US009709725B2

(12) United States Patent
Wilcox et al.

(10) Patent No.: US 9,709,725 B2
(45) Date of Patent: Jul. 18, 2017

(54) LUMINAIRE UTILIZING WAVEGUIDE

(71) Applicant: Cree, Inc., Durham, NC (US)

(72) Inventors: Kurt S. Wilcox, Libertyville, IL (US); Nicholas W. Medendorp, Jr., Raleigh, NC (US); Zongjie Yuan, Libertyville, IL (US); Andrew Dan Bendtsen, Racine, WI (US); Nathan Snell, Raleigh, NC (US); Jeremy Sorenson, Oak Creek, WI (US); Brian Kinnune, Racine, WI (US); Craig D. Raleigh, Burlington, WI (US)

(73) Assignee: Cree, Inc., Durham, NC (US)

( * ) Notice: Subject to any disclaimer, the term of this patent is extended or adjusted under 35 U.S.C. 154(b) by 0 days.

(21) Appl. No.: 14/657,988

(22) Filed: Mar. 13, 2015

(65) Prior Publication Data

US 2015/0253488 A1 Sep. 10, 2015

Related U.S. Application Data

(63) Continuation-in-part of application No. 13/842,521, filed on Mar. 15, 2013, now Pat. No. 9,519,095, and
(Continued)

(51) Int. Cl.
*G02B 6/00* (2006.01)
*F21V 8/00* (2006.01)
(Continued)

(52) U.S. Cl.
CPC .......... *G02B 6/0038* (2013.01); *F21V 23/009* (2013.01); *G02B 6/0021* (2013.01); *G02B 6/0031* (2013.01); *G02B 6/0035* (2013.01); *G02B 6/0043* (2013.01); *G02B 6/0073* (2013.01); *G02B 6/24* (2013.01); *G02B 6/262* (2013.01); *G02B 6/305* (2013.01);
(Continued)

(58) Field of Classification Search
CPC ....................................................... G02B 6/00
USPC ....................................................... 385/131
See application file for complete search history.

(56) References Cited

U.S. PATENT DOCUMENTS 3,372,740 A 3/1968 Kastovich et al.
5,165,772 A * 11/1992 Wu ............................... 362/309
(Continued)

FOREIGN PATENT DOCUMENTS

WO    WO 2014-145283    9/2014

OTHER PUBLICATIONS

International Search Report and Written Opinion for International Application No. PCT/US2015/020601, dated Jul. 31, 2015, Applicant, Cree, Inc. (23 pages).
(Continued)

*Primary Examiner* — Kaveh C Kianni
(74) *Attorney, Agent, or Firm* — McCracken & Gillen LLC

(57) ABSTRACT

An optical waveguide having orthogonal x- and y-dimensions includes at least one coupling feature for directing light into the waveguide, at least one light redirection feature extending in the x- and y-dimensions for redirecting light in the waveguide, at least one first light extraction feature extending in the x-dimension for extracting light out of the waveguide, and at least one second light extraction feature extending in the y-dimension for extracting light out of the waveguide.

34 Claims, 112 Drawing Sheets

Related U.S. Application Data a continuation-in-part of application No. 13/839,949, filed on Mar. 15, 2013, now Pat. No. 9,581,751, and a continuation-in-part of application No. 13/841,074, filed on Mar. 15, 2013, and a continuation-in-part of application No. 13/840,563, filed on Mar. 15, 2013, and a continuation-in-part of application No. 13/841,622, filed on Mar. 15, 2013, and a continuation-in-part of application No. 13/938,877, filed on Jul. 10, 2013, now Pat. No. 9,389,367, and a continuation-in-part of application No. 14/015,801, filed on Aug. 30, 2013, now Pat. No. 9,291,320, and a continuation-in-part of application No. 14/101,086, filed on Dec. 9, 2013, and a continuation-in-part of application No. 14/101,147, filed on Dec. 9, 2013, and a continuation-in-part of application No. 14/101,099, filed on Dec. 9, 2013, now Pat. No. 9,411,086, and a continuation-in-part of application No. 14/101,129, filed on Dec. 9, 2013, and a continuation-in-part of application No. 14/101,051, filed on Dec. 9, 2013, now Pat. No. 9,366,396, and a continuation-in-part of application No. PCT/US2014/013937, filed on Jan. 30, 2014, and a continuation-in-part of application No. PCT/US2014/013931, filed on Jan. 30, 2014, and a continuation-in-part of application No. PCT/US2014/030017, filed on Mar. 15, 2014, and a continuation-in-part of application No. 14/462,426, filed on Aug. 18, 2014, and a continuation-in-part of application No. 14/462,391, filed on Aug. 18, 2014, now Pat. No. 9,513,424, and a continuation-in-part of application No. 14/485,609, filed on Sep. 12, 2014, and a continuation-in-part of application No. 14/583,415, filed on Dec. 26, 2014, and a continuation-in-part of application No. 14/292,778, filed on May 30, 2014, now Pat. No. 9,366,799, and a continuation-in-part of application No. 14/577,730, filed on Dec. 19, 2014, now abandoned, and a continuation-in-part of application No. PCT/US2014/072848, filed on Dec. 30, 2014, and a continuation-in-part of application No. 14/101,132, filed on Dec. 9, 2013, now Pat. No. 9,442,243.

(60) Provisional application No. 61/922,017, filed on Dec. 30, 2013, provisional application No. 62/005,955, filed on May 30, 2014, provisional application No. 62/009,039, filed on Jun. 6, 2014, provisional application No. 62/005,965, filed on May 30, 2014, provisional application No. 62/025,436, filed on Jul. 16, 2014, provisional application No. 62/025,905, filed on Jul. 17, 2014.

(51) Int. Cl.

| | | |
|---|---|---|
| *F21V 23/00* | (2015.01) | |
| *G02B 6/30* | (2006.01) | |
| *G02B 6/32* | (2006.01) | |
| *G02B 6/34* | (2006.01) | |
| *G02B 6/24* | (2006.01) | |
| *G02B 6/26* | (2006.01) | |
| *F21W 131/10* | (2006.01) | |
| *F21Y 115/10* | (2016.01) | |

(52) U.S. Cl.
CPC .................. *G02B 6/32* (2013.01); *G02B 6/34* (2013.01); *F21W 2131/10* (2013.01); *F21Y 2115/10* (2016.08)

(56) References Cited

U.S. PATENT DOCUMENTS

| | | | |
|---|---|---|---|
| 5,659,410 A * | 8/1997 | Koike et al. | 349/62 |
| 5,676,457 A | 10/1997 | Simon | |
| 5,839,823 A | 11/1998 | Hou et al. | |
| 5,863,113 A | 1/1999 | Oe et al. | |
| 5,961,198 A * | 10/1999 | Hira et al. | 362/621 |
| 6,099,134 A * | 8/2000 | Taniguchi et al. | 362/618 |
| 6,322,225 B1 * | 11/2001 | Koike | 362/620 |
| 6,425,673 B1 * | 7/2002 | Suga et al. | 362/613 |
| 6,443,594 B1 | 9/2002 | Marshall et al. | |
| 6,480,307 B1 * | 11/2002 | Yang | 359/15 |
| 6,554,451 B1 | 4/2003 | Keuper | |
| 6,802,628 B2 * | 10/2004 | Kuo | 362/332 |
| 6,992,718 B1 * | 1/2006 | Takahara | 348/333.09 |
| 7,008,097 B1 | 3/2006 | Hulse | |
| 7,090,370 B2 | 8/2006 | Clark et al. | |
| 7,488,093 B1 | 2/2009 | Huang et al. | |
| 7,534,013 B1 | 5/2009 | Simon | |
| 7,566,159 B2 | 7/2009 | Oon et al. | |
| 7,593,615 B2 | 9/2009 | Chakmakjian et al. | |
| 7,599,277 B1 * | 10/2009 | Kato et al. | 369/112.27 |
| 7,628,508 B2 | 12/2009 | Kita et al. | |
| 7,635,205 B2 | 12/2009 | Yu et al. | |
| 7,641,363 B1 | 1/2010 | Chang et al. | |
| 7,736,019 B2 | 6/2010 | Shimada et al. | |
| 7,775,697 B2 * | 8/2010 | Hirano et al. | 362/511 |
| 7,810,960 B1 | 10/2010 | Soderman et al. | |
| 7,813,131 B2 | 10/2010 | Liang | |
| 8,033,706 B1 * | 10/2011 | Kelly et al. | 362/607 |
| 8,277,106 B2 | 10/2012 | Van Gorkom et al. | |
| 8,287,152 B2 | 10/2012 | Gill | |
| 8,317,366 B2 | 11/2012 | Dalton et al. | |
| 8,353,606 B2 | 1/2013 | Jeong | |
| 8,382,387 B1 | 2/2013 | Sandoval | |
| 8,408,737 B2 | 4/2013 | Wright et al. | |
| 8,419,224 B2 | 4/2013 | Wan-Chih et al. | |
| 8,434,892 B2 | 5/2013 | Zwak et al. | |
| 8,434,893 B2 | 5/2013 | Boyer et al. | |
| 8,475,010 B2 | 7/2013 | Vissenberg et al. | |
| 8,485,684 B2 | 7/2013 | Lou et al. | |
| 8,547,022 B2 | 10/2013 | Summerford et al. | |
| 8,567,983 B2 | 10/2013 | Boyer et al. | |
| 8,573,823 B2 | 11/2013 | Dau et al. | |
| 8,593,070 B2 | 11/2013 | Wang et al. | |
| 9,099,592 B2 | 8/2015 | Derryberry et al. | |
| 2001/0035927 A1 * | 11/2001 | Sasagawa et al. | 349/113 |
| 2002/0181224 A1 * | 12/2002 | Tahara et al. | 362/31 |
| 2003/0123244 A1 * | 7/2003 | Ishitaka | 362/31 |
| 2004/0125590 A1 * | 7/2004 | Tsai | 362/31 |
| 2004/0125592 A1 * | 7/2004 | Nagakubo et al. | 362/31 |
| 2004/0136077 A1 * | 7/2004 | Leu et al. | 359/599 |
| 2004/0183774 A1 * | 9/2004 | Manabe et al. | 345/102 |
| 2004/0234229 A1 * | 11/2004 | Yagi et al. | 385/146 |
| 2004/0246601 A1 * | 12/2004 | Okuwaki et al. | 359/834 |
| 2004/0257484 A1 * | 12/2004 | Ishitaka et al. | 349/16 |
| 2005/0023433 A1 * | 2/2005 | Ishitaka et al. | 249/134 |
| 2005/0146897 A1 * | 7/2005 | Mimura et al. | 362/623 |
| 2005/0286854 A1 * | 12/2005 | Honma et al. | 385/146 |
| 2006/0062016 A1 * | 3/2006 | Dejima et al. | 362/600 |
| 2006/0146573 A1 * | 7/2006 | Iwauchi et al. | 362/621 |
| 2007/0115569 A1 | 5/2007 | Tang et al. | |
| 2007/0201234 A1 * | 8/2007 | Ottermann | 362/341 |
| 2007/0206137 A1 * | 9/2007 | Akiyama | 349/113 |
| 2008/0002399 A1 | 1/2008 | Villard et al. | |
| 2008/0144324 A1 * | 6/2008 | Tahara et al. | 362/311 |
| 2008/0198621 A1 * | 8/2008 | Tanoue et al. | 362/606 |
| 2008/0199143 A1 * | 8/2008 | Turner | 385/146 |
| 2008/0232135 A1 * | 9/2008 | Kinder et al. | 362/615 |
| 2009/0218525 A1 * | 9/2009 | Ikeda et al. | 250/559.07 |
| 2010/0008088 A1 * | 1/2010 | Koizumi et al. | 362/235 |
| 2010/0238671 A1 | 9/2010 | Catone et al. | |
| 2010/0301360 A1 | 12/2010 | Van De Ven et al. | |
| 2010/0302783 A1 | 12/2010 | Shastry et al. | |
| 2011/0044022 A1 | 2/2011 | Ko et al. | |
| 2011/0233568 A1 | 9/2011 | An et al. | |
| 2011/0305027 A1 | 12/2011 | Ham | |

(56) References Cited

U.S. PATENT DOCUMENTS

| | | |
|---|---|---|
| 2011/0317436 A1 | 12/2011 | Kuan |
| 2012/0026728 A1 | 2/2012 | Lou et al. |
| 2012/0069579 A1* | 3/2012 | Koh et al. .................... 362/307 |
| 2012/0152490 A1 | 6/2012 | Wen et al. |
| 2012/0287654 A1 | 11/2012 | He et al. |
| 2012/0287677 A1 | 11/2012 | Wheatley et al. |
| 2012/0307496 A1 | 12/2012 | Phillips, III et al. |
| 2013/0003363 A1 | 1/2013 | Lu et al. |
| 2013/0128593 A1 | 5/2013 | Luo |
| 2013/0170210 A1 | 7/2013 | Athalye |
| 2013/0215612 A1 | 8/2013 | Garcia |
| 2013/0250584 A1 | 9/2013 | Wang et al. |
| 2013/0300310 A1 | 11/2013 | Hu et al. |
| 2013/0343045 A1 | 12/2013 | Lodhie et al. |
| 2013/0343055 A1 | 12/2013 | Eckert et al. |
| 2013/0343079 A1 | 12/2013 | Unger et al. |
| 2014/0029257 A1 | 1/2014 | Boyer et al. |
| 2015/0055369 A1 | 2/2015 | Tarsa et al. |
| 2015/0055371 A1 | 2/2015 | van de Ven et al. |
| 2015/0160396 A1 | 6/2015 | Wilcox et al. |
| 2015/0253488 A1 | 9/2015 | Wilcox et al. |

OTHER PUBLICATIONS

Invitation to Pay Additional Fees for International Application No. PCT/US2015/020601 dated Jun. 5, 2015, Applicant, Cree, Inc. (2 pages).

International Search Report and Written Opinion for International Application No. PCT/US14/30017, dated Aug. 1, 2014, Applicant, Cree, Inc., (21 pages).

IPRP for International Application No. PCT/US2014/030017, dated Sep. 24, 2015, Applicant, Cree, Inc., (15 pages).

* cited by examiner

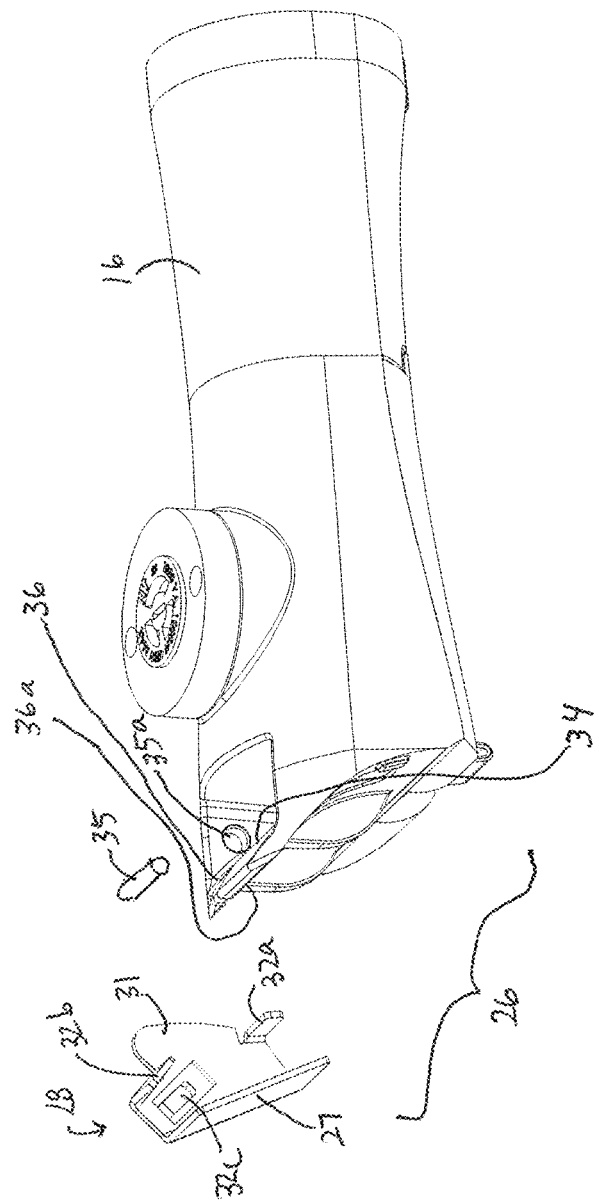

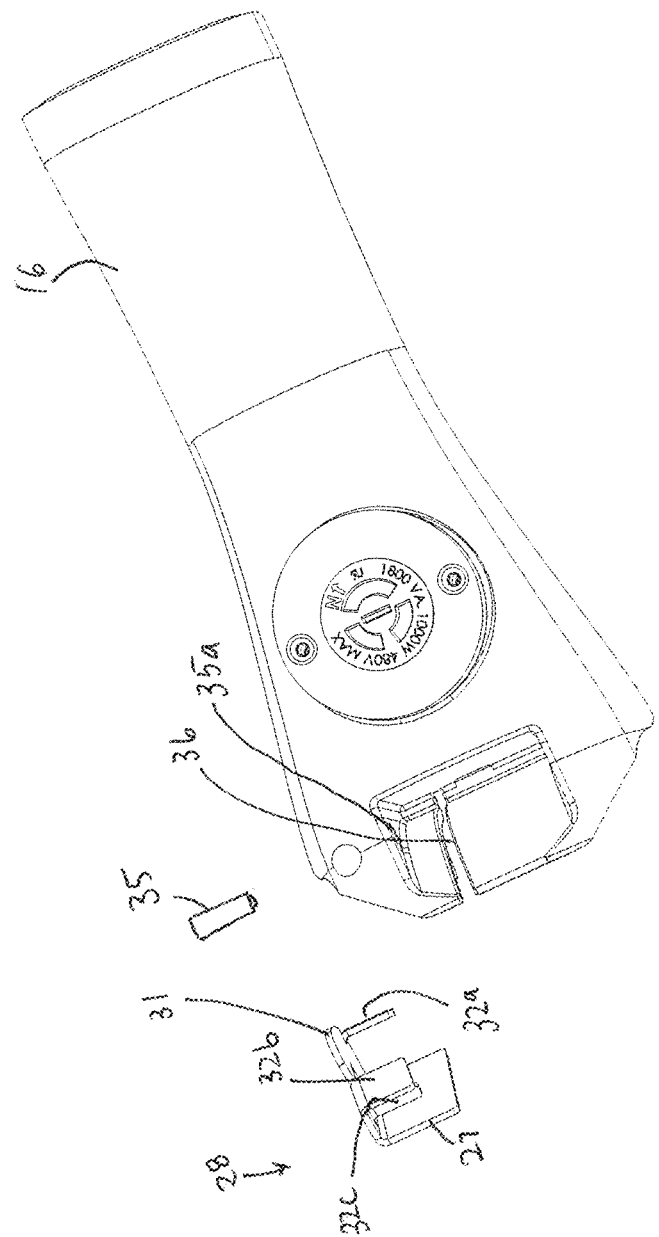

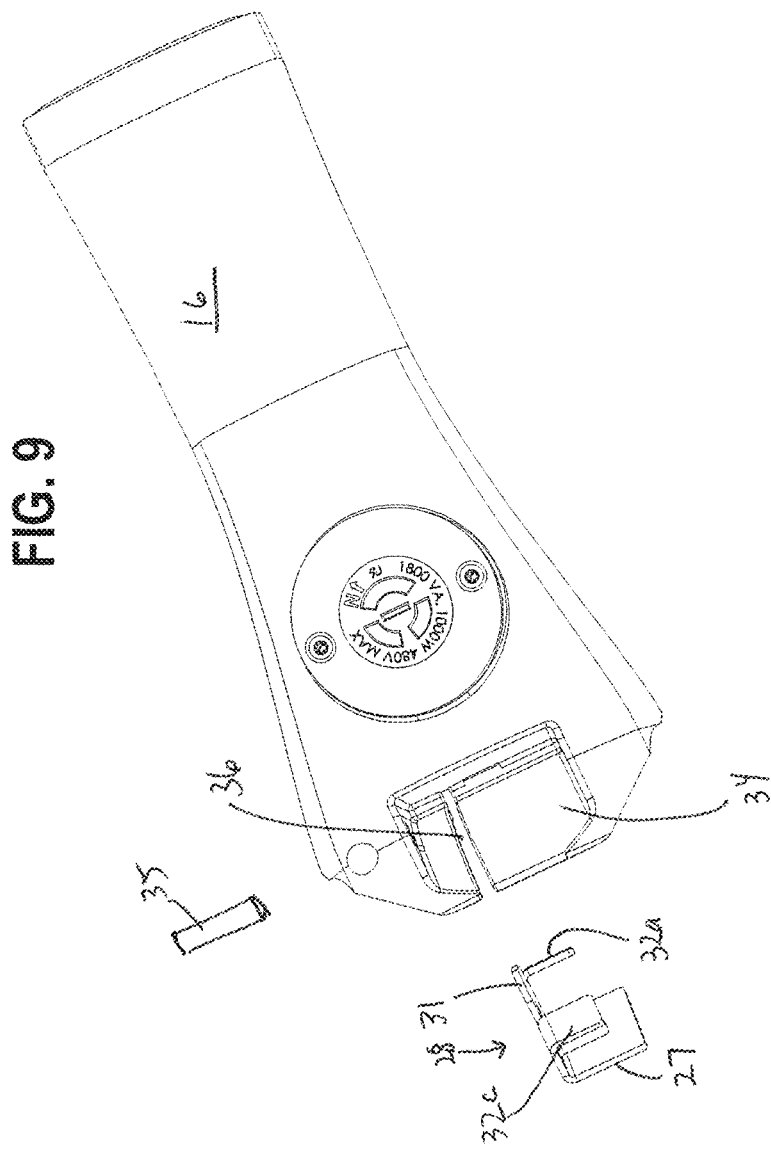

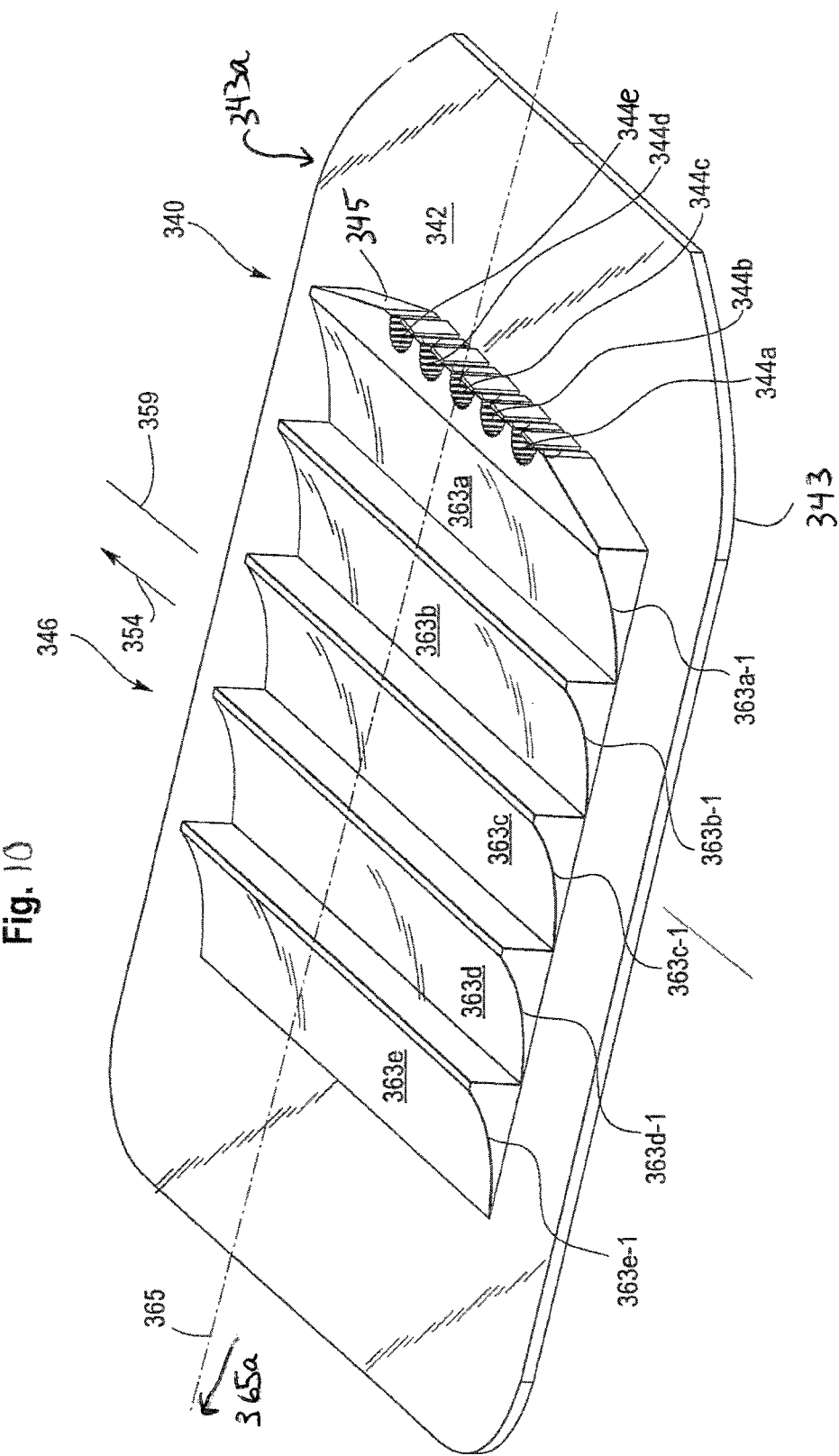

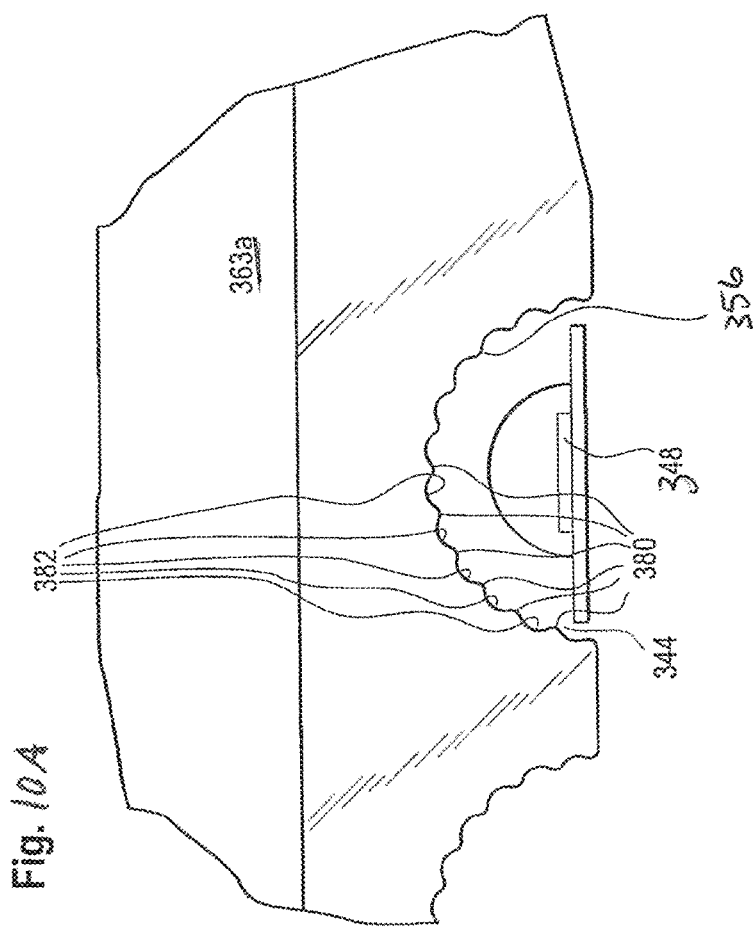

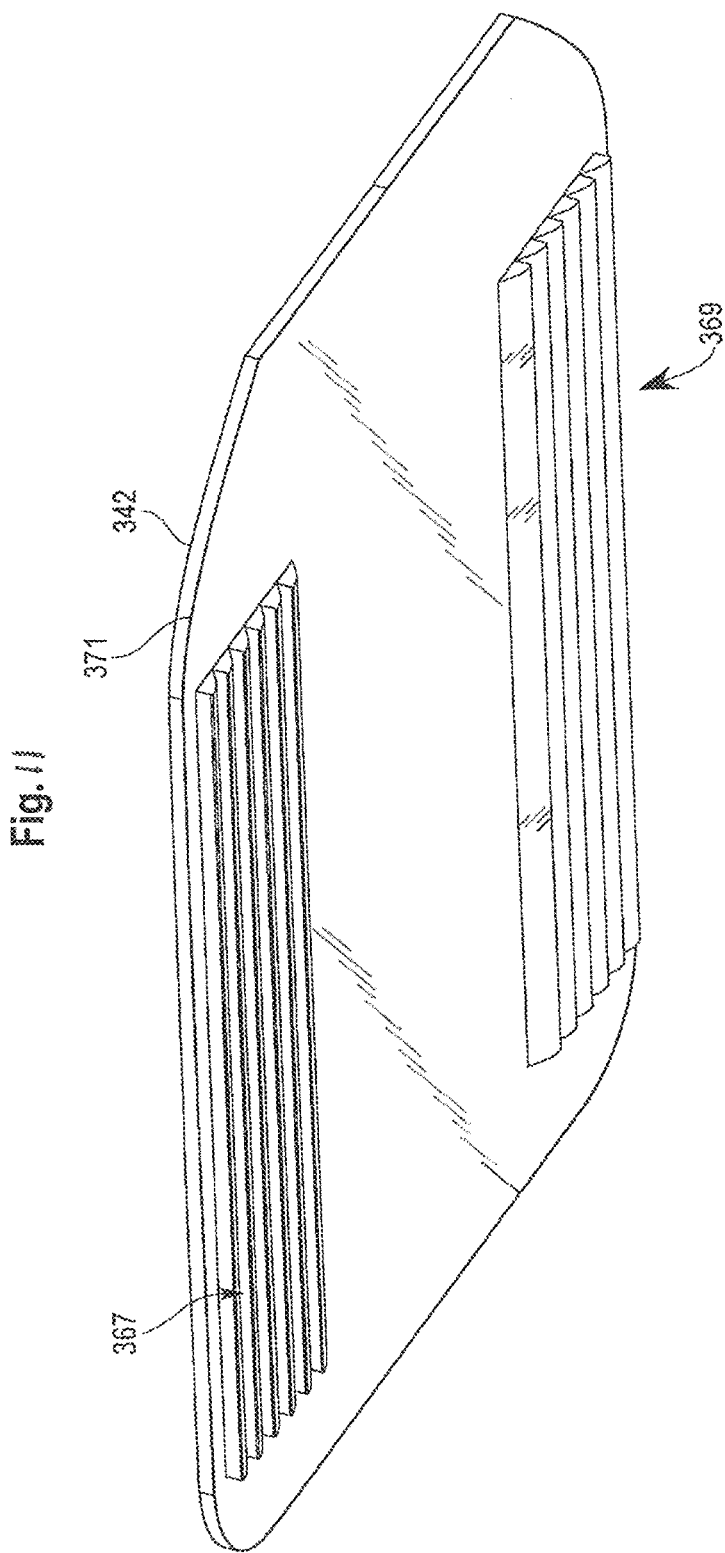

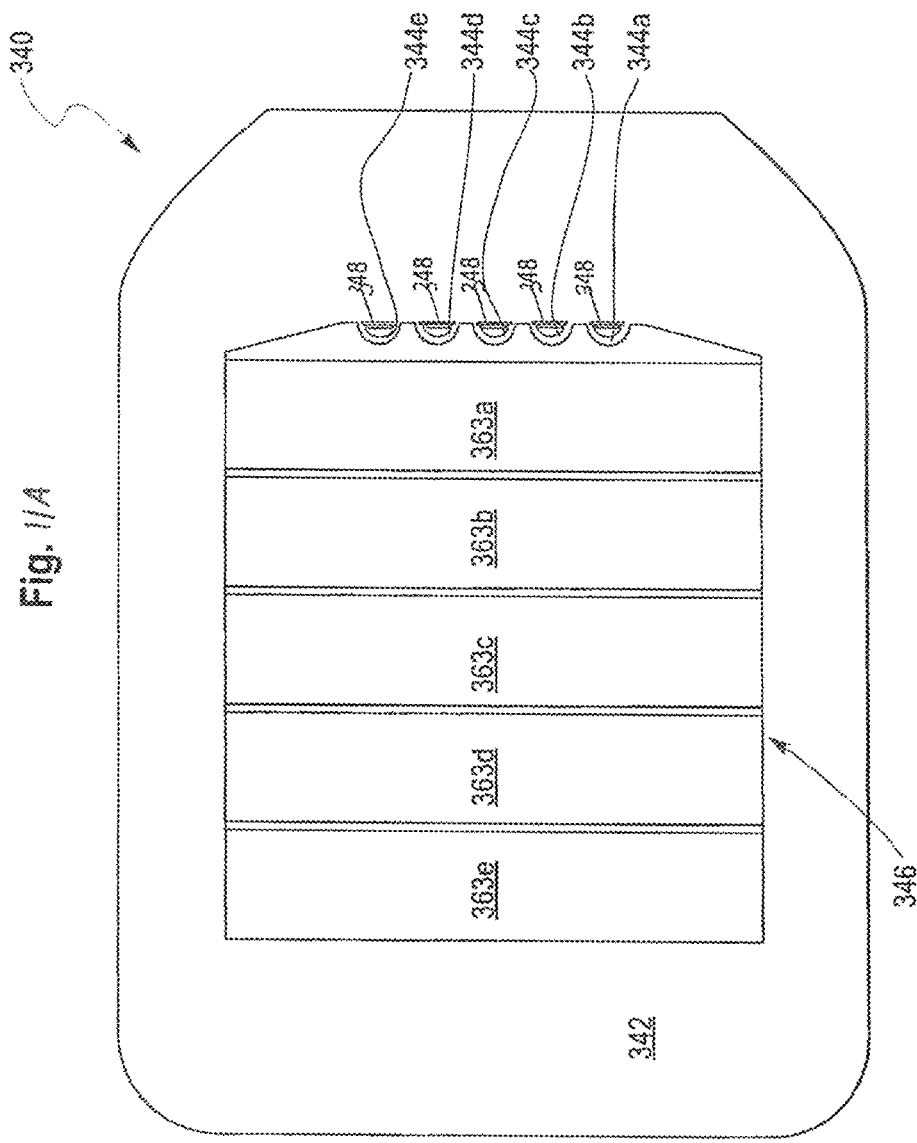

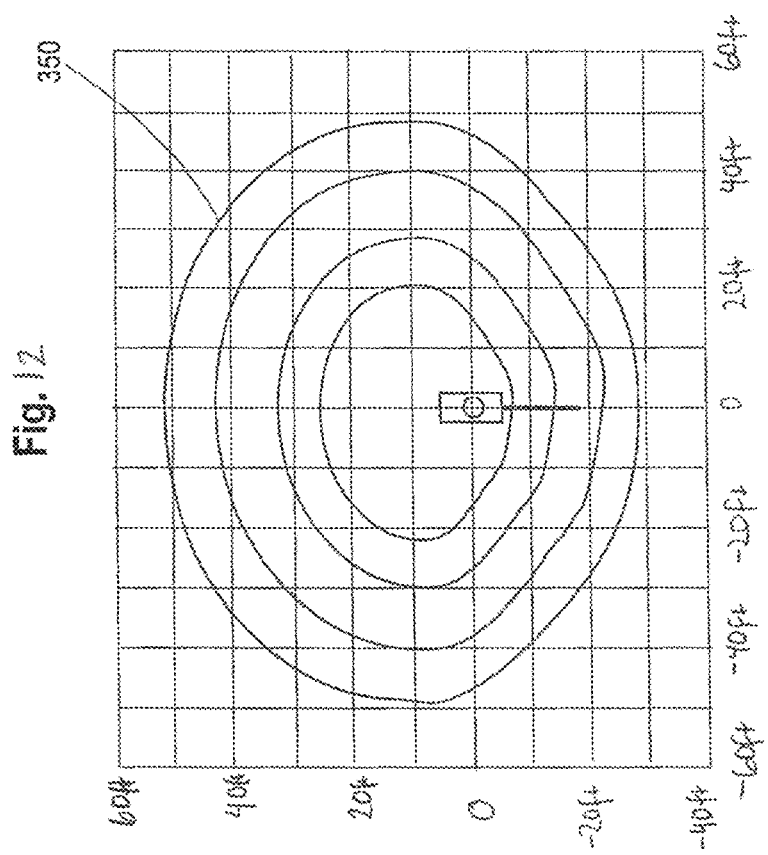

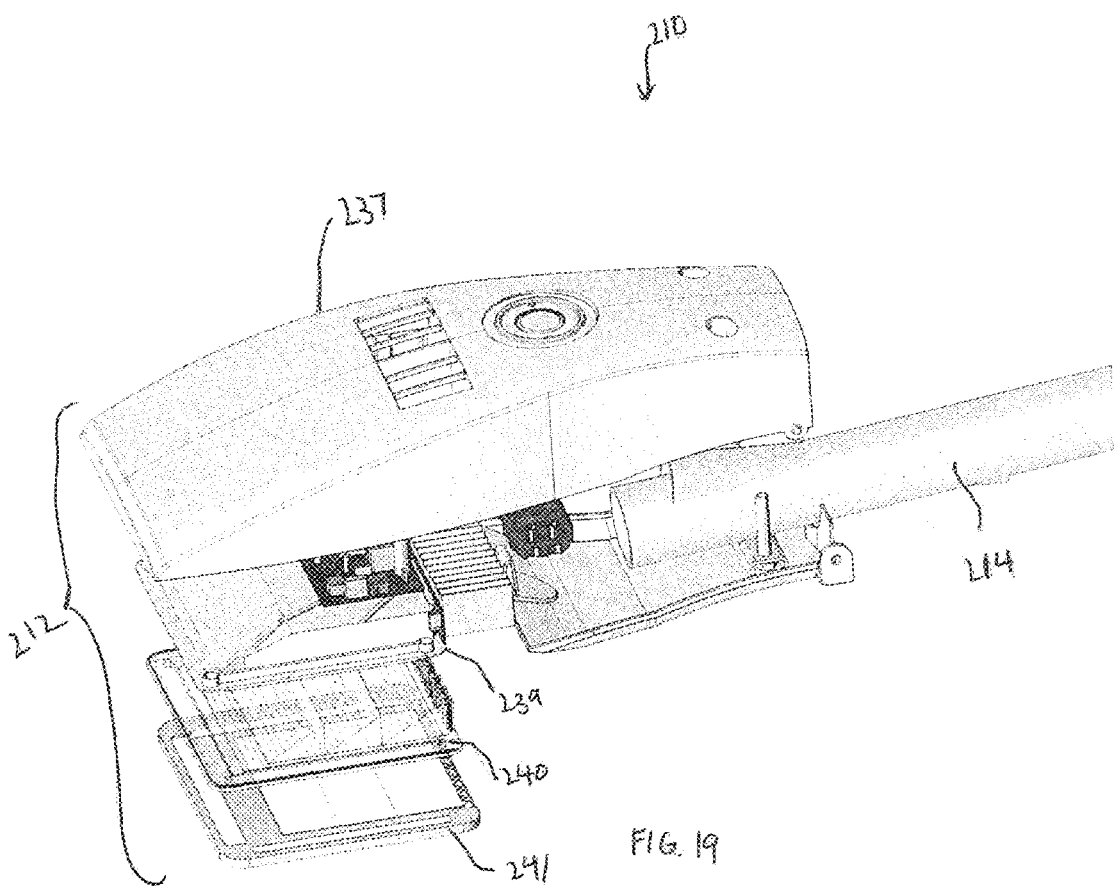

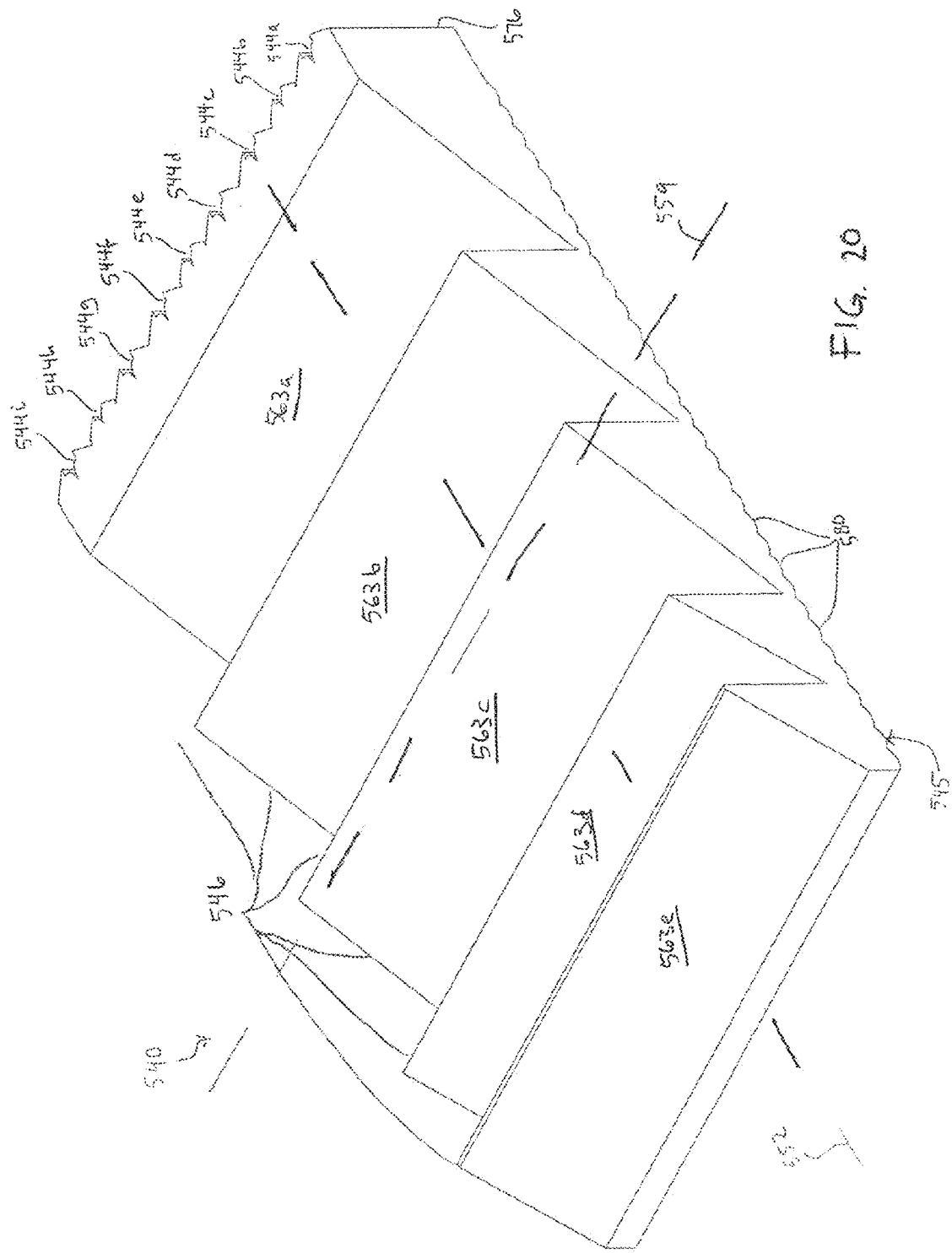

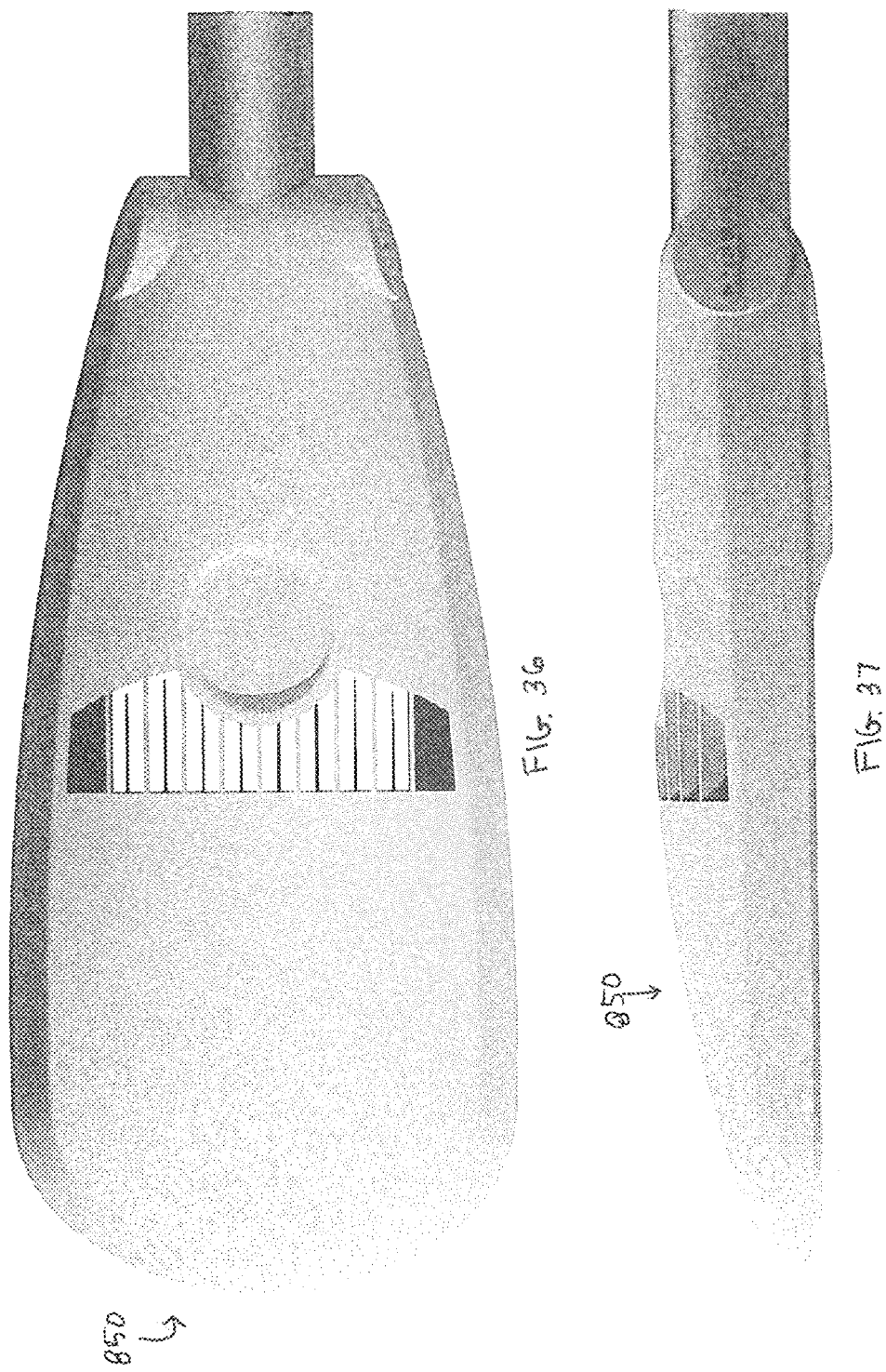

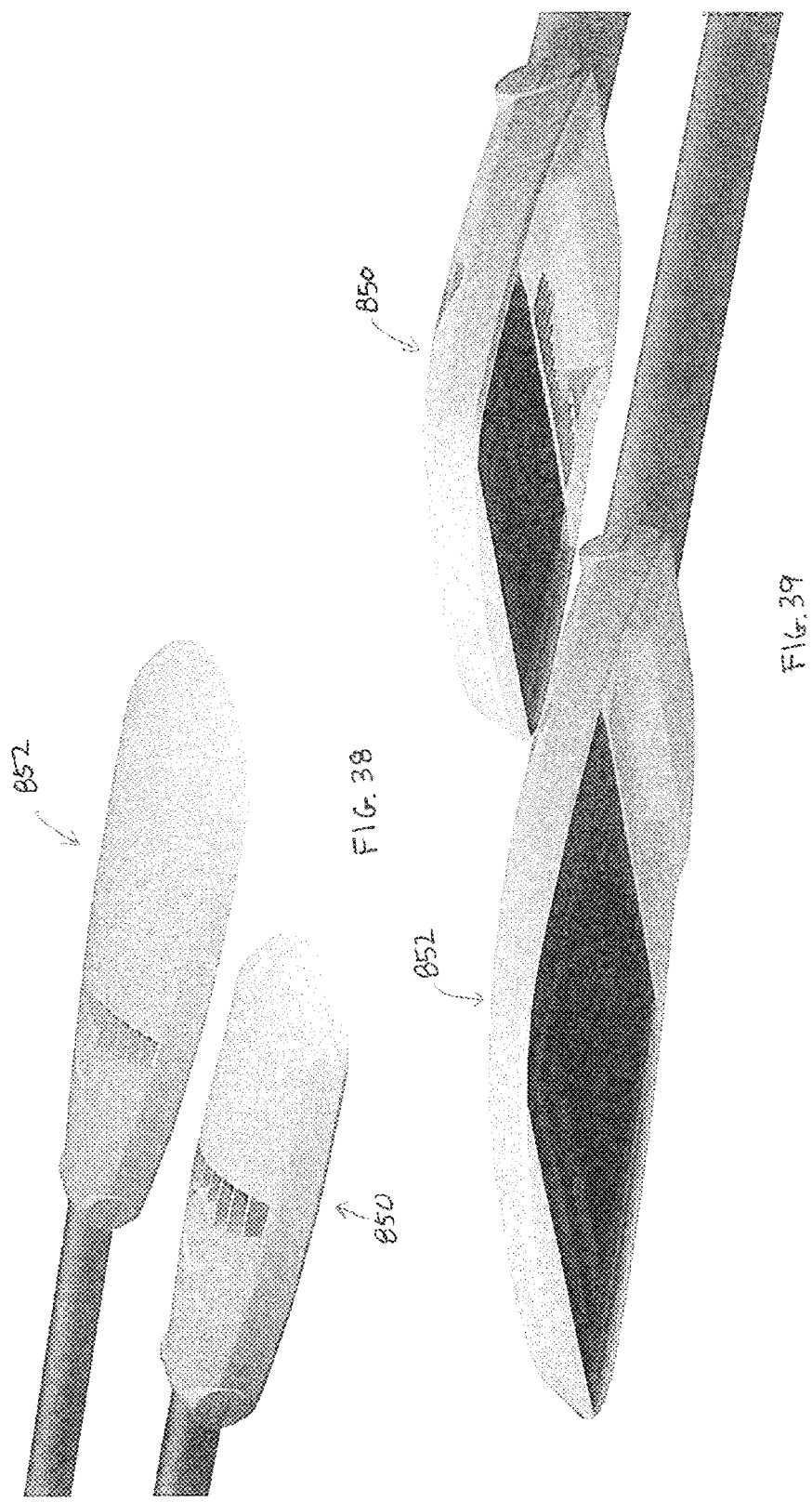

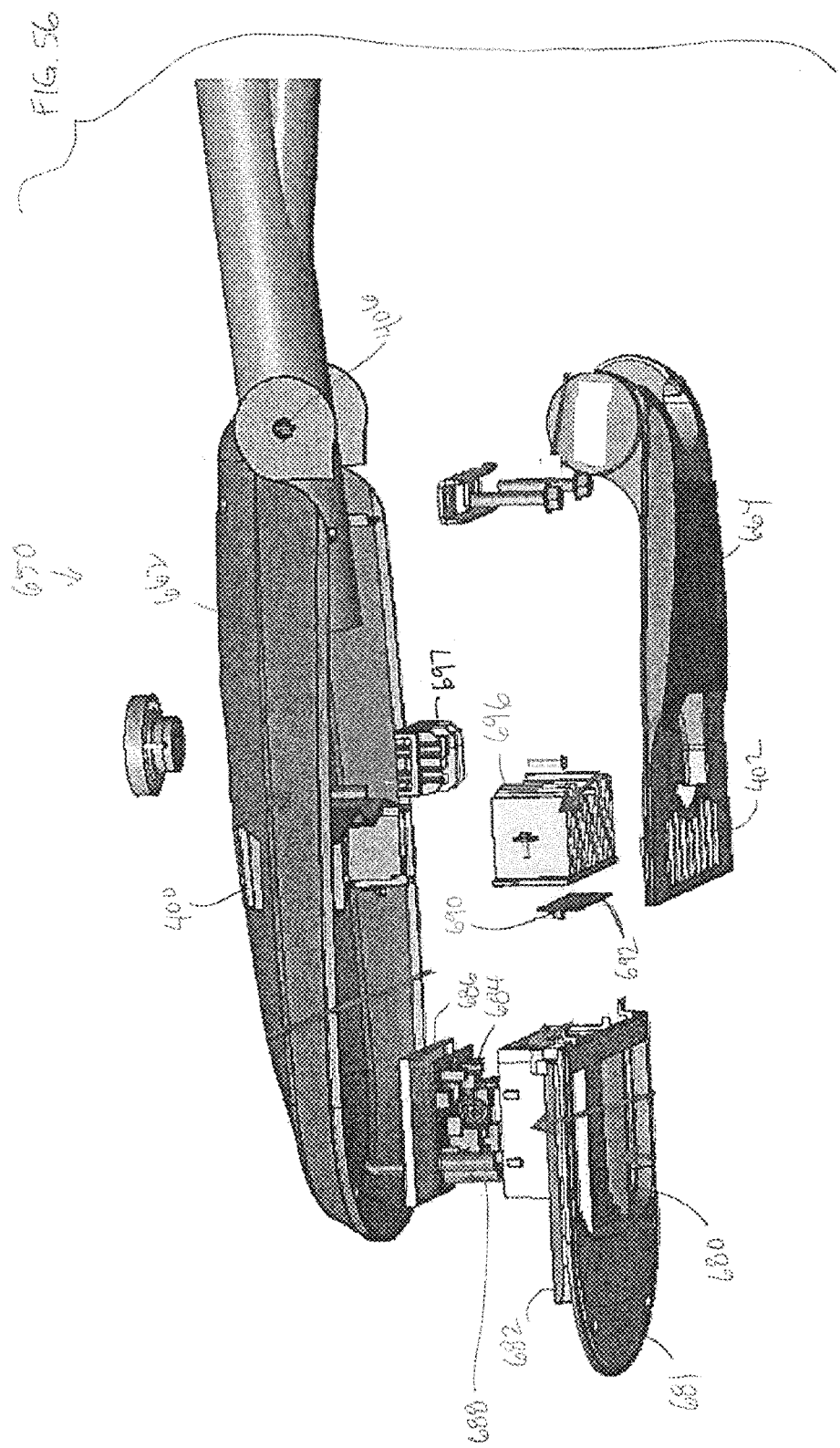

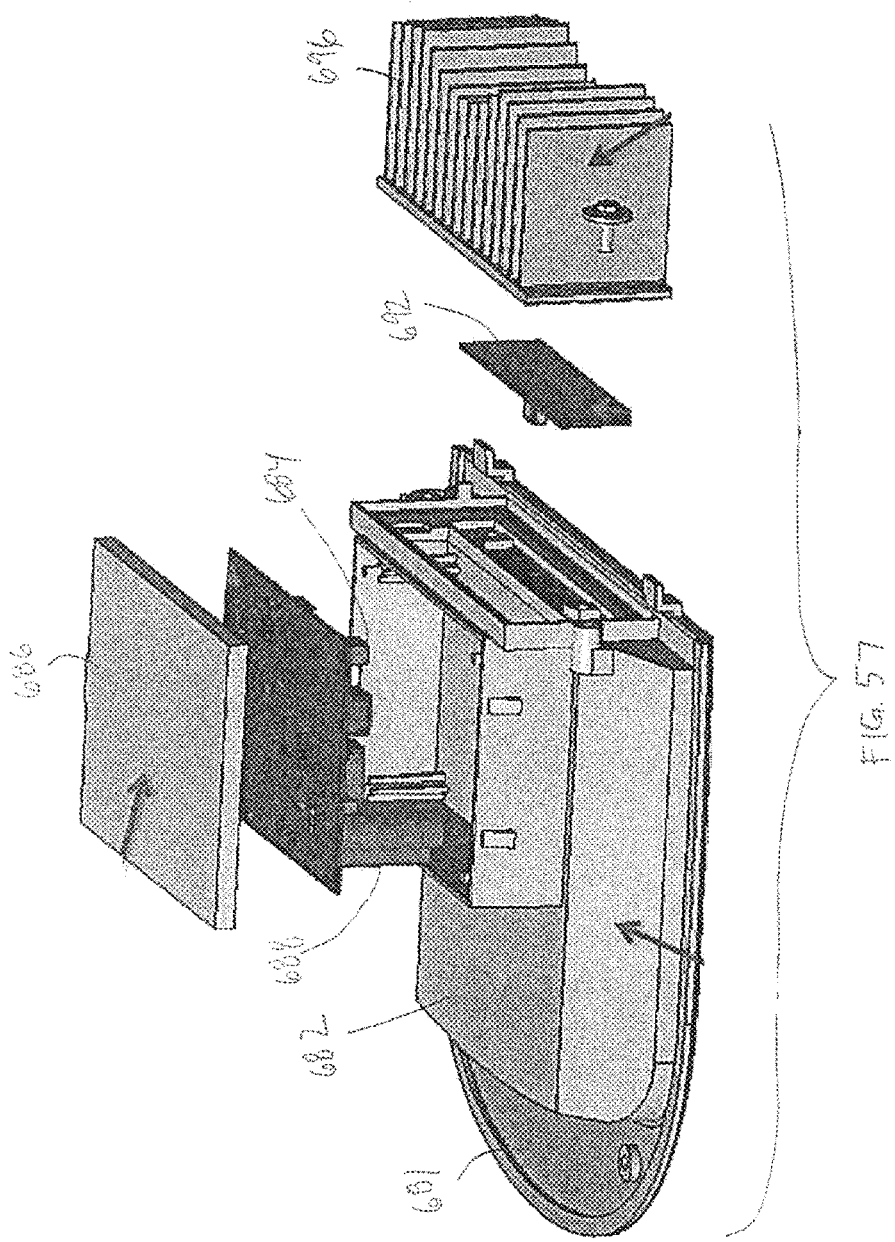

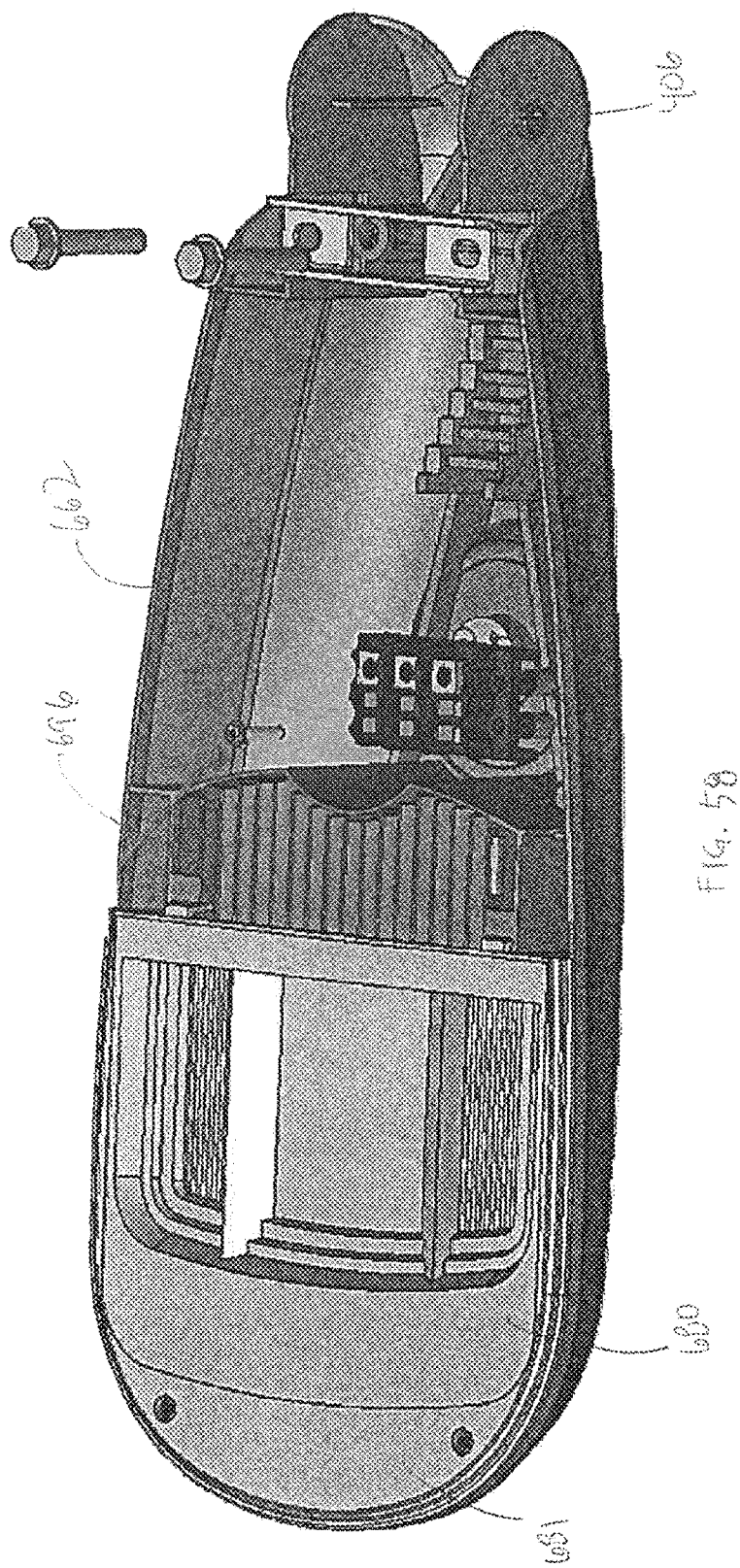

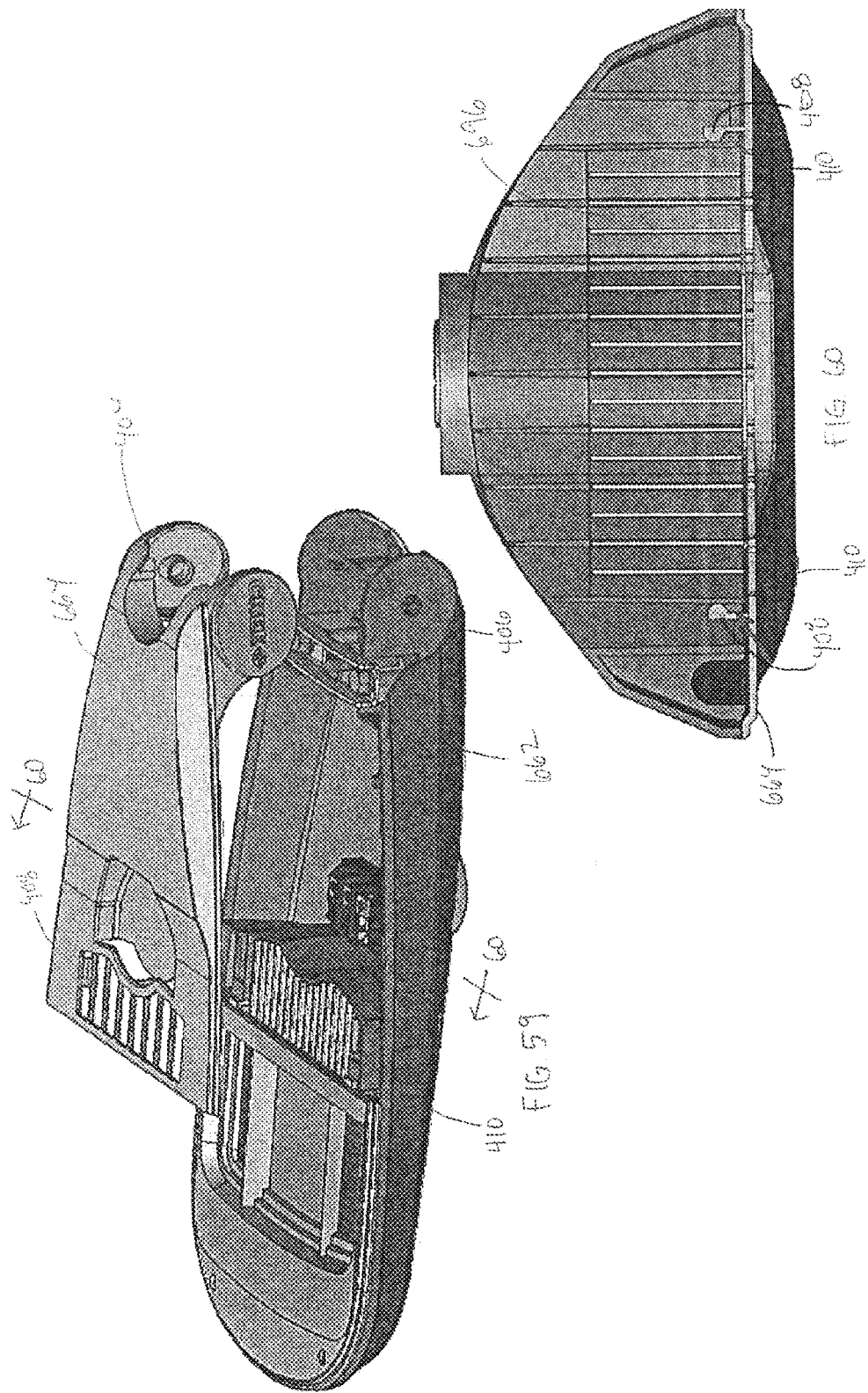

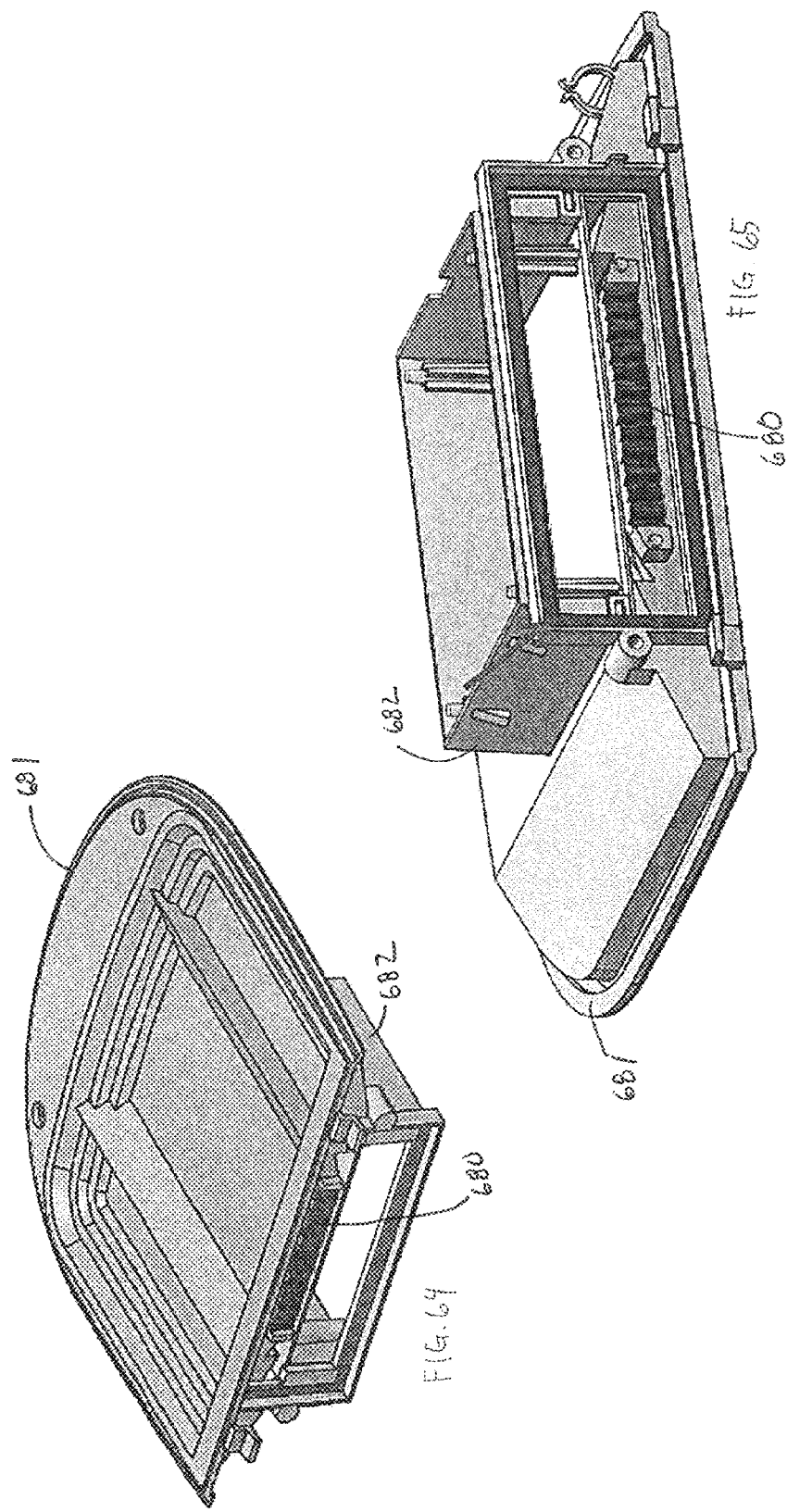

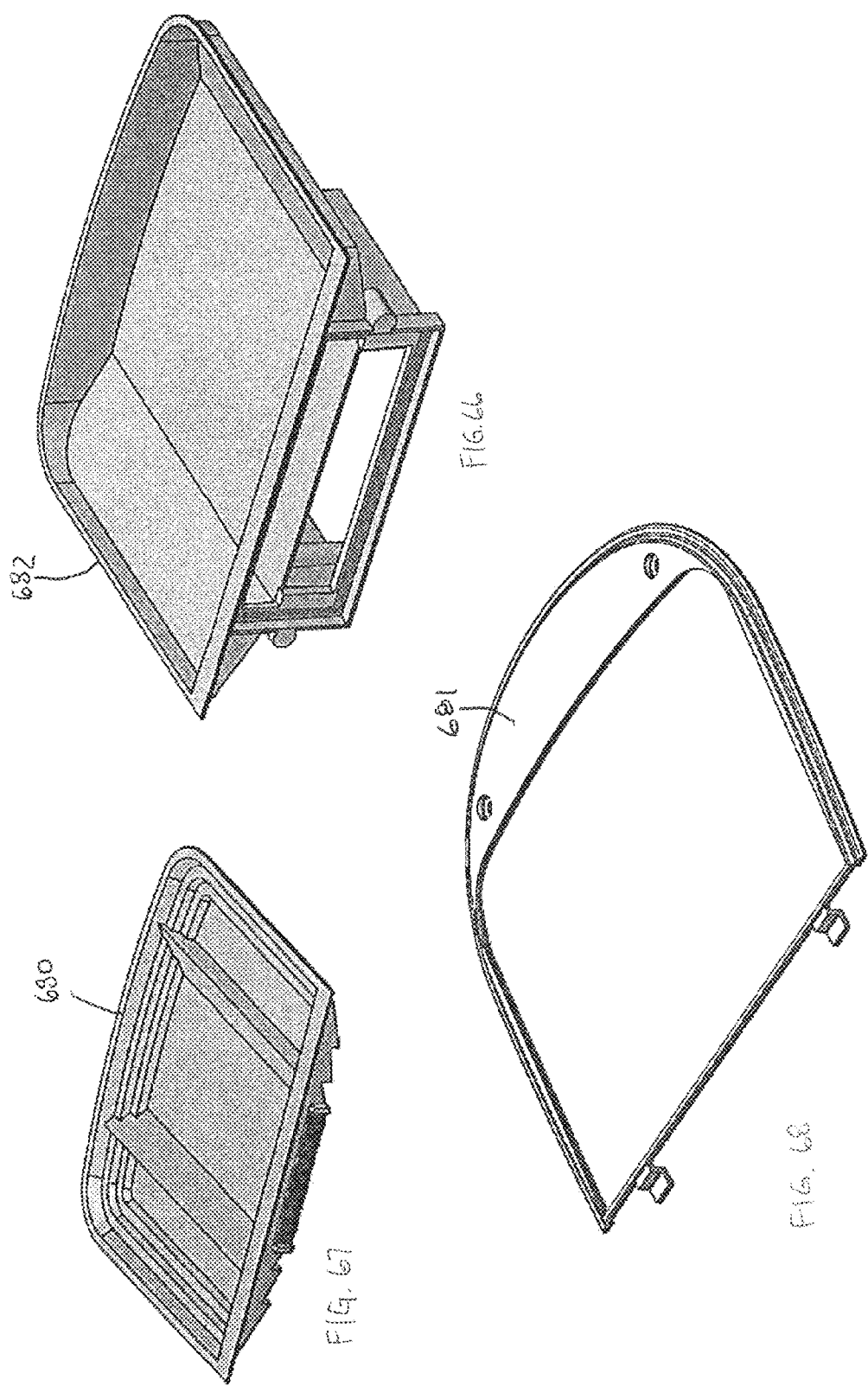

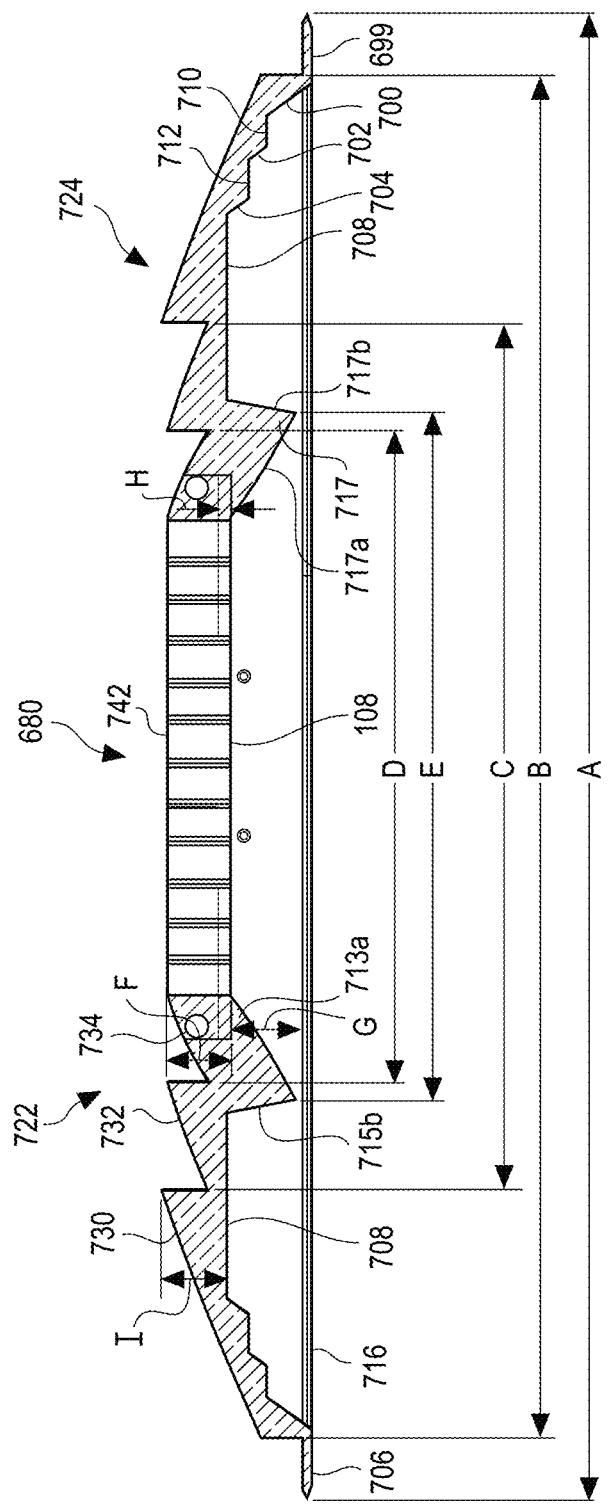

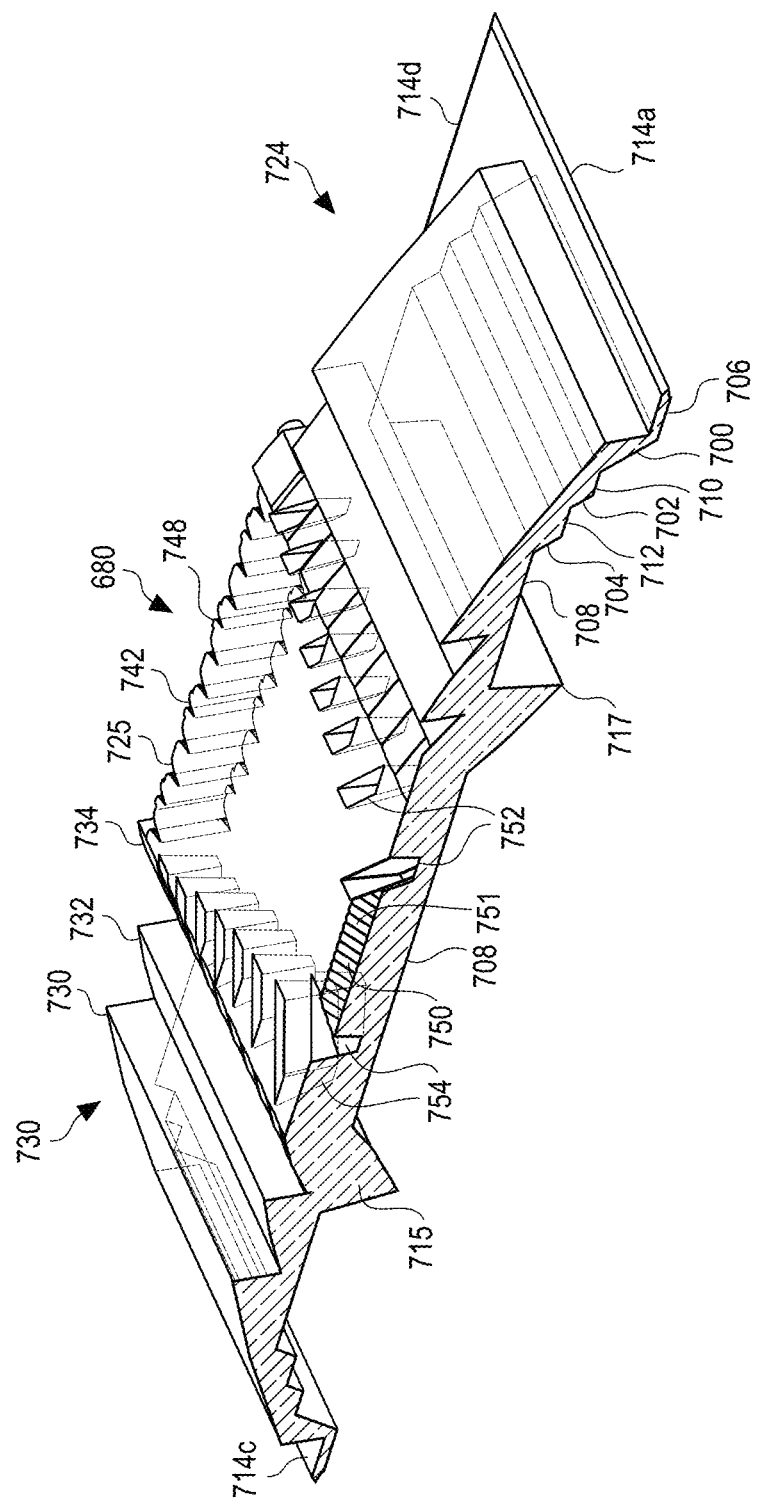

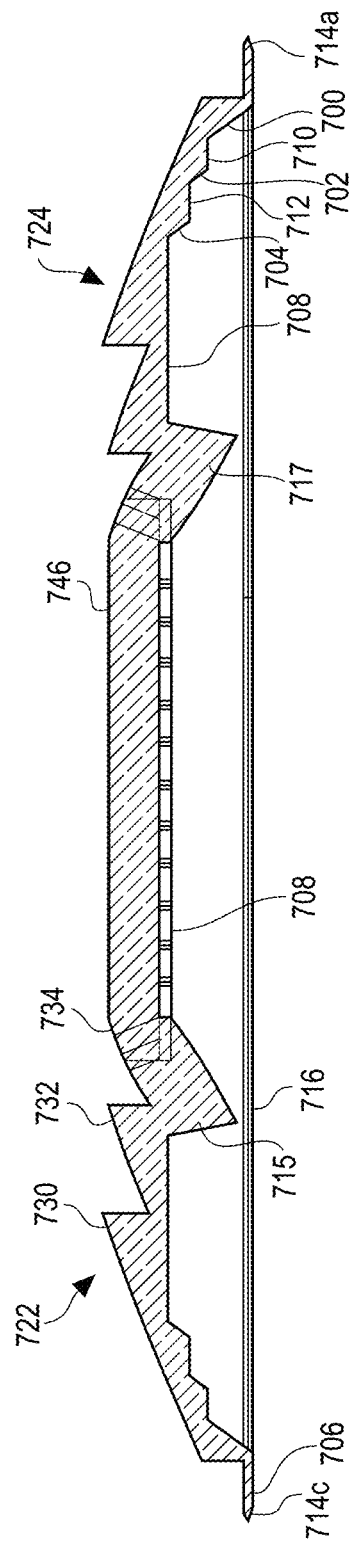

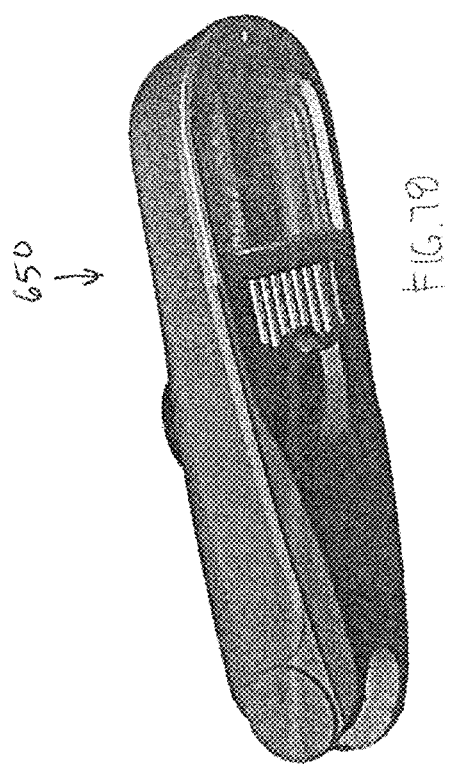

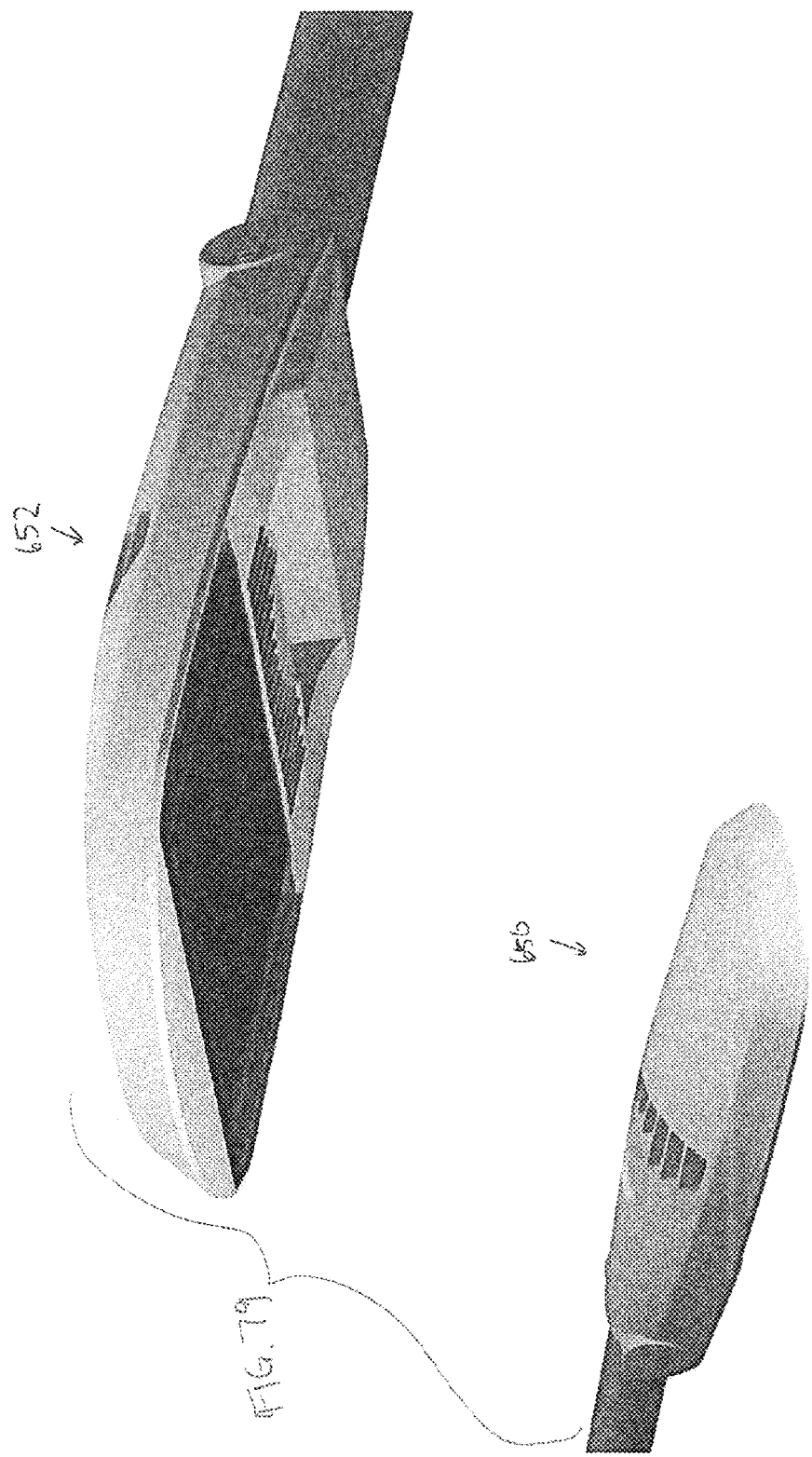

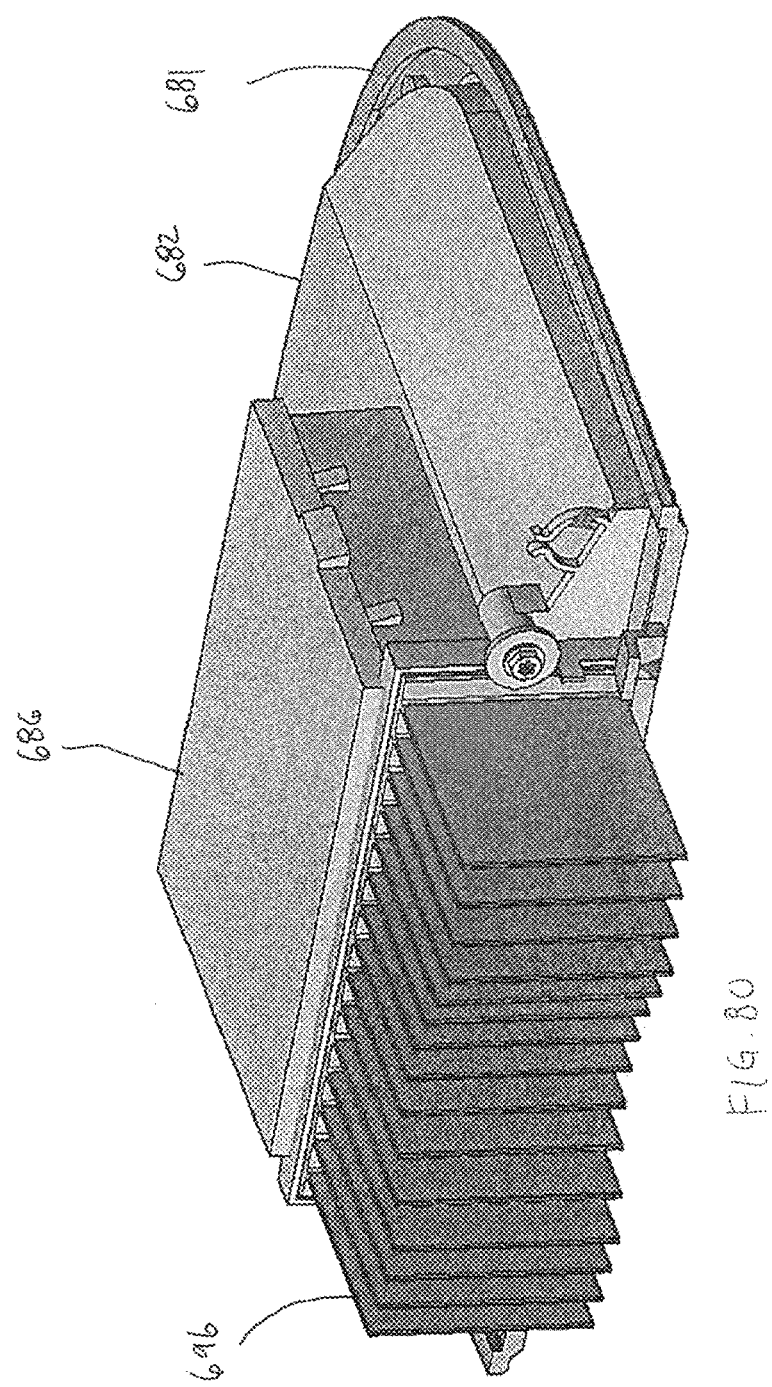

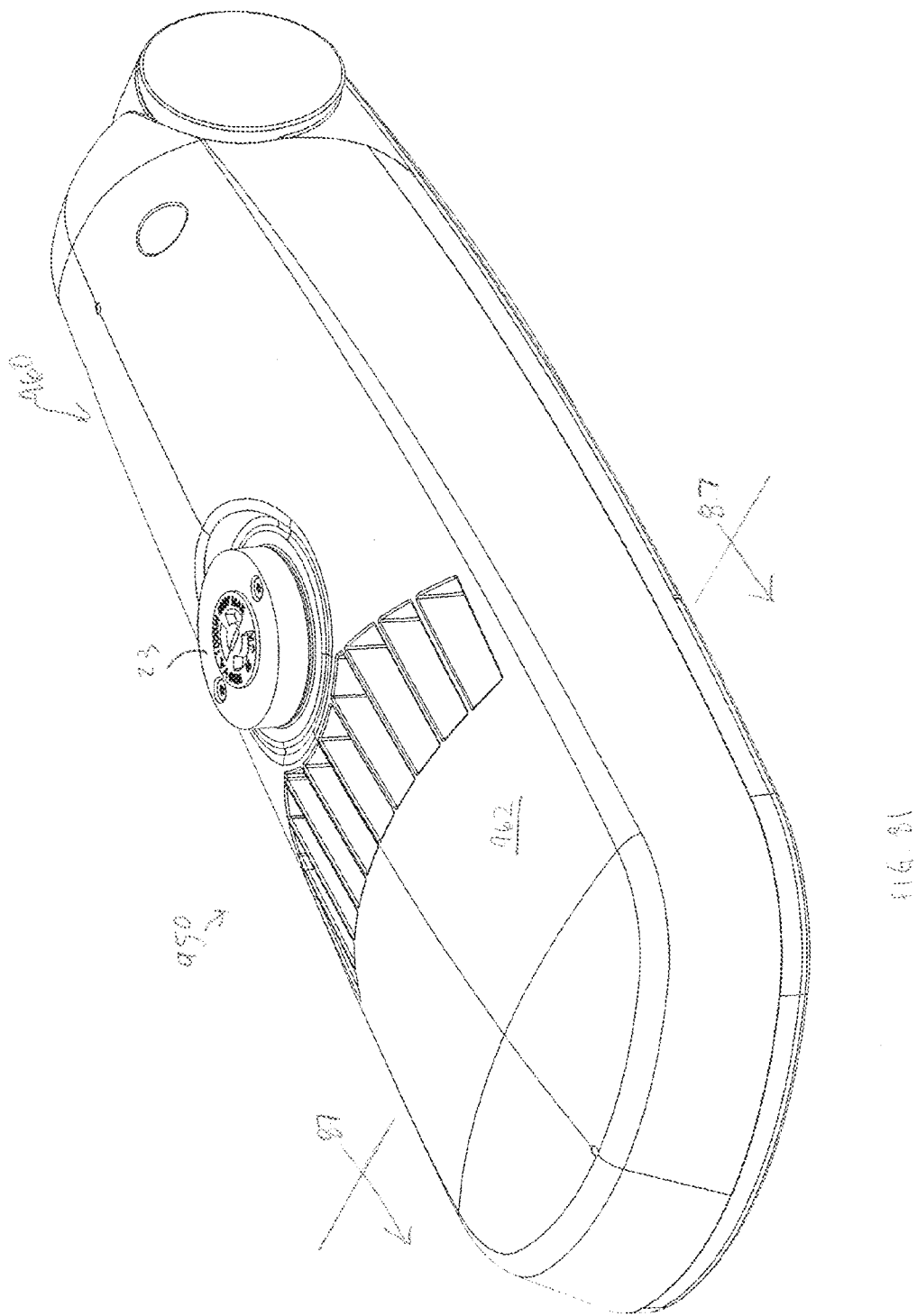

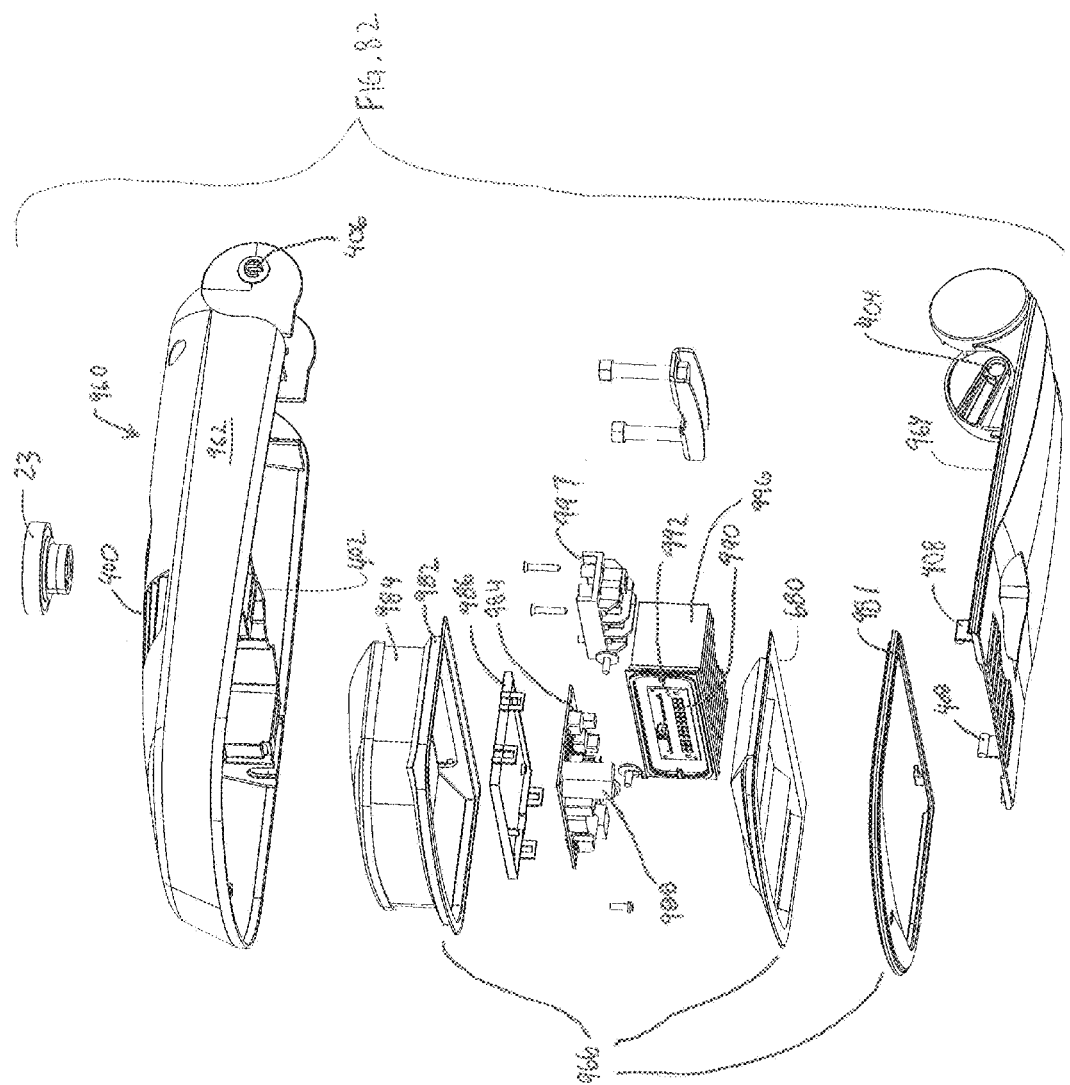

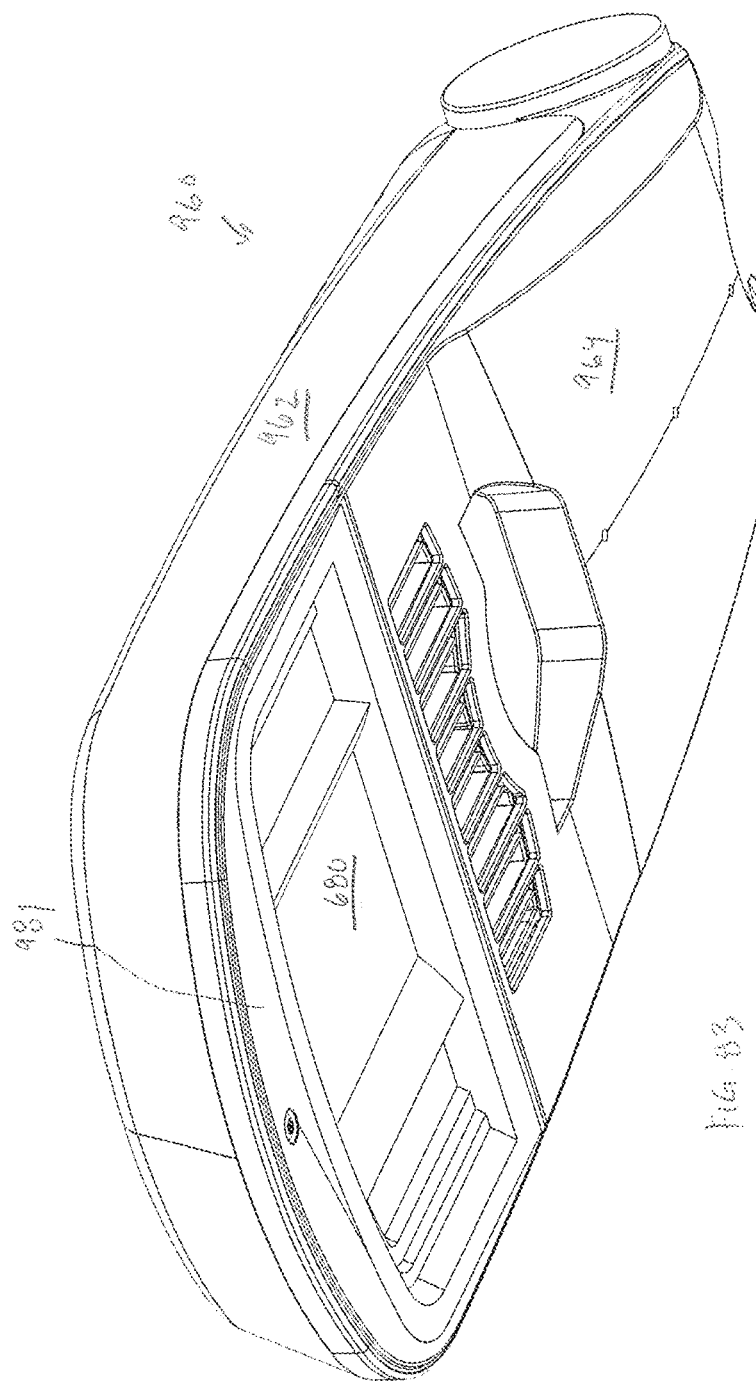

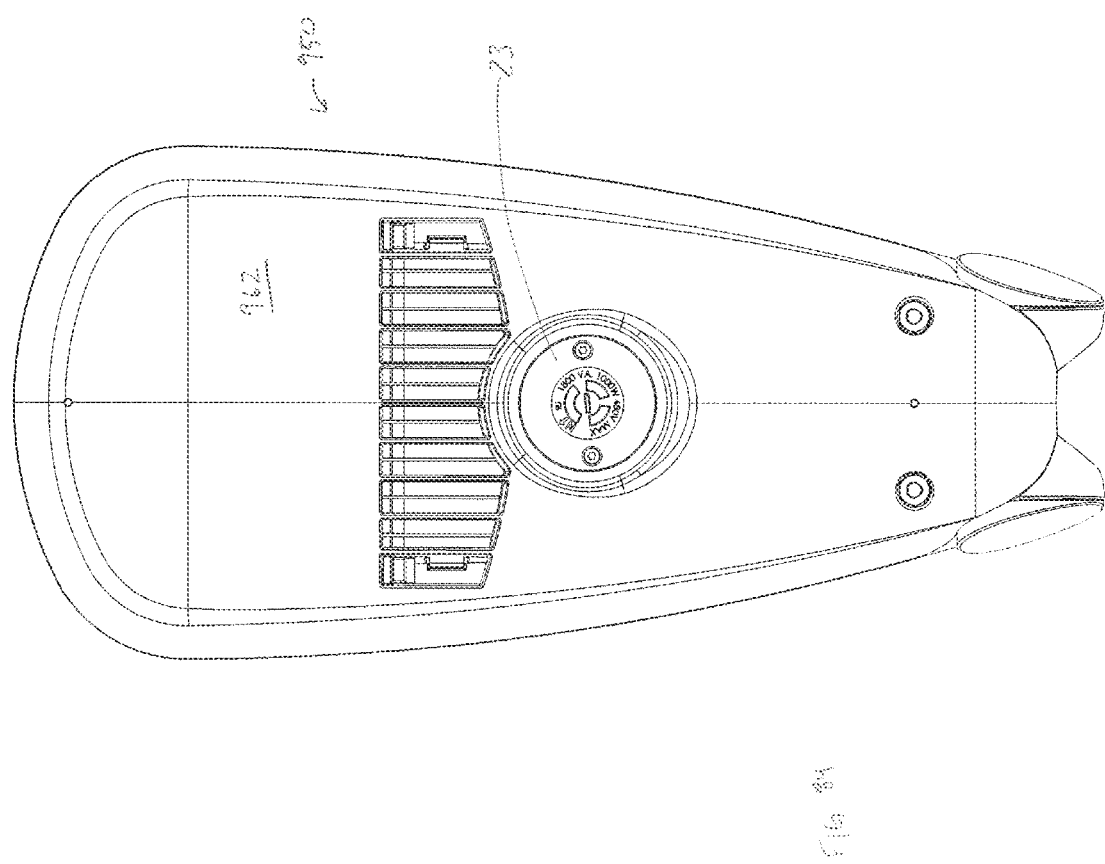

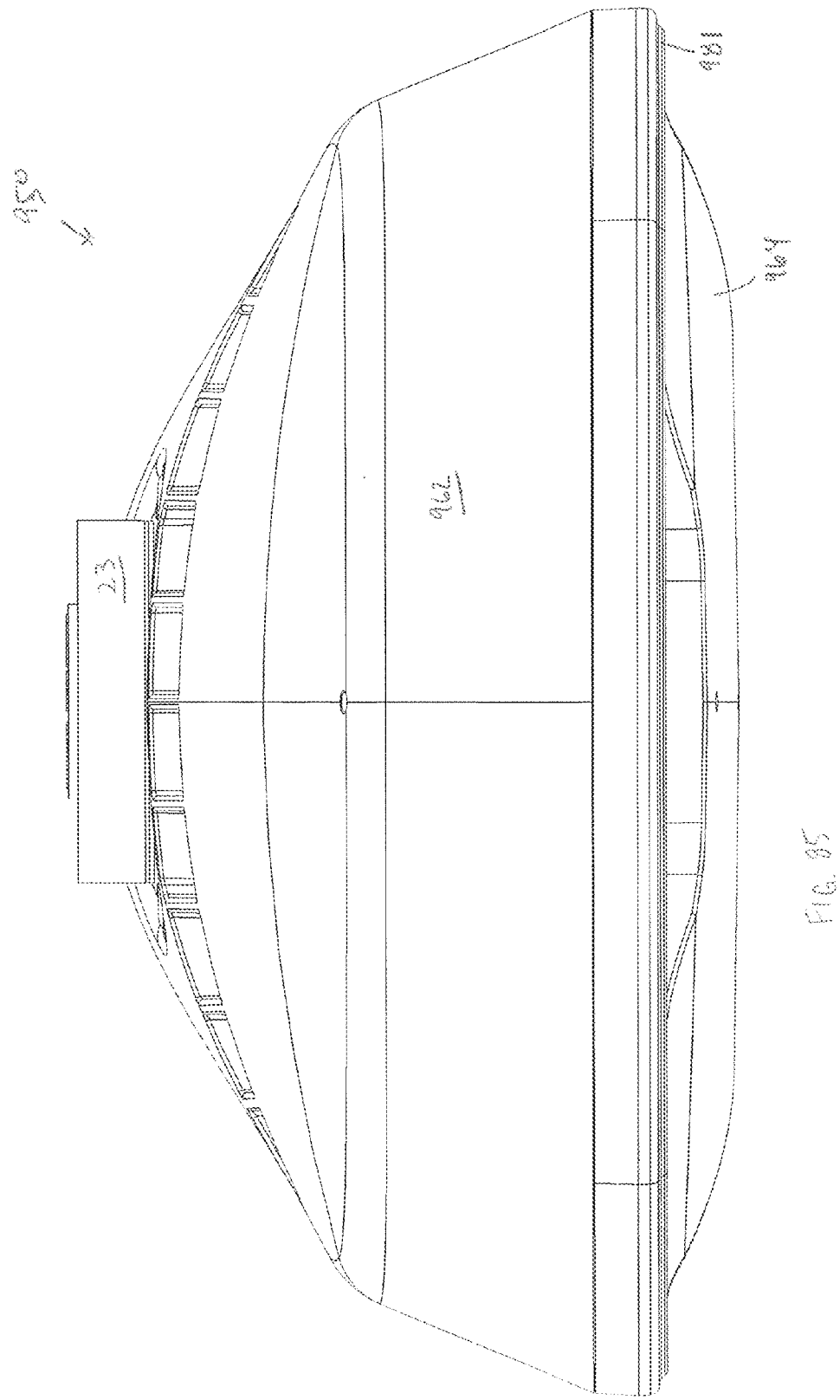

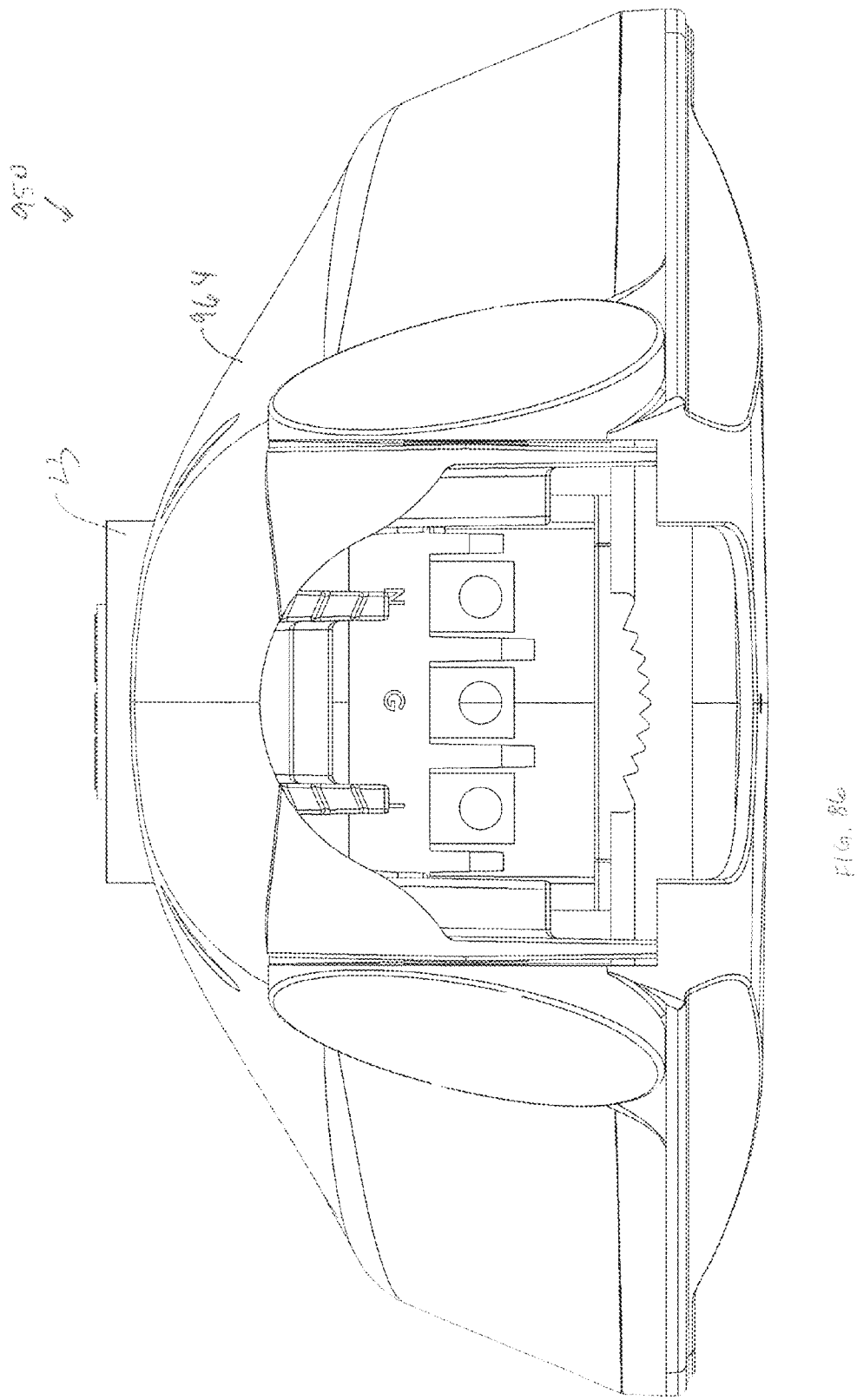

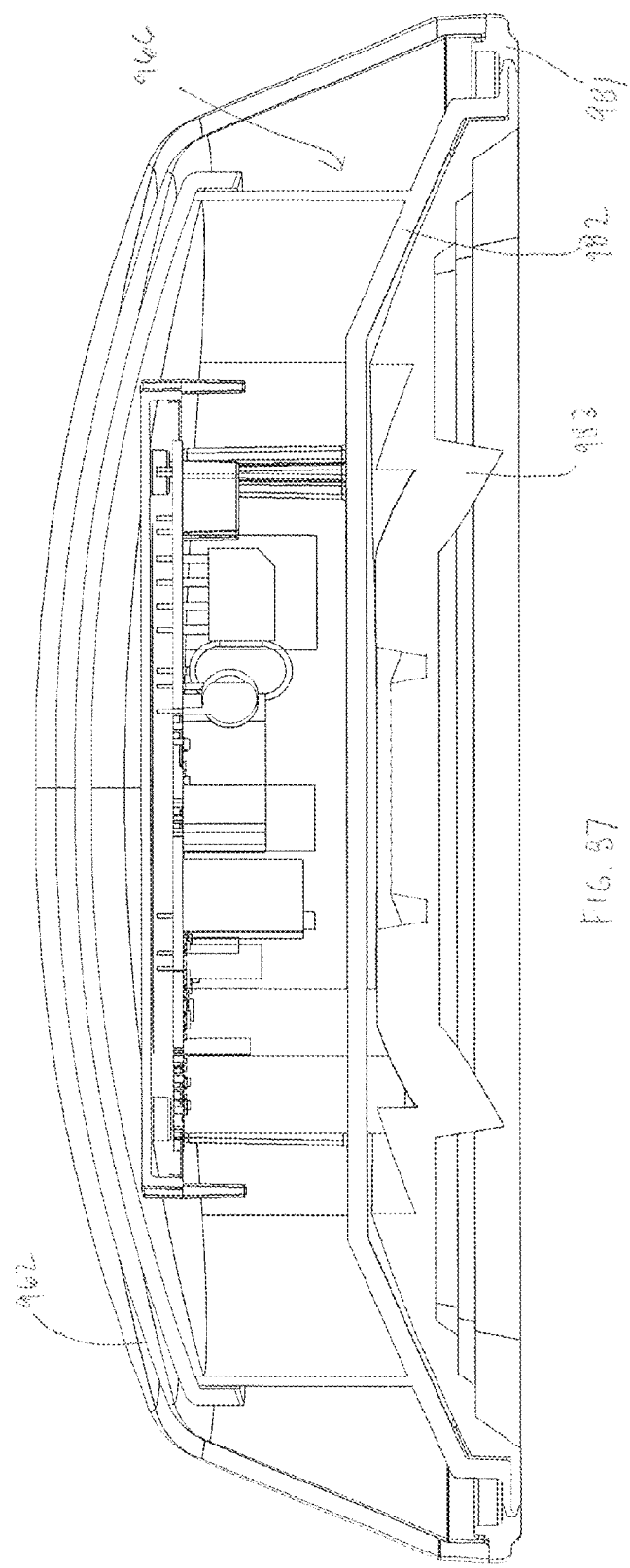

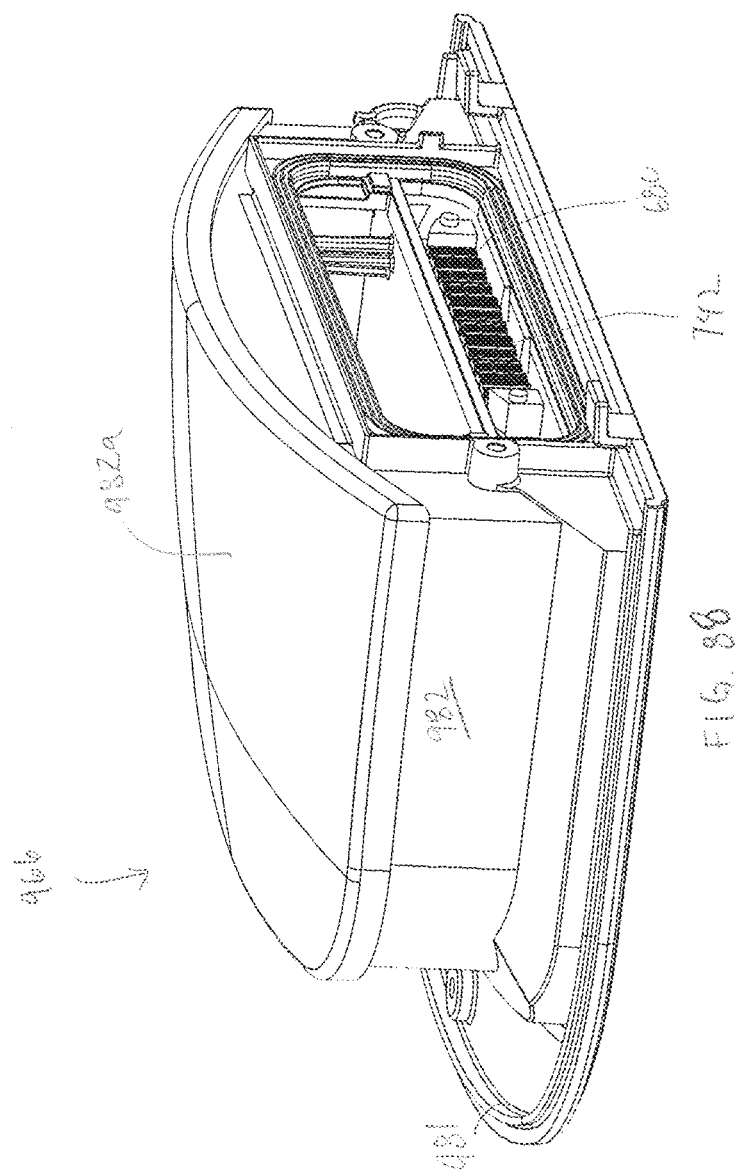

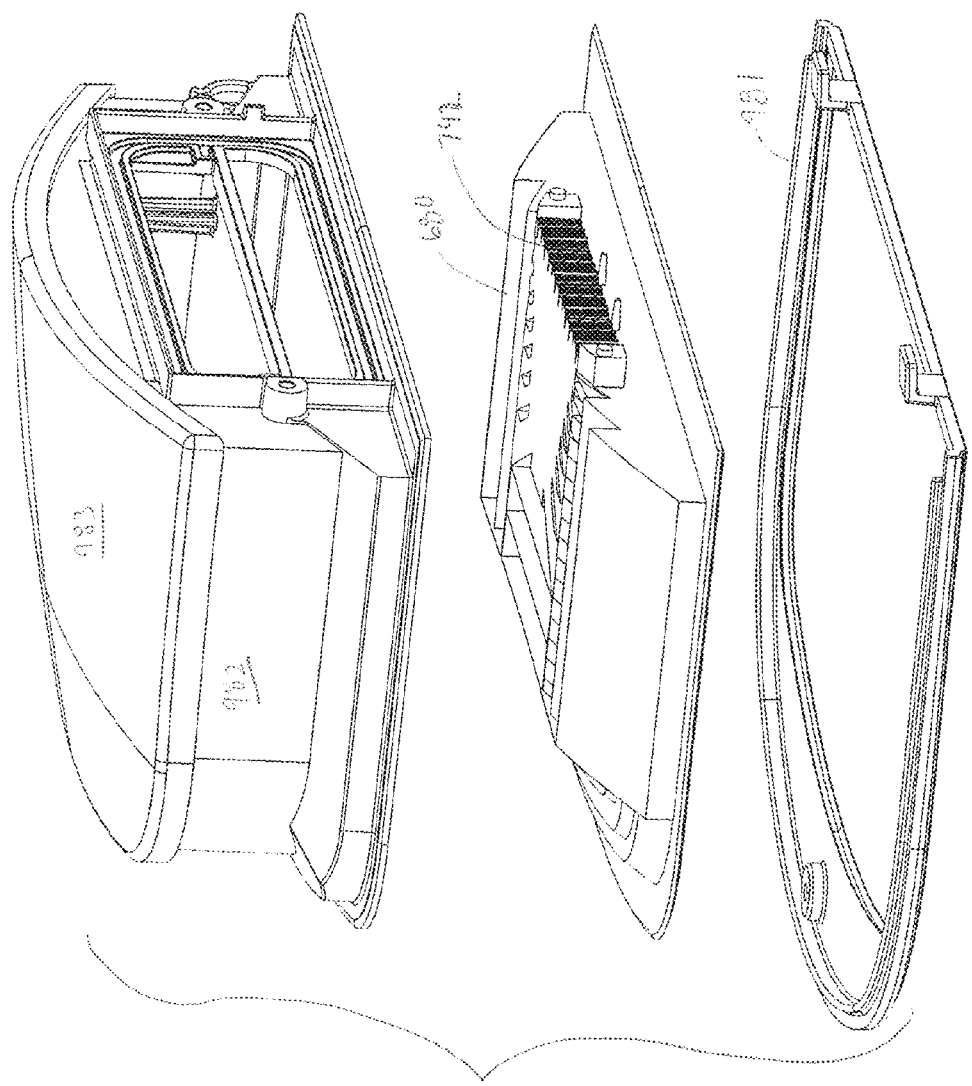

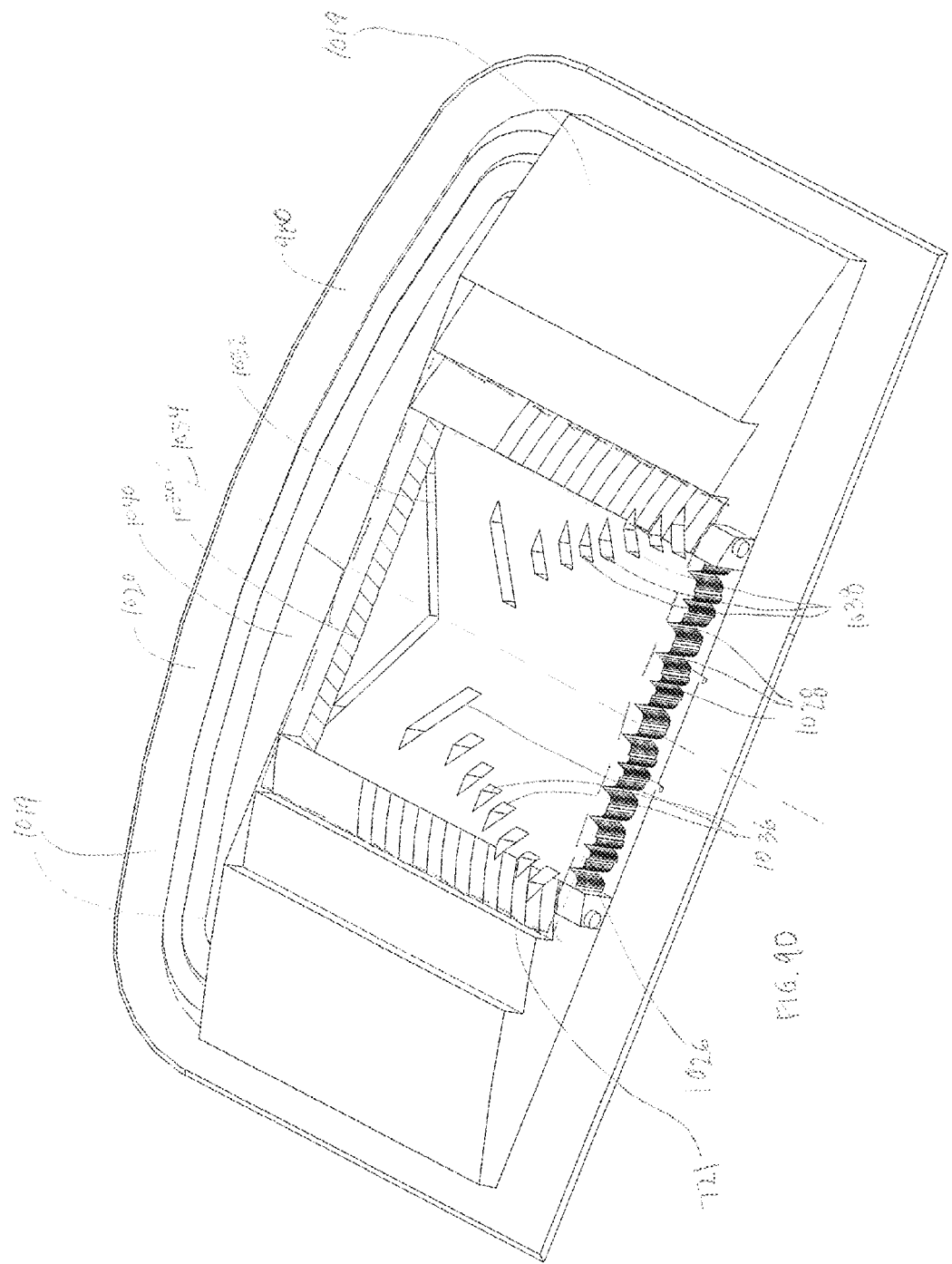

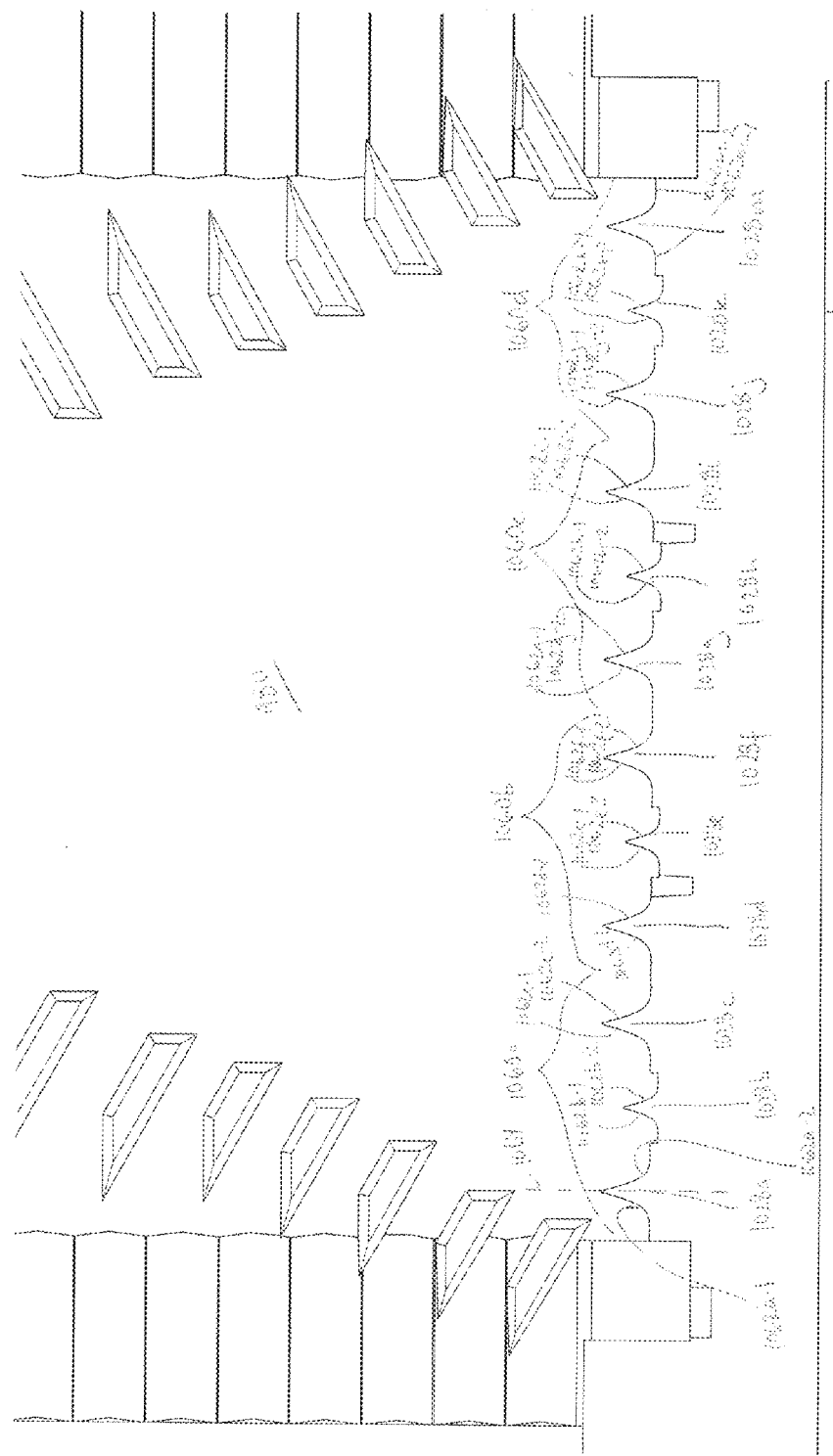

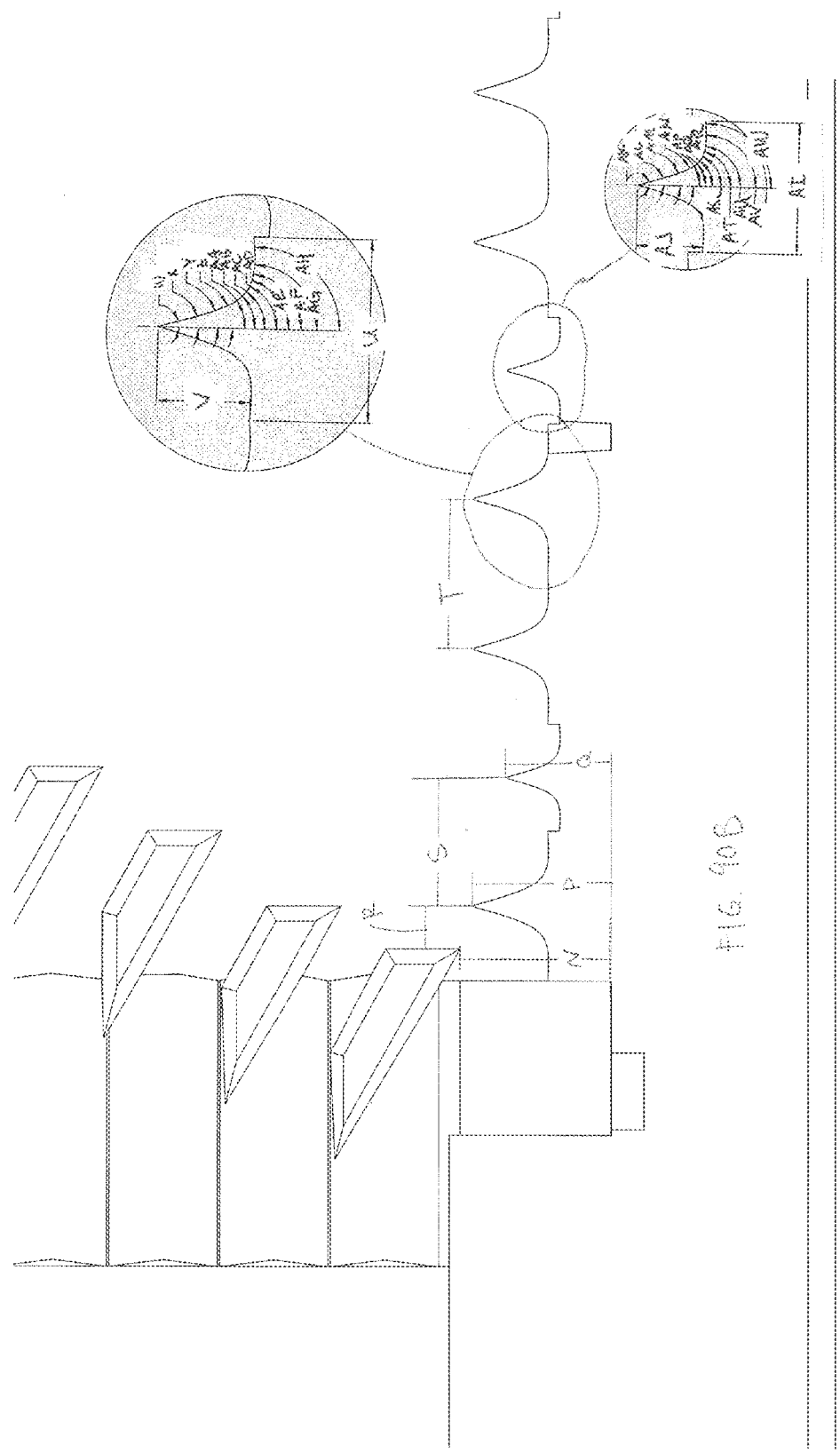

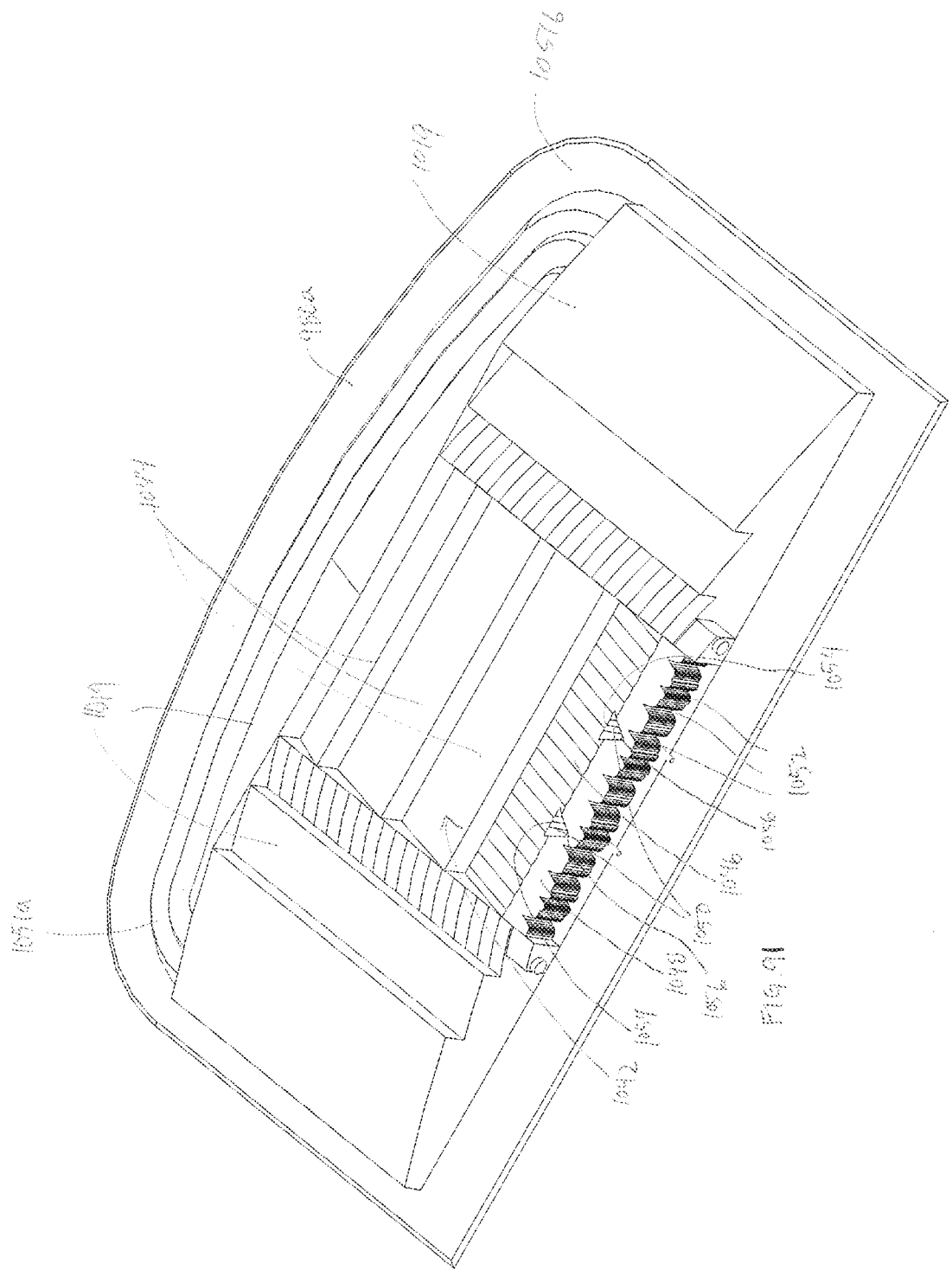

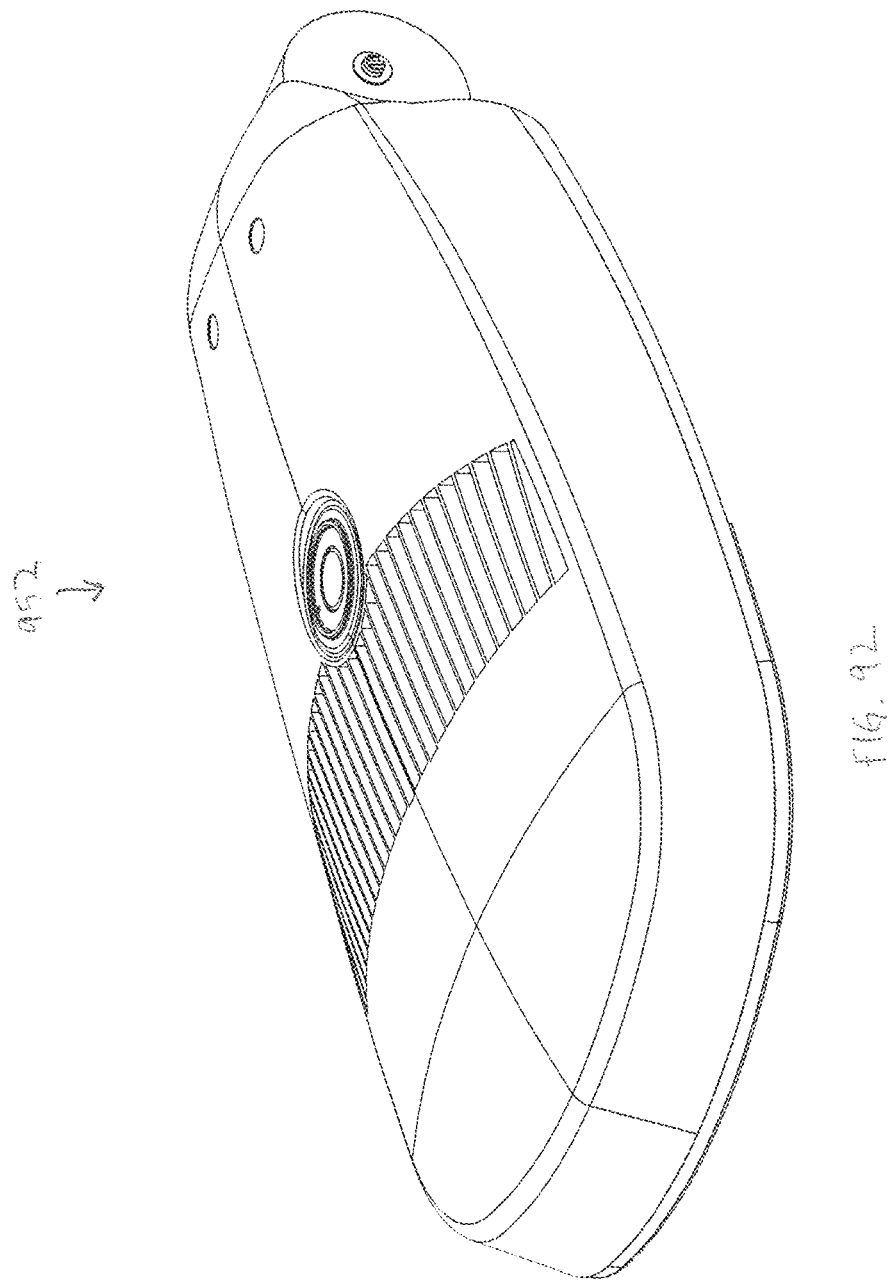

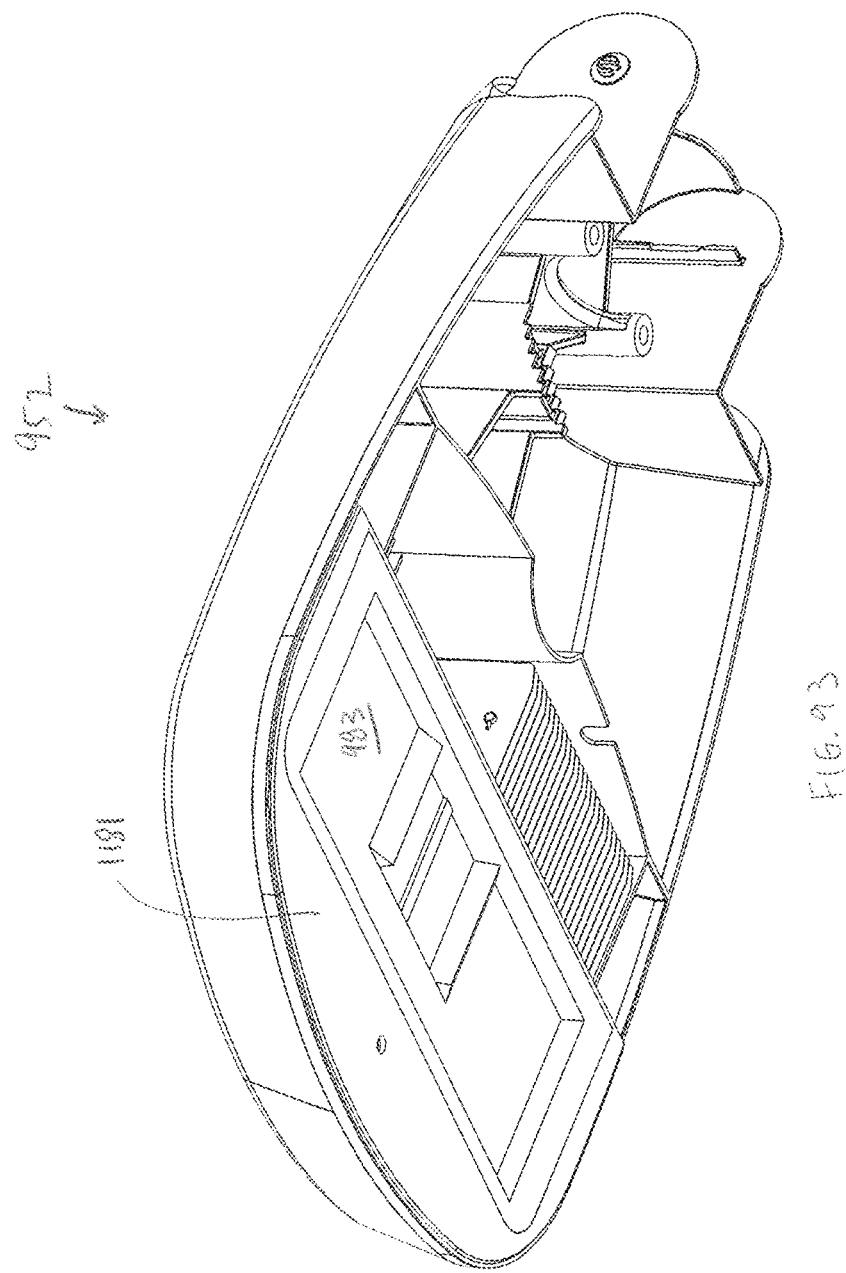

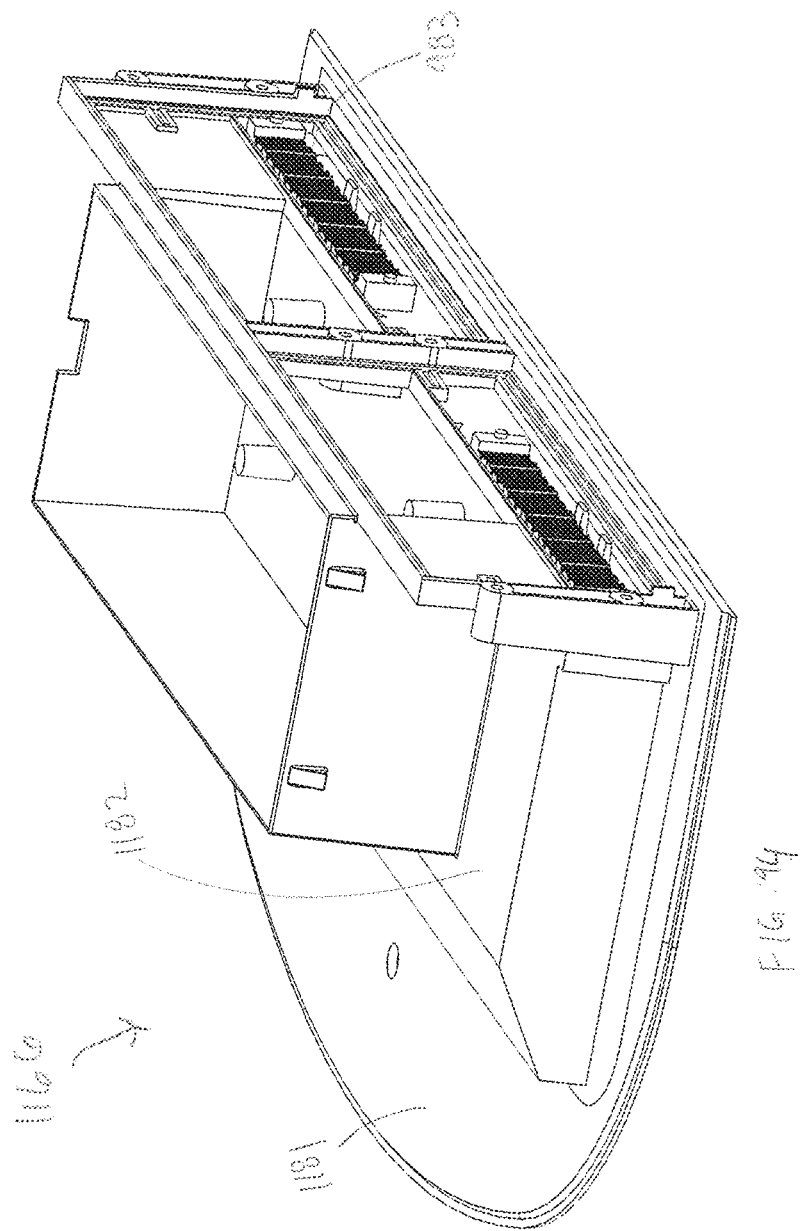

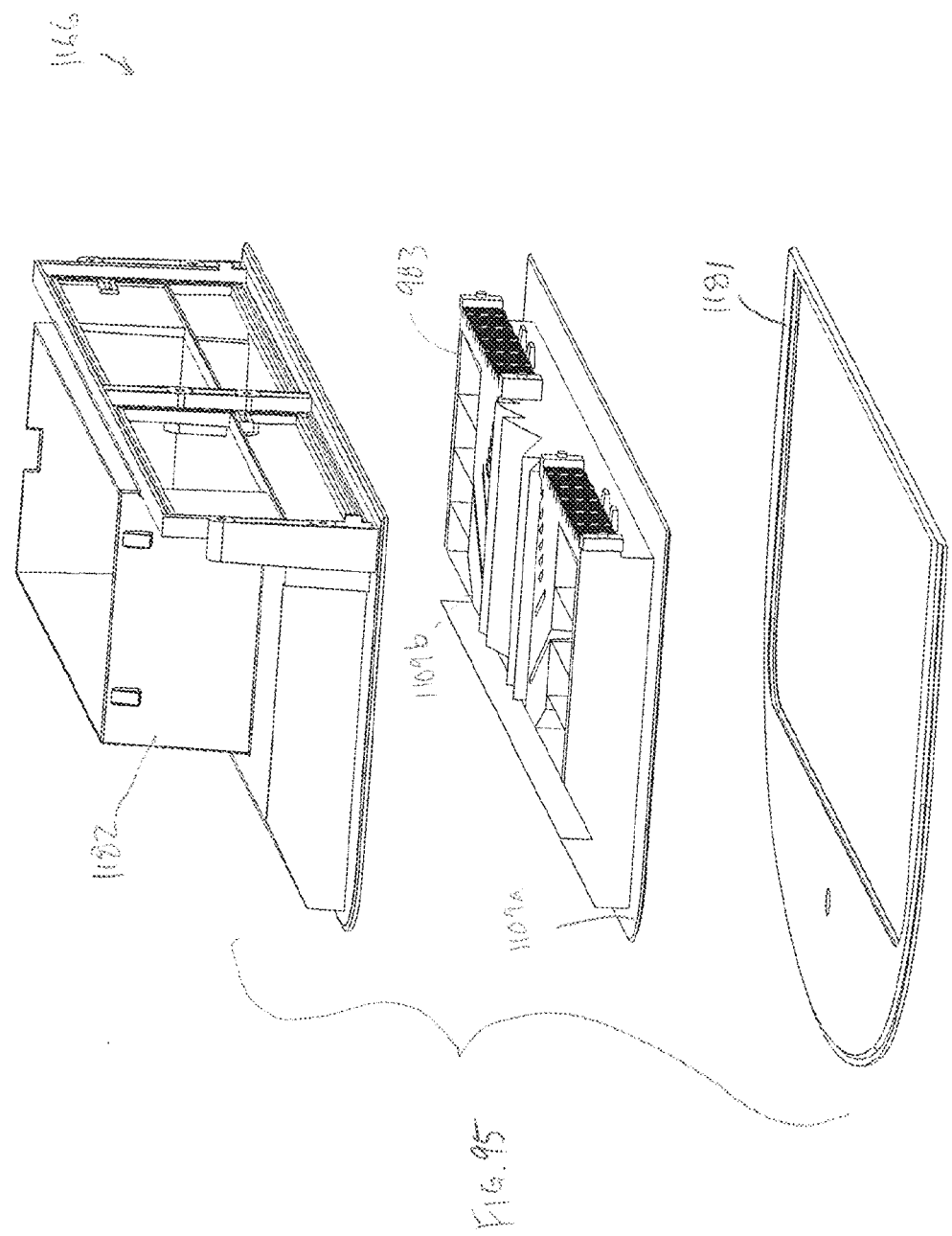

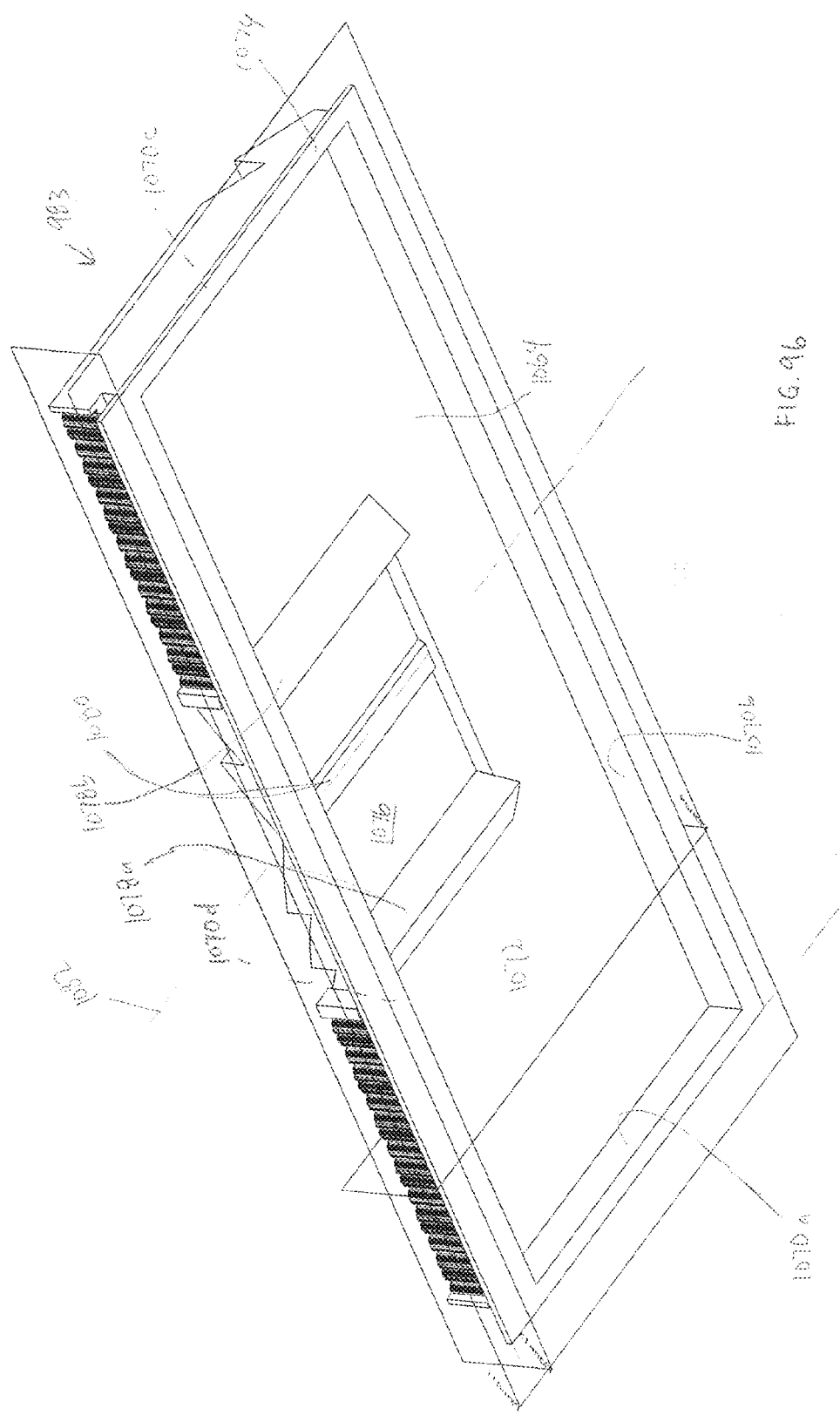

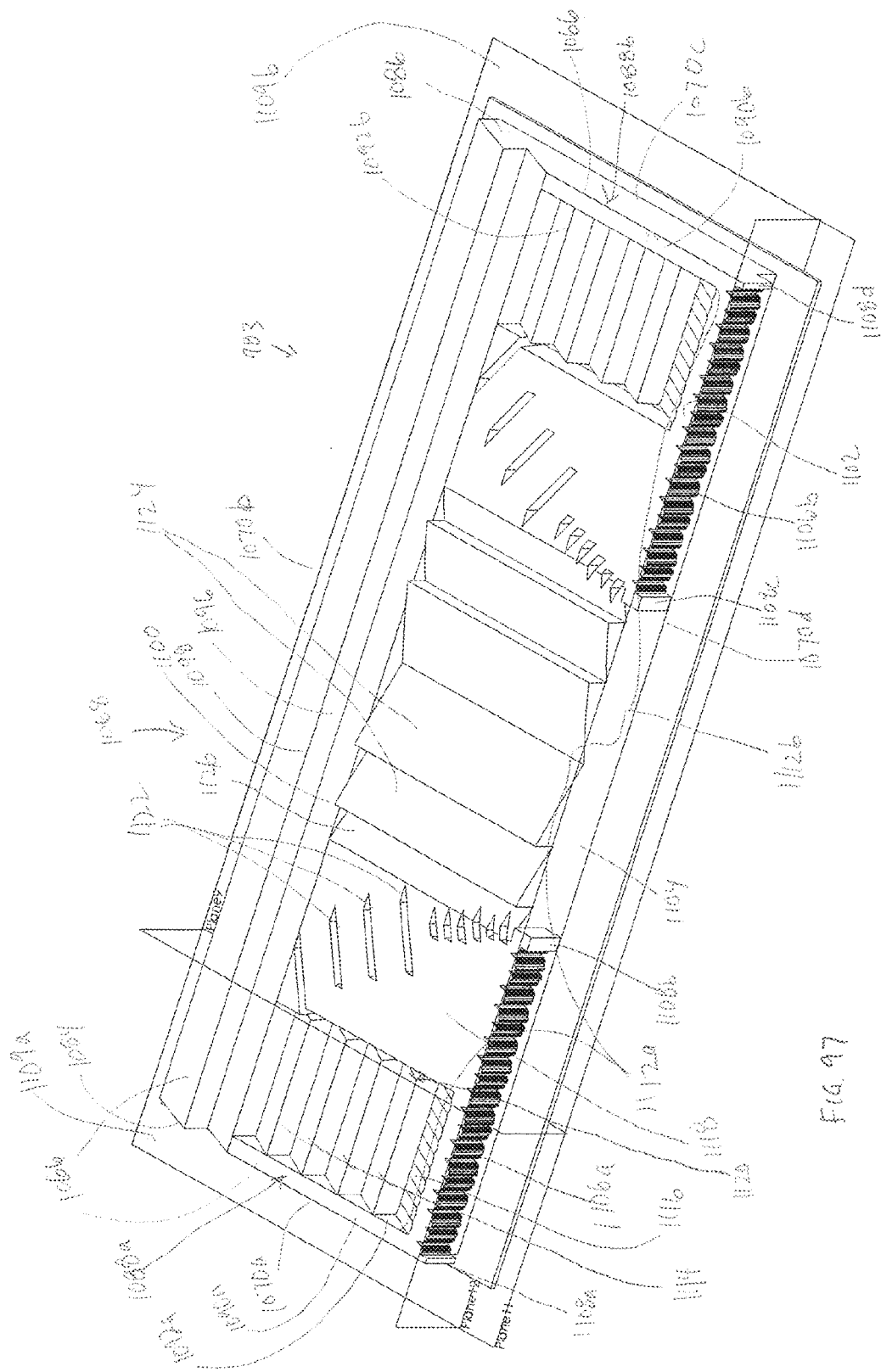

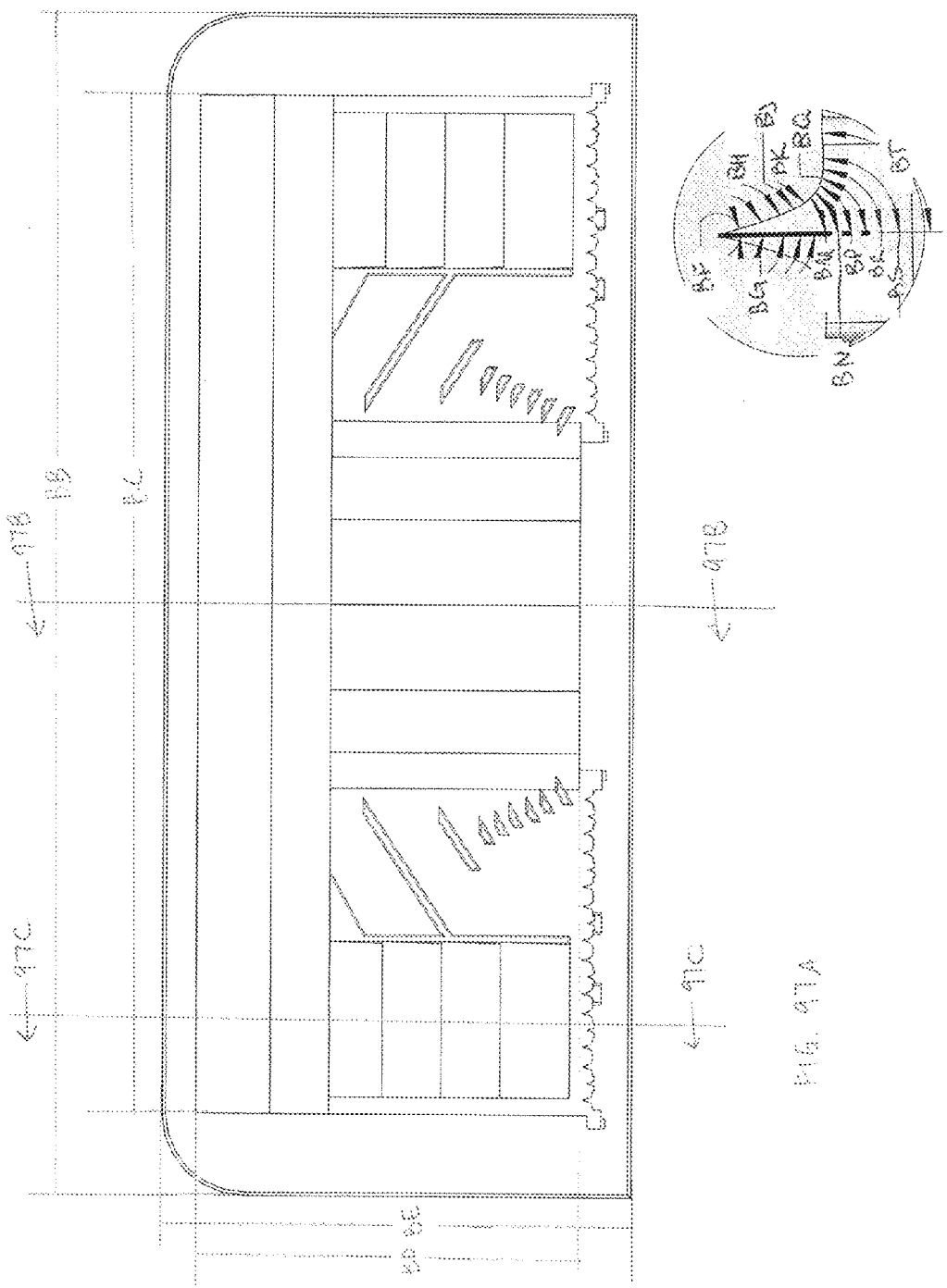

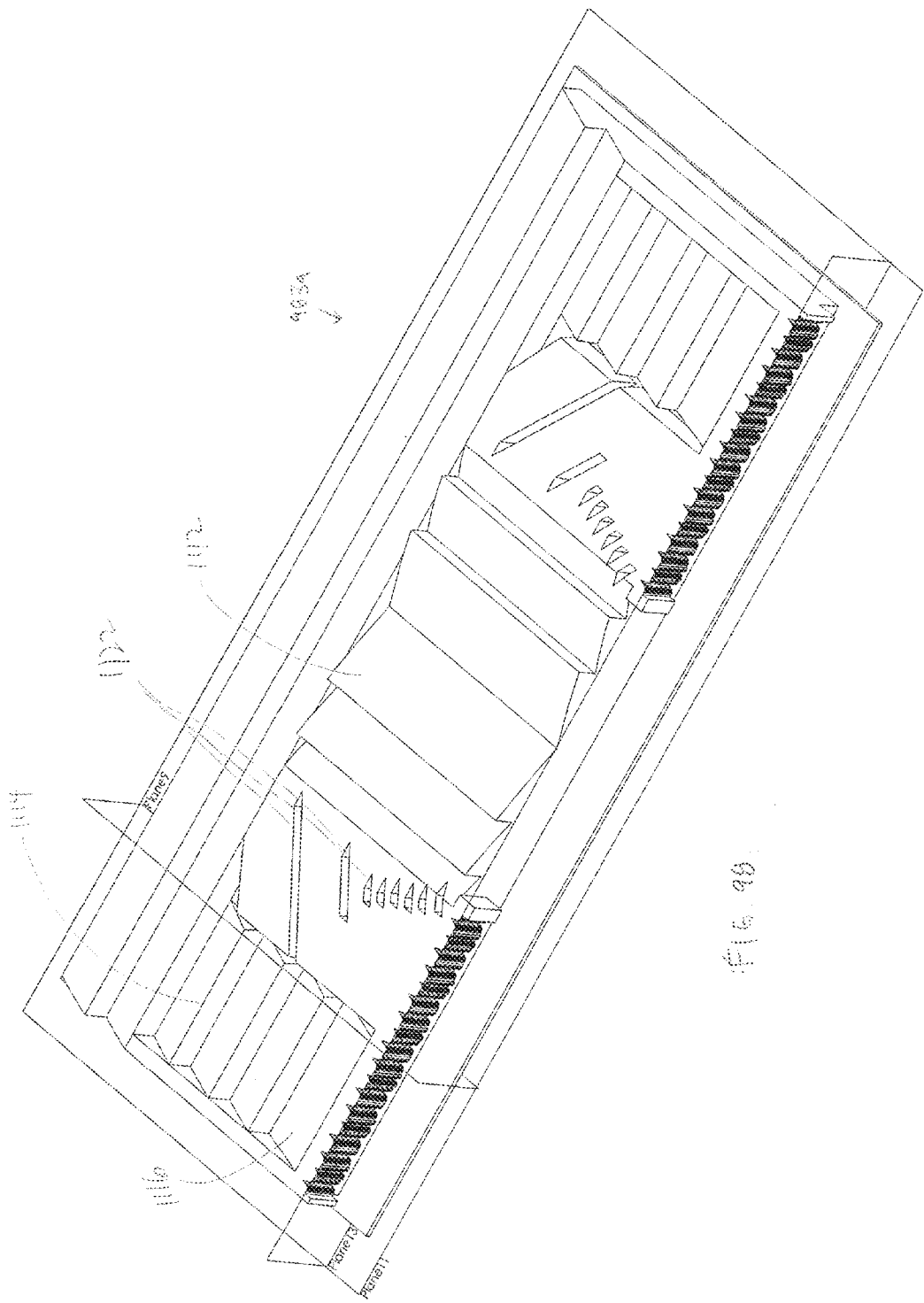

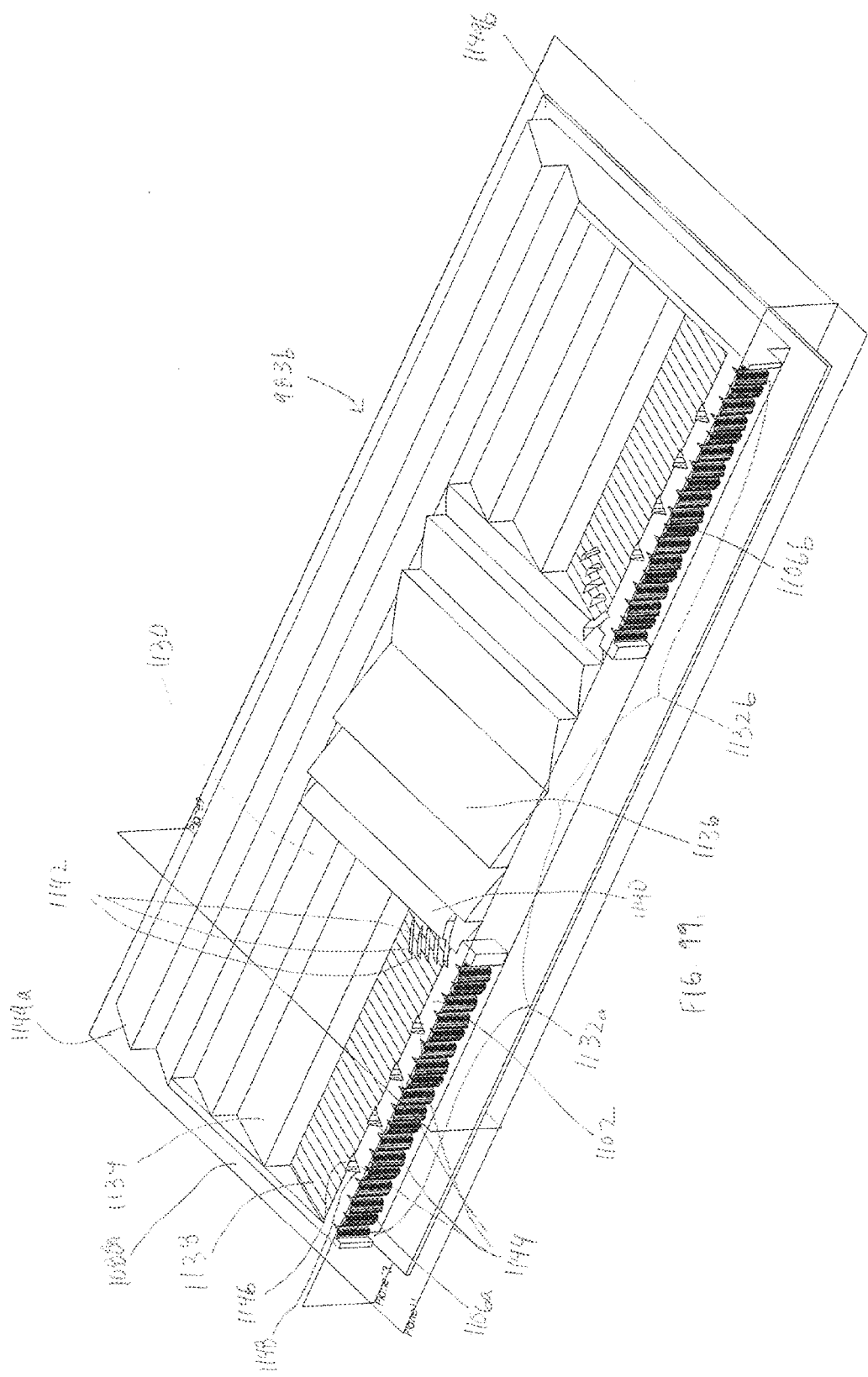

LUMINAIRE UTILIZING WAVEGUIDE

CROSS REFERENCE TO RELATED APPLICATIONS

The present application claims the benefit of U.S. Provisional Patent Application No. 61/922,017, filed Dec. 30, 2013, entitled "Optical Waveguide Bodies and Luminaires Utilizing Same", U.S. Provisional Patent Application No. 62/005,955, filed May 30, 2014, entitled "Parking Structure LED Light", U.S. Provisional Patent Application No. 62/009,039, filed Jun. 6, 2014, entitled "Parking Structure LED Light" (Cree docket No. P2238US0-2), U.S. Provisional Patent Application No. 62/005,965, filed May 30, 2014, entitled "Luminaire Utilizing Waveguide", U.S. Provisional Patent Application No. 62/025,436, filed Jul. 16, 2014, entitled "Luminaire Utilizing Waveguide", and U.S. Provisional Patent Application No. 62/025,905, filed Jul. 17, 2014, entitled "Luminaire Utilizing Waveguide", all owned by the assignee of the present application and the disclosures of which are incorporated by reference herein. The present application further comprises a continuation-in-part of U.S. patent application Ser. No. 13/842,521, filed Mar. 15, 2013, entitled "Optical Waveguides", and further comprises a continuation-in-part of U.S. patent application Ser. No. 13/839,949, filed Mar. 15, 2013, entitled "Optical Waveguide and Lamp Including Same", and further comprises a continuation-in-part of U.S. patent application Ser. No. 13/841,074, filed Mar. 15, 2013, entitled "Optical Waveguide Body", and further comprises a continuation-in-part of U.S. patent application Ser. No. 13/840,563, filed Mar. 15, 2013, entitled "Optical Waveguide and Luminaire Incorporating Same", and further comprises a continuation-in-part of U.S. application Ser. No. 13/841,622, filed Mar. 15, 2013, entitled "Shaped Optical Waveguide Bodies", and further comprises a continuation-in-part of U.S. patent application Ser. No. 13/938,877, filed Jul. 10, 2013, entitled "Optical Waveguide and Luminaire Incorporating Same", and further comprises a continuation-in-part of U.S. patent application Ser. No. 14/015,801, filed Aug. 30, 2013, entitled "Consolidated Troffer", and further comprises a continuation-in-part of U.S. patent application Ser. No. 14/101,086, filed Dec. 9, 2013, entitled "Optical Waveguides and Luminaires Incorporating Same", and further comprises a continuation-in-part of U.S. patent application Ser. No. 14/101,132, filed Dec. 9, 2013, entitled "Waveguide Bodies Including Redirection Features and Methods of Producing Same", and further comprises a continuation-in-part of U.S. patent application Ser. No. 14/101,147, filed Dec. 9, 2013, entitled "Luminaires Using Waveguide Bodies and Optical Elements", and further comprises a continuation-in-part of U.S. patent application Ser. No. 14/101,099, filed Dec. 9, 2013, entitled "Optical Waveguide Assembly and Light Engine Including Same", and further comprises a continuation-in-part of U.S. patent application Ser. No. 14/101,129, filed Dec. 9, 2013, entitled "Simplified Low Profile Module With Light Guide For Pendant, Surface Mount, Wall Mount and Stand Alone Luminaires", and further comprises a continuation-in-part of U.S. patent application Ser. No. 14/101,051, filed Dec. 9, 2013, entitled "Optical Waveguide and Lamp Including Same", and further comprises a continuation-in-part of International Application No. PCT/US14/13937, filed Jan. 30, 2014, entitled "Optical Waveguide Bodies and Luminaires Utilizing Same", and further comprises a continuation-in-part of International Application No. PCT/US14/13931, filed Jan. 30, 2014, entitled "Optical Waveguides and Luminaires Incorporating Same", and further comprises a continuation-in-part of International Application No. PCT/US14/30017, filed Mar. 15, 2014, entitled "Optical Waveguide Body", and further comprises a continuation-in-part of U.S. patent application Ser. No. 14/462,426, filed Aug. 18, 2014, entitled "Outdoor and/or Enclosed Structure LED Luminaire for General Illumination Applications, Such as Parking Lots and Structures", and further comprises a continuation-in-part of U.S. patent application Ser. No. 14/462,391, filed Aug. 18, 2014, entitled "Optical Components for Luminaire", and further comprises a continuation-in-part of U.S. patent application Ser. No. 14/292,778, filed May 30, 2014, entitled "Optical Waveguide Bodies and Luminaires Utilizing Same", and further comprises a continuation-in-part of U.S. patent application Ser. No. 14/485,609, filed Sep. 12, 2014, entitled "Luminaire Utilizing Waveguide", and further comprises a continuation-in-part of U.S. patent application Ser. No. 14/577,730, filed Dec. 19, 2014, entitled "Optical Waveguide Bodies and Luminaires Utilizing Same", and further comprises a continuation-in-part of U.S. patent application Ser. No. 14/583,415, filed Dec. 26, 2014, entitled "Outdoor and/or Enclosed Structure LED Luminaire", and further comprises a continuation-in-part of International Application No. PCT/US14/72848, filed Dec. 30, 2014, entitled "Optical Waveguide Bodies and Luminaires Utilizing Same", all owned by the assignee of the present application and the disclosures of which are incorporated by reference herein.

REFERENCE REGARDING FEDERALLY SPONSORED RESEARCH OR DEVELOPMENT

Not applicable

SEQUENTIAL LISTING

Not applicable

FIELD OF THE INVENTION

The present subject matter relates to optical devices, and more particularly, to a luminaire utilizing an optical waveguide.

BACKGROUND OF THE INVENTION

An optical waveguide mixes and directs light emitted by one or more light sources, such as one or more light emitting diodes (LEDs). A typical optical waveguide includes three main components: one or more coupling elements, one or more distribution elements, and one or more extraction elements. The coupling component(s) direct light into the distribution element(s), and condition the light to interact with the subsequent components. The one or more distribution elements control how light flows through the waveguide and is dependent on the waveguide geometry and material. The extraction element(s) determine how light is removed by controlling where and in what direction the light exits the waveguide.

When designing a coupling optic, the primary considerations are: maximizing the efficiency of light transfer from the source into the waveguide; controlling the location of light injected into the waveguide; and controlling the angular distribution of the light in the coupling optic. One way of controlling the spatial and angular spread of injected light is by fitting each source with a dedicated lens. These lenses can be disposed with an air gap between the lens and the coupling optic, or may be manufactured from the same piece of material that defines the waveguide's distribution element(s). Discrete coupling optics allow numerous advantages such as higher efficiency coupling, controlled overlap of light flux from the sources, and angular control of how the injected light interacts with the remaining elements of the waveguide. Discrete coupling optics use refraction, total internal reflection, and surface or volume scattering to control the distribution of light injected into the waveguide.

After light has been coupled into the waveguide, it must be guided and conditioned to the locations of extraction. The simplest example is a fiber-optic cable, which is designed to transport light from one end of the cable to another with minimal loss in between. To achieve this, fiber optic cables are only gradually curved and sharp bends in the waveguide are avoided. In accordance with well-known principles of total internal reflectance light traveling through a waveguide is reflected back into the waveguide from an outer surface thereof, provided that the incident light does not exceed a critical angle with respect to the surface.

In order for an extraction element to remove light from the waveguide, the light must first contact the feature comprising the element. By appropriately shaping the waveguide surfaces, one can control the flow of light across the extraction feature(s). Specifically, selecting the spacing, shape, and other characteristic(s) of the extraction features affects the appearance of the waveguide, its resulting distribution, and efficiency.

Hulse U.S. Pat. No. 5,812,714 discloses a waveguide bend element configured to change a direction of travel of light from a first direction to a second direction. The waveguide bend element includes a collector element that collects light emitted from a light source and directs the light into an input face of the waveguide bend element. Light entering the bend element is reflected internally along an outer surface and exits the element at an output face. The outer surface comprises beveled angular surfaces or a curved surface oriented such that most of the light entering the bend element is internally reflected until the light reaches the output face Parker et al. U.S. Pat. No. 5,613,751 discloses a light emitting panel assembly that comprises a transparent light emitting panel having a light input surface, a light transition area, and one or more light sources. Light sources are preferably embedded or bonded in the light transition area to eliminate any air gaps, thus reducing light loss and maximizing the emitted light. The light transition area may include reflective and/or refractive surfaces around and behind each light source to reflect and/or refract and focus the light more efficiently through the light transition area into the light input surface of the light-emitting panel. A pattern of light extracting deformities, or any change in the shape or geometry of the panel surface, and/or coating that causes a portion of the light to be emitted, may be provided on one or both sides of the panel members. A variable pattern of deformities may break up the light rays such that the internal angle of reflection of a portion of the light rays will be great enough to cause the light rays either to be emitted out of the panel or reflected back through the panel and emitted out of the other side.

Shipman, U.S. Pat. No. 3,532,871 discloses a combination running light reflector having two light sources, each of which, when illuminated, develops light that is directed onto a polished surface of a projection. The light is reflected onto a cone-shaped reflector. The light is transversely reflected into a main body and impinges on prisms that direct the light out of the main body.

Simon U.S. Pat. No. 5,897,201 discloses various embodiments of architectural lighting that is distributed from contained radially collimated light. A quasi-point source develops light that is collimated in a radially outward direction and exit means of distribution optics direct the collimated light out of the optics.

Kelly et al. U.S. Pat. No. 8,430,548 discloses light fixtures that use a variety of light sources, such as an incandescent bulb, a fluorescent tube and multiple LEDs. A volumetric diffuser controls the spatial luminance uniformity and angular spread of light from the light fixture. The volumetric diffuser includes one or more regions of volumetric light scattering particles. The volumetric diffuser may be used in conjunction with a waveguide to extract light.

Dau et al U.S. Pat. No. 8,506,112 discloses illumination devices having multiple light emitting elements, such as LEDs disposed in a row. A collimating optical element receives light developed by the LEDs and a light guide directs the collimated light from the optical element to an optical extractor, which extracts the light.

A.L.P. Lighting Components, Inc. of Niles, Ill., manufactures a waveguide having a wedge shape with a thick end, a narrow end, and two main faces therebetween. Pyramid-shaped extraction features are formed on both main faces. The wedge waveguide is used as an exit sign such that the thick end of the sign is positioned adjacent a ceiling and the narrow end extends downwardly. Light enters the waveguide at the thick end and is directed down and away from the waveguide by the pyramid-shaped extraction features.

Low-profile LED-based luminaires have recently been developed (e.g., General Electric's ET series panel troffers) that utilize a string of LED components directed into the edge of a waveguiding element (an "edge-lit" approach). However, such luminaires typically suffer from low efficiency due to losses inherent in coupling light emitted from a predominantly Lambertian emitting source such as a LED component into the narrow edge of a waveguide plane.

Smith U.S. Pat. Nos. 7,083,313 and 7,520,650 discloses a light direction device for use with LEDs. In one embodiment, the light direction device includes a plurality of opposing collimators disposed about a plurality of LEDs on one side of the device. Each collimator collimates light developed by the LEDs and directs the collimated light through output surfaces of the collimators toward angled reflectors disposed on a second side opposite the first side of the device. The collimated light reflects off the reflectors out of from the one side perpendicular thereto. In another embodiment, the collimators are integral with a waveguide having reflective surfaces disposed on a second side of the waveguide, and the collimated light is directed toward the reflective surfaces. The light incident on the reflective surfaces is directed from the one side of the device, as in the one embodiment.

In some applications such as roadway, street, or parking lot lighting, it may be desirable to illuminate certain regions surrounding a light fixture while maintaining relatively low illumination of neighboring regions thereof. For example, along a roadway, it may be preferred to direct light in a lateral direction parallel with the roadway while minimizing illumination in a longitudinal direction toward roadside houses.

SUMMARY OF THE INVENTION

According to one aspect, an optical waveguide having orthogonal x- and y-dimensions includes at least one coupling feature for directing light into the waveguide, at least one light redirection feature extending in the x- and y-dimensions for redirecting light in the waveguide, at least one first light extraction feature extending in the x-dimension for extracting light out of the waveguide, and at least one second light extraction feature extending in the y-dimension for extracting light out of the waveguide.

According to another aspect, an optical waveguide having orthogonal x- and y-dimensions and developing an illumination distribution pattern having orthogonal x- and y-extents. The optical waveguide body includes at least one coupling feature for directing light into the waveguide, at least one light redirection feature redirecting light in an x-y plane within the waveguide, and at least one light extraction feature for extracting light out of the waveguide in an illumination pattern having at least one of the x- and y-extents that is offset with respect to the x- and y-dimensions, respectively.

According to a further aspect, an optical waveguide includes a first plurality of LED light sources and a second plurality of light coupling features each for transmitting light developed by at least one of the first plurality of LED light sources into the waveguide along a primary light path. The optical waveguide further includes a third plurality of light redirection features each for redirecting light in the waveguide to cause at least a portion of the light developed by an LED to be redirected into a secondary light path transverse to the primary light path, and a fourth plurality of light extraction features for directing light in the primary and secondary paths to be directed out of the waveguide. At least one of the light redirection features includes a light extraction surface having light scattering features.

According to another aspect, an optical waveguide having x- and y-dimensions includes a first plurality of LED light sources and a second plurality of light coupling features disposed along a width of the waveguide along the x-dimension each for transmitting light developed by at least one of the first plurality of LED light sources into the waveguide along a primary light path directed parallel to the y-dimension wherein the width of the waveguide is bisected by a center line. The optical waveguide further includes at least one light extraction feature disposed away from the centerline and having a width along the x-dimension for receiving light from at least some of the LED light sources and directing light out of the optical waveguide into a non-central portion of an illumination pattern.

Other aspects and advantages of the present invention will become apparent upon consideration of the following detailed description and the attached drawings wherein like numerals designate like structures throughout the specification.

BRIEF DESCRIPTION OF THE DRAWINGS

FIG. 7 is a partial exploded fragmentary side isometric view of the mounting portion of FIG. 6;
FIG. 8 is a partial exploded plan view of the mounting portion of FIG. 6;
FIG. 9 is another partial exploded plan view of the mounting portion of FIG. 6;
FIG. 10 is an isometric view of a waveguide body;
FIG. 10A is a fragmentary plan view of a light extraction feature in combination with an LED;
FIG. 11 is an isometric view of a bottom surface of the waveguide body of FIG. 10;
FIG. 11A is a plan view of the waveguide body of FIG. 10;
FIG. 12 is a graph of the illumination pattern of the waveguide body of FIG. 10;
FIG. 19 is an exploded isometric view from above of the luminaire of FIG. 18;
FIG. 20 is an isometric view of the waveguide body of FIG. 18;
FIG. 21 is a plan view of the waveguide body of FIG. 20;
FIG. 36 is a plan view of the luminaire of FIG. 34;
FIG. 37 is a side elevational view of the luminaire of FIG. 34;
FIG. 38 is an isometric view from above of the luminaire of FIG. 34 and a smaller version of the luminaire of FIG. 34;
FIG. 39 is an isometric view from below of the two luminaires of FIG. 38.

FIG. 56 is an exploded isometric view of the embodiment of FIGS. 51-53;

FIG. 57 is an exploded isometric view illustrating the optic assembly, power supply, LED board, and heat sink of FIG. 56;

FIG. 58 is a bottom isometric view of the embodiment of FIGS. 51-53 with a bottom door removed and illustrating installation of a terminal block and clasp;

FIG. 59 is a bottom isometric view of the embodiment of FIGS. 51-53 illustrating installation of the bottom door;

FIG. 60 is a sectional view taken generally along the lines 60-60 of FIG. 59 illustrating the door after installation thereof;

FIGS. 64 and 65 are top and bottom isometric views, respectively, of the optic assembly of FIG. 57;

FIGS. 66-68 are isometric views of one of the waveguide bodies (also referred to as an optic) of FIGS. 61-63, a reflective enclosure member (or optic box) within which the waveguide body is disposed, and a surround member that surrounds the waveguide, respectively, of the optic assembly of FIGS. 64 and 65;

FIGS. 75, 75A, 75B, and 75C are a sectional elevational line view, a sectional elevational shaded view, a sectional isometric line view, and a sectional isometric shaded view, respectively, all taken along the lines 75-75 of FIG. 69;

FIGS. 76, 76A, 76B, and 76C are a sectional elevational line view, a sectional elevational shaded view, a sectional isometric line view, and a sectional isometric shaded view, respectively, all taken along the lines 76-76 of FIG. 69;

FIGS. 78 and 79 are perspective views of embodiments of FIGS. 51-55 with various details specified therein;

FIG. 80 is an isometric view of the optic assembly of FIG. 57;

FIG. 81 is a top isometric view of a further embodiment;

FIG. 82 is an exploded isometric view of the embodiment of FIG. 81;

FIG. 83 is a bottom isometric view of the embodiment of FIG. 81;

FIG. 84 is a plan view of the embodiment of FIG. 81;

FIG. 85 is a front elevational view of the embodiment of FIG. 81;

FIG. 86 is a rear elevational view of the embodiment of FIG. 81;

FIG. 87 is a sectional elevational view taken generally along the lines 87-87 of FIG. 81;

FIG. 88 is an isometric view of an optic assembly that may be used in the embodiment of FIG. 81;

FIG. 89 is an exploded isometric view of the optic assembly of FIG. 88;

FIG. 90 is an isometric view of an alternative embodiment of a waveguide body that may be used in the embodiment of FIG. 81;

FIGS. 90A and 90B are fragmentary, enlarged plan views of a plurality of coupling cavities that may be used in the embodiment of FIG. 81;

FIG. 91 is an isometric view of a further embodiment of a waveguide body that may be used in the embodiment of FIG. 81;

FIG. 92 is a top isometric view of a further embodiment;

FIG. 93 is a bottom isometric view of a portion of the embodiment of FIG. 92 with a bottom cover removed to reveal inner portions of the luminaire;

FIG. 94 is an isometric view of an optic assembly that may be used in the embodiment of FIG. 92;

FIG. 95 is an exploded isometric view of the optic assembly of FIG. 99;

FIG. 96 is a bottom isometric view of a waveguide body that may be used in the embodiment of FIG. 92;

FIGS. 97-99 are top isometric views of alternative waveguide bodies that may be used in the embodiment of FIG. 92;

FIG. 97A is a plan view of an alternative embodiment waveguide body;

DETAILED DESCRIPTION

Figure 1:
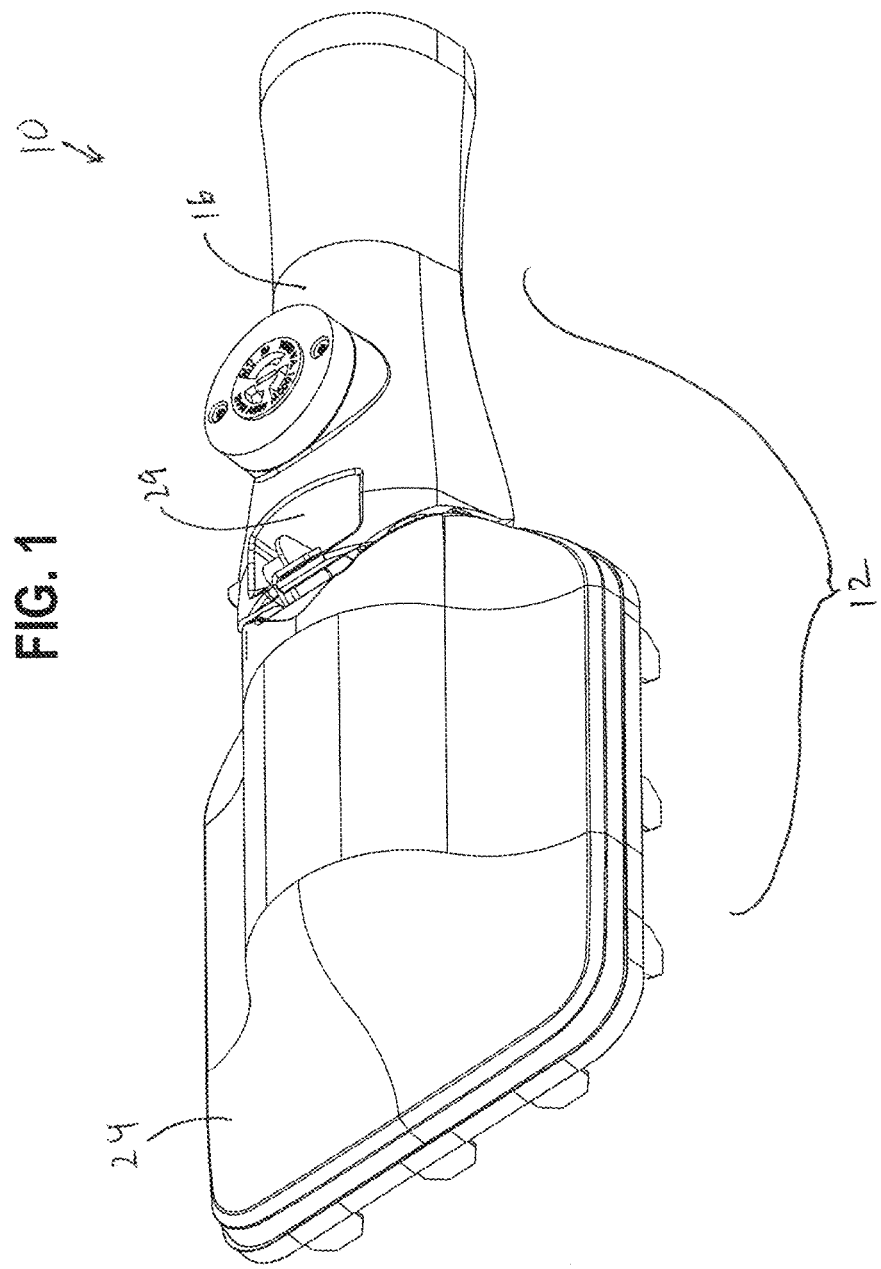
FIG. 1 is an isometric view from above of a luminaire.
Figure 2:
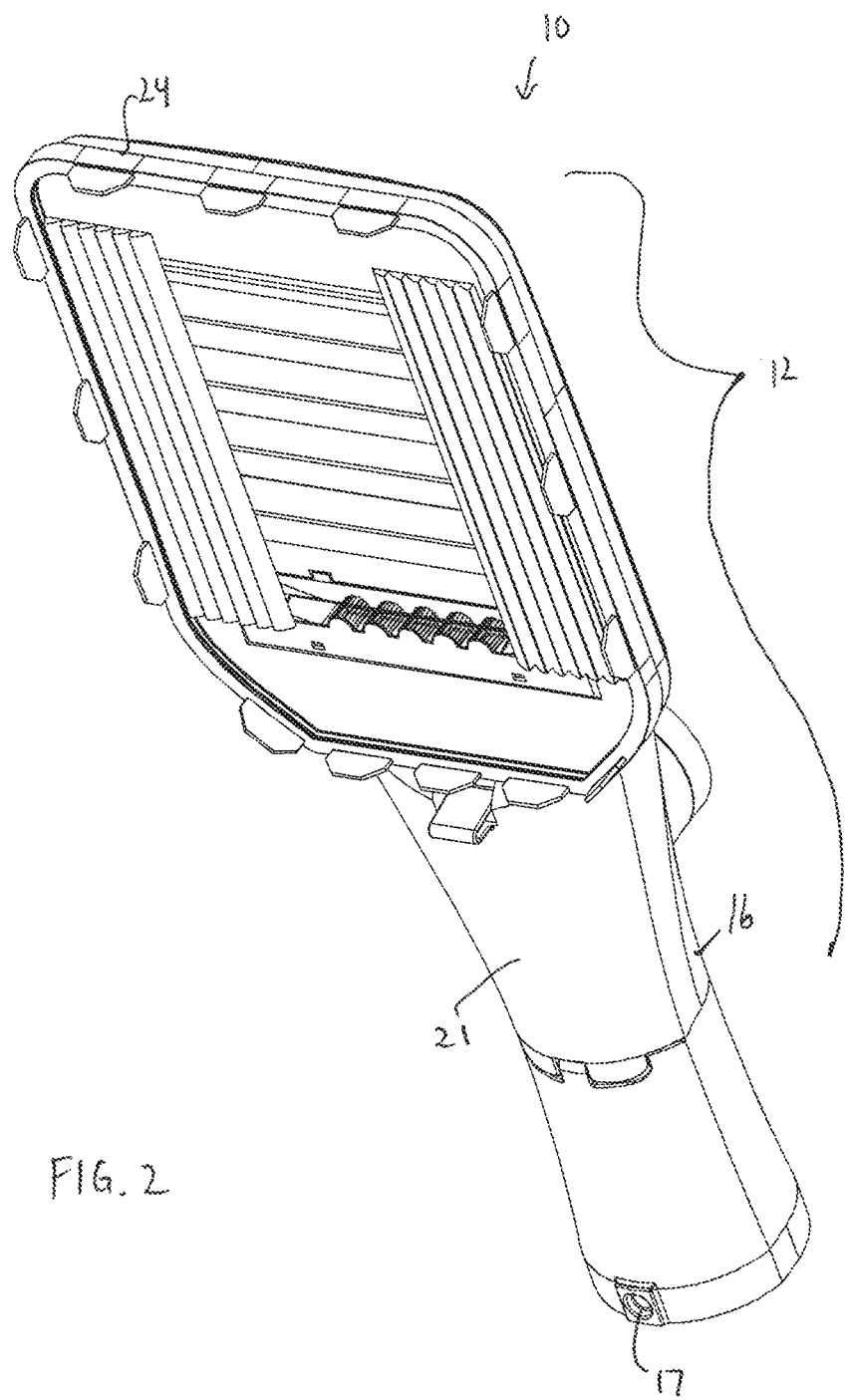
FIG. 2 is an isometric view from below of the luminaire of FIG. 1.
Figure 3:
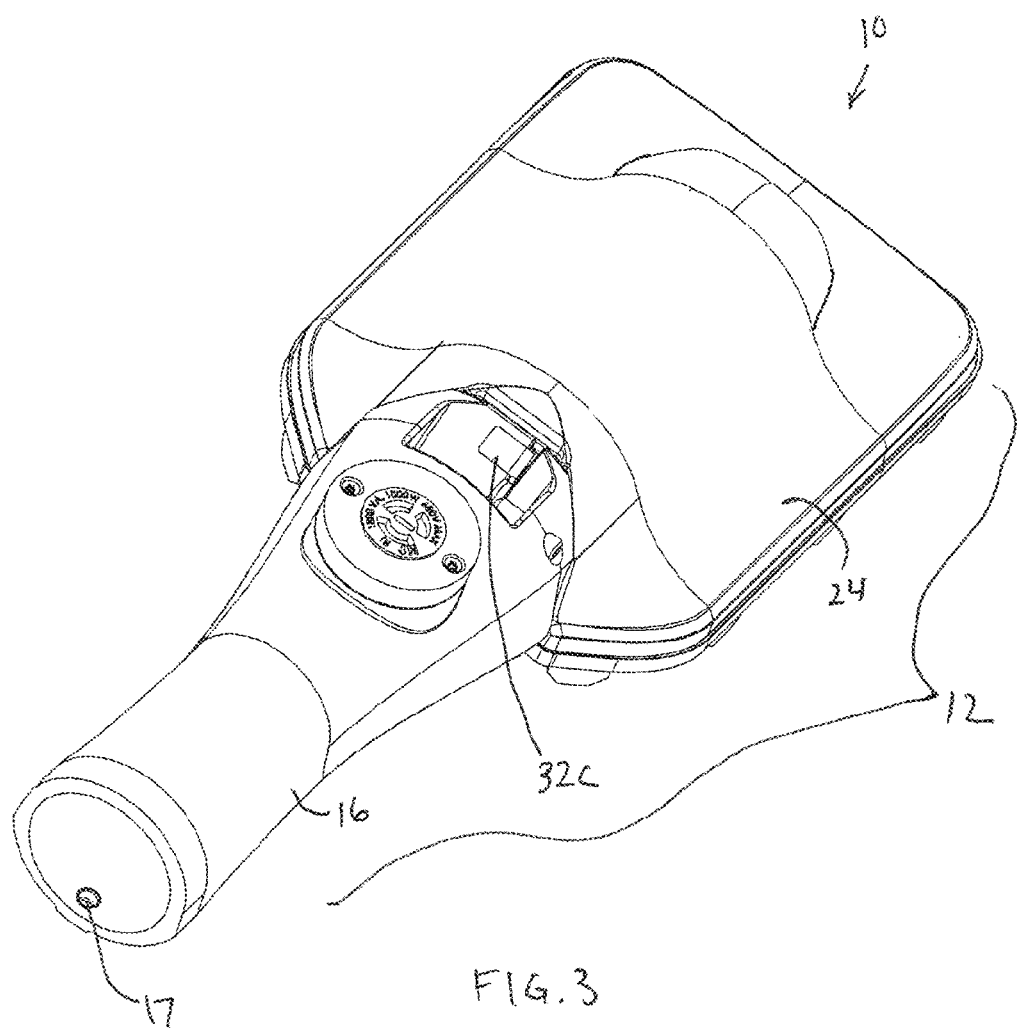
FIG. 3 is a further isometric view from above of the luminaire of FIG. 1.
Figure 16:
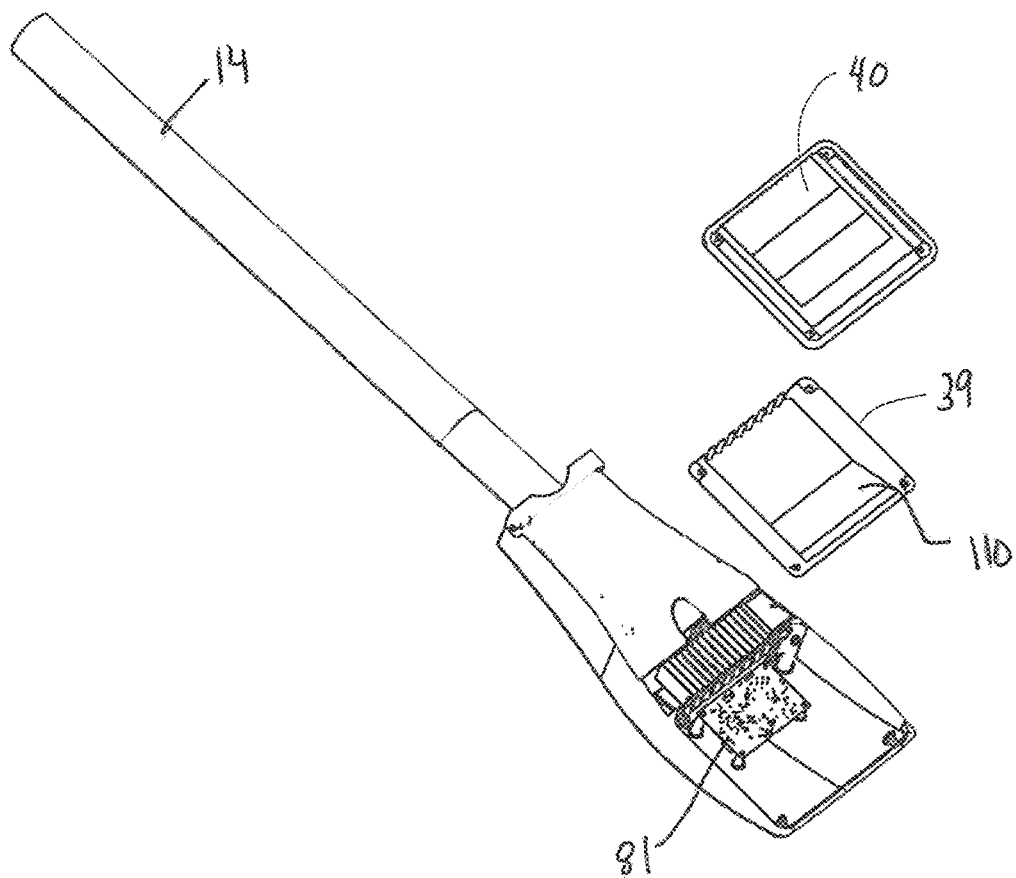
FIG. 16 is a partial exploded view of the luminaire of FIG. 1 from below.
Figure 17:
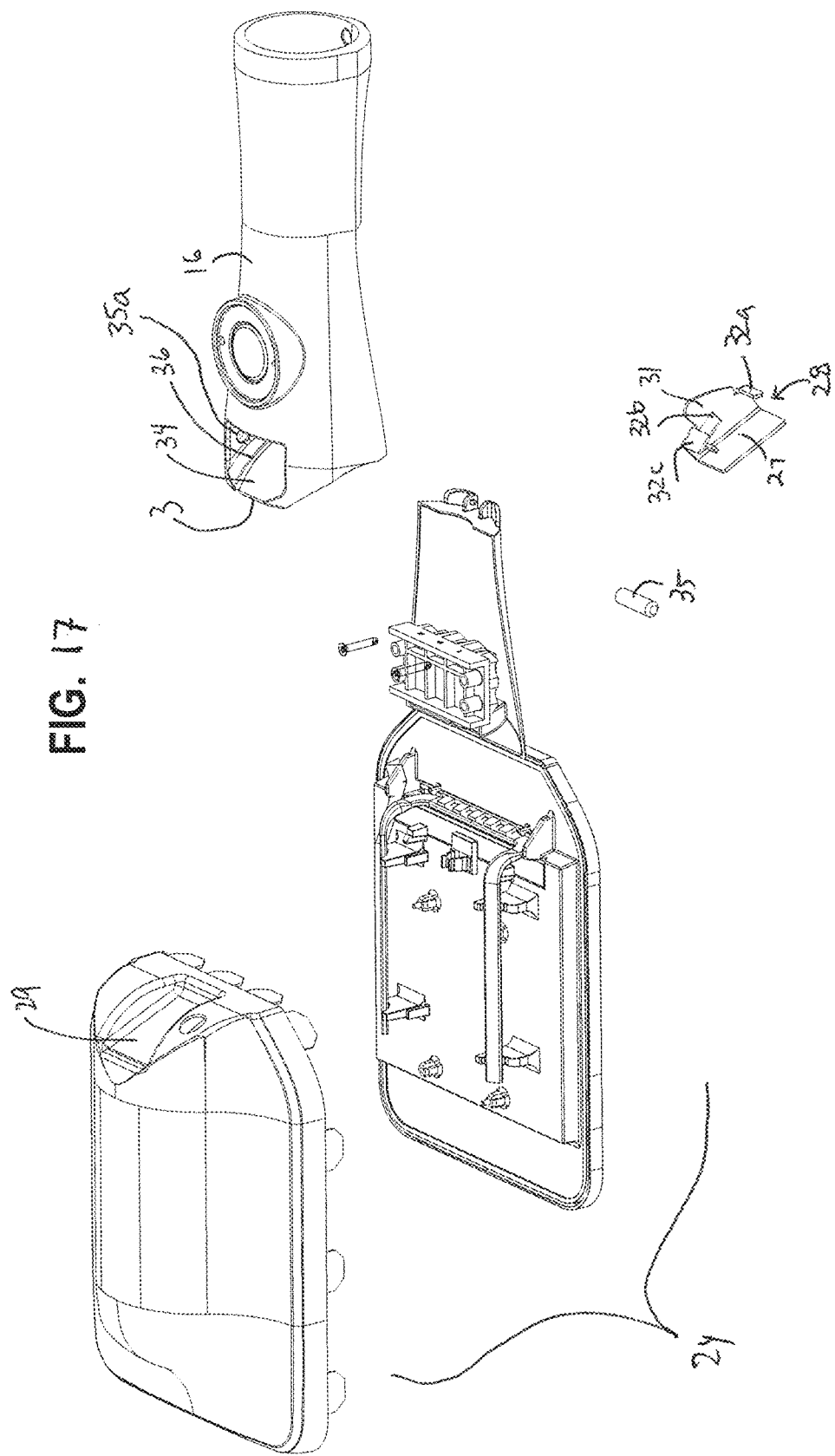
FIG. 17 is an exploded isometric view of the luminaire of FIG. 1.

Referring to FIGS. 1-17, a luminaire 10 that utilizes a waveguide is illustrated. The luminaire 10, as well as other embodiments disclosed herein, are particularly adapted for use in general lighting applications, for example, as an outdoor roadway (including a driveway) or parking lot luminaire, or as any other indoor or outdoor luminaire. The luminaire 10 includes a housing 12 adapted to be mounted on a stanchion or pole 14 (see FIG. 16). More particularly, the housing 12 includes a mounting portion 16 that is sized to accept an end of any of a number of conventional stanchions. A set screw (not shown) is threaded through a bore 17 (see FIGS. 2 and 3) and against an end of the stanchion 14 (see FIG. 16) to secure the luminaire 10 in fixed position on the end of the stanchion 14. The housing 12 may be secured to the stanchion 14 by any suitable means. Referring to FIG. 6, electrical connections (i.e., line, ground, and neutral) are effectuated via a terminal block 18 disposed within a fitter compartment 20 of the mounting portion 16. The fitter compartment 20 is accessible via a movable fitter door 21 (see FIG. 5), which is rotatable about a pivoted hinge 22 and which can be maintained in a closed position by a latch (not shown). Wires (not shown) connect the terminal block 18 to an LED driver circuit in the housing 12 to provide power thereto as noted in greater detail hereinafter.

A head portion 24 of the housing 12 is movable relative to the mounting portion 16 by an adjustment apparatus 26 as shown in FIGS. 7-9 and 21. More particularly, a base member 27 of a mounting bracket 28 is fixedly mounted by any suitable means in an end recess 29 (see FIG. 4) of the head portion 24. The mounting bracket 28 further includes a bearing plate 31 transverse to the base member 27, and first, second, and third tabs 32a, 32b, and 32c transverse to the bearing plate 31. As seen in FIGS. 7-9, a curved surface 34 carried by the mounting portion 16 includes a slot 36 that receives the bearing plate 31 such that the curved surface 34 is captured between the tabs 32a, 32b to guide the mounting bracket 28, and hence, the head portion 24, through a curved range of motion. A set screw 35 is threaded into a bore 35a in the mounting portion 16 and bears against the bearing plate 31 to maintain the position of the head portion 24 relative to the mounting portion 16 at a desired position. The tab 32c limits travel of the head portion 24 upwardly relative to the mounting portion 16 through interference thereof with a bottom surface 36a adjacent the curved surface 34.

Figure 4:
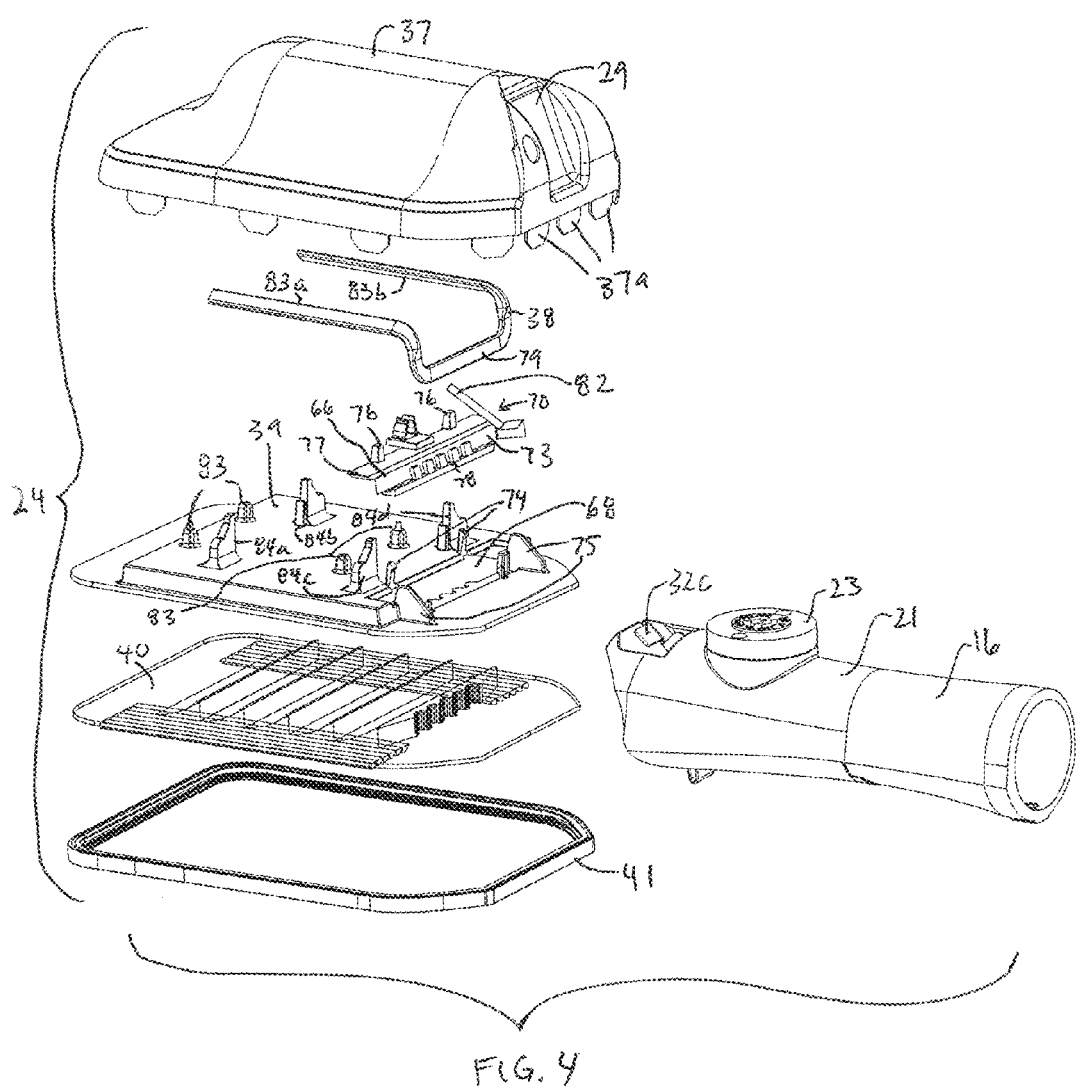
FIG. 4 is an exploded isometric view of the luminaire of FIG. 1.
Figure 5:
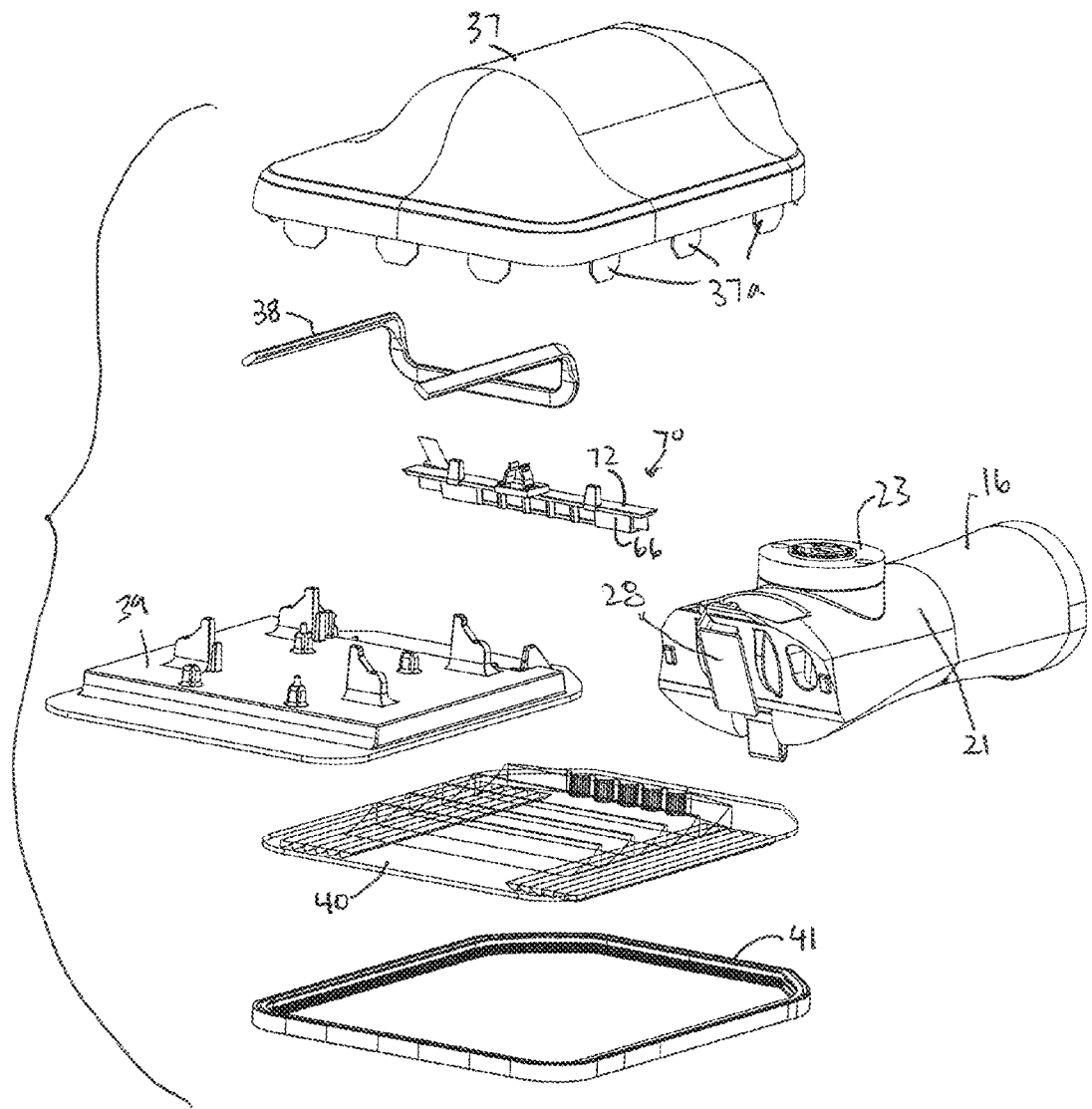
FIG. 5 is another exploded isometric view of the luminaire of FIG. 1.
Figure 6:
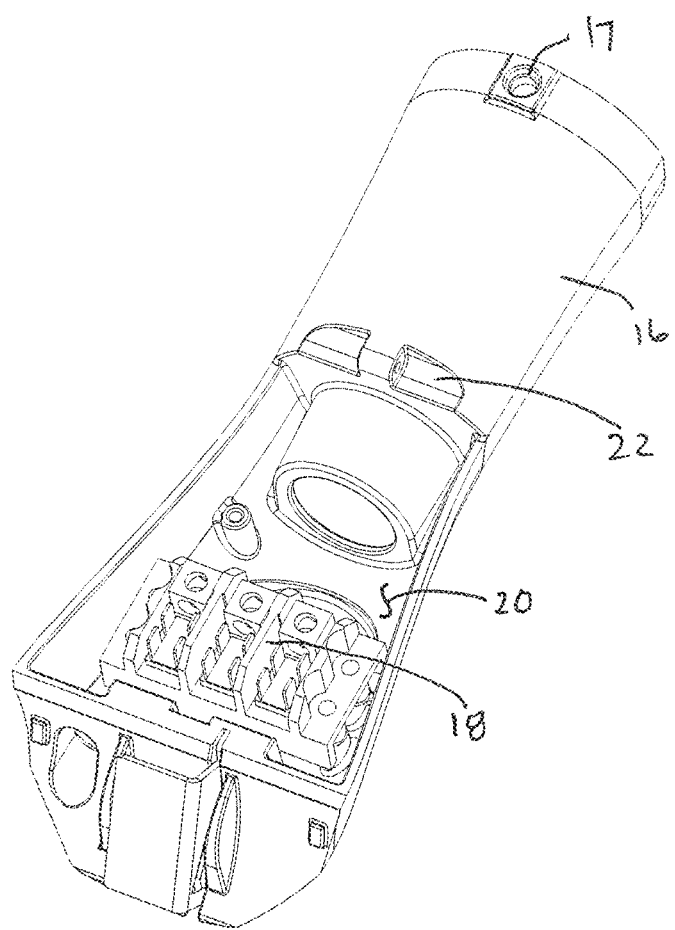
FIG. 6 is a fragmentary isometric view from below of a mounting portion of the luminaire of FIG. 1.
Figure 13:
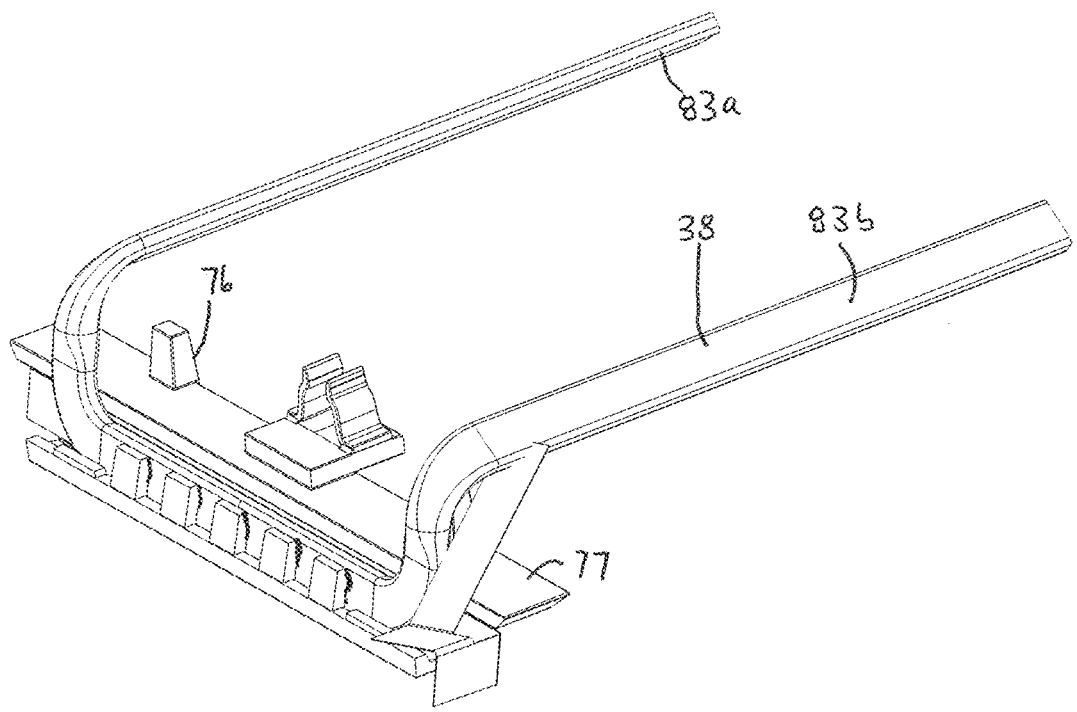
FIG. 13 is an isometric view of a heat pipe shown in FIG. 5.
Figure 14:
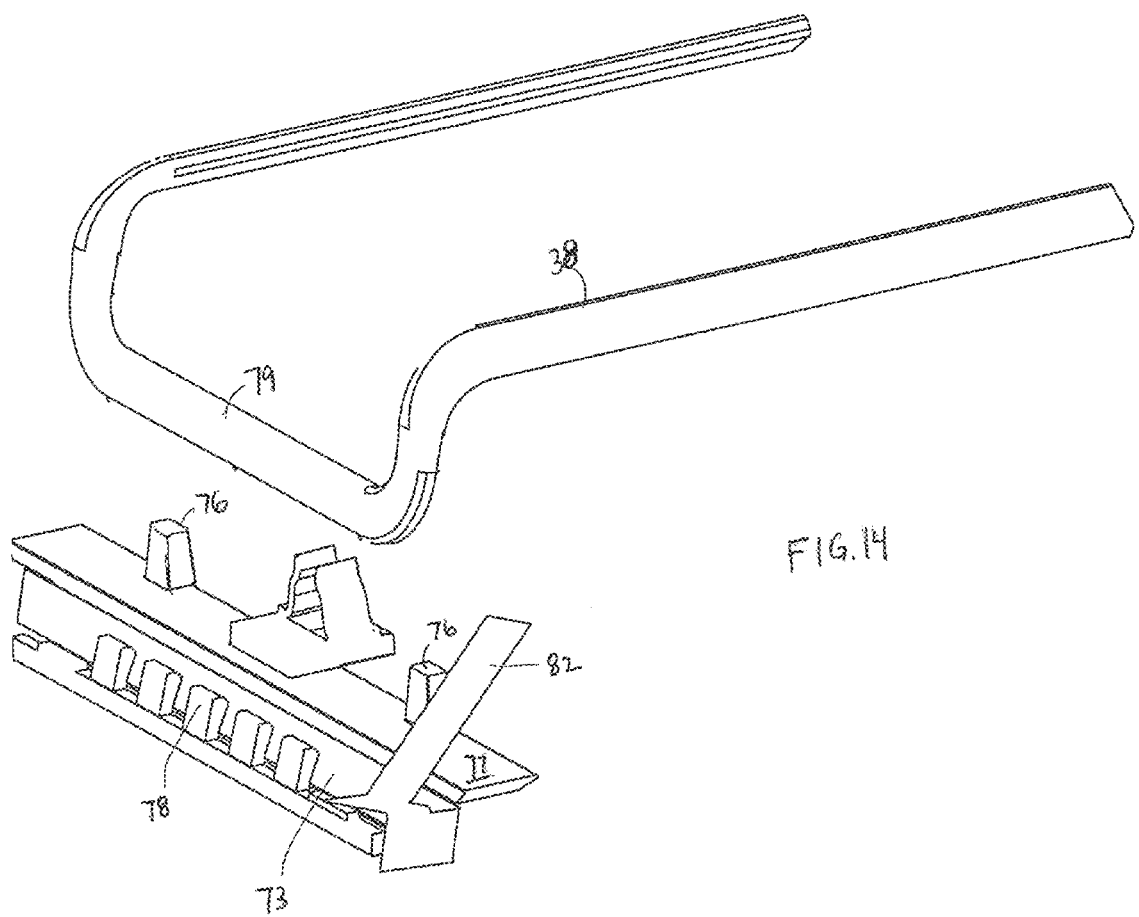
FIG. 14 is an exploded view of the heat pipe of FIG. 13.
Figure 15:
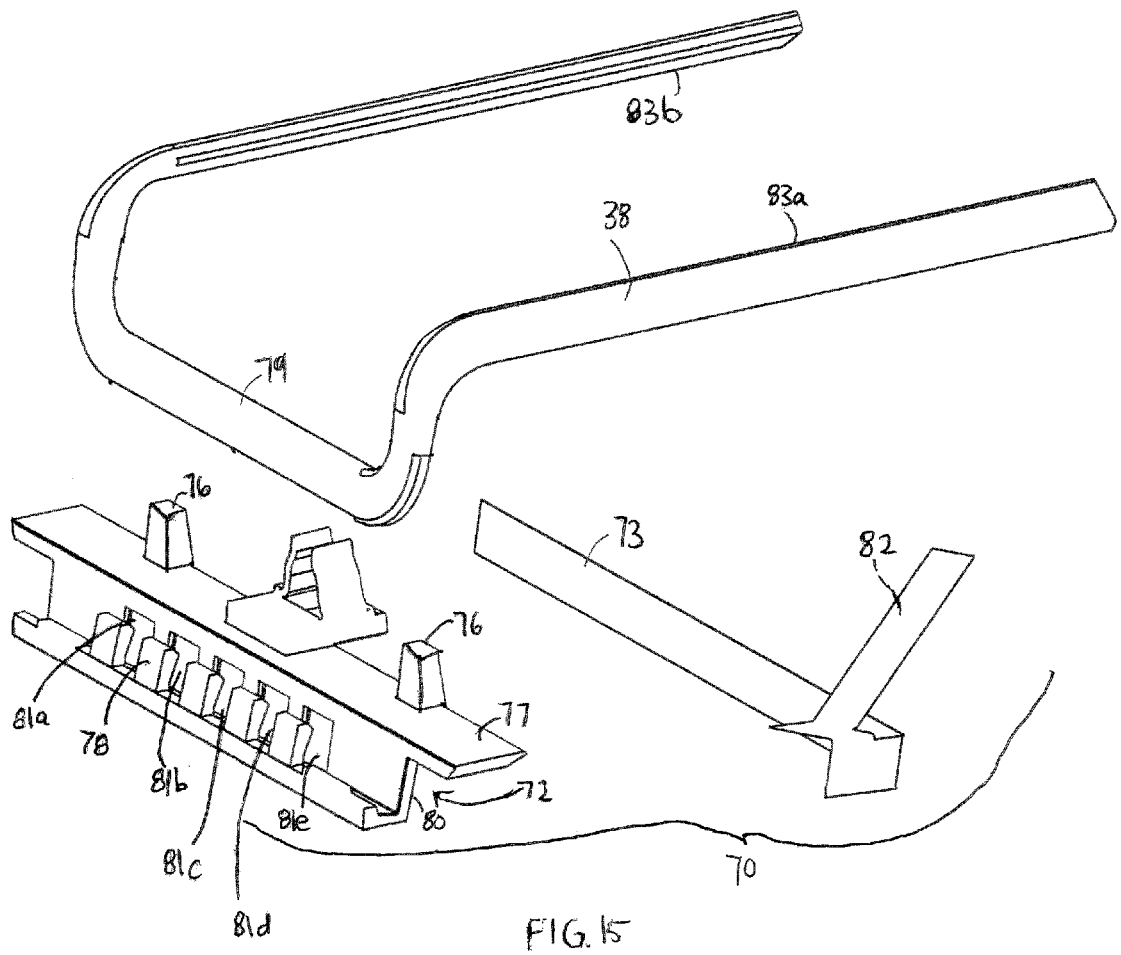
FIG. 15 is a further exploded view of the heat pipe of FIG. 13.

Referring next to FIGS. 4 and 5, the head portion 24 comprises a cover member 37, an optional heat pipe 38, a reflective enclosure member 39, and an optical waveguide comprising a waveguide body or optic 40. A gasket 41 surrounds an outer edge of the waveguide body 40 and the various components are sandwiched between the waveguide body 40 and the cover member 37 by deflecting tabs 37a of the cover member 37 upwardly and inwardly against the assembled elements. A sensor 23 may be disposed atop the mounting portion 16 for sensing ambient light conditions or other parameters and a signal representative thereof may be provided to the LED driver circuit in the housing 12.

Referring next to FIGS. 10-12, an embodiment of a waveguide body 340 includes a top surface 342, a bottom surface 343 forming a part of a substrate 343a, and at least one, and, more preferably, a plurality of light coupling cavities or features 344a-344e extending into the waveguide body 340 from an end surface 345. A number of light redirection elements 346 define the top surface 342 and are disposed atop the substrate 343a. An optional plurality of light extraction features 367 may be disposed on the bottom surface 343. LED elements (see FIG. 10A) 348 comprising light sources are disposed in or adjacent each of the plurality of light coupling cavities 344 as described in greater detail below.

As seen in FIG. 10, the plurality of light coupling cavities 344 are all preferably of substantially the same shape, although different shapes may be used to effectuate a desired illumination pattern. As seen in FIG. 10A, each light coupling cavity 344 is defined by a surface 356 that is substantially or generally hemispherical in cross section and the cavity 344 is preferably cylindrical in the sense that the general hemispherical shape is unchanged along a length of the cavity 344. The surface 356 defining each light coupling cavity 344 may be smooth, textured, curved, or otherwise shaped to affect light mixing and/or redirection. For example, as seen in FIG. 10A, the surface 356 includes an arrangement of protrusions 380 separated from one another by intervening grooves 382 to promote light mixing. Such an arrangement may take any of the forms disclosed in International Application No. PCT/US14/30017, filed Mar. 15, 2014, entitled "Optical Waveguide Body", incorporated by reference herein. The arrangement promotes color mixing in the event that different color LEDs 348 are used and/or promote illuminance uniformity by the waveguide body 340 regardless of whether multi-color or monochromatic LEDs are used.

In any of the embodiments disclosed herein other light mixing features may be included in or on the waveguide body 340, for example, one or more bodies of differing index or indices of refraction than remaining portions of the waveguide body 340 may extend into the waveguide body and/or be located fully within the waveguide body 40.

As described in greater detail hereinafter in connection with FIG. 11A, LED elements 348 are disposed within or adjacent the coupling cavities 344a-344e of the waveguide body 340. Each LED element 348 may be a single white or other color LED, or each may comprise multiple LEDs either mounted separately or together on a single substrate or package to form a module including, for example, at least one phosphor-coated or phosphor-converted LED, such as a blue-shifted yellow LED, either alone or in combination with at least one color LED, such as a green LED, a yellow LED, a red LED, etc. The number and configuration of LEDs 48 may vary depending on the shape(s) of the coupling cavity.

Different color temperatures and appearances could be produced using particular LED combinations, as is known in the art. In one embodiment, each light source comprises any LED, for example, an MT-G LED incorporating True-White® LED technology or as disclosed in U.S. patent application Ser. No. 13/649,067, filed Oct. 10, 2012, entitled "LED Package with Multiple Element Light Source and Encapsulant Having Planar Surfaces" by Lowes et al., the disclosure of which is hereby incorporated by reference herein, as developed and manufactured by Cree, Inc., the assignee of the present application. In another embodiment, a plurality of LEDs may include at least two LEDs having different spectral emission characteristics. If desirable, one or more side emitting LEDs disclosed in U.S. Pat. No. 8,541,795, the disclosure of which is incorporated by reference herein, may be utilized inside or at the edge of the waveguide body 40, 340 (the option to use LEDs inside the waveguide body is discussed below). In any of the embodiments disclosed herein the LED elements 48 preferably have a Lambertian light distribution, although each may have a directional emission distribution (e.g., a side emitting distribution), as necessary or desirable. More generally, any Lambertian, symmetric, wide angle, preferential-sided, or asymmetric beam pattern LED(s) may be used as the light source.

Referring to FIGS. 10 and 11, the light redirection elements 346 include at least a plurality of light extraction features 363a-363e. The light extraction features 363a-363e are linear in overall side-to-side extent or shape and include five wedge-shaped (in cross-section) extraction features. Further, the light extraction features 363a-363e are preferably symmetric with respect to a centerline 365 of the waveguide body 340, although other configurations are envisioned. In other embodiments, the width, length, and curvature and/or other shape(s) of the extraction features may vary.

The substrate 343a may be integral with the redirection elements 346 or the redirection elements 346 may be separately formed and placed on or otherwise disposed and retained relative to the substrate 343a, as desired. The substrate 343a and some or all of the redirection elements may be made of the same or different materials.

The waveguide body 340 is made of suitable optical materials, such as one or more of acrylic, air, polycarbonate, molded silicone, glass, cyclic olefin copolymers, and/or a liquid, including water and/or mineral oils, and combinations thereof, possibly in a layered arrangement, to achieve a desired effect and/or appearance.

The light developed by the LEDs 348 travels through the waveguide body 340 and is redirected downwardly by the extraction features 363 and is emitted out the bottom or emission surface 343 of the waveguide body 340. The optional light extraction features 367, which may comprise two sets of parallel features extending transverse to the extent of the features 363, further facilitate light extraction. It should be noted that the light extraction features 347 may not be needed in the case where the light extraction features 363 are optically decoupled from the substrate 343a, resulting in an air gap between the features 363 and the substrate 343a preventing substantial retention of light in the substrate 343a. Such an optically decoupled condition may exist, for example, where the extraction features 363 are not intimately optically bonded to the substrate 343a, but are non-intimately retained thereon, such as by one or more mechanical elements.

Figure 43:
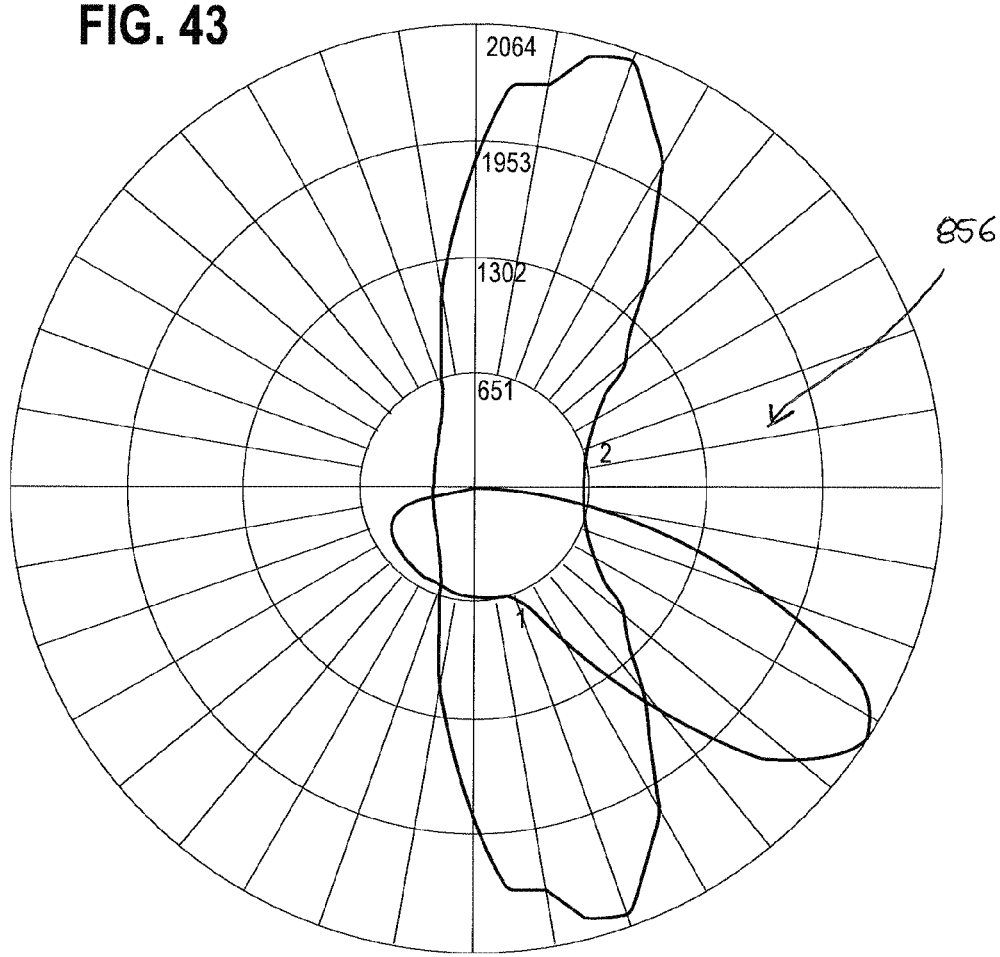
FIGS. 43 and 43A are graphs illustrating light distributions produced by an embodiment of a luminaire disclosed herein.
Figure 43A:
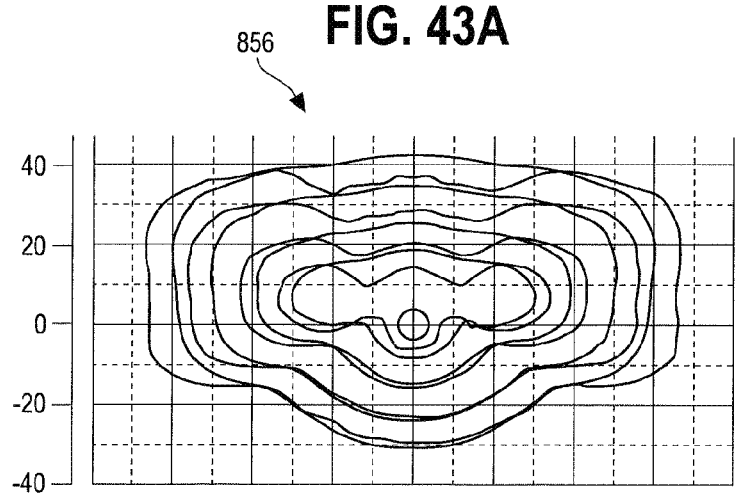
Figure 44:
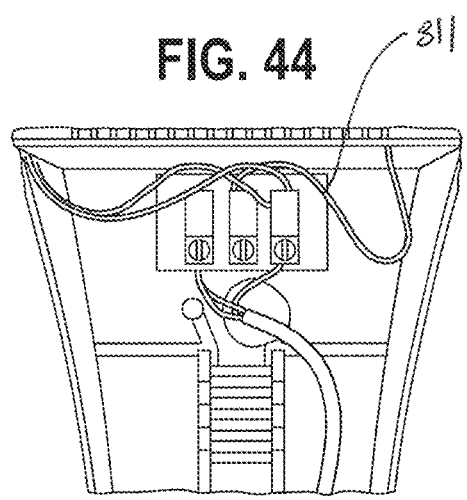
FIGS. 44-50 are photographs of portions of the embodiment of FIG. 30.
Figure 45:
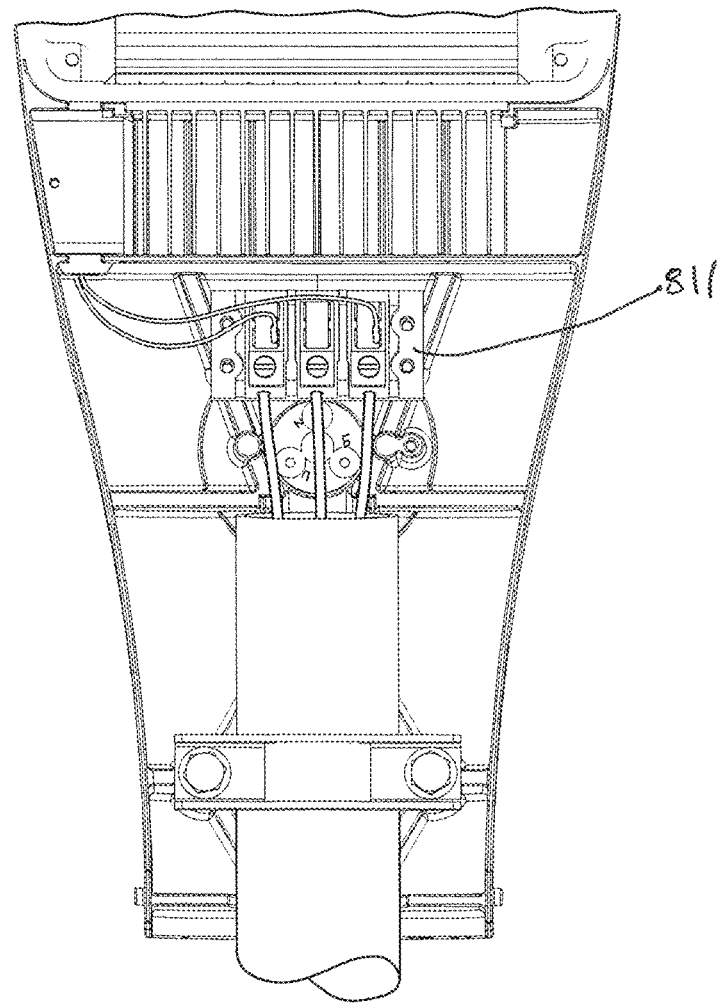
Figure 46:
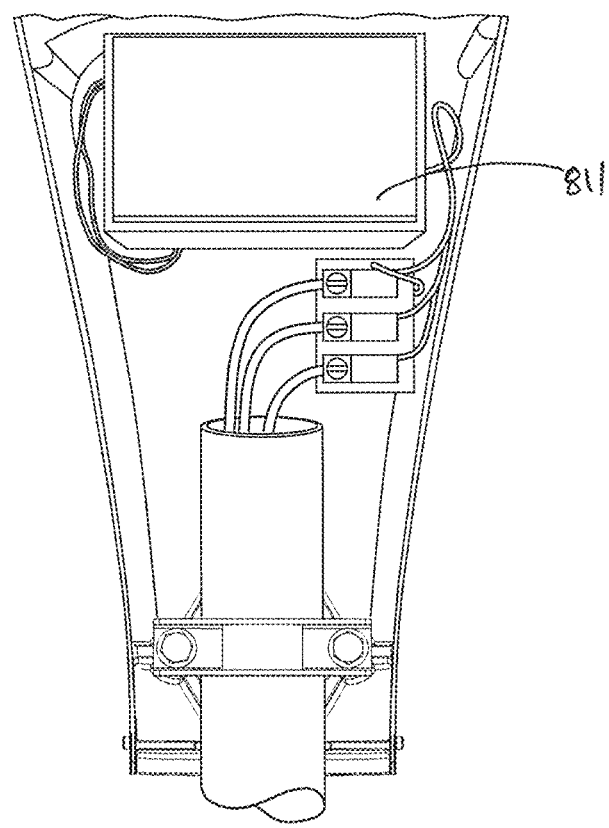

The waveguide body 340 directs light developed by the LED element(s) 348 toward a desired illumination target surface, such as a roadway, with an illumination pattern 350, for example, as seen in FIG. 12. The illumination pattern 350 is preferably, although not necessarily, offset with respect to a center of the waveguide body as described above. Referring to FIG. 12, the extraction features 363 are configured to develop an asymmetric light distribution having a lateral first maximum extent offset from the lateral axis 359 (see FIG. 10). The light distribution further has a longitudinal second maximum extent aligned with the longitudinal axis 365. The lateral first maximum extent is larger than the longitudinal second maximum extent. Specifically, the luminaire is located at the center (0, 0) of the graph of FIG. 12 and has a mounting height of 20 feet. Further, the illumination area is disposed away from the center 359 in the direction of the arrow 365a, with the magnitude of the offset and the size and, possibly, the shapes of the illumination area being a function of distance of the luminaire from the target surface, as should be evident. An alternative light distribution 856 is illustrated in FIGS. 43 and 43A.

Further, the LED elements 348 may be disposed in some other arrangement relative to one another and relative to the light coupling cavities. The LED elements 348 may be mounted on individual support structures or multiple elements may be mounted on a single support structure. In the illustrated embodiment, the LEDs 348 are disposed on and carried by a metal coated printed circuit board (PCB) 66 (FIG. 4) that is, in turn, held in place relative to an opening 68 of the reflective enclosure member 39 by a holder assembly 70. The holder assembly 70 comprises a main holding member 72 and a flexible compression strip 73. The main holding member 72 is held in place on the reflective enclosure member 39 by a first set of hooked members 74 and a second pair of hooked members 75 of the reflective enclosure member 39 that bear against a pair of upstanding posts 76 and a ledge 77, respectively, of the main holding member 72. A set of upstanding teeth 78 bear against a central portion 79 of the heat pipe 38 and the compression strip 73 is firmly captured between the central portion 79 and a back surface of the PCB 66. A front surface of the PCB 73 on which the LEDs are disposed is disposed adjacent a vertical surface 80 of the main holding member 72 such that each LED 48 extends into an associated one of a plurality of rectangular or square openings 81a-81e. The flexible or rigid PCB 73 is sandwiched between compression strip 72 and heat pipe 79. A force is exerted by the upstanding teeth 78 toward the heat pipe 79. The compression force exerted by the upstanding teeth 78 maintains a thermal conduction path between the heat pipe 79 and the PCB 73. The waveguide body 40 (FIG. 16), 340 (FIG. 10) is disposed and maintained within an inside surface of the reflective enclosure member 39 such that the coupling cavities 344a-344e are disposed in a fixed relationship adjacent the openings 81a-81e, respectively, and the LEDs 48, 348. Each LED receives power from an LED driver circuit or power supply of suitable type, such as a SEPIC-type power converter and/or other power conversion circuits carried by a circuit board 81 that is mounted by fasteners 82 and locating pins 83 (FIG. 4) atop the reflective enclosure member 39.

Side portions 83a, 83b of the heat pipe 38 are disposed and held within four support brackets 84a-84d carried by the reflective enclosure member 39. The portions 83a, 83b are thus disposed adjacent an inside surface of the cover member 37, and heat developed by the LEDs 48 (or 348) is transmitted through the printed circuit board 73 to the central portion 79 of the heat pipe 38. The heat is further transmitted to the side portions 83a, 83b and through the cover member 37 to ambient surroundings.

As shown in the FIGS., in any of the embodiments disclosed herein, each coupling cavity 344 may extend fully through the body 340, although each coupling cavity 344 (or one or more coupling cavities) may extend only partially through the body 340. It should be noted that the LED element(s) 348 need not be located at an edge portion of the waveguide body 340 (which embodiments are referred to as "edge lit"). Rather, one or more of the coupling cavities 344 may be a blind cavity or through bore of any suitable shape disposed at a location intermediate side surfaces and the end surface and an opposing end surface and the LED element(s) 48 may be disposed in the blind cavity or through bore to obtain an "interior lit" waveguide. In edge lit embodiments, the LED element(s) 48 may be above, below, and/or to the side of the edge and aligned therewith as shown and described in co-pending U.S. patent application Ser. No. 14/101,086, entitled "Optical Waveguides and Luminaires Incorporating Same," filed Dec. 9, 2013 . Further, it may be desirable to dispose one or more of the LED elements 48 at an angle α within the associated coupling. For example, where an LED element 48 extends into the waveguide body from an edge thereof, the central axis of the LED element 48 may be disposed at a non-zero angle with respect to the length, width, and/or thickness dimensions of the waveguide body 40.

Also in any of the embodiments disclosed herein, a conical light diverter may be disposed in the blind cavity or through bore opposite the LED element to direct light into the waveguide body 40, 340, if desired. For example, a light diverter as disclosed in U.S. patent application Ser. No. 13/839,949, filed Mar. 15, 2013, entitled "Optical Waveguide and Lamp Including Same"incorporated by reference herein may be disposed in such a blind cavity or through bore.

The spacing, number, size, and geometry of extraction features 363 determine the mixing and distribution of light in the waveguide body 340 and light exiting therefrom. In the illustrated embodiment, the extraction features 363 comprise a series of ridges separated by intervening troughs at least some of which define one or more inverted V-shapes in cross section, as seen in the FIGS. Also, at least one (and perhaps more or all) of the extraction features 363 or any or all of the other extraction features disclosed herein may be continuous (i.e., it extends in a continuous manner), while any remaining extraction features may comprise continuous or discontinuous ridges (i.e., partial linear and/or nonlinear features extending continuously or discontinuously) separated by intervening troughs. If desired, inflections or other surface features may be provided in any of the extraction features disclosed herein. Still further, for example, as seen in the illustrated embodiment, all of the extraction features 363 are symmetric with respect to the centerline 352 of the body 340, although this need not be the case. In addition to the foregoing, the waveguide body 340 and any other waveguide body disclosed herein may be tapered in an overall sense from the coupling cavities 344 to the end surface in that there is less material at the general location of the end surface 95 than at portions adjacent the coupling cavities 344. Such tapering may be effectuated by providing extraction features that become deeper and/or more widely separated with distance from the coupling cavities 344. The tapering maximizes the possibility that substantially all the light introduced into the waveguide body 340 is extracted over a single pass of the light therethrough. This results in substantially all of the light striking the outward surfaces of the extraction features 363, which surfaces are carefully controlled so that the extraction of light is also carefully controlled. The combination of tapering with the arrangement of extraction features result in improved color mixing with minimum waveguide thickness and excellent control over the emitted light.

It should be noted that there could be a different number of light extraction features 363, as desired. In any event, the Lambertian or other distributions of light developed by the LED elements 348 are converted into a distribution resulting in the illumination pattern 350. More specifically, the light developed by the LED element(s) 348 is emitted into center portions of the beam spread and to side portions past imaginary planar surfaces normal to the bottom surface 343 and coincident with side surfaces. As noted above, this lateral extent of the beam spread is substantially greater than a longitudinal extent of the beam spread of the light (i.e., the beam spread transverse to the lateral extent) of the illumination pattern 350. The illumination pattern 350 can be modified through appropriate modification of the light extraction elements. The brightness can be increased or decreased by adding or omitting, respectively, LED elements 348.

As should be apparent from the foregoing, the reflective enclosure member 39 is disposed above the waveguide body 340 opposite the substrate 343a. The reflective enclosure member 39 includes a lower surface 110 that is coated or otherwise formed with a white or specular material. Further, one or more of the surfaces of the waveguide body may be coated/covered with a white or specular material. Light that escapes the upper surface 342 of the waveguide body 340 may be thus reflected back into the waveguide body 340 so that light is efficiently extracted out the substrate 343a. The lower surface 110 may have other than a planar shape, such as a curved surface.

In all of the illustrated embodiments, the light emitted out the waveguide body 340 is mixed such that point sources of light in the LED elements 348 are not visible to a significant extent and the emitted light is controlled and collimated to a high degree.

Figure 18:
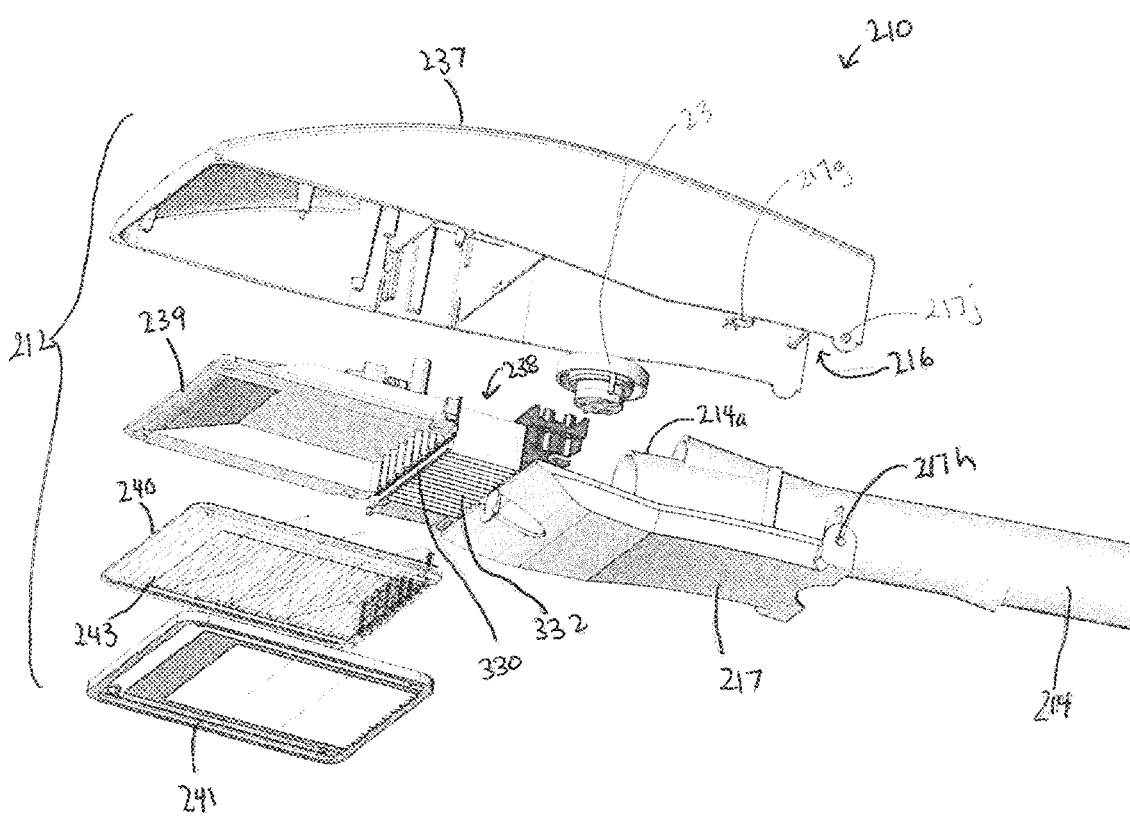
FIG. 18 is an exploded isometric view from below of another embodiment of a luminaire.
Figure 24:
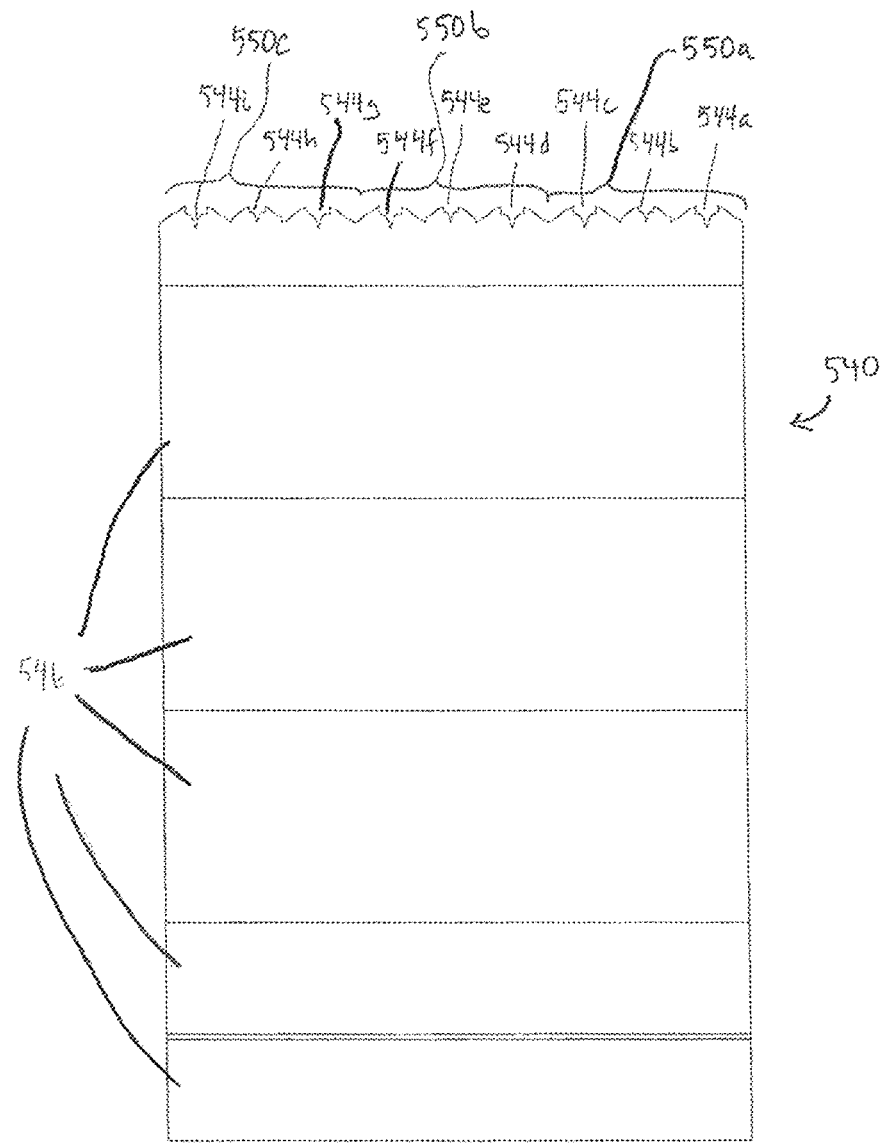
FIG. 24 is a side elevational view of the waveguide body of FIG. 20.

Referring next to FIGS. 18 and 19, a second embodiment of a luminaire 210 that utilizes a waveguide is illustrated. The luminaire 210, as in the previous embodiment disclosed herein, is particularly adapted for use in general lighting applications, for example, as an outdoor roadway (including a driveway) or parking lot luminaire, or as any other indoor or outdoor luminaire. The luminaire 210 includes a housing 212 adapted to be mounted on a stanchion or pole 214 that may be similar or identical to or different than the stanchion or pole 14. More particularly, the housing 212 includes a mounting portion 216 that is sized to accept an end of any of a number of differently-sized conventional stanchions. The housing 212 is secured to the stanchion 214 by a mounting assembly 217 comprising a clamping member 217a (FIG. 30) and first and second fasteners 217c, 217d that extend through bores 217e, 217f of the clamping member 217a and into threaded bores 217g, 217h (FIG. 18) extending into bosses (not shown) of the housing 212, thereby capturing the stanchion between the clamping member 217 and a curved seat member 217k (best seen in FIG. 33) of the housing 212. In addition, an end 214a of the stanchion 214 is disposed in any of a number of seats defined by ridges and grooves in a pair of curved members 219a, 219b carried by the housing so that the angle of the housing 212 relative to the stanchion may be adjusted before the fasteners 217c, 217d are fully threaded into the threaded bores 217g, 217h. Electrical connections (i.e., line, ground, and neutral) are effectuated via a terminal block 218 disposed within a fitter compartment 220 of the mounting portion 216. The fitter compartment is accessible via a movable fitter door 221, which is rotatable about a pivoted hinge 222 and which can be maintained in a closed position by a latch 223. Wires (not shown) connect the terminal block to an LED driver circuit in the housing to provide power thereto as noted in greater detail hereinafter.

Referring to FIGS. 18 and 19, the head portion 224 comprises a cover member 237, a heat exchanger 238, a reflective enclosure member 239, and an optical waveguide comprising, for example, a waveguide body or optic 240. A gasket 241 is sandwiched between outer edges of the waveguide body 240 and outer edges of the cover member 237. Fasteners in the form of screws 242 secure the outer edges of the waveguide body 240 and the gasket 241 to the outer edges of the cover member 237.

Referring next to FIGS. 20-25, the waveguide body 540 includes a plurality of light coupling cavities or features 544a-544i extending into the waveguide body 540 from an end surface 576 thereof and a number of light redirection elements 546. Light mixing features 580 are disposed on a bottom surface 545 of the waveguide body 540. LED elements 596 (see FIG. 25) are disposed in a stacked configuration within each of the plurality of light coupling cavities 544 as described in greater detail below. As in the previous embodiment, the waveguide body 540 may include a planar substrate, similar or identical to the substrate 343a, if desired, or the substrate may simply comprise the bottom surface 545 of the waveguide body 540 as shown.

As seen in FIG. 21, the plurality of light coupling cavities includes three groups 550a-550c, each of which includes three light coupling cavities of substantially the same shape. However, two of the coupling cavities of each group 550a-550c are larger than a remaining coupling cavity of the group and the remaining coupling cavity is disposed between the two larger coupling cavities. For example, group 550a shown in FIG. 21 includes two larger coupling cavities 544a, 544c and a remaining coupling cavity 544b. Similarly, group 550b includes two larger coupling cavities 544e, 544f and a remaining coupling cavity 544e, and group 550c includes two larger coupling cavities 544g, 544i and a remaining coupling cavity 544h. Preferably, all of the light coupling cavities 544a-544i have the same shape, although other shapes may be used to effectuate a desired illumination pattern.

Figure 22:
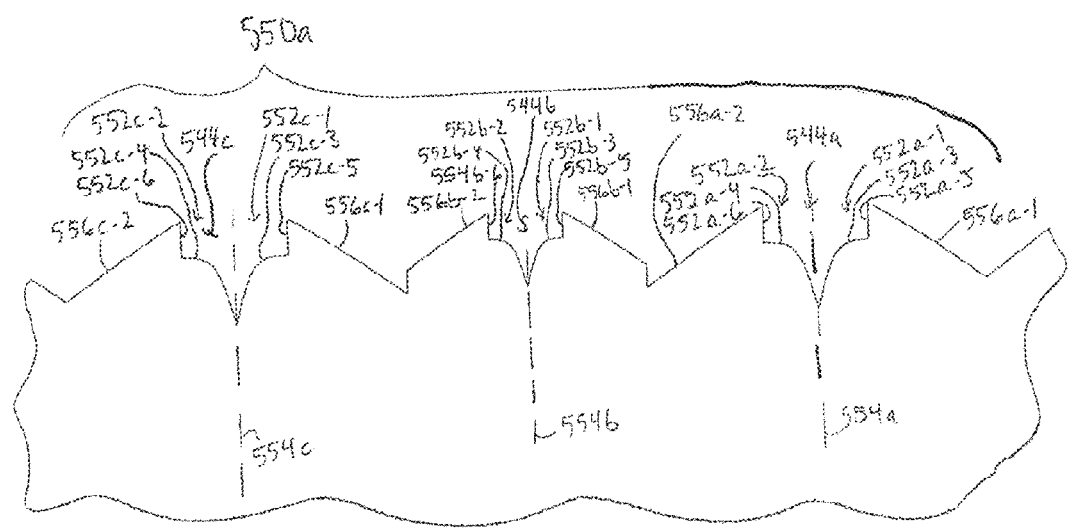
FIG. 22 is a fragmentary, enlarged plan view of coupling cavities of the waveguide body of FIG. 20.
Figure 23:
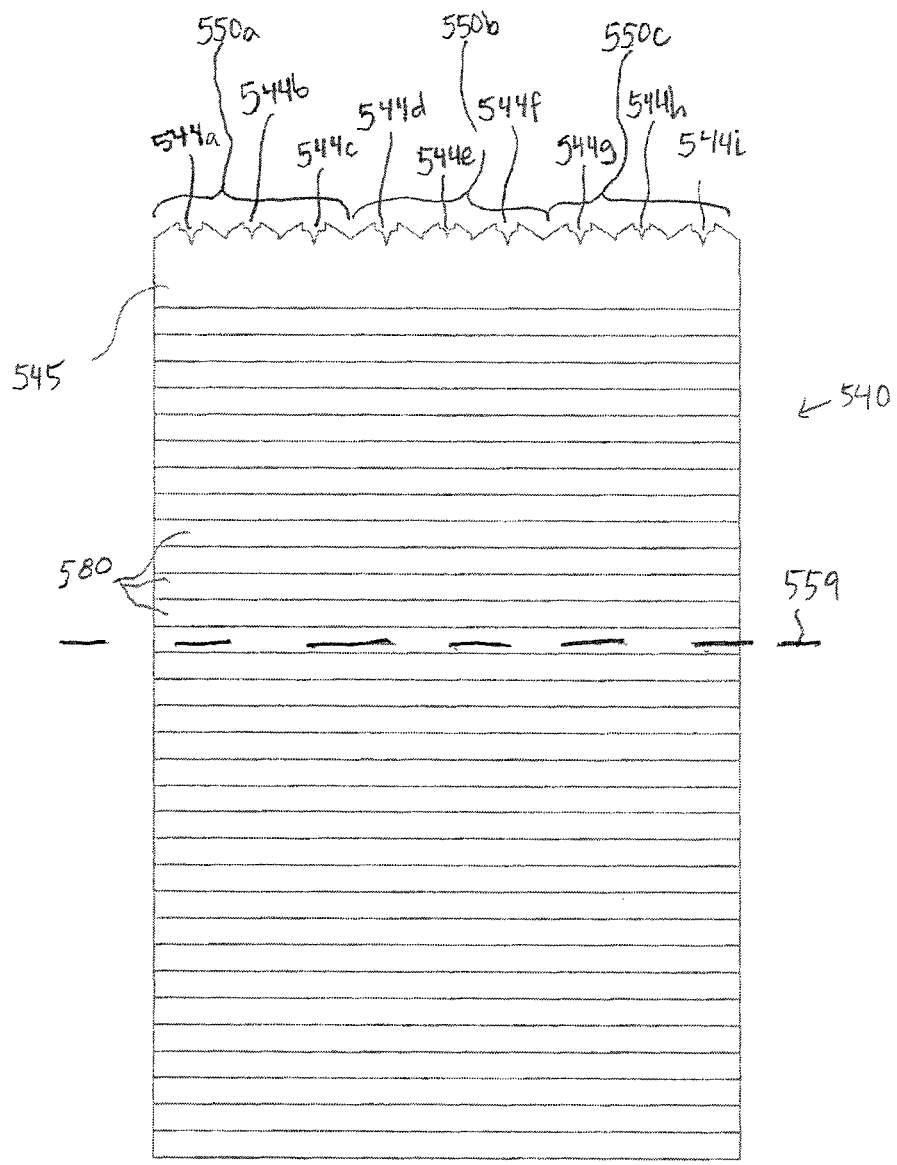
FIG. 23 is a bottom elevational view of the waveguide body of FIG. 20.
Figure 24:
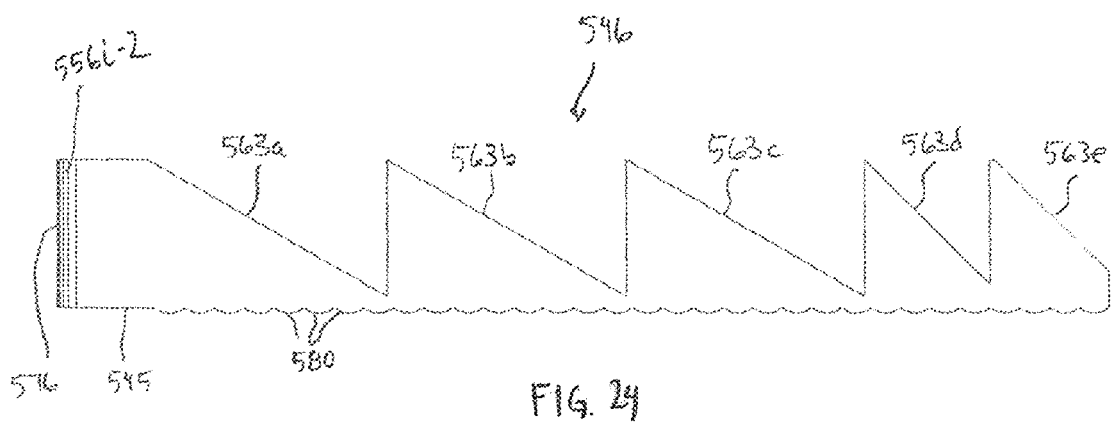

Referring to FIG. 22, each light coupling cavity 544 includes two coupling surfaces 552-1, 552-2 that are mirror images of one another on either side of an axis 554 of symmetry. Planar portions 552-5, 552-6 of the respective coupling surfaces 552-1, 552-2 are spaced apart, and curved portions 552-3, 552-4 of the respective coupling surfaces 552-1, 552-2 meet along the axis of symmetry 554. Two control surfaces 556-1, 556-2 are provided on each side of the coupling surfaces 552-1, 552-2 adjacent one of the planar portions 552-5, 552-6 thereof and extend into the waveguide 540 from the end surface 576. The coupling surfaces 552-1, 552-2 and the control surfaces 556-1, 556-2 are shaped to direct light emitted from an LED 548 substantially in defined paths in the waveguide. The coupling surfaces 556-1, 556-2 and the control surfaces 552-1, 552-2 may be smooth, textured, curved, or otherwise shaped to affect light mixing and/or redirection. In the embodiment shown in FIG. 22, each of the curved portions 552-3, 552-4 of the coupling surfaces 552-1, 552-2 and the control surfaces 556-1, 556-2 has a piecewise linear shape. Each of the curved portions 552-3, 552-4 preferably approximates a curve, while each of the control surfaces 556-1, 556-2 preferably approximates a line.

The light redirection elements 546 include at least a plurality of light extraction features 563a-563e. The light extraction features 563a-563e are linear in overall side-to-side extent or shape and include five wedge-shaped (in cross-section) extraction features. Further, the light extraction features 563a-563e are preferably symmetric with respect to a centerline 552 of the waveguide body 540, although other configurations are envisioned. In other embodiments, the width, length, and curvature and/or other shape(s) of the extraction features may vary as in the previous embodiments.

Figure 25:
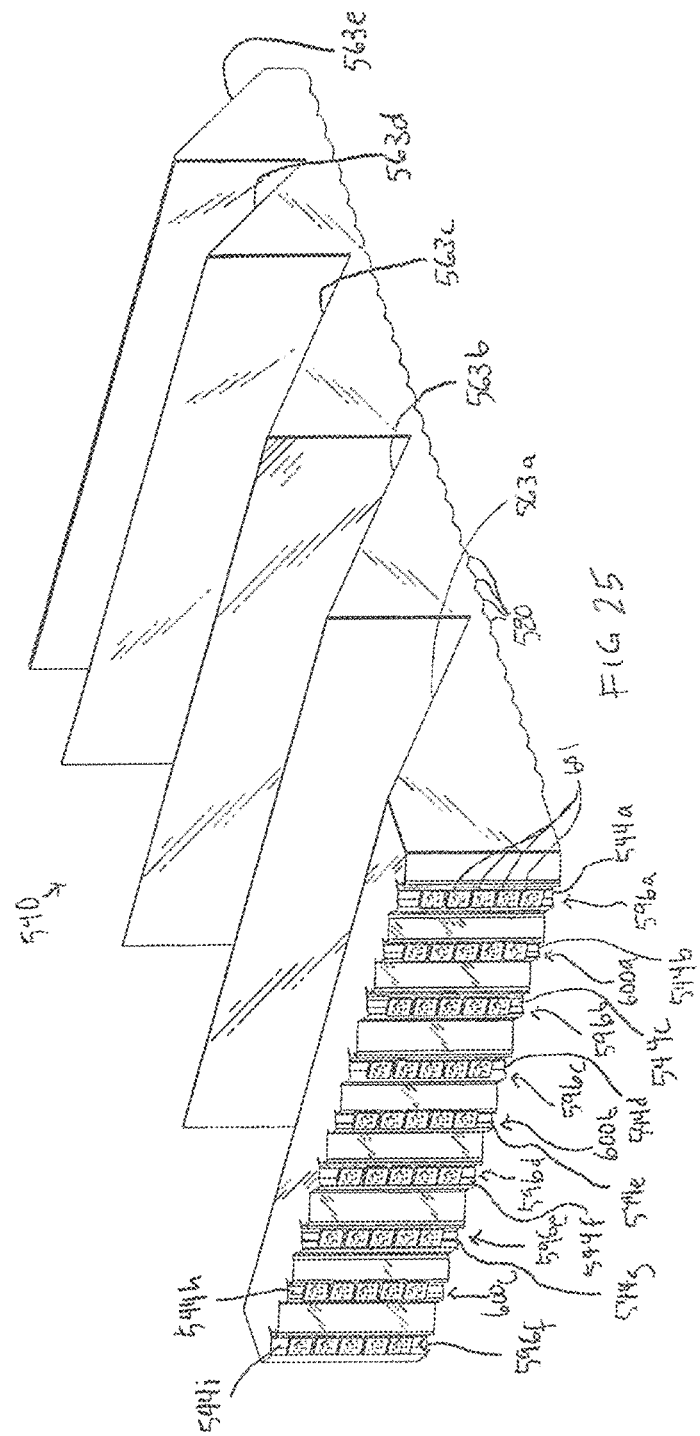
FIG. 25 is an isometric view of the waveguide body of FIG. 20.

As shown in FIG. 25, LED elements 548 are disposed within or adjacent the coupling cavities 544a-544i of the waveguide body 540. Each LED element 548 may be a single white or other color LED, or each may comprise multiple LEDs either mounted separately or together on a single substrate or package to form a module including, for example, at least one phosphor-coated LED either alone or in combination with at least one color LED, such as a green LED, a yellow LED, a red LED, etc. In the embodiment of FIG. 25, individual blue-shifted yellow LEDs and individual red LEDs are disposed in or adjacent the light coupling cavities. In general, at least one blue-shifted yellow LED is disposed in or adjacent each of the two larger coupling cavities of each group of three coupling cavities 550 and at least one red LED is disposed in or adjacent the remaining coupling cavity of each group. In the specific illustrated embodiment, each coupling cavity 544 receives five equally spaced and stacked LEDs each disposed on a carrier 601 such that the LEDs are disposed in rows across a width of the waveguide 540. The waveguide body 540 therefore includes six sets of five stacked blue-shifted yellow LEDs in or adjacent the larger light coupling cavities and three sets of five stacked red LEDs disposed in or adjacent the remaining light coupling cavities. The number and configuration of LEDs 548 may vary depending on the shape of the coupling cavity.

The light developed by the LEDs 548 is directed into groups of light rays by the control surfaces 552, wherein the rays of each group of light rays are directed within a range of angles within the waveguide body. Thus, beam control is accomplished by the coupling cavities. Such light travels through the waveguide body 540 and is redirected downwardly by the extraction features 563 as shown in FIG. 20 and is emitted out the second side of the waveguide body 540. As light is emitted from the second side, the light mixing features 580 promote color mixing in the event that different color LEDs 548 are used and/or promote illuminance uniformity by the waveguide body 540 regardless of whether multi-color or monochromatic LEDs are used. The light mixing features 580 have an elongate linear extent along a lateral direction 559 of the waveguide body 540 and are rounded and convex in cross-sectional shape.

Figure 26:
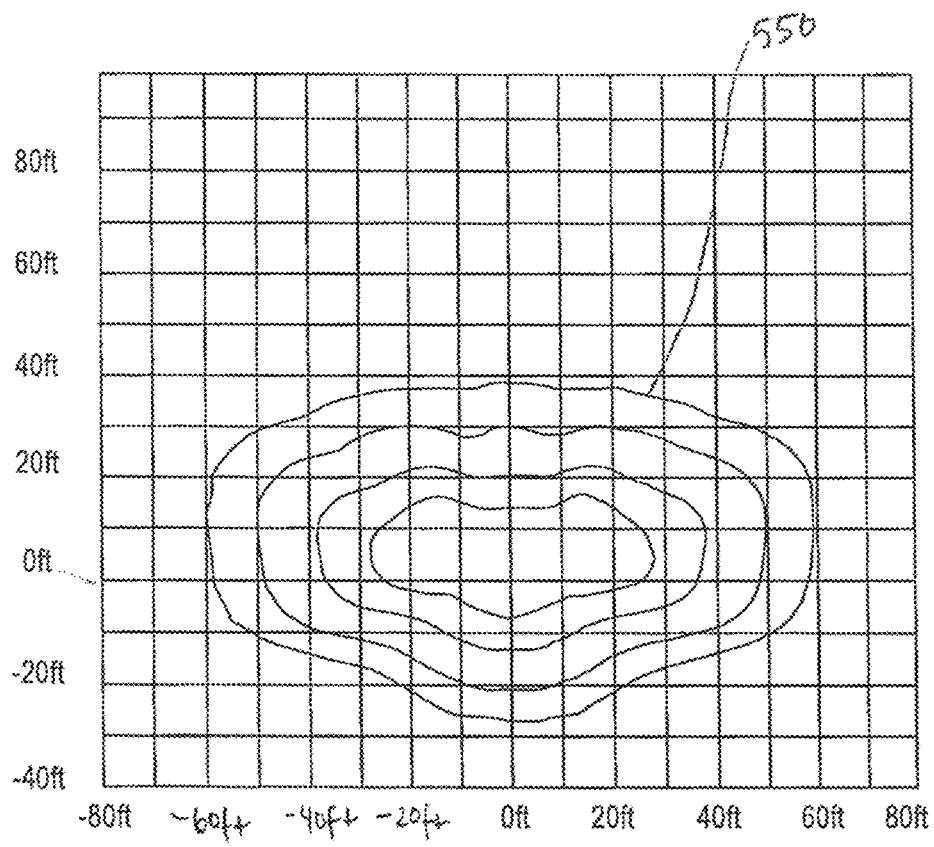
FIG. 26 is a graph of the illumination pattern produced by the waveguide body of FIG. 20.
Figure 27:
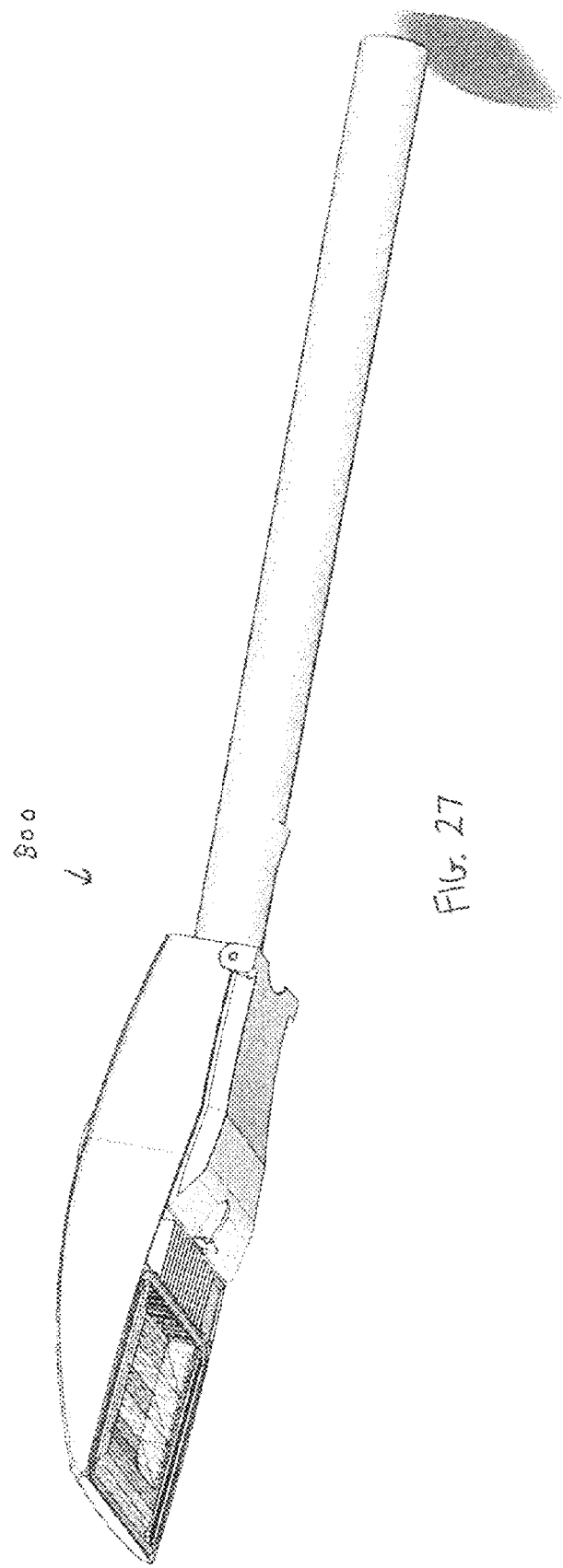
FIG. 27 is an isometric view from below of an embodiment of a luminaire.

The waveguide body 540, like the other embodiments disclosed herein, develops an illumination pattern 550 suitable for the uses described herein as shown in FIG. 26. The waveguide body directs light developed by the LED element(s) toward a desired illumination target surface, such as a roadway, with an illumination pattern. The illumination pattern 250 is preferably, although not necessarily, offset with respect to a center of the waveguide body as described above. The extraction features 563 are configured to develop an asymmetric light distribution having a lateral extent offset from the lateral axis 559 greater than a longitudinal extent aligned with the longitudinal axis 552.

Each LED element 548 receives power from a power supply of suitable type, such as a SEPIC-type power converter 280 and/or other power conversion circuits mounted by suitable fasteners 281 and location pins 282 to an inner surface 283 of the cover member 237 above the reflective enclosure member 239. The power converter 280 and/or other power converter circuits receive power over wires that extend from the terminal block 218 through a wire tube 320 that extends through a wire compartment 321 defined in part by a wiring cover 322. The wiring cover 322 is maintained in place by a screw or other fastener that extends into a threaded boss 324 in the wire compartment 321. The wiring cover 322 is further maintained in place by a shouldered member 328 forming a part of the cover member 237.

Referring to FIG. 18, the heat exchanger 238 includes a base plate 330 that extends transversely relative to a plurality of heat dissipation plates 332. Ends 334a, 334b of the base plate 330 and a printed circuit board (PCB) 335 are captured within inwardly-directed flanges 336, 338 of the shouldered member 328 and a further shouldered member 340 also forming a part of the cover member 237. The heat exchanger 238 is seated against a T-shaped stop member 342. Apertures 344 in the cover member 237 and the fact that the heat exchanger 238 is open at the bottom thereof results in a path for convective air currents through the heat exchanger 238 to ambient surroundings, thereby facilitating cooling.

The PCB 335 is fixedly maintained in position by the base plate 330 of the heat exchanger 238 against an end surface 340 of the reflective enclosure member 239 including side portions 340a, 340b and downwardly extending spaced tab portions 340c-340j. Openings 341a-341i are defined by the side portions and tab portions 340a-340j. The LEDs 248 are mounted on the PCB 350 at locations coincident with the openings 341a-341i. The cavities 244a-244i of the waveguide body 241 are aligned with the openings 341a-341i, respectively, such that the LEDs 248 are adjacent or extend into the cavities 244a-244i.

As in the previous embodiment, and as seen in FIG. 18, the reflective enclosure member 239 is disposed above the waveguide body 240 opposite the substrate 243a. The reflective enclosure member 239 includes a lower surface 310 that is coated or otherwise formed with a white or specular material. Further, one or more of the surfaces of the waveguide body may be coated/covered with a white or specular material. Light that escapes the upper surface 236 of the waveguide body 240 may be thus reflected back into the waveguide body 240 so that light is efficiently extracted out the substrate 243a. The lower surface 310 may have other than a planar shape, such as a curved surface.

As noted above, any of the embodiments disclosed herein can be used in many different applications, for example, a parking lot light, a roadway light, a light that produces a wall washing effect, a light usable in a large structure, such as a warehouse, an arena, a downlight, etc. A luminaire as disclosed herein is particularly adapted to develop high intensity light greater than 1000 lumens, and more particularly greater than 2000-5000 lumens, and can even be configured to develop 35,000 or more lumens by adding LED elements and, possibly, other similar, identical or different waveguide bodies with associated LEDs in a luminaire.

The placement of multiple LED element(s) and the optics of the waveguide bodies overlay the illumination from each LED element onto each other, which further helps color mixing while maintaining a desired photometric distribution. If necessary or desirable, color mixing may be enhanced by using any of the structures or cavities disclosed in co-pending applications U.S. patent application Ser. No. 14/101,086, filed Dec. 9, 2013, entitled "Optical Waveguides and Luminaires Incorporating Same,", U.S. patent application Ser. No. 14/101,132, filed Dec. 9, 2013, entitled "Waveguide Bodies Including Redirection Features and Methods of Producing Same,", U.S. patent application Ser. No. 14/101,147, filed Dec. 9, 2013, entitled "Luminaire Using Waveguide Bodies and Optical Elements", and U.S. patent application Ser. No. 14/101,051, filed Dec. 9, 2013, entitled "Optical Waveguide and Lamp Including Same", owned by the assignee of the present application and filed herewith, the disclosures of which are incorporated by reference herein.

If desired, any of the features disclosed in co-pending U.S. patent application Ser. No. 13/839,949 and/or U.S. patent application Ser. No. 13/840,563, may be used in the luminaire 40 as desired.

Further, any LED chip arrangement and/or orientation as disclosed in U.S. patent application Ser. No. 14/101,147, filed Dec. 9, 2013, entitled "Luminaire Using Waveguide Bodies and Optical Elements", incorporated by reference herein and owned by the assignee of the present application, may be used in the devices disclosed herein. Where two LED elements are used in each light coupling cavity (as in the illustrated embodiments), it may be desired to position the LEDs elements within or adjacent the coupling cavity along a common vertical axis or the LED elements may have different angular orientations, as desired. The orientation, arrangement, and position of the LEDs may be different or identical in each waveguide body section of a waveguide as desired. Still further, each light coupling cavity may be cylindrical or non-cylindrical and may have a substantially flat shape, a segmented shape, an inclined shape to direct light out a particular side of the waveguide body, etc.

Figure 28:
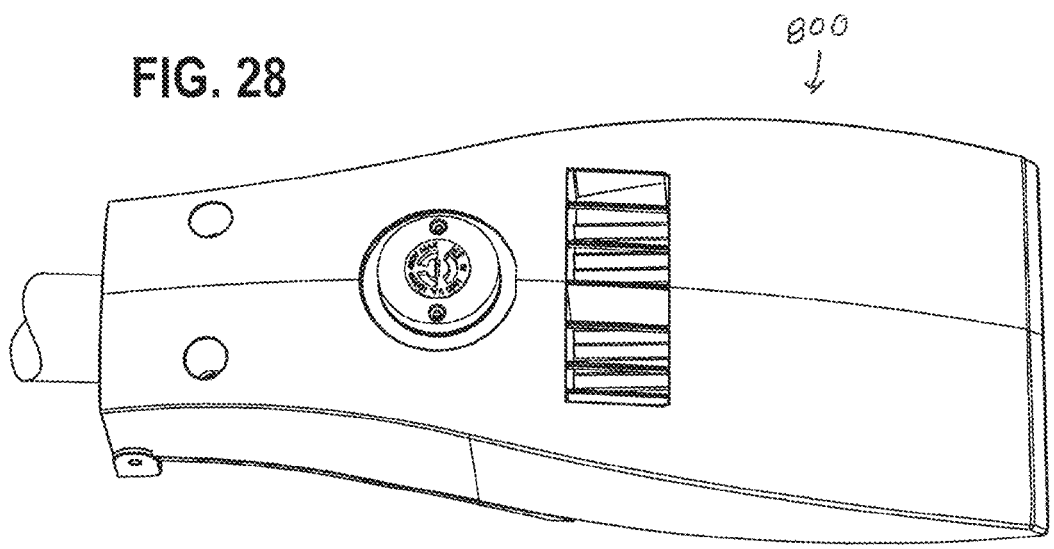
FIG. 28 is an isometric view from above of another embodiment of a luminaire.
Figure 29:
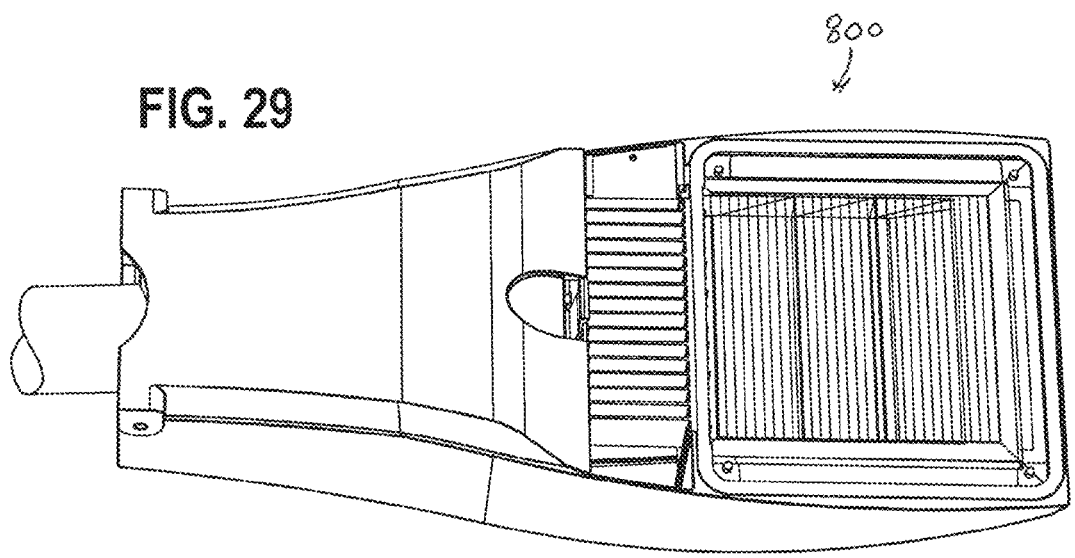
FIG. 29 is an isometric view from below of the luminaire of FIG. 28.
Figure 30:
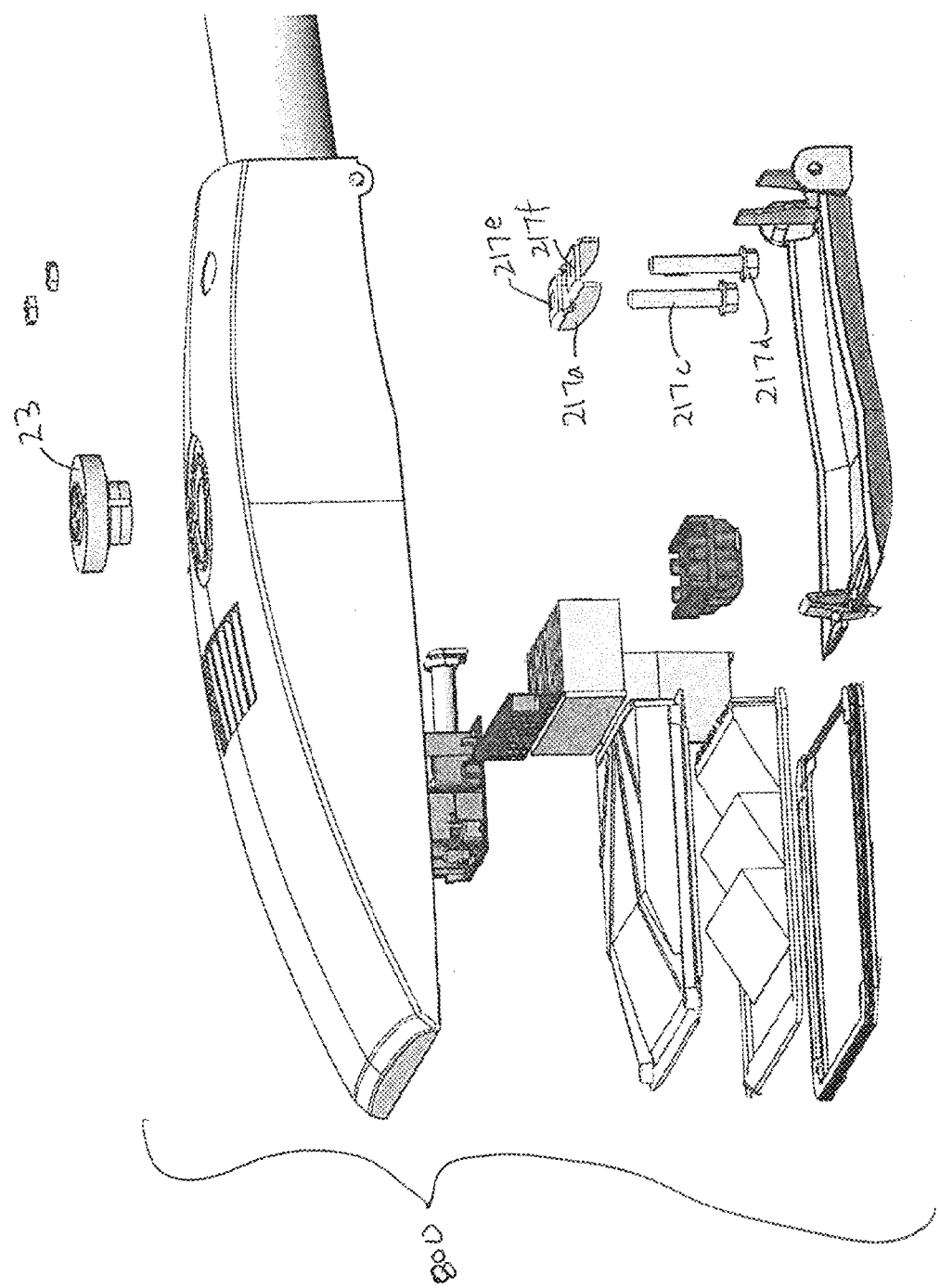
FIG. 30 is an exploded isometric view of the luminaire of FIG. 27.
Figure 31:
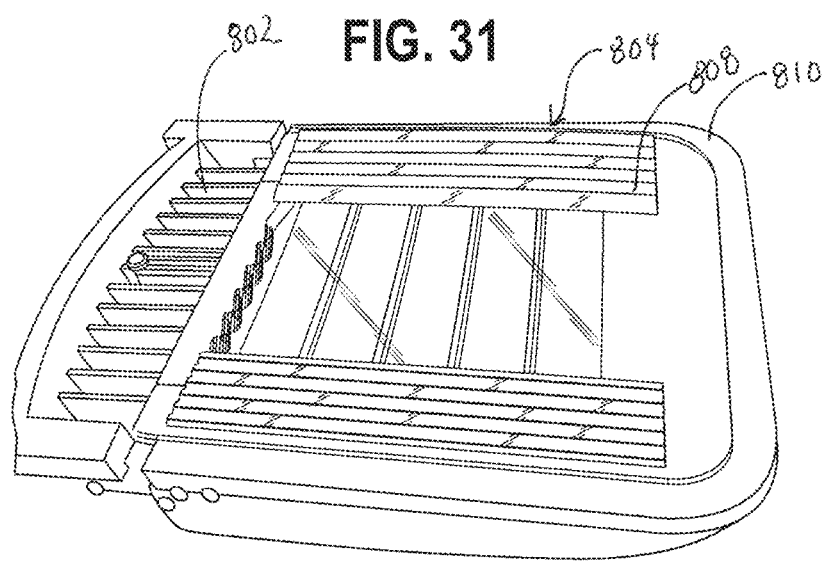
FIG. 31 is a fragmentary bottom perspective view of a portion of the luminaire of FIG. 28.
Figure 32:
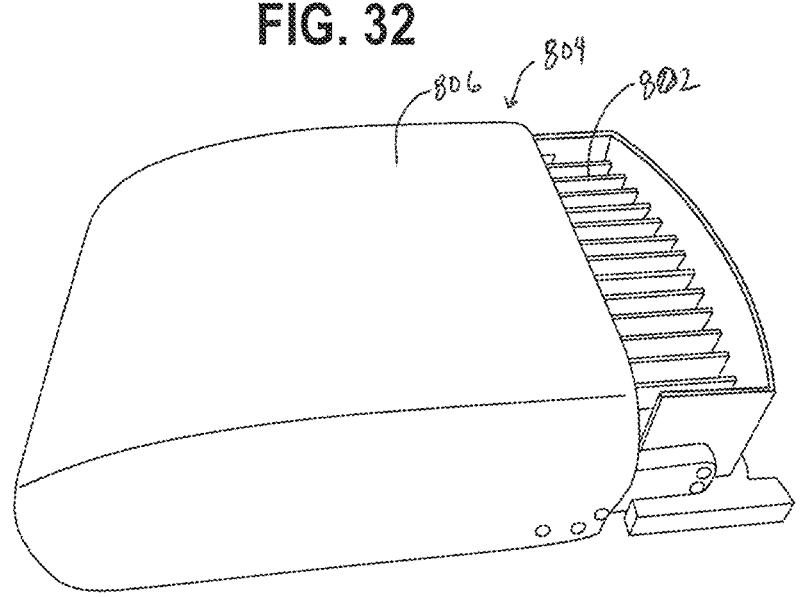
FIG. 32 is a fragmentary top perspective view of a portion of the luminaire of FIG. 28.
Figure 33:
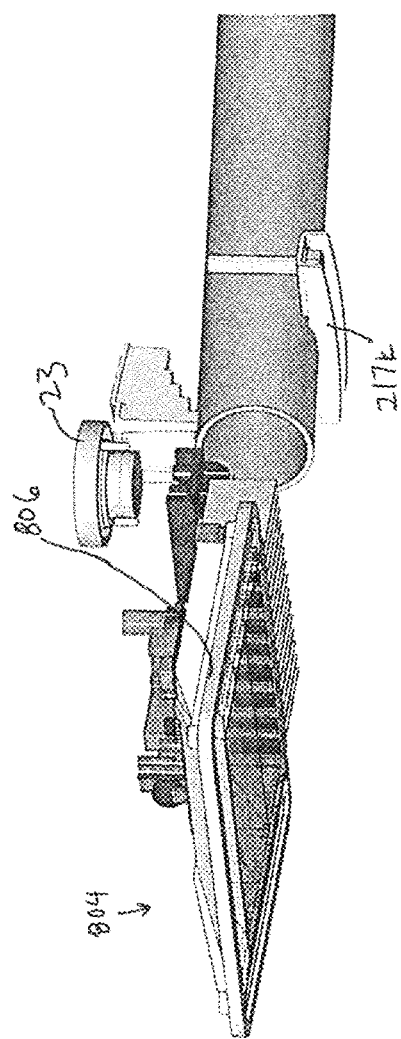
FIG. 33 is a fragmentary exploded isometric view of a portion of the embodiment of FIG. 30.
Figure 34:
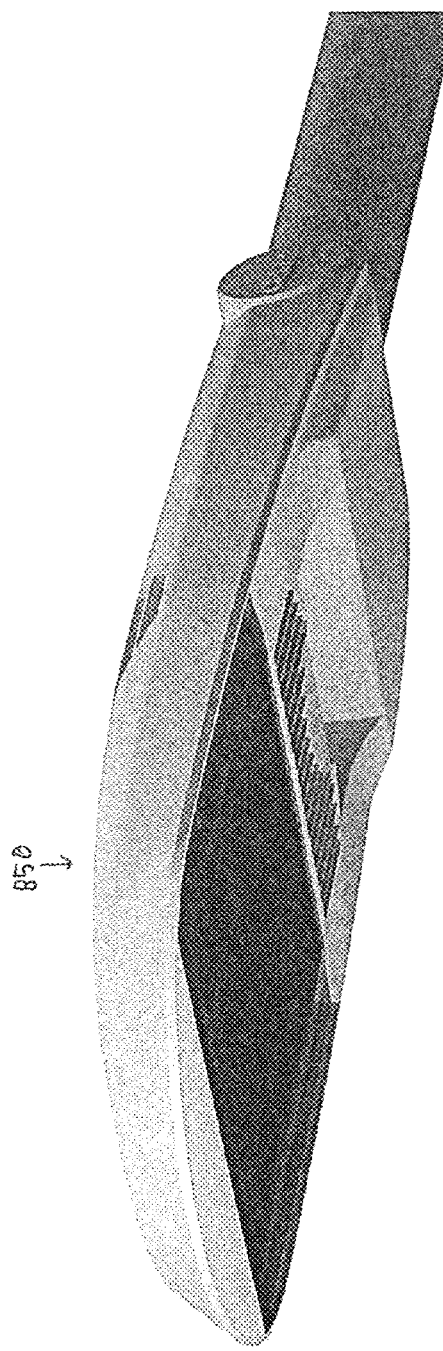
FIG. 34 is an isometric view from below of another embodiment of a luminaire.
Figure 35:
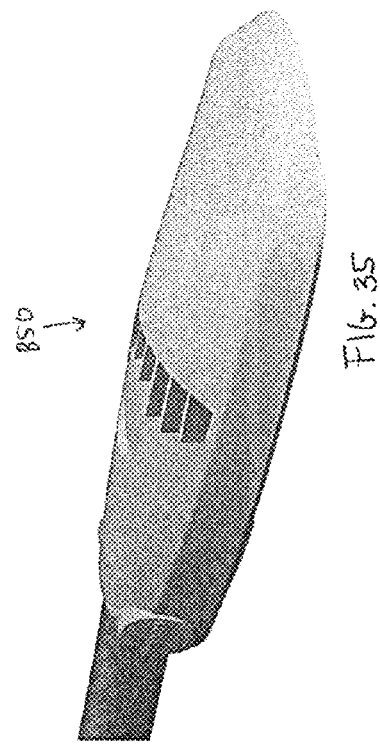
FIG. 35 is an isometric view from above of the luminaire of FIG. 34.
Figure 42:
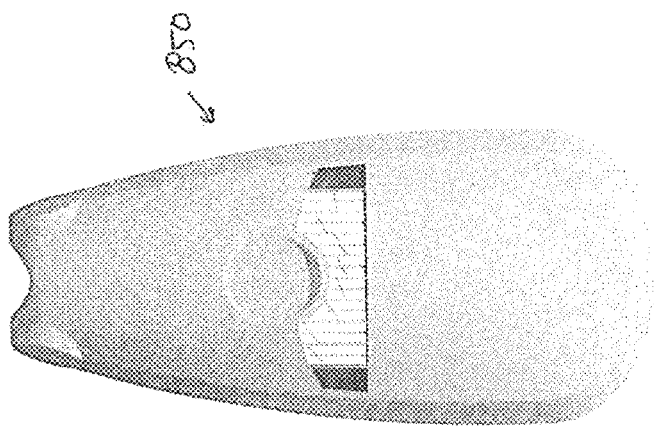
FIGS. 41 and 42 are plan views of embodiments of FIG. 38.
Figure 41:
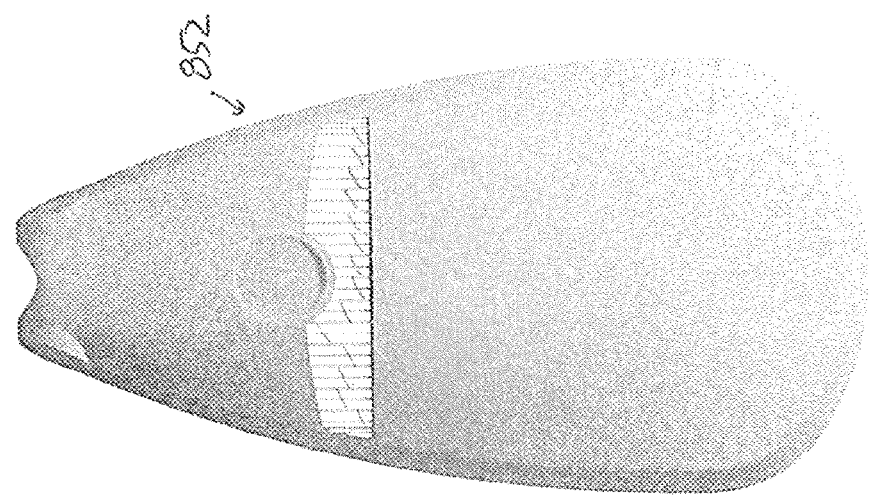
Figure 40:
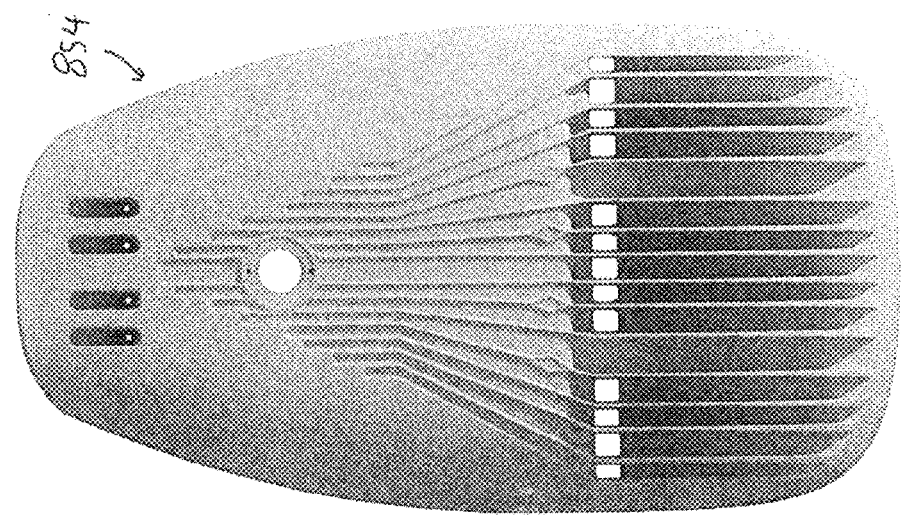
FIG. 40 is a plan view of yet another embodiment of a luminaire.
Figure 47:
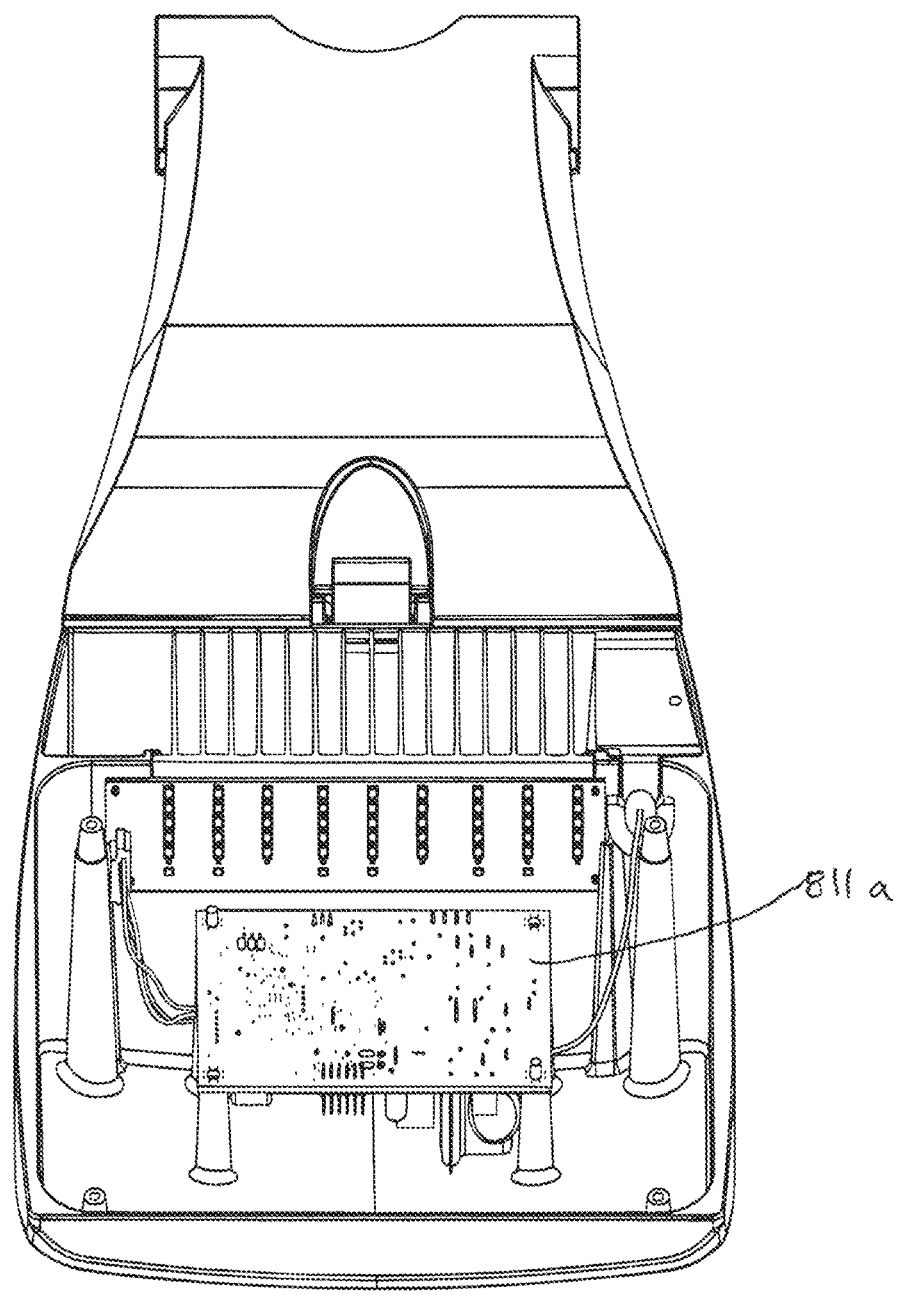
Figure 48:
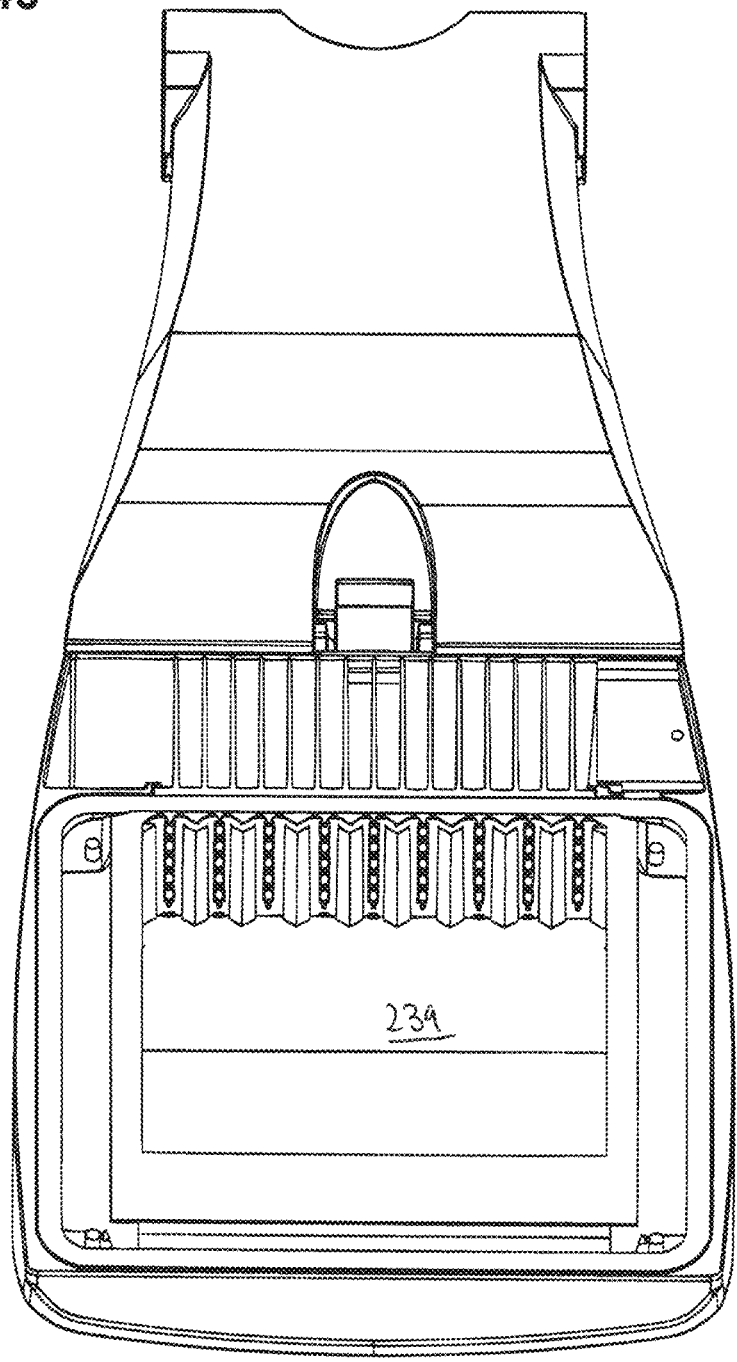
Figure 49:
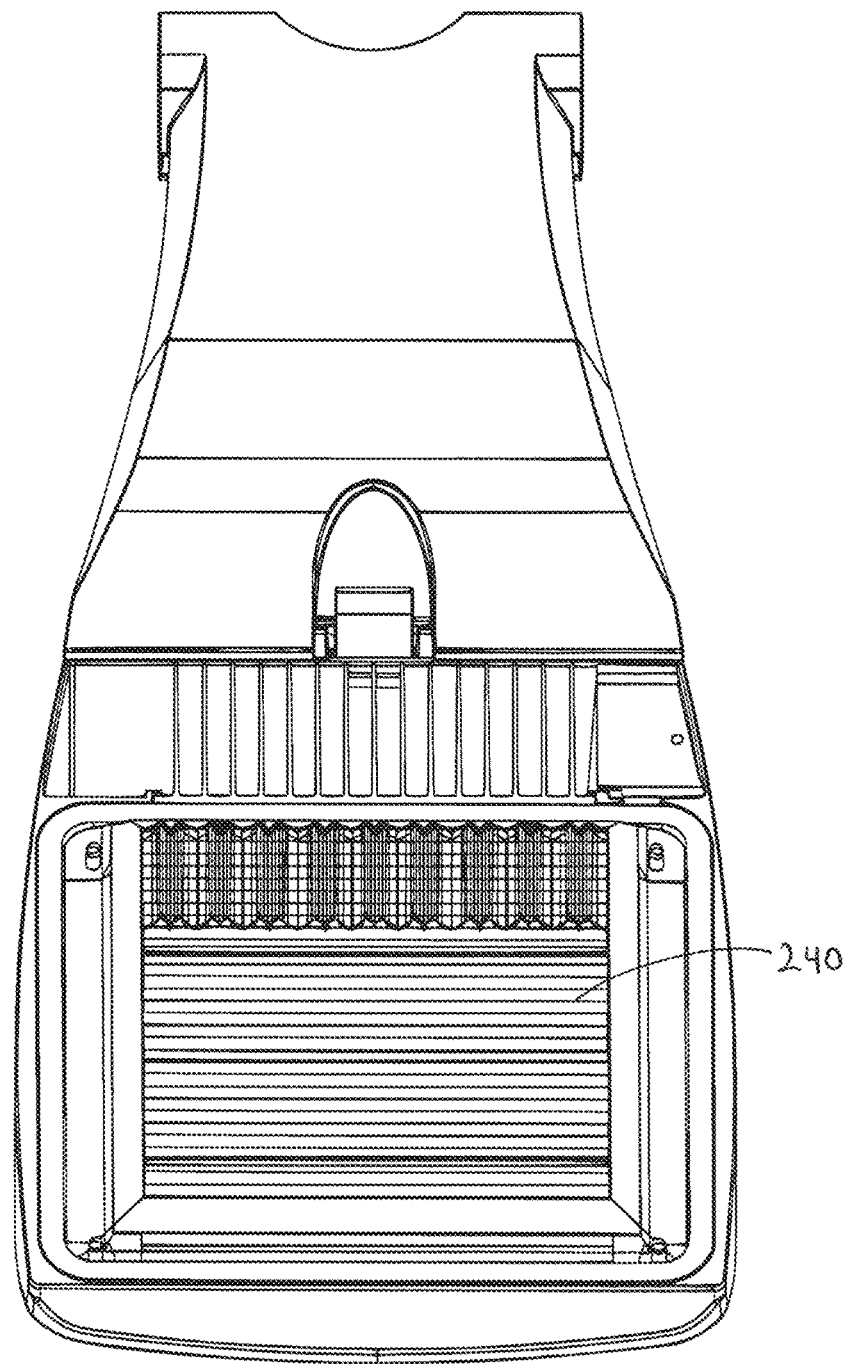
Figure 50:
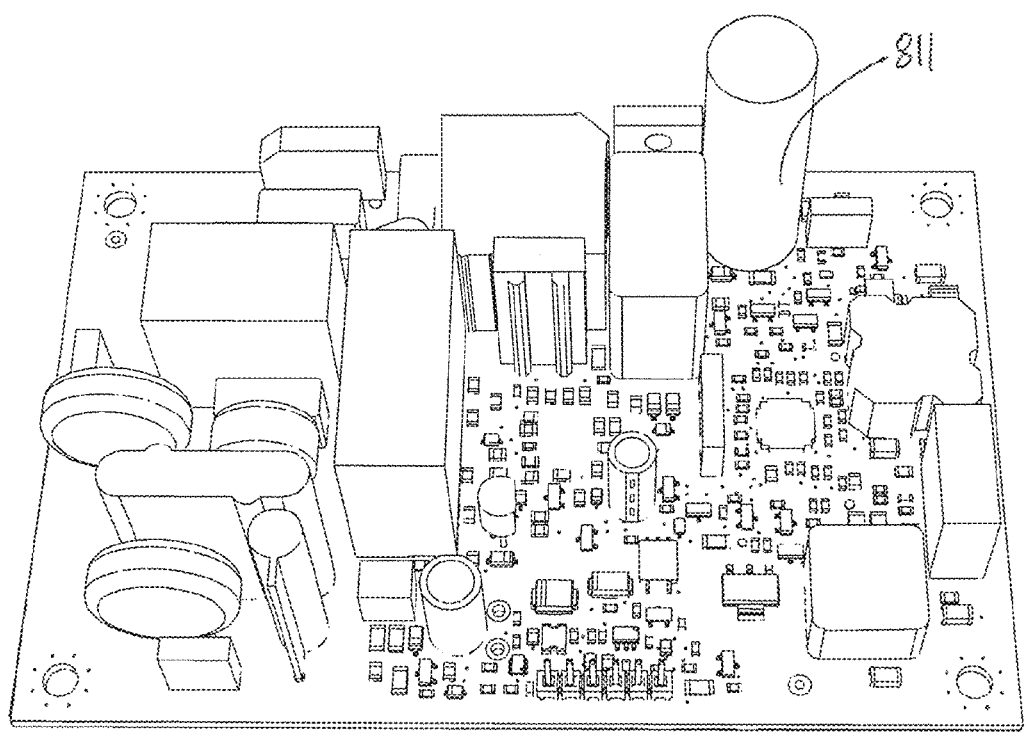

The remaining FIGS. illustrate other embodiments. For example, FIGS. 28-30 illustrate a further embodiment of a luminaire 800. FIGS. 31 and 32 illustrate a heat sink 802 disposed adjacent an optic assembly 804. The optic assembly 804 includes a reflector element 806, a waveguide 808, and a surround member 810. Referring to FIG. 33, electrical components are disposed adjacent the reflector element 806 of the optic assembly 804. The electrical components 811 are further illustrated in FIGS. 44-46 and 50. FIGS. 47-49 illustrate the assembly of a driver 811a, the reflector element 239, and a waveguide 240 having a gasket 241 disposed thereon, respectively, of the luminaire 800. FIGS. 34-39 and 42 illustrate an additional embodiment of a luminaire 850. FIGS. 38, 39, and 41 also illustrate another embodiment of a luminaire 852, and FIG. 41 illustrates a still further embodiment of a luminaire 854.

Figure 51:
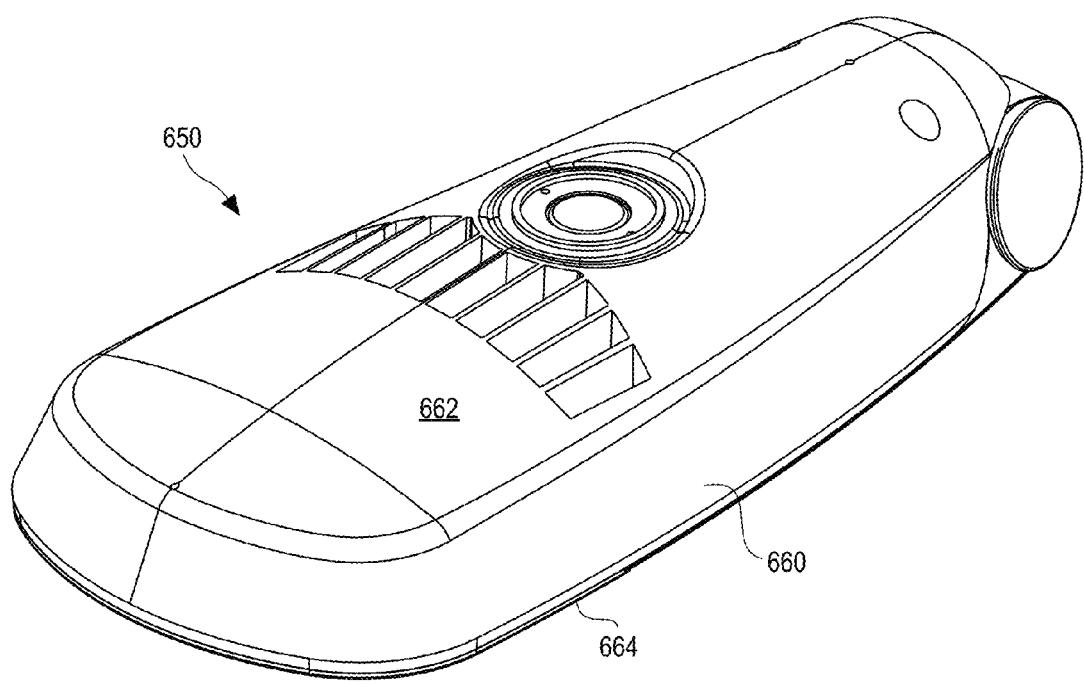
FIGS. 51 and 52 are front and rear top isometric views, respectively, of yet another embodiment.
Figure 52:
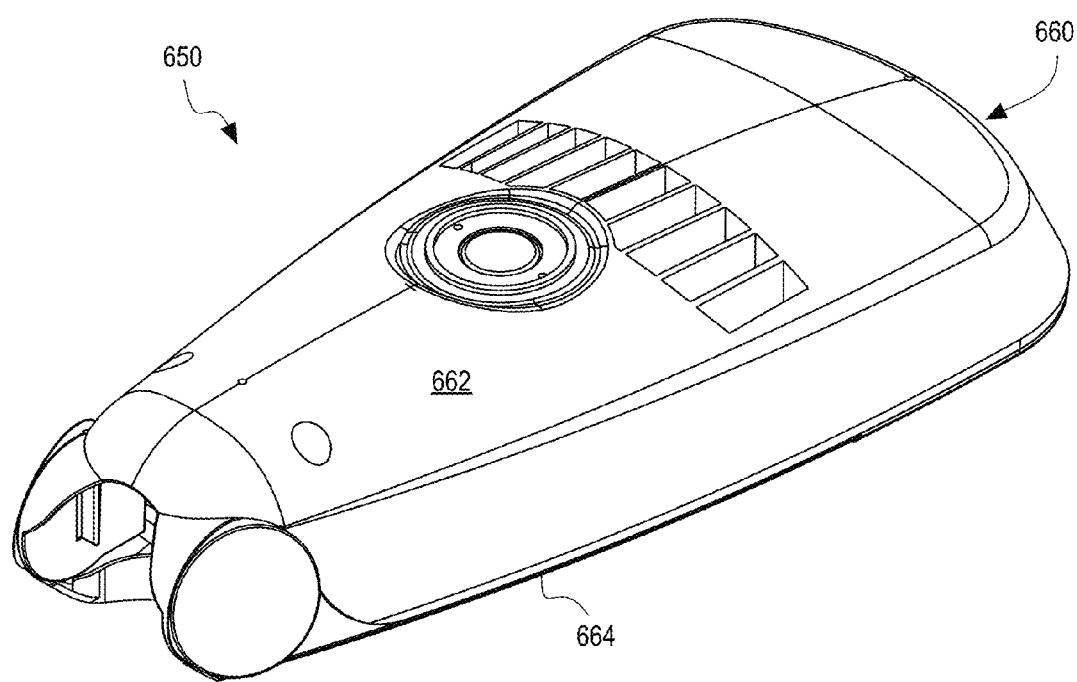
Figure 53:
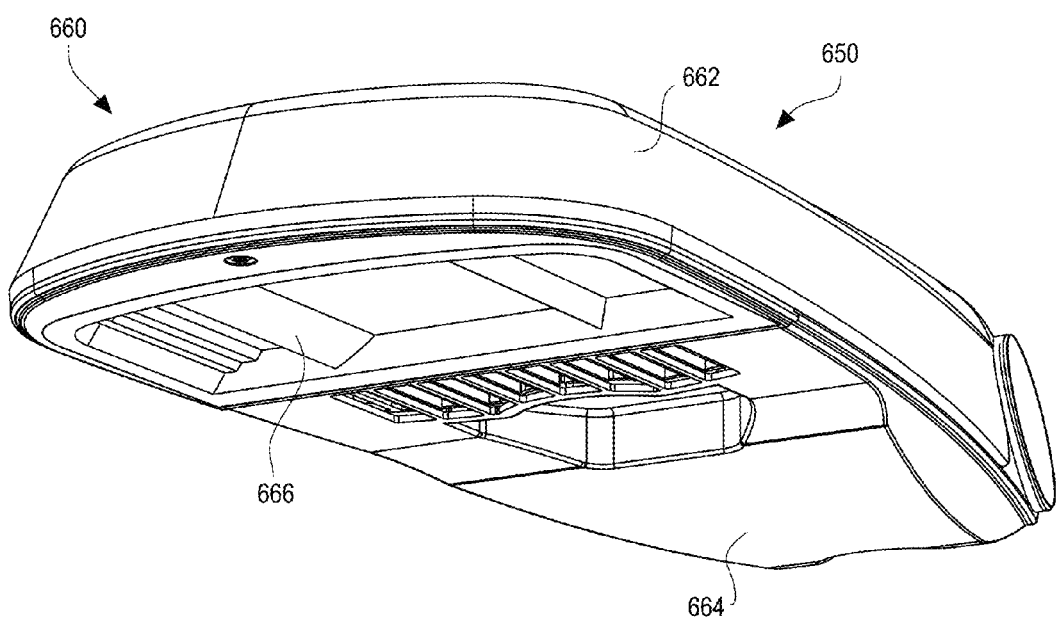
FIG. 53 is a bottom front isometric view of the embodiment of FIGS. 51 and 52.
Figure 54:
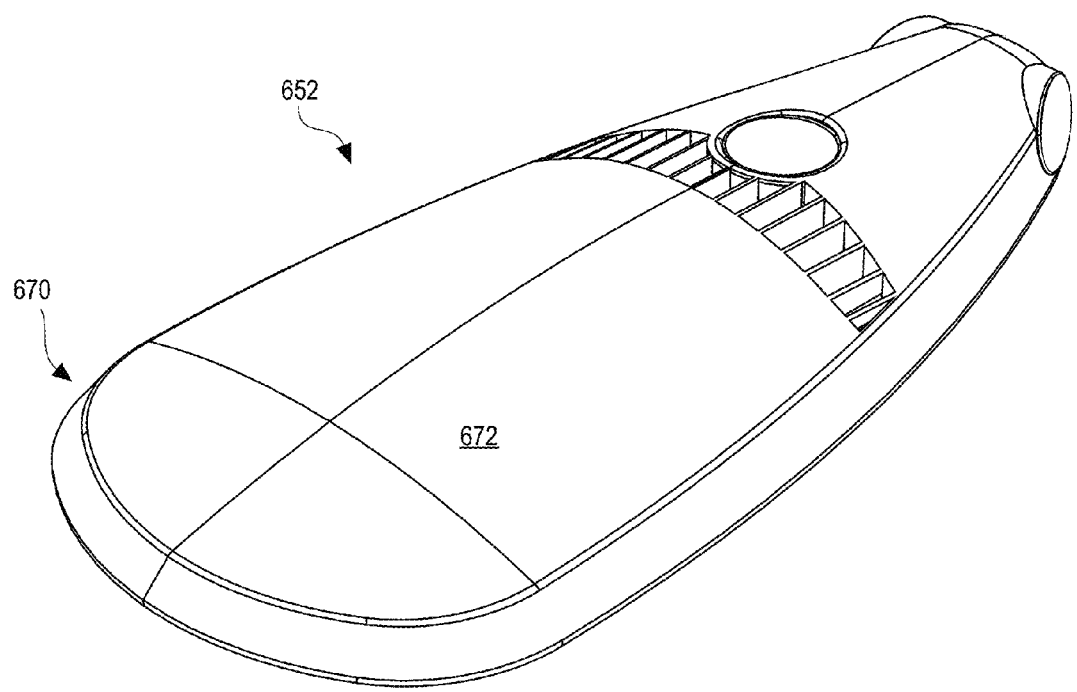
FIGS. 54 and 55 are front and rear top isometric views respectively, of a further embodiment similar to but larger than the embodiment of FIGS. 51-53.
Figure 55:
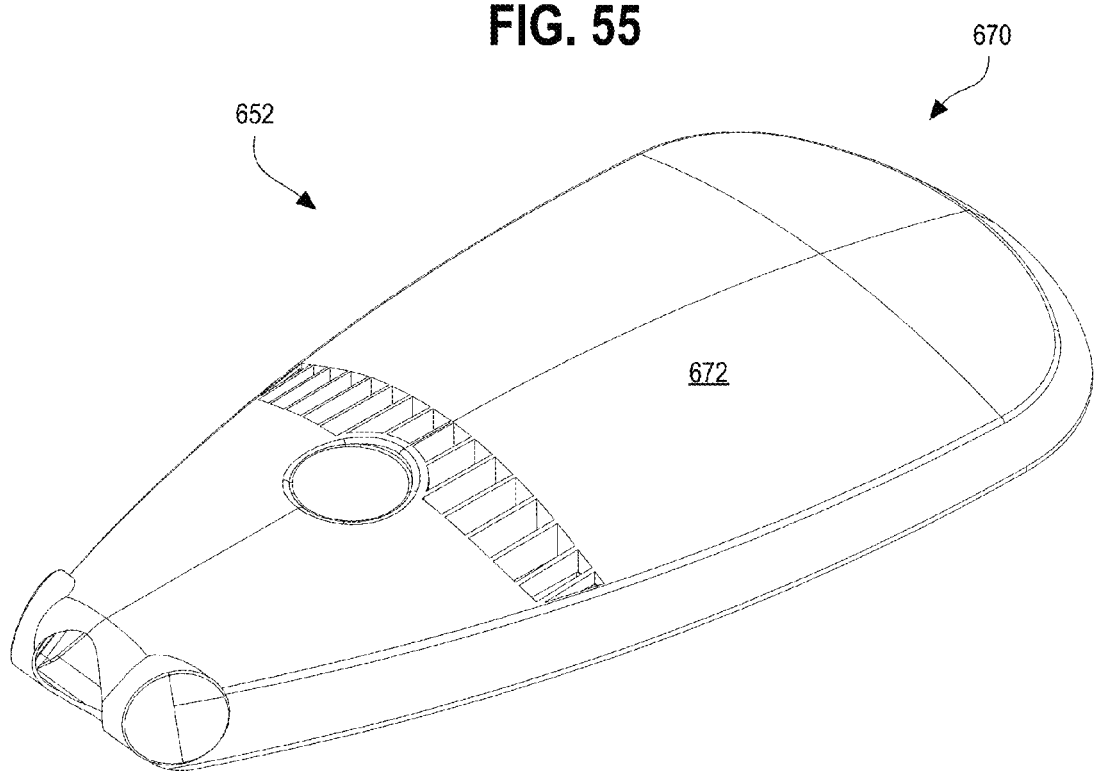

FIGS. 51-53 illustrate an embodiment that comprises a relatively small luminaire 650 and FIGS. 54 and 55 show an embodiment that comprises a relatively large luminaire 652 that is otherwise similar in appearance to the small luminaire 650 of FIGS. 51-53. Similarly, FIGS. 81-91 illustrate an alternative embodiment of a luminaire 950 having a relative small size, and FIGS. 92-100 illustrate an alternative embodiment of a luminaire 952 having a relatively large size. The luminaires 650, 652, 900, 952 are adapted to be adjustably mounted on a pole or stanchion in a fashion similar or identical to the previous embodiments, and are usable as roadway, parking lot, or as any other indoor or outdoor luminaire luminaires.

Referring specifically to FIGS. 51-53 and FIGS. 81-91, the luminaire 650, 950 includes a head portion 660, 960 including an upper cover member 662, 962, a lower door 664, 964 secured in any suitable fashion to the upper cover member 662, 962, and an optic assembly 666, 966 retained in the upper cover member 662, 962.

Referring next to FIGS. 54 and 55, the luminaire 652, 952 includes a head portion 670, 970 including an upper cover member 672, 972, a lower door, and optic assembly (the latter two are not shown, but such elements are similar or identical to the elements 664, 666 and 964, 966, except as to size) that are secured/retained in any suitable fashion to the upper cover member 672, 972.

Referring next to FIGS. 56 and 82, the inner components of the embodiments 650, 652 and 950, 952 are identical, except as to the size of the optic assembly, and hence, only the inner components of the embodiment 650, 950 are described in detail herein. The optic assembly 666, 966 includes an optical waveguide body 680, 980 made of the materials specified hereinabove or any other suitable materials, a surround member 681, 981, and a reflective enclosure member 682, 982 similar to the element 39 described above. A circuit compartment 684, 984 with a cover 686, 986 is disposed atop the reflective enclosure member 682, 982, and a power supply 688, 988 disposed in the circuit compartment 684, 984 and that may be similar or identical to the SEPIC-type power converter 280 and/or other power conversion circuits described above. LED elements 690, 990 similar or identical to the LED elements 348, 548 are disposed on a printed circuit board (PCB) 692, 992 and extend into coupling cavities or features 694 (FIGS. 69-77), 994 (FIGS. 89-91) of the waveguide 680, 980, 980a, 980b, as in previous embodiments. A heat sink 696, 996 is disposed behind the PCB 692, 992 to dissipate heat through vents that extend through the luminaire 650, 950 and terminate at upper and lower openings 400, 402. In addition, a terminal block 697, 997 is mounted adjacent the heat sink 696, 996 and permits electrical interconnection between the power supply 688, 988 and electrical supply conductors (not shown).

The lower door 664, 964 includes stub shafts 404 (only one of which is visible in FIGS. 59 and 82, respectively) which are disposed in bores 406 in the upper cover member 662 (FIGS. 56, 58, and 59), 962 (FIG. 82) to allow the lower door 664, 964 to pivot. The door 664, 964 further includes latch members 408 that, during assembly, engage and interfere with shouldered members 410 (see FIG. 60) to maintain the door 664, 964 in a closed position as seen in FIGS. 60 and 83, respectively.

FIGS. 64-68, 80, 87-90, 94, and 95 illustrate the optic assembly 666, 966, 1166 in greater detail. A process for fabricating the assembly 666, 966, 1166 includes the steps of molding the waveguide body 680, 980, 983 placing the reflective enclosure member 682, 982, 1182 onto the waveguide body 680, 980, 983, and overmolding the surround member 681, 981, 1181 onto the waveguide body 680, 980, 983 and/or the reflective member to maintain the reflective enclosure member, the waveguide body, and the surround member together in a unitary or integral fashion. The optic assembly 966 further includes an upper cover 982a having curved and/or tapered side surfaces to interfit with the housing 962. In each luminaire 650, 950, 1150, the reflective enclosure members 682, 982, 1182 has a size and shape (including tapered or curved side surfaces) to closely receive the respective waveguide body 680, 980, 983 in a nesting fashion, as illustrated in FIG. 87. The unitary aspect of the optic assembly provides a seal around the waveguide body.

Figure 61:
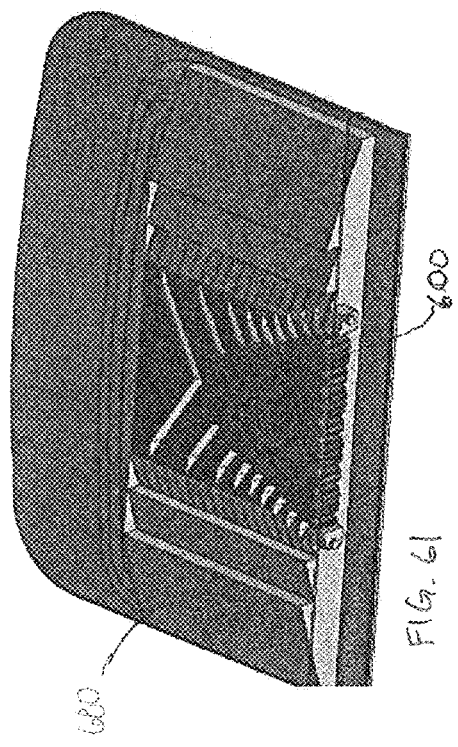
FIGS. 61-63 are isometric views illustrating optical waveguide bodies that may be used in the embodiments of FIGS. 51-55 to achieve different illumination distributions wherein the waveguide bodies are identical except for the shape of a central portion 600 and, possibly, the overall sizes of the waveguides depending upon whether the waveguide body is used in the embodiment of FIGS. 51-53 or the embodiment of FIGS. 54 and 55.
Figure 63:
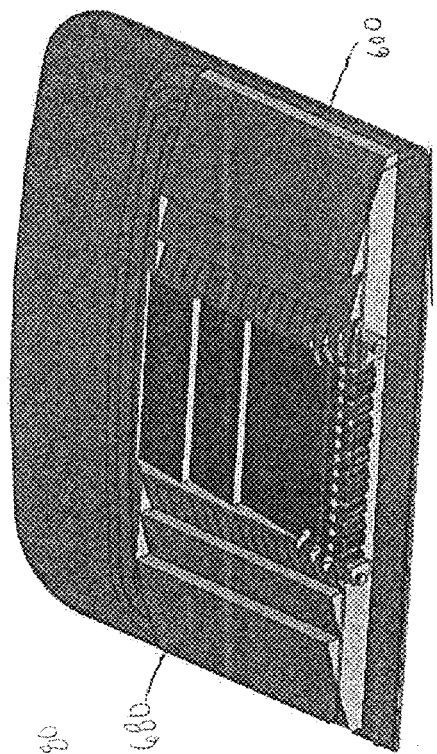
Figure 62:
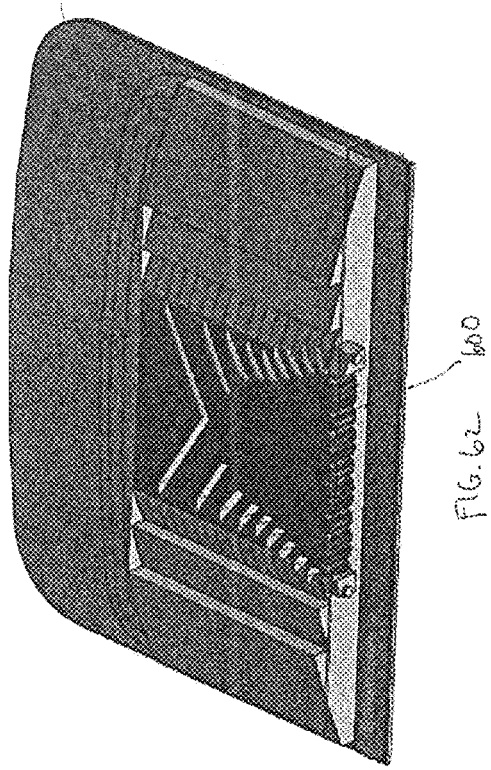

Any of the waveguide bodies disclosed herein may be used in the embodiments of FIGS. 51-55, 81-87, and 92 and 93, including the waveguide bodies of FIGS. 61-77, 90, 91, and 96-99. For example, the luminaires 650, 652, 950, 952 may incorporate waveguide bodies 680 of FIGS. 61-63 to achieve appropriate illumination distributions for desired output light illumination levels. The waveguide bodies of FIGS. 61-63 may be fabricated by a molding process that utilizes a tooling recess common to production of all three waveguide bodies, and using a particular bottom insert in the tooling cavity unique to each of the three waveguide bodies. The insert allows for a central section of each waveguide body 680, 980, 980a to have different extraction features and/or redirection features while a bottom surface 699 and an outboard portion 719 of an upper surface 720 are common to the waveguides 680, 980, 980a. For example, referring to FIG. 90, the dashed line 721 outlines the central section of the waveguide body 980 formed using a particular bottom insert in the tooling cavity. Similarly, a central section of each waveguide body 983, 983a, 983b may have different extraction features and/or redirection features while a bottom surface 1064 and an outboard portion 1066 of an upper surface 1068 are common to the waveguide bodies 983, 983a, 983b. The different central sections of the waveguides allow for different illumination distribution patterns to be produced by the waveguide bodies. The varied illumination distribution patterns may be described in accordance with the American Institute of Architects lighting standards that are commonly known in the art. The boundary of the illumination pattern on the illuminated surface is defined by the threshold of minimum acceptable lighting conditions, which depend on the roadway requirements, such as a highway luminaire or parking lot luminaire. For example, the waveguide bodies 680, 983, 1200, 1250 may provide an illumination pattern having a relatively shallow reach, for example, about one times the mounting height of the luminaire, in a y-direction extending away from the luminaire and a long range distribution, for example, about seven times the mounting height of the luminaire, in an x-direction extending to either side of the luminaire transverse to the y-direction. The spacing of the luminaires would therefore be about one times the mounting height along the y-direction and about seven times the mounting height along the x-direction. The waveguide bodies 980, 983a, 1300 may provide an illumination pattern having a shallow reach, for example, about two times the mounting height of the luminaire, in the y-direction and a medium range distribution, for example, about six times the mounting height of the luminaire, in the x-direction, such that the spacing of adjacent luminaires may be about two times the mounting height along the y-direction and about six times the mounting height along the x-direction. Finally, the waveguide bodies 980a, 983b, 1350 may produce an illumination pattern having a mid-range reach, for example, about three times the mounting height of the luminaire, in the y-direction while having a medium range distribution, for example, about 4.7 times the mounting height of the luminaire, in the x-direction, for a spacing of adjacent luminaires of about three times the mounting height along the y-direction and about 4.7 times the mounting height along the x-direction. The illumination patterns may be different from the descriptions above depending on the number, spacing, colors, and orientation of the LEDs relative to the respective waveguide.

Further, the waveguide bodies 680, 980, 980a may have a length along the y-direction ranging from about 75 mm to about 250 mm, preferably from about 125 mm to about 175 mm, a width along the x-direction ranging from about 150 mm to about 300 mm, preferably from about 200 mm to about 250 mm, and a height ranging from about 5 mm to about 50 mm, preferably from about 15 mm to about 35 mm. The waveguide bodies 680, 980, 980a may be used in a luminaire having a lumen output ranging from about 2,000 lumens to about 12,000 lumens, and, more preferably, in luminaires having a lumen output between about 3,000 lumens to about 8,000 lumens. The waveguide bodies 983, 983a, 983b may have a length ranging from about 75 mm to about 300 mm, preferably from about 125 mm to about 200 mm, a width ranging from about 350 mm to about 500 mm, preferably from about 400 mm to about 450 mm, and a height ranging from about 10 mm to about 50 mm, preferably from about 20 mm to about 40 mm and may be used in a luminaire having a lumen output ranging from about 10,000 lumens to about 30,000 lumens and, more preferably, in luminaires having a lumen output between about 13,000 lumens and about 23,000 lumens.

Figure 69:
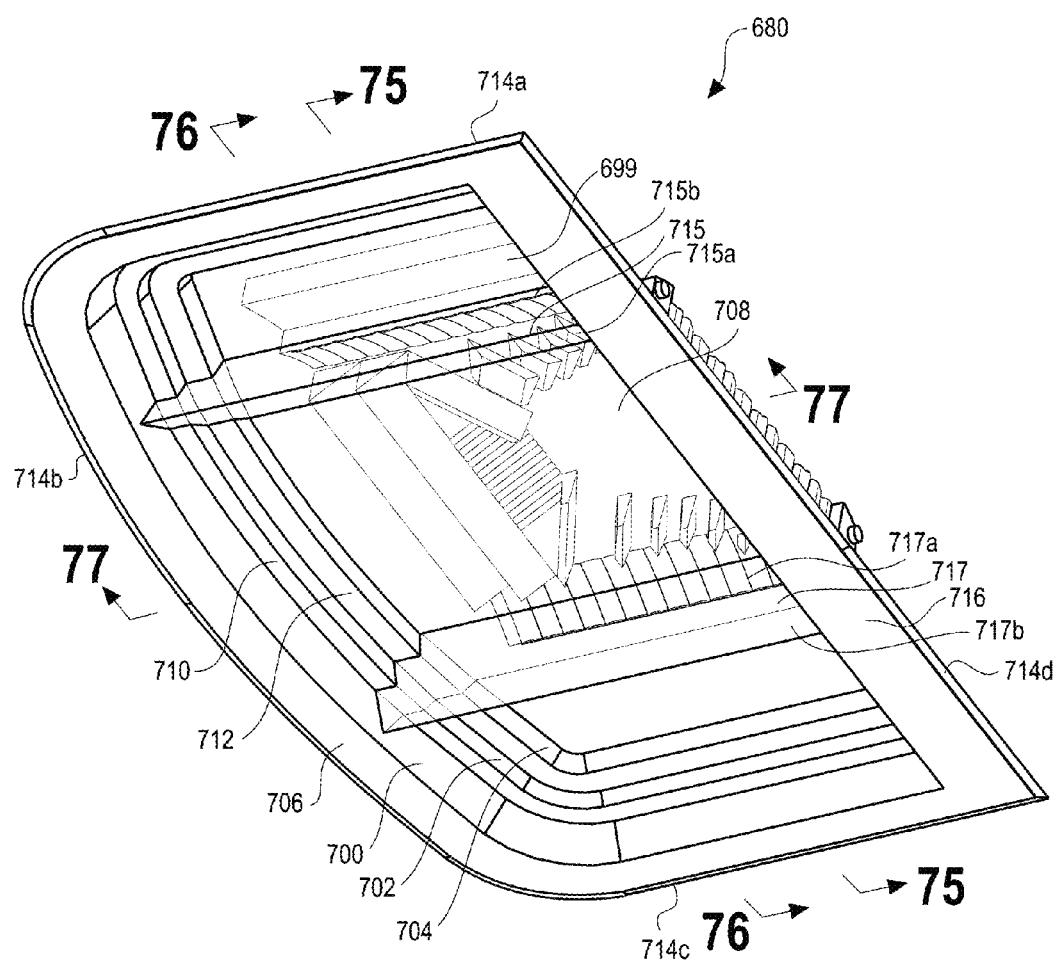
FIG. 69 is a bottom isometric view of another waveguide body that may be used in either the embodiment of FIGS. 51-53 or the embodiment of FIGS. 54 and 55.
Figure 70:
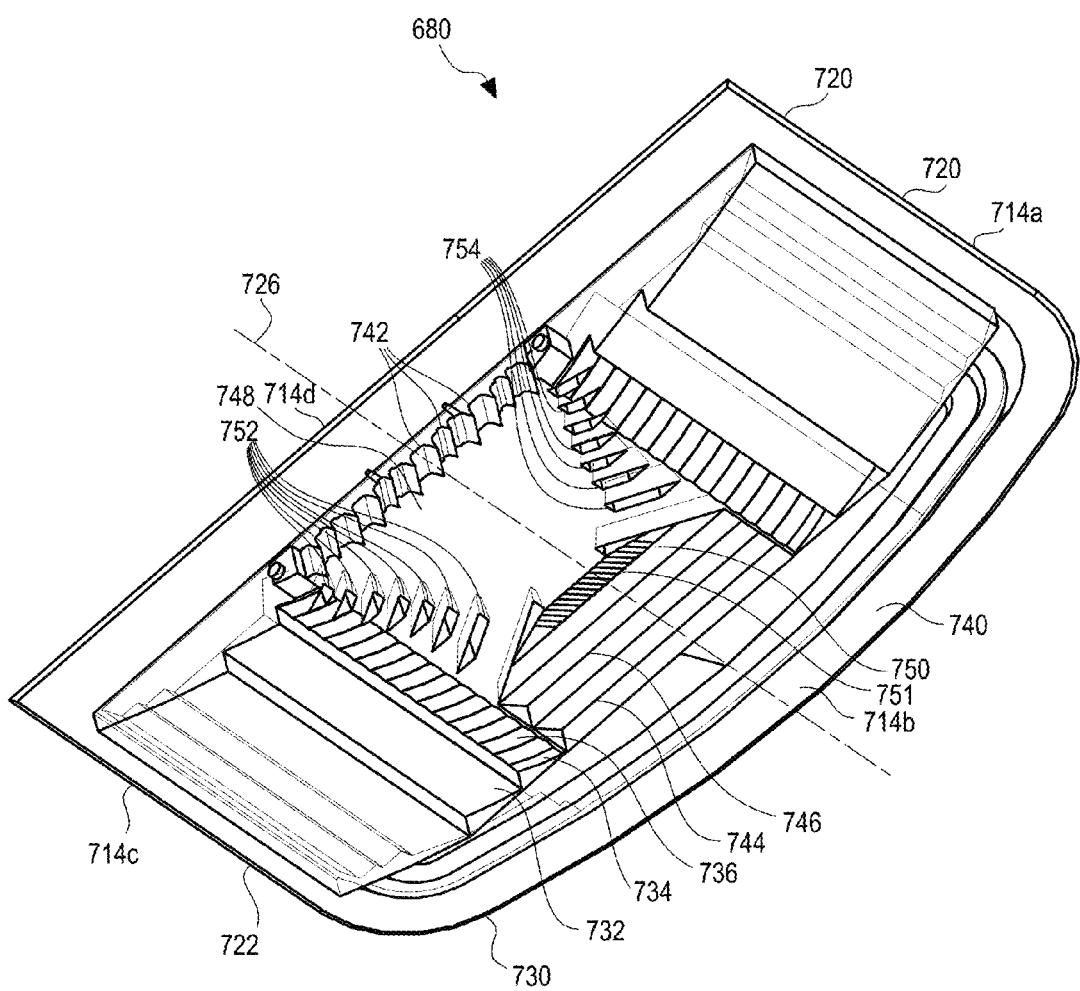
FIGS. 70-74 are top isometric, plan, front elevational, side elevational, and rear elevational views, respectively, of the waveguide body of FIG. 69.

FIG. 69 illustrates a bottom surface 699 common to the waveguide bodies 680, 980, 980a of FIGS. 61-77, 90, and 91. The bottom surface 699 is tray-shaped and includes tapered side surfaces 700, 702, 704 disposed between an outer planar surface 706 and an inner planar base surface 708. Referring also to FIGS. 75-75C, 76-76C, and 77-77C, the tapered side surfaces 700, 702, 704 are spaced from one another by intermediate planar surfaces 710, 712. The surfaces 700, 702, 704, 710, 712 circumscribe three sides 714a-714c of the waveguide body 680. A planar transverse side surface 716 (FIG. 77) bounds a fourth side 714d of the waveguide body 680 and extends between the surfaces 706 and 708. First and second light extraction ribs 715, 717 protrude away from the base surface 708 and extend between the transverse surface 716 and portions of the surfaces 700, 702, 704, 710, 712 opposite the transverse surface 716. Each rib 715, 717 comprising a tapered inner surface 715a, 717a, and an outer surface 715b, 717b extracts light out of the waveguide body 680.

The outboard portion 719 of the upper surface 720 of the waveguide body 680 (FIGS. 61-77) generally includes first and second opposed side sections 722, 724 adjacent the sides 714a, 714c, respectively. A central section 725 is disposed between the sides 714b and 714d intermediate the side sections 722, 724. The side sections 722, 724 are preferably mirror images of one another (i.e., symmetric about a center line 726), and hence, only the side section 722 will be described in detail. The side section 722 includes first, second, and third wedge-shaped members 730, 732, and 734. Each light extraction wedge-shaped member described herein may be linear in overall side-to-side extent or shape, and/or may have a linear, piece-wise linear, and/or curved shape in cross-section. The innermost wedge-shaped member 734 includes an outwardly-facing surface 736. The surface 736 may have light mixing features such as a scalloped and/or textured surface, as shown. The light mixing features to mix light from different light sources. The waveguide bodies 980 and 980a shown in FIGS. 90 and 91, respectively, have an outboard portion 1019 of an upper surface 1020 similar to the outboard portion 719 of the upper surface 720 of the waveguide body 680.

Referring to FIGS. 61-63 and 69-77, the central section 725 of the waveguide body 680 extends between a tapered end portion 740 adjacent the side 714b and coupling cavities or features 742 that receive the light developed by the LED elements 690. The central section 725 includes a pair of recessed wedge-shaped members 744, 746 transverse to the wedge-shaped members 730, 732, 734 (and the corresponding wedge-shaped members of the side section 724) and a rectangular planar surface 748 that extends from the coupling cavities 742 to a tapered transition surface 750 adjacent the wedge-shaped member 746. The tapered transition surface 750 includes a scalloped surface 751. Redirection features comprising two pluralities of cavities 752, 754 extend into the rectangular planar surface 748 and are symmetric about the center line 726. Each cavity 752, 754 is generally prismatic in shape and the shapes and positions vary with distance from the coupling cavities 742. Each cavity 752, 754 having a length thereof is disposed at an angle relative to a lateral extent of the coupling cavities 742. The angle may range between about 5 degrees and about 85 degrees, preferably between about 15 degrees and about 45 degrees, and most preferably between about 25 degrees and about 35 degrees. Four side surfaces of each cavity 752, 754 taper together toward the bottom surface 699 of the waveguide body 680. In the illustrated embodiment as well as other embodiments described herein, the waveguide body includes a plurality of redirection features and a plurality of extraction features, wherein the redirection features are relatively smaller than the extraction features. In some such embodiments, at least one redirection feature has a linear extent in a first direction and at least one extraction feature has a linear extent in a second direction different from the first direction.

Sample dimensions for the waveguide body 680 are provided in Table 1 below in reference to FIGS. 75, 77, and 90B. Dimensions are in mm unless otherwise noted. Each cavity 752, 754 may have a length ranging from about 0.5 mm to about 50 mm, preferably from about 1 mm to about 35 mm, and a width ranging from about 0.1 mm to about 10 mm, preferably from about 1 mm to about 5 mm.

TABLE 1

Figure 75A:
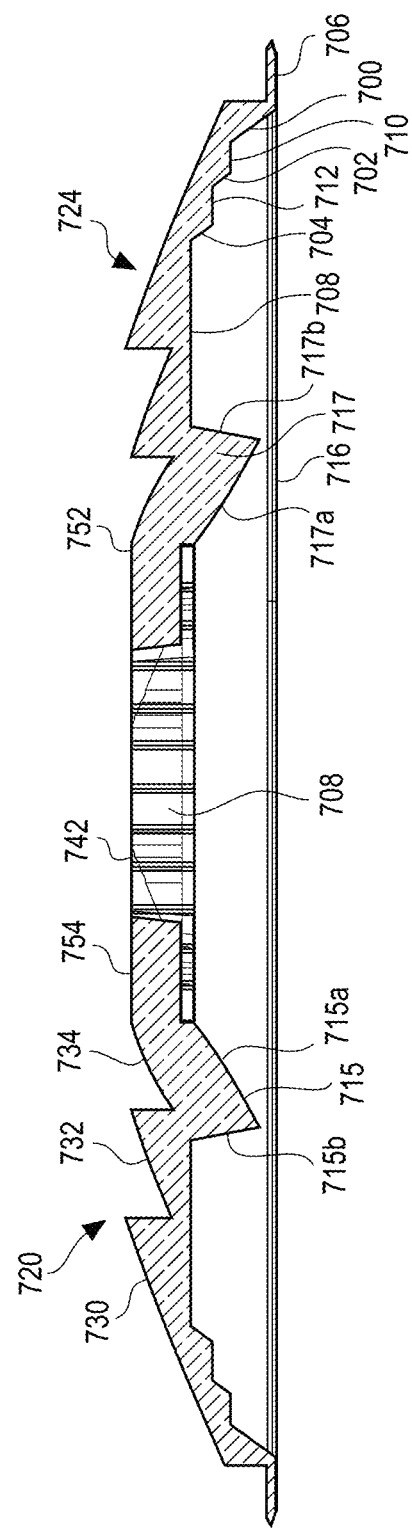
Figure 75B:
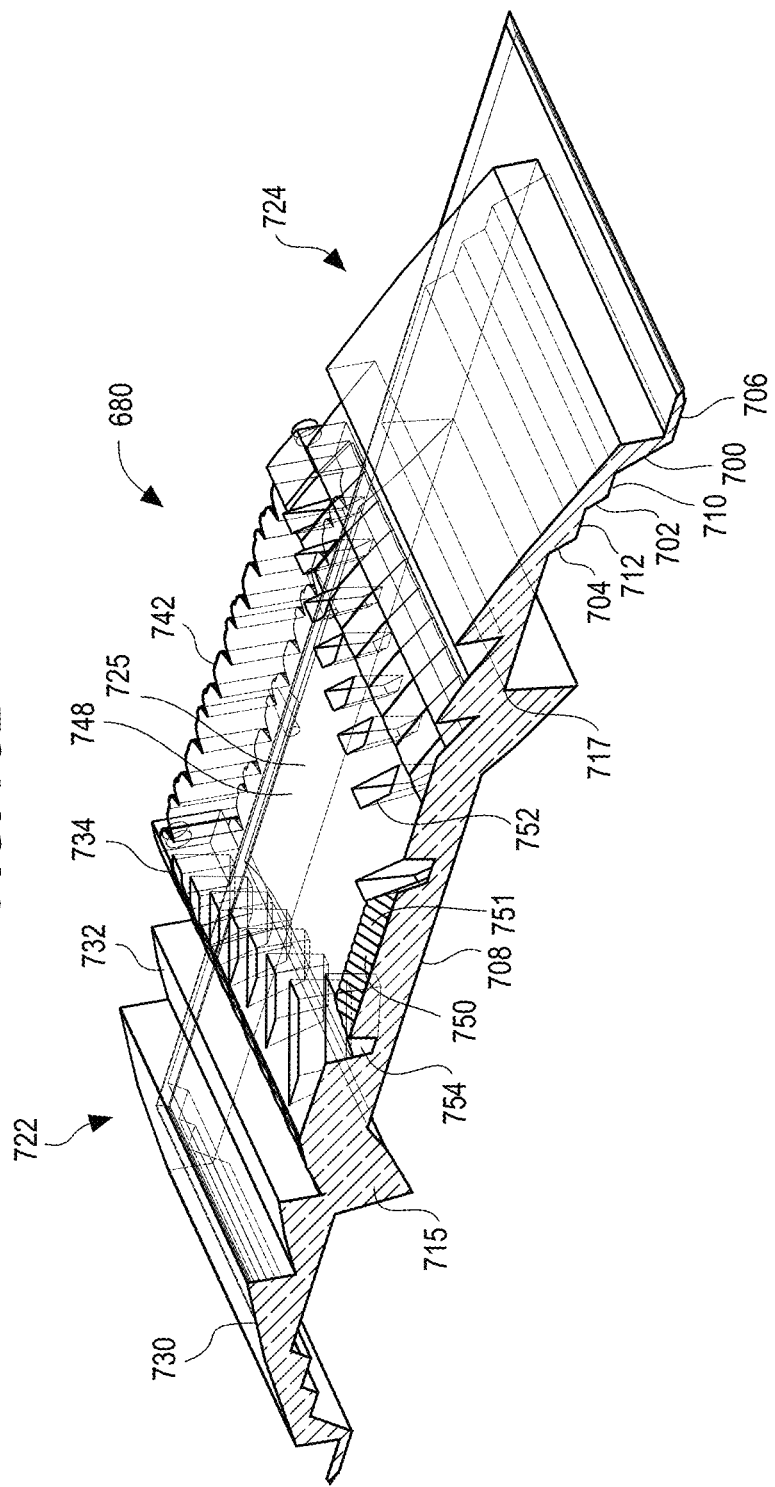
Figure 76:
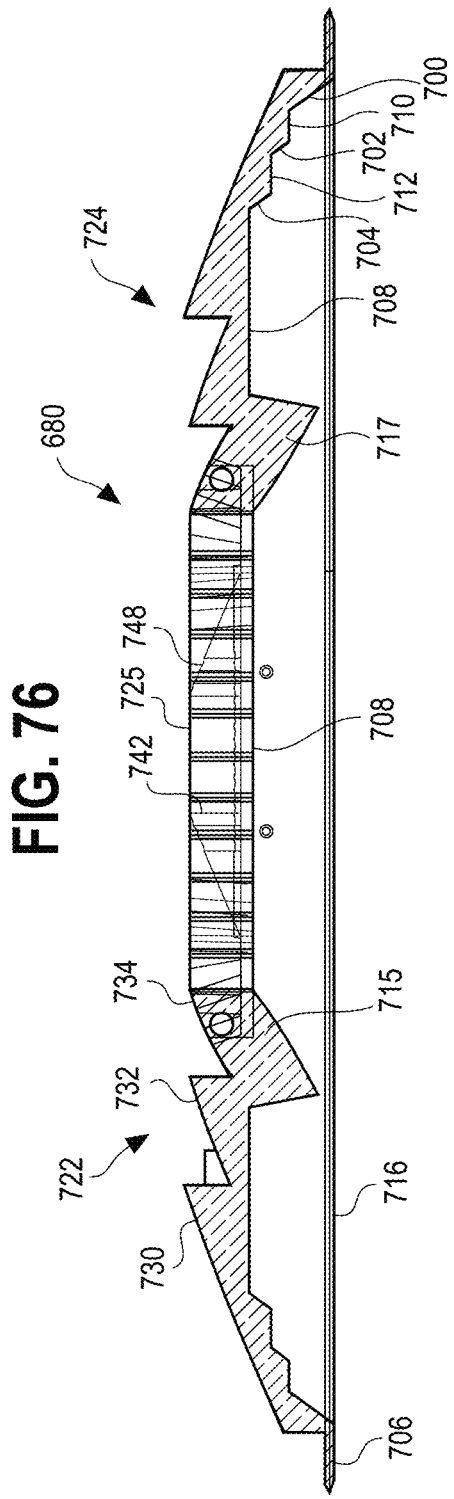
Figure 76B:
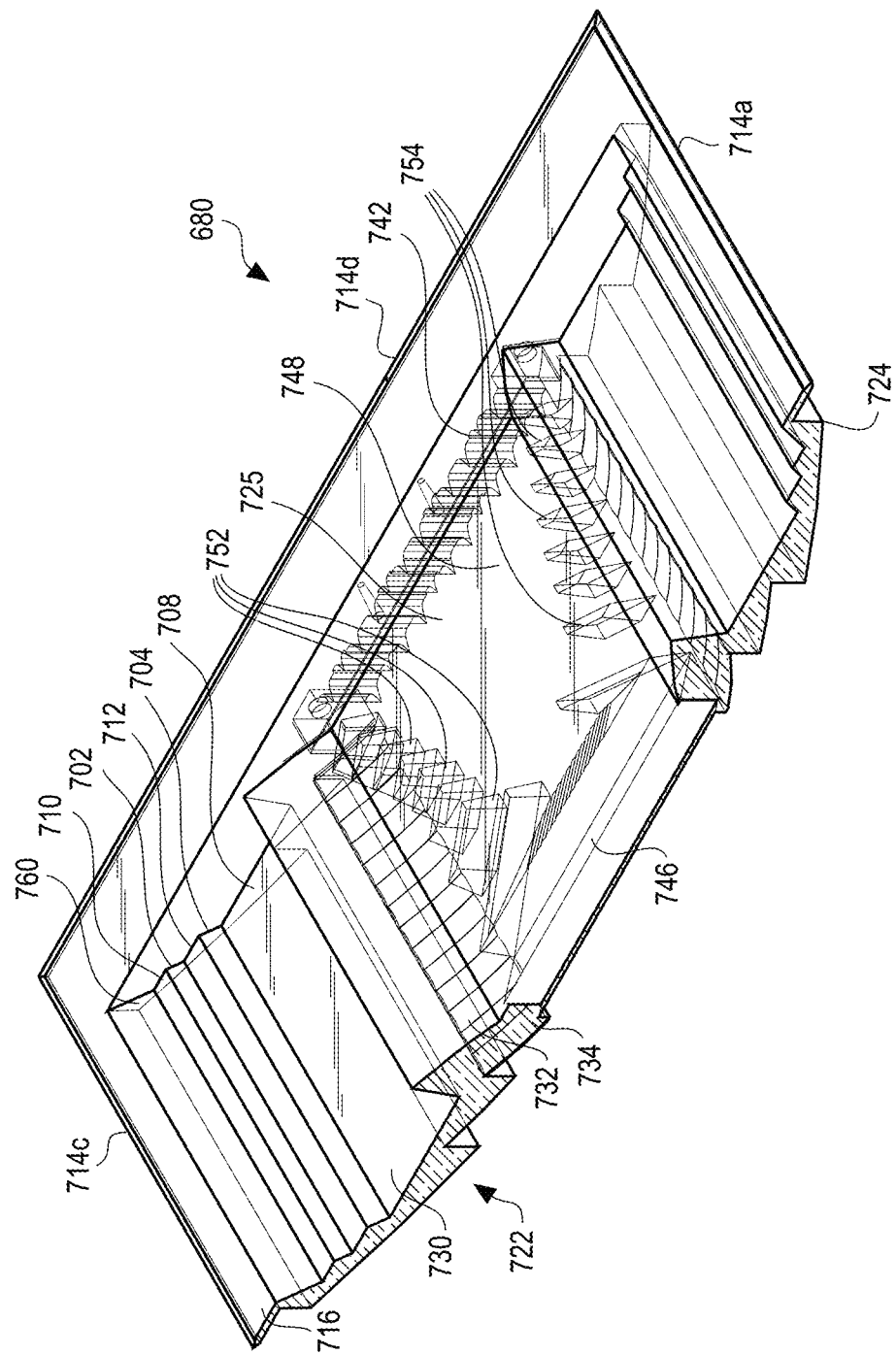
Figure 76C:
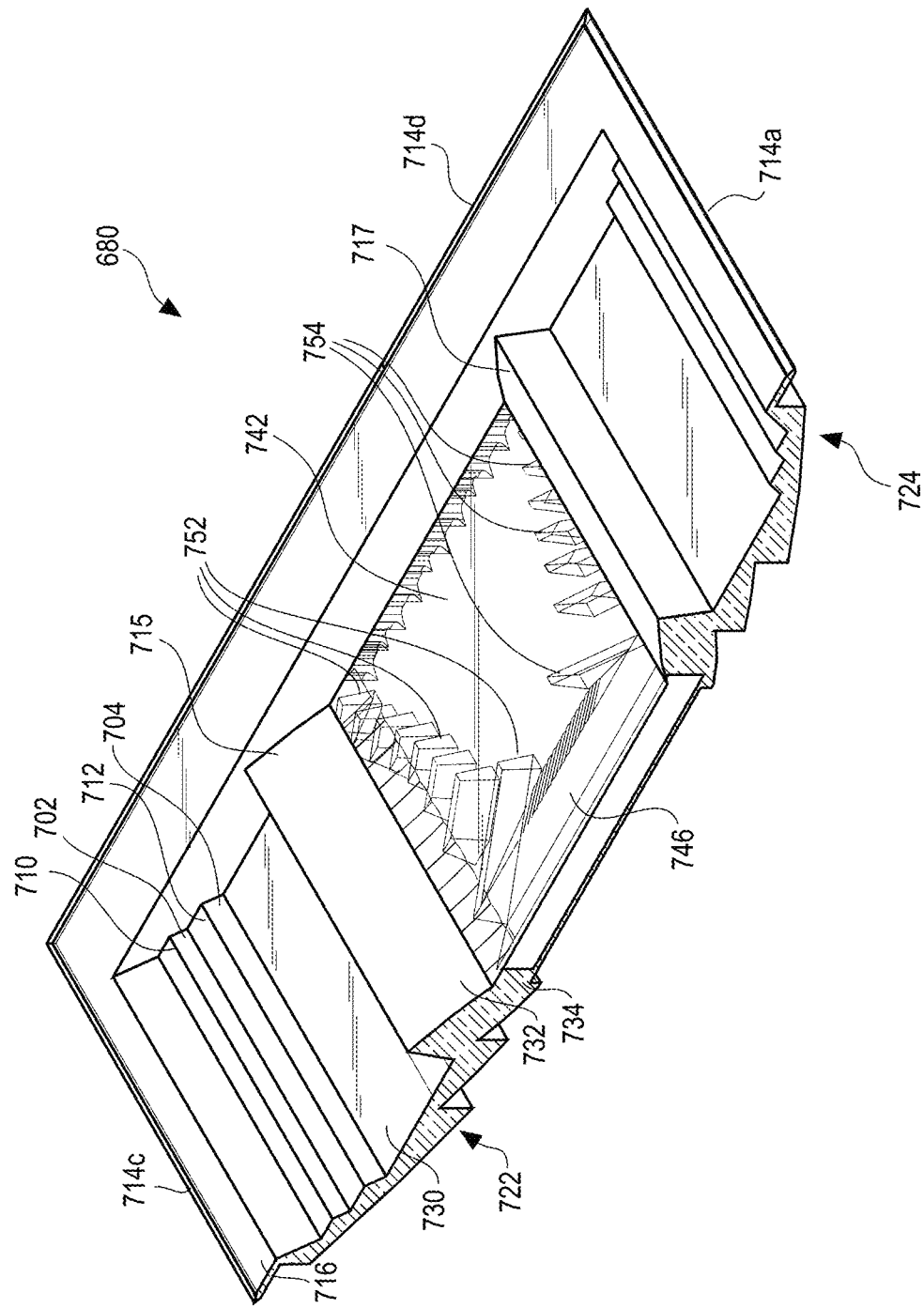
Figure 77:
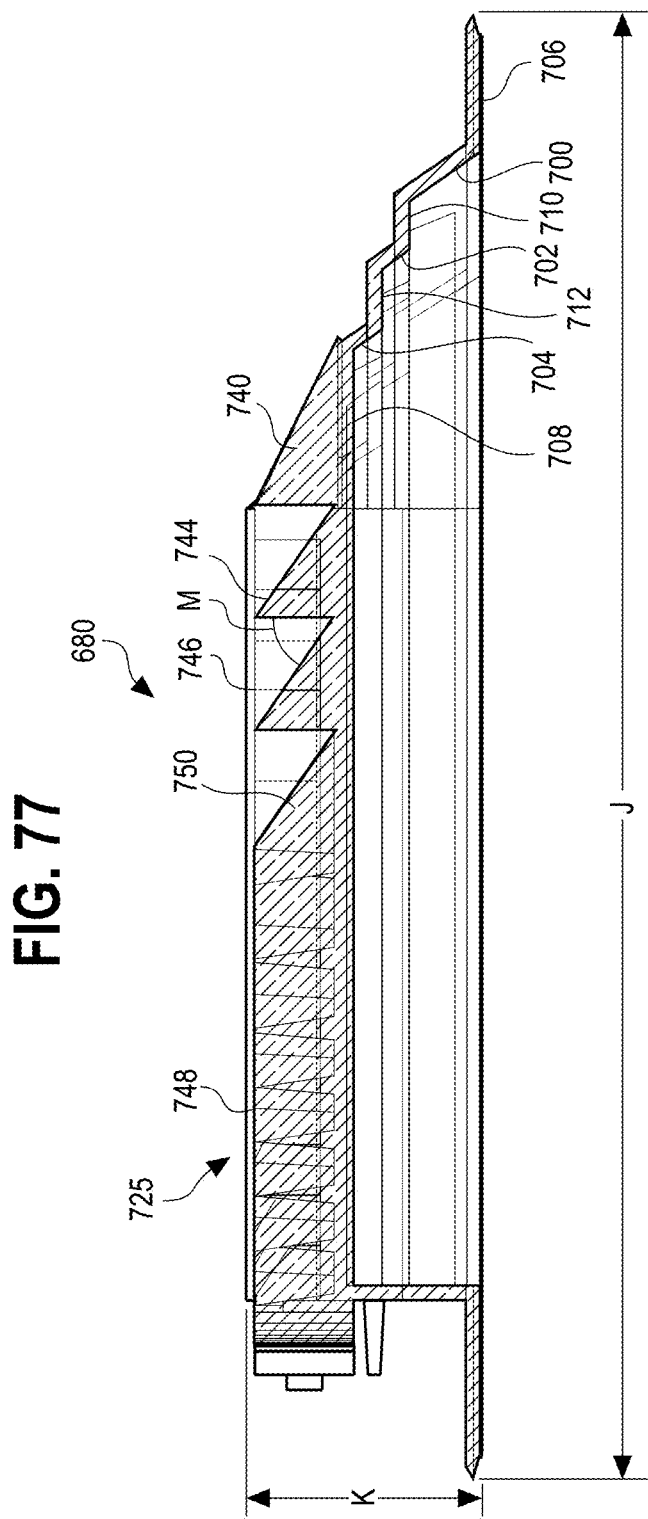
FIGS. 77, 77A, 77B, and 77C are a sectional elevational line view, a sectional elevational shaded view, a sectional isometric line view, and a sectional isometric shaded view, respectively, all taken along the lines 77-77 of FIG. 69.
Figure 77A:
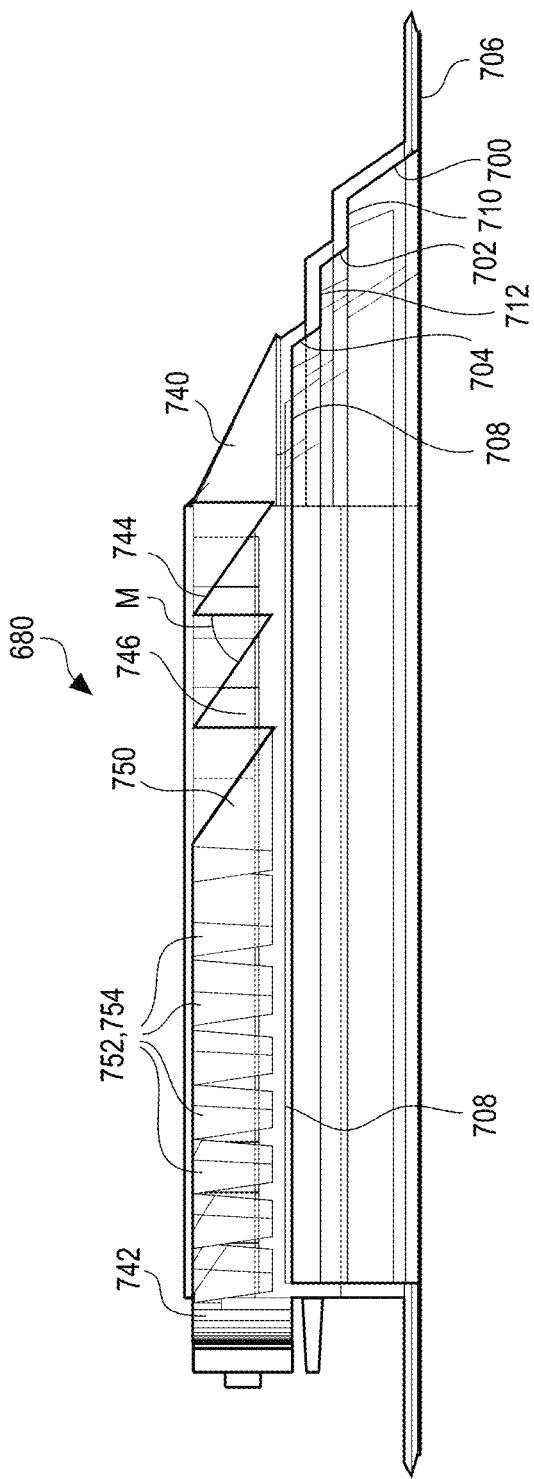
Figure 77B:
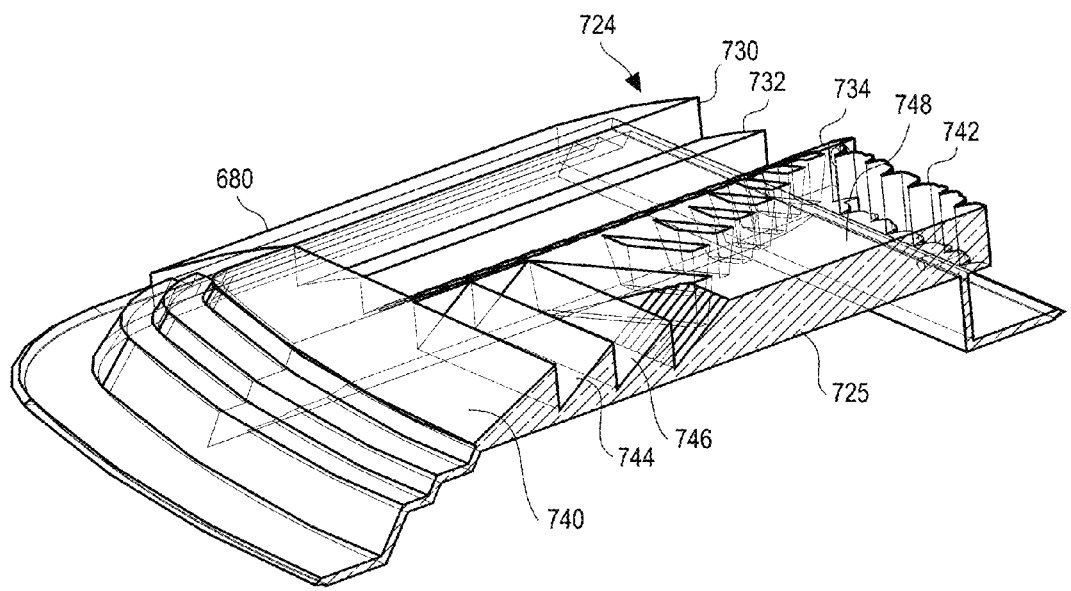
Figure 77C:
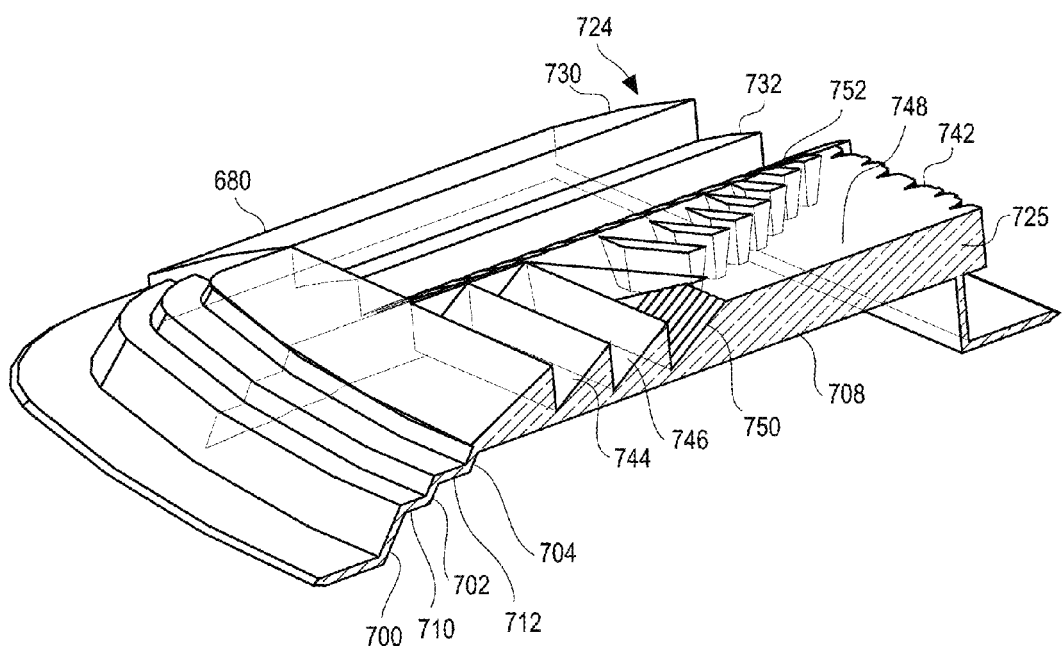

| Waveguide body 680 | |
|---|---|
| FIG. 75 | |
| A | 234.6 |
| B | 215.33 |
| C | 136.89 |
| D | 102.69 |
| E | 108.65 |
| F | 10 |
| G | 12.82 |
| H | 2 |
| I | 10.16 |
| FIG. 77 | |
| J | 147.84 |
| K | 23.71 |
| M | 55 degrees |
| FIG. 90B | |
| N | 7 |
| P | 6.49 |
| Q | 4.92 |
| R | 0.079 |
| S | 6 |
| T | 7 |
| U | 7 |
| V | 3.54 |
| W | 16.0 degrees |
| X | 18.5 degrees |
| Y | 22.0 degrees |
| Z | 27.5 degrees |
| AA | 34.5 degrees |
| AB | 44.0 degrees |
| AC | 54.0 degrees |
| AD | 65.0 degrees |
| AE | 75.0 degrees |
| AF | 83.0 degrees |
| AG | 89.0 degrees |
| AH | 93.0 degrees |
| AI | 5 |
| AJ | 2.53 |
| AL | 16.0 degrees |
| AK | 18.5 degrees |
| AM | 22.0 degrees |
| AN | 27.5 degrees |
| AP | 34.5 degrees |
| AQ | 44.0 degrees |
| AR | 54.0 degrees |
| AS | 65.0 degrees |
| AT | 75.0 degrees |
| AU | 83.0 degrees |
| AV | 89.0 degrees |
| AW | 93.0 degrees |

Figure 101:
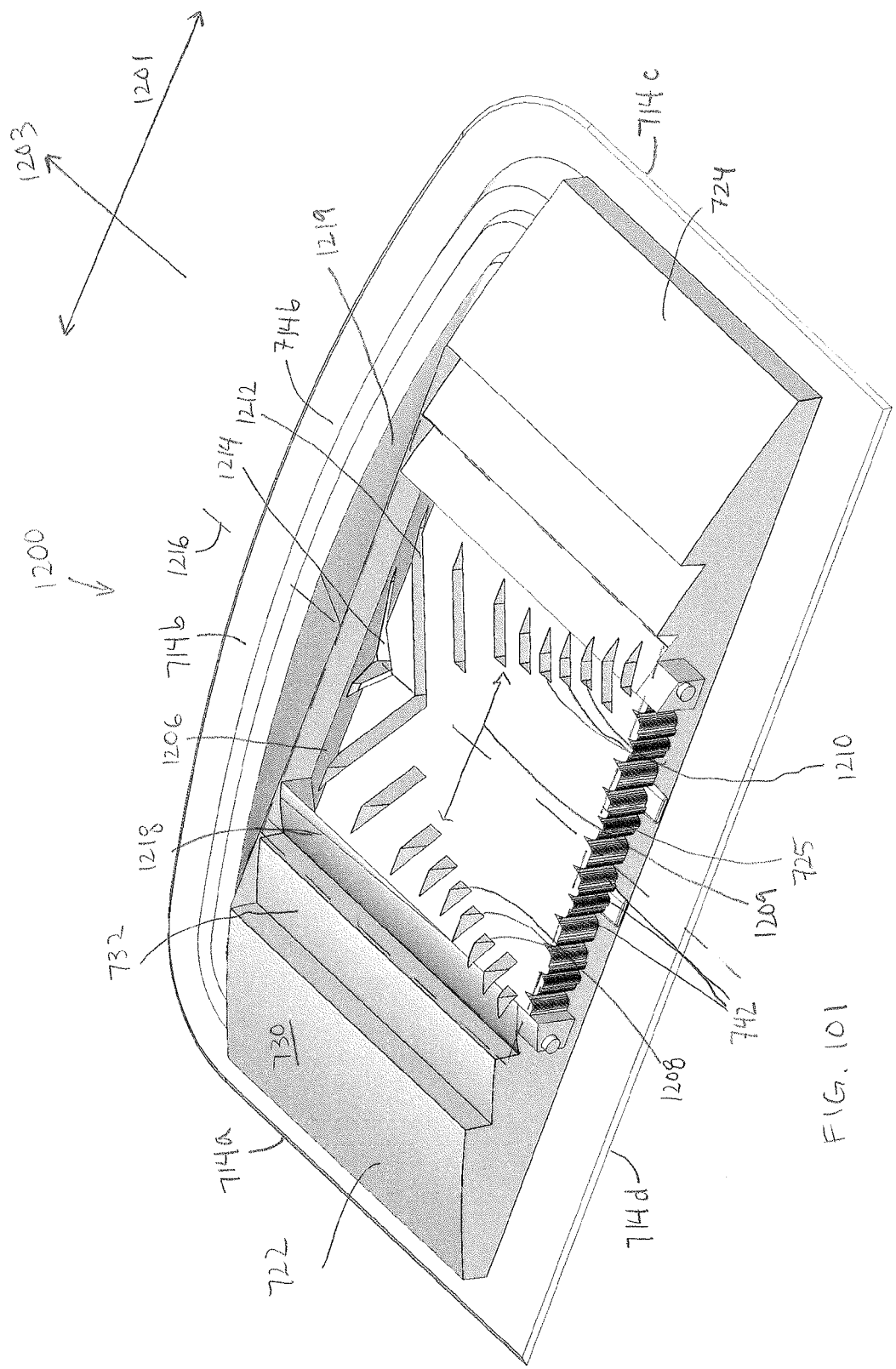
FIG. 101 is a top isometric view of a further embodiment of a waveguide body that may be used in the embodiment of FIG. 81.
Figure 102:
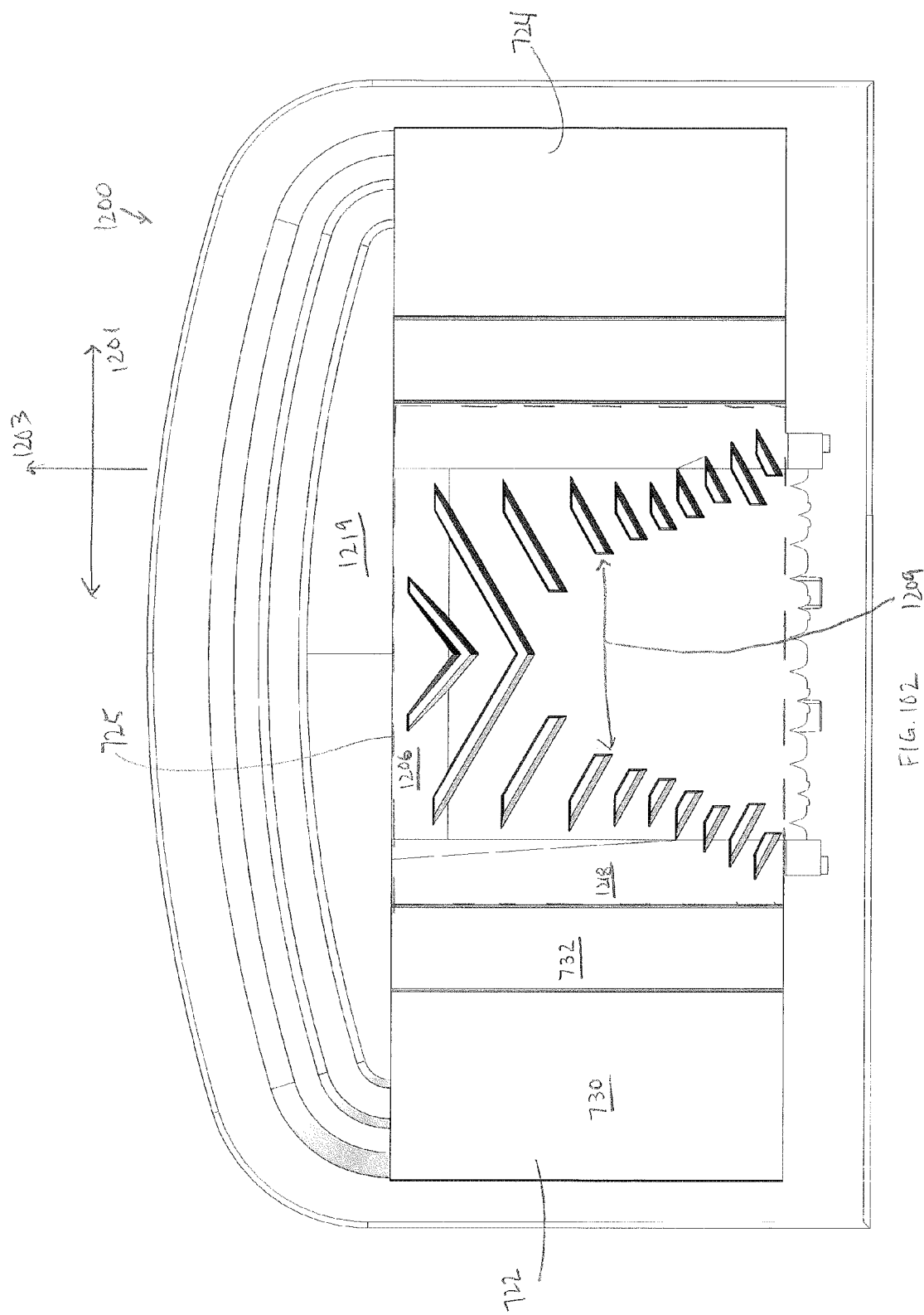
FIG. 102 is a plan view of the waveguide body of FIG. 101.
Figure 103:
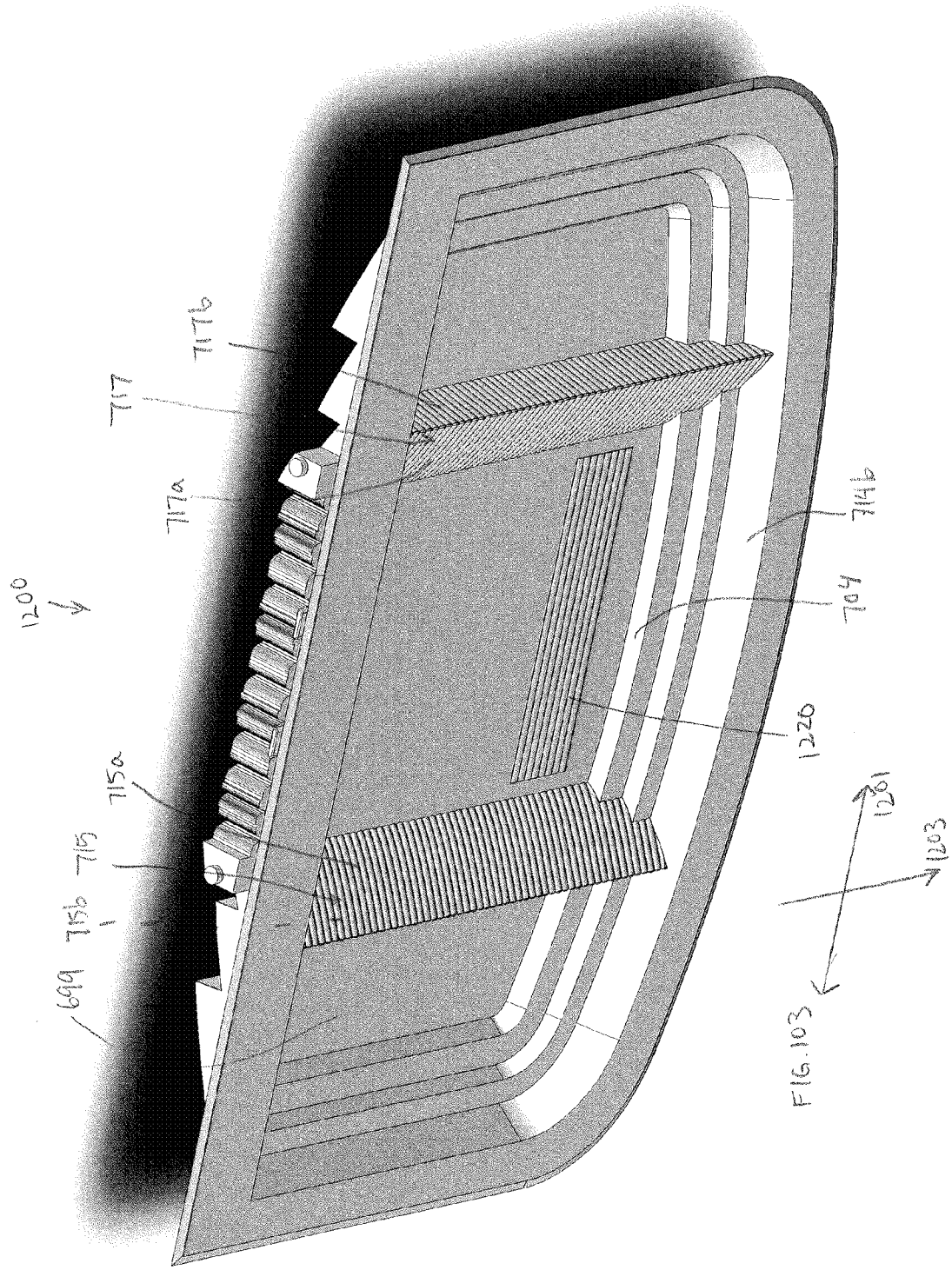
FIG. 103 is a bottom isometric view of the waveguide body of FIG. 101.
Figure 104:
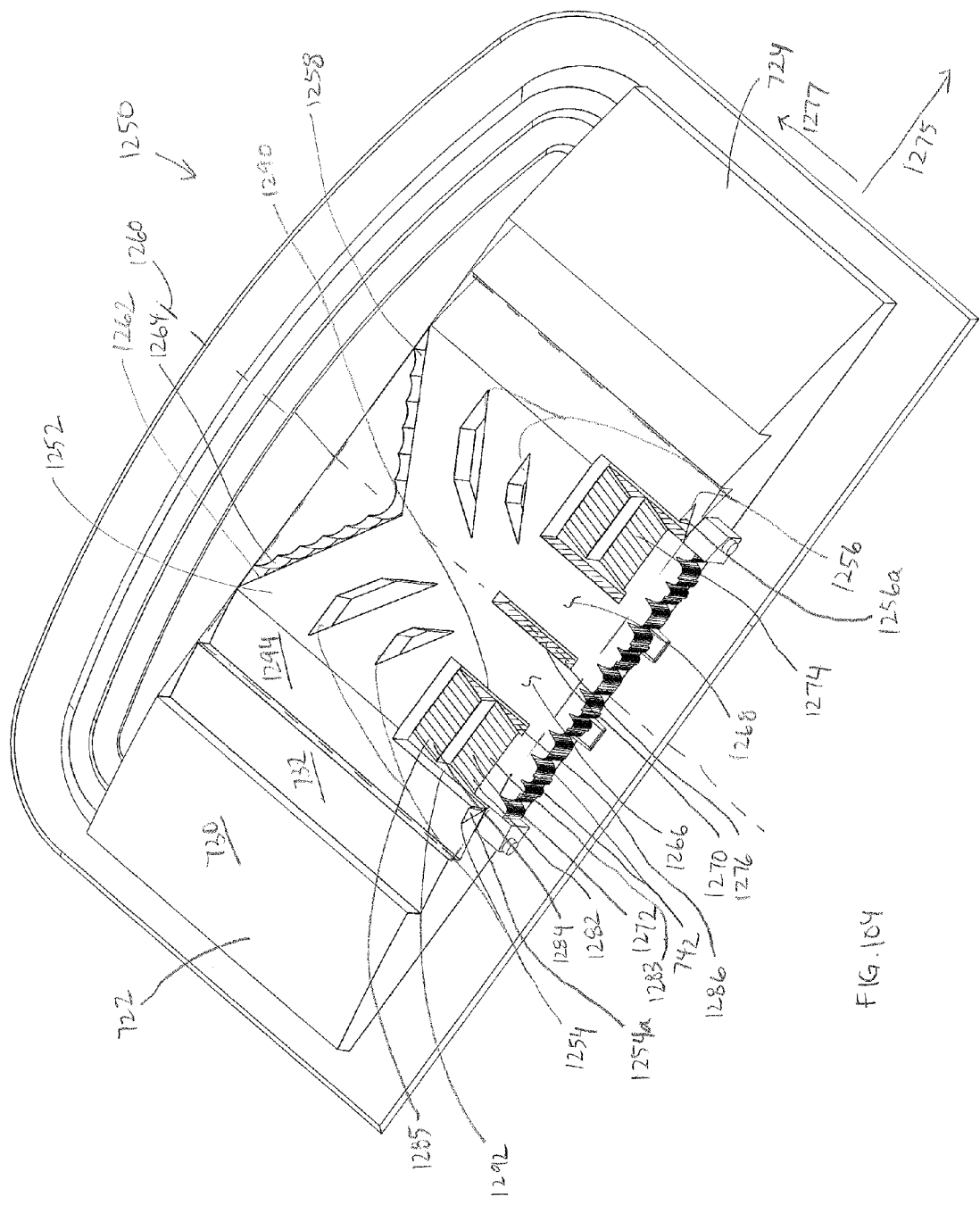
FIG. 104 is a top isometric view of a further embodiment of a waveguide body that may be used in the embodiment of FIG. 81.
Figure 105:
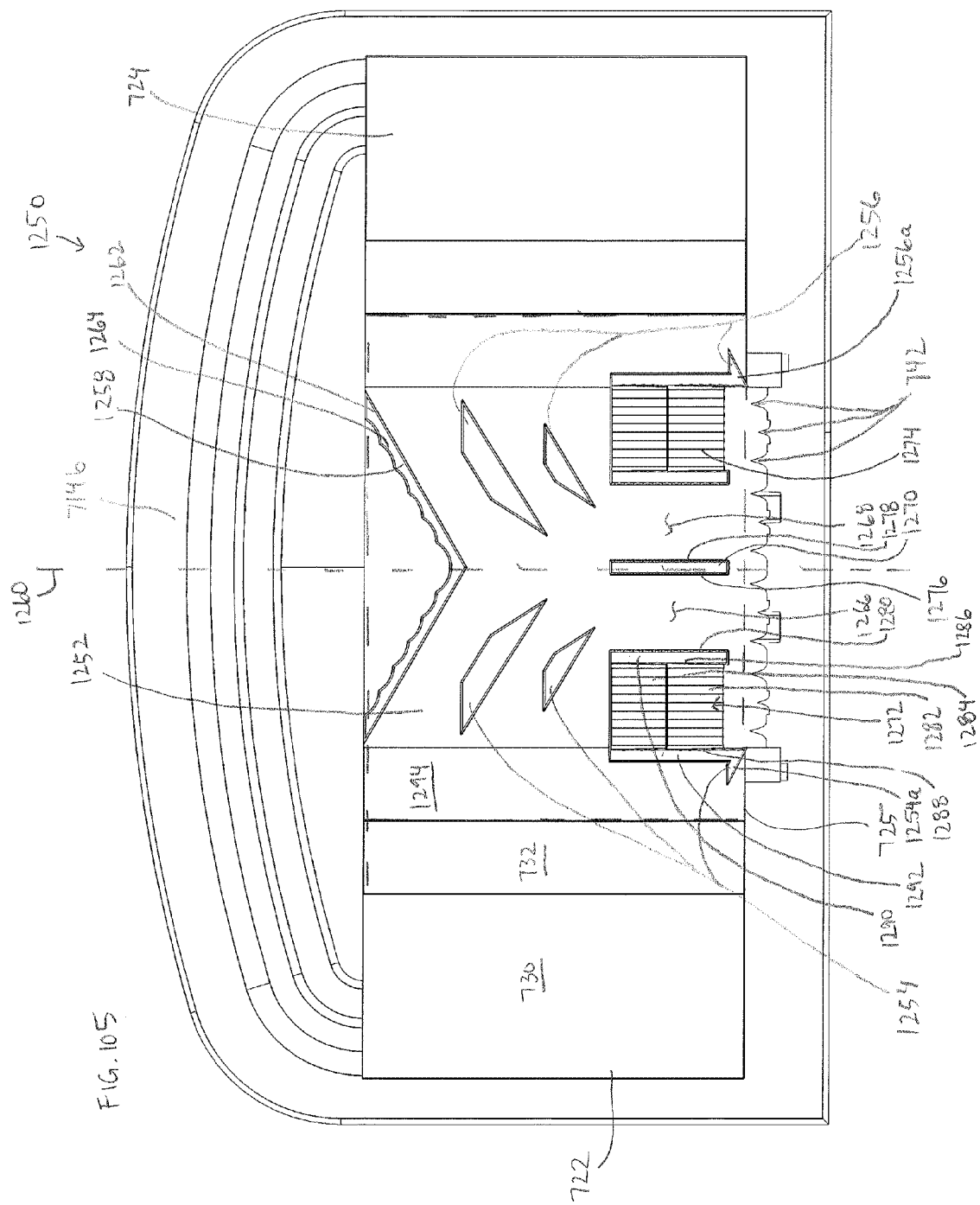
FIG. 105 is a plan view of the waveguide body of FIG. 104.

FIGS. 101-103 illustrate a further embodiment of a waveguide body 1200 having transverse, and, more preferably, orthogonal x- and y-dimensions 1201, 1203. The waveguide body 1200 is identical to the waveguide body 680 as shown in FIGS. 69-77C except for the differences noted below. Shown in FIGS. 101 and 102, the central section 725 of the waveguide body 1200 includes a rectangular planar surface 1202 that extends from the coupling cavities 742 to a tapered transition light extraction surface 1206 adjacent the side 714*b* of the waveguide 1200. Redirection features comprising first and second pluralities of cavities 1208, 1210 extend into the rectangular planar surface 1202. In some embodiments, the first and second pluralities of cavities 1208, 1210 are mirror images of one another with a gap 1209 therebetween. In the illustrated embodiment, inner edges of the first and second pluralities of cavities 1208, 1210 are offset relative to one another along the x-dimension. Each cavity of the first plurality 1208 is aligned with an associated cavity of the second plurality 1210 along the y-dimension. A spacing between inner edges of associated cavities of the first and second pluralities 1208, 1210 decreases with distance from the coupling cavities 742 along the y-dimension. Further redirection features including first and second slotted cavities 1212, 1214 are formed adjacent the transition surface 1206 and have a chevron or v-shape about a center line 1216. Each cavity 1208, 1210 and each slotted cavity 1212, 1214 extends in the x- and y-dimensions 1201, 1203. In the illustrated embodiment, the tapered transition light extraction surface 1206 and third wedge-shaped members 1218 of the side sections 722, 724 are smooth. In other embodiments, such surfaces may include light scattering features comprising, in the illustrated embodiments, a scalloped surface. Light scattering features in any of the embodiments described herein may comprise protrusions, depressions, cavities, convex or concave shapes, texturing, a combination of any of the foregoing, or any number of irregular (i.e., non-planar) features. Wedge-shaped members 730, 732, 1218 of the first and second sides 722 and 724 extending in the y-dimension 1203 extract light out of the waveguide body 1200. Tapered surface 1219 adjacent the side 714*b* extending in the x- and y-dimensions 1201, 1203 extracts light out of the waveguide body 1200. Referring to FIG. 103, the tapered inner surfaces 715*a*, 717*a* and the outer surfaces 715*b*, 717*b* of the respective first and second light extraction ribs 715, 717 of the bottom surface 699 include light scattering features, such as ribs, scallops, and/or cavities thereon or therein. The base surface 708 includes a textured portion 1220 extending at least partially between the first and second light extraction ribs 715, 717 and adjacent the tapered side surface 704 along the side 714*b*. The textured portion 1220 may include ribs and/or scallops and/or other scattering features.

Figure 106:
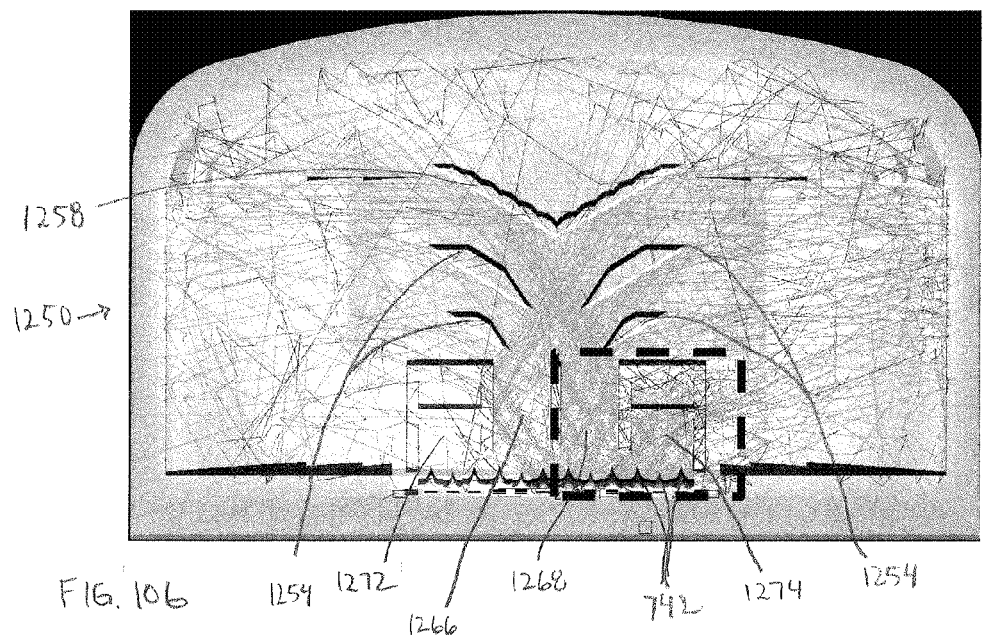
FIGS. 106 and 107 are ray trace diagrams of the waveguide body of FIG. 104.
Figure 107:
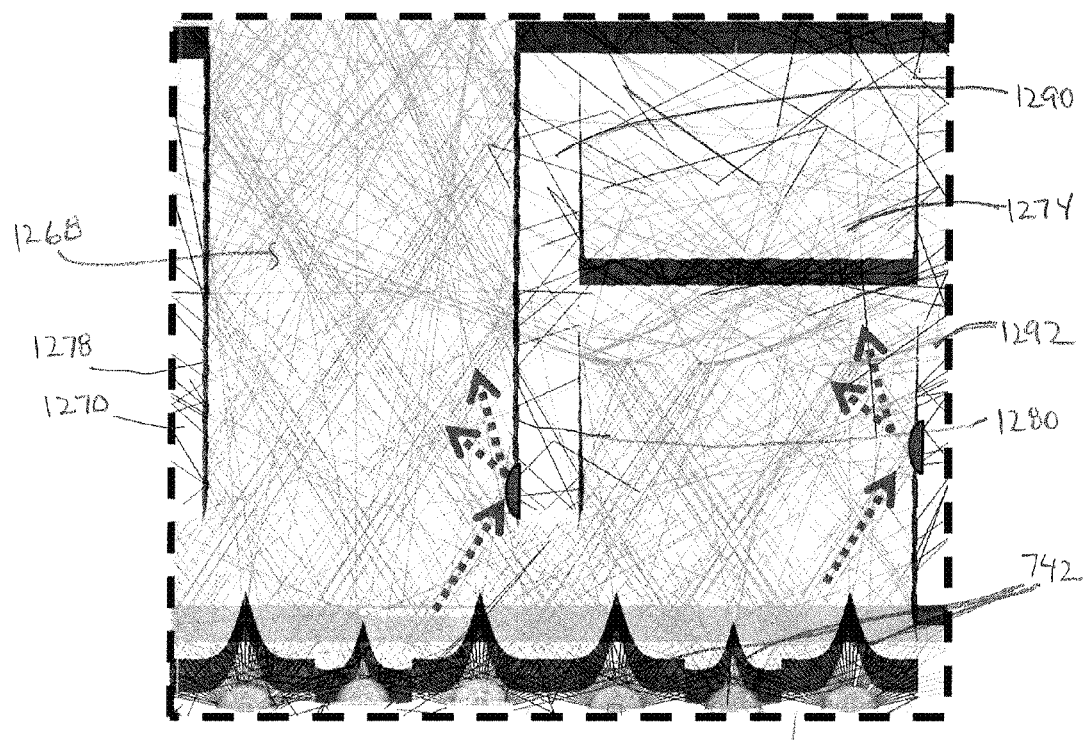

Referring to FIGS. 104-107, a further embodiment of a waveguide body 1250 is identical to the waveguide body 680 as shown in FIGS. 69-77C except for the differences noted. The central section 725 includes a rectangular planar surface 1252 that extends from the coupling cavities 742 to the side 714*b* of the waveguide. Redirection features comprising first and second pluralities of cavities 1254, 1256 and a slotted cavity 1258 that extend into the rectangular planar surface 1252 redirect light traveling through the waveguide body laterally therein. The slotted cavity 1258 formed adjacent the side 714*b* has a v-shape about a center line 1260 and may include a planar inner surface 1262 and an outer surface 1264 having light scattering features as described above. Further, the rectangular planar surface 1252 includes first and second mixing channels 1266, 1268 separated by a cavity 1270 disposed between first and second extraction features or volumes 1272, 1274 along the x-dimension 1275 adjacent the coupling cavities 742. The first and second extraction features or volumes 1272, 1274 are offset from the center line 1260 (FIG. 104) extending in the y-dimension 1277. The first and second mixing channels 1266, 1268 are identical such that only the first mixing channel 1266 will be described. Similarly, the first and second extraction volumes 1272, 1274 are identical such that only the first extraction volume 1274 will be described. Ray trace diagrams provided in FIGS. 106 and 107 illustrate the interaction of light emitted from the plurality of LEDs with the mixing channels 1266, 1268 and extraction volumes 1272, 1274. Preferably, but not necessarily, light extracted by the first and second light extraction volumes 1272, 1274 is directed into an output illumination distribution at locations offset from a center of the output illumination distribution. The cavity 1270 provides an air gap between inner side surfaces 1276, 1278 of the respective first and second mixing channels 1266, 1268 in order to allow light to totally internally reflect off of the inner side surfaces 1276, 1278 into the respective mixing channel 1266, 1268. Further, inner and outer side surfaces 1276, 1280 of the first mixing channel 1266 include light scattering features, such as scalloped surfaces, wherein light is scattered and diffused by the side surfaces 1276, 1280 as it travels laterally through the first mixing channel 1266 along the y-dimension 1277, as shown in FIGS. 106 and 107. As noted previously, and in any of the embodiments disclosed herein, any or all of the disclosed scalloped surfaces may extend outwardly, inwardly, or a combination thereof. The first extraction volume 1272 includes first and second wedges 1282, 1284 that have a width extending along the x-dimension. Inner and outer surfaces 1286, 1288 of the first and second wedges 1282, 1284 may include further light scattering features, such as scallops, to scatter and mix light. Further, tapered surfaces 1283, 1285 of the first and second wedges 1282, 1284 may also include light scattering features, such as scallops, to scatter and mix light. An air gap 1290 is formed between the outer side surface 1280 of the first mixing channel 1266 and the inner side surface 1286 of the first and second wedges 1282, 1284 such that light may totally internally reflect off of the outer side surface 1280 of the first mixing channel 1266 into the first mixing channel 1266 and light may totally internally reflect off of the inner side surfaces 1286 of the first and second wedges 1282, 1284 prior to extraction. An air gap 1292 is similarly formed adjacent the outer side surfaces 1288 of the first and second wedges 1282, 1284. First and second pluralities of cavities 1254, 1256 may be aligned with the first and second light mixing channels 1266, 1268, respectively. Each of the plurality of cavities 1254, 1256 includes a cavity 1254*a*, 1256*a* that extends from the air gap 1292 into the adjacent third wedge-shaped members 1294 of the side sections 722, 724, respectively, from the planar surface. A portion of the cavities 1254*a*, 1256*a* may have light scattering features. The third wedge-shaped members 1294 may have a planar surface.

Referring to FIG. 90, the waveguide body 980 includes a central section 1025 having a planar surface 1026 that extends from a plurality of coupling cavities or features 1028 to a transition surface 1030 adjacent the tapered end portion 1040 of the outboard portion 1019. At least a portion of the transition surface 1030 may include light mixing (i.e., scattering) features such as a scalloped and/or textured surface. A slotted cavity 1032 is formed adjacent the transition surface 1030 and has a v-shape about a center line 1034. The planar surface 1026 includes two pluralities of light redirection cavities 1036, 1038 similar to those of the waveguide body of FIG. 70. The cavities 1032, 1036, 1038 redirect light traveling through the waveguide body 980 laterally within the waveguide body 980.

Figure 108:
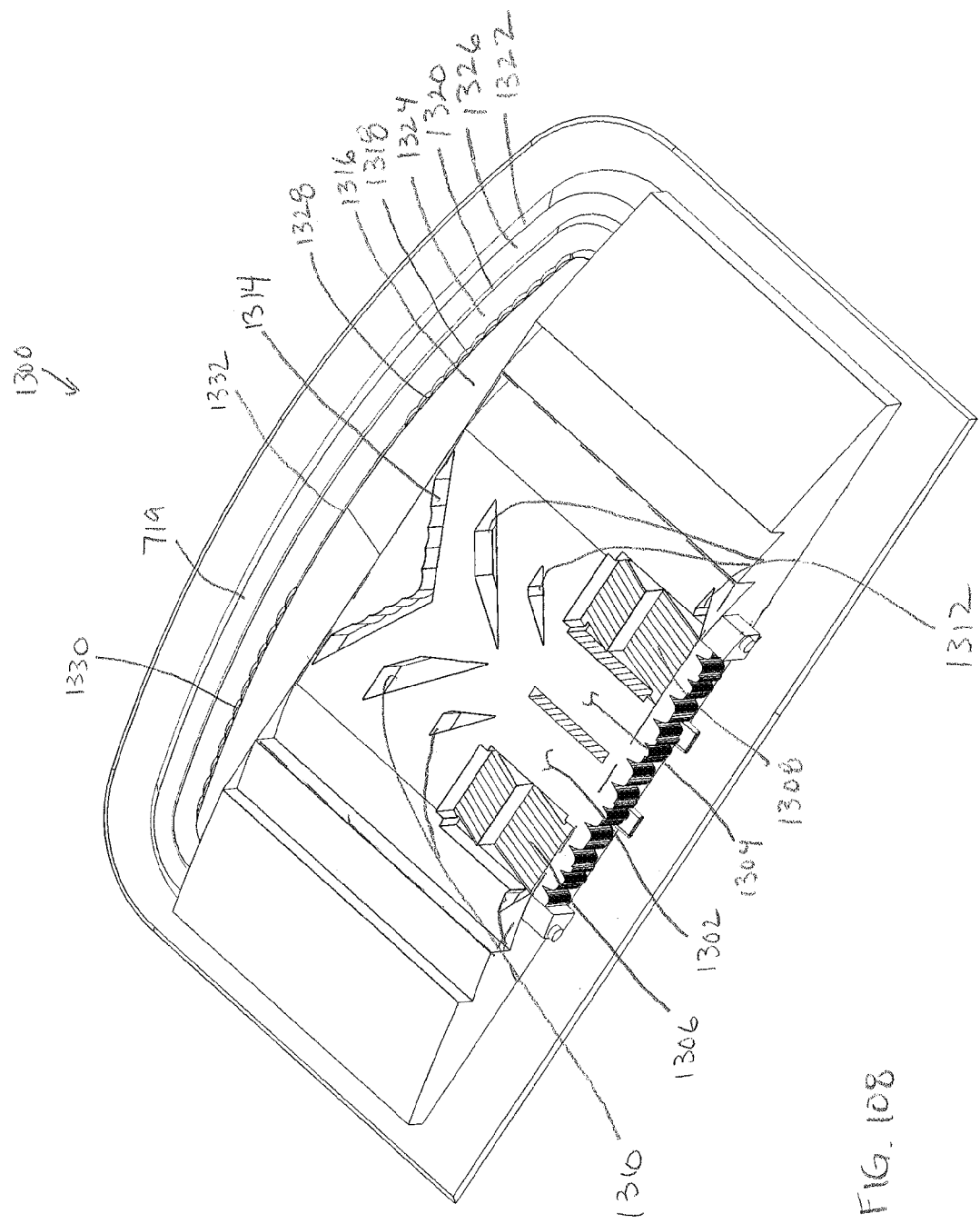
FIG. 108 is a top isometric view of a further embodiment of a waveguide body that may be used in the embodiment of FIG. 81.
Figure 109:
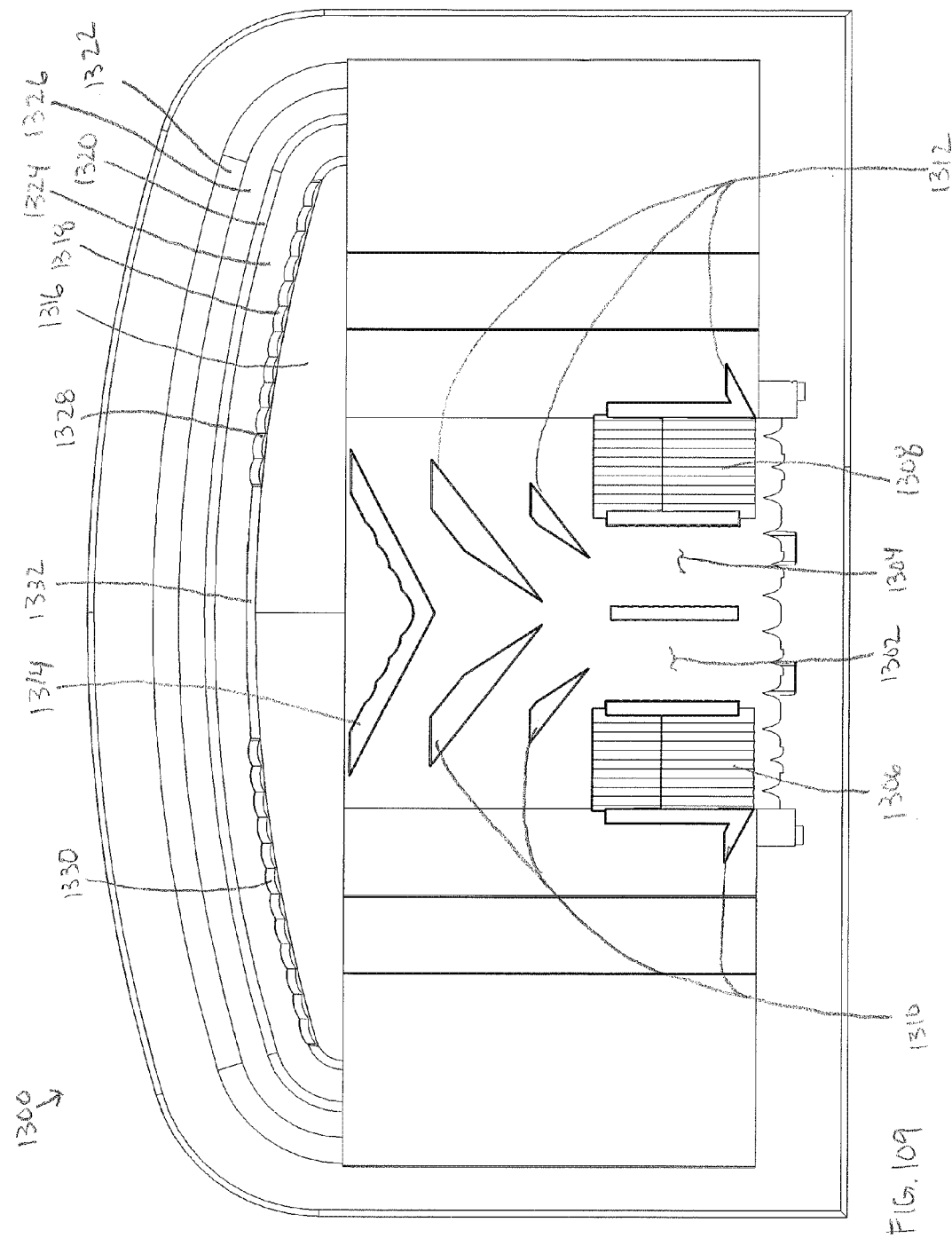
FIG. 109 is a plan view of the waveguide body of FIG. 108.

Referring to FIGS. 108 and 109, a further embodiment of a waveguide body 1300 is illustrated. The waveguide body 1300 produces a light distribution similar but not identical to the light distribution produced by the waveguide body 980 shown in FIG. 90. Further, the waveguide body 1300 is similar to the waveguide body 1250 shown in FIGS. 104-107 in that the waveguide bodies 1250, 1300 include similar or identical features such as light mixing channels, light extraction volumes, and light redirection features comprising first and second pluralities of cavities and a slotted cavity. The waveguide bodies 1250, 1300 differ in that the dimensions and shapes of such features are different such that somewhat different light distribution patterns are produced. Referring to FIGS. 108 and 109, the waveguide body 1300 includes first and second light mixing channels 1302, 1304, first and second light extraction volumes 1306, 1308, first and second pluralities of cavities 1310, 1312, and a slotted cavity 1314. Additionally, the outboard portion 719 of the waveguide body 1300 includes tapered surfaces 1316, 1318, 1320, 1322. Tapered surfaces 1318, 1320, 1322 are spaced from one another by intermediate planar surfaces 1324, 1326. In the illustrated embodiment, the tapered surface 1318 includes first and second portions 1328, 1330 having light scattering features separated by a smooth portion 1332. In other embodiments, each of the tapered and planar surfaces 1318-1326 may be smooth or include light scattering features, such as texturing and/or scallops.

FIG. 91 illustrates the waveguide body 980a including a central section 1042. Three wedge-shaped members 1044 extend across the central section 1042 transverse to the wedge-shaped members of the side sections of the outboard portion 1019. A transition surface 1046 having a scalloped edge extends from a coupling portion 1048 to the adjacent wedge-shaped member 1044. Two light redirection cavities 1050 are disposed along the coupling portion 1048 opposite a plurality of coupling cavities or features 1052. Each cavity 1050 has an equilateral triangular shape and is disposed such that a side surface 1054 is parallel to a lateral extent of the coupling portion 1048 and a point 1056 opposite the side surface 1054 is disposed between the coupling cavities 1052 and the side surface 1054. The side surfaces of the cavities 1050 may include light mixing features such as a scalloped and/or textured surface. Further, the cavities 1050 extend from the coupling portion 1048 into the transition surface 1046. The cavities 1050 redirect light laterally within the waveguide toward two outer corners 1051a, 1051b opposite the coupling cavities 1052.

Figure 110:
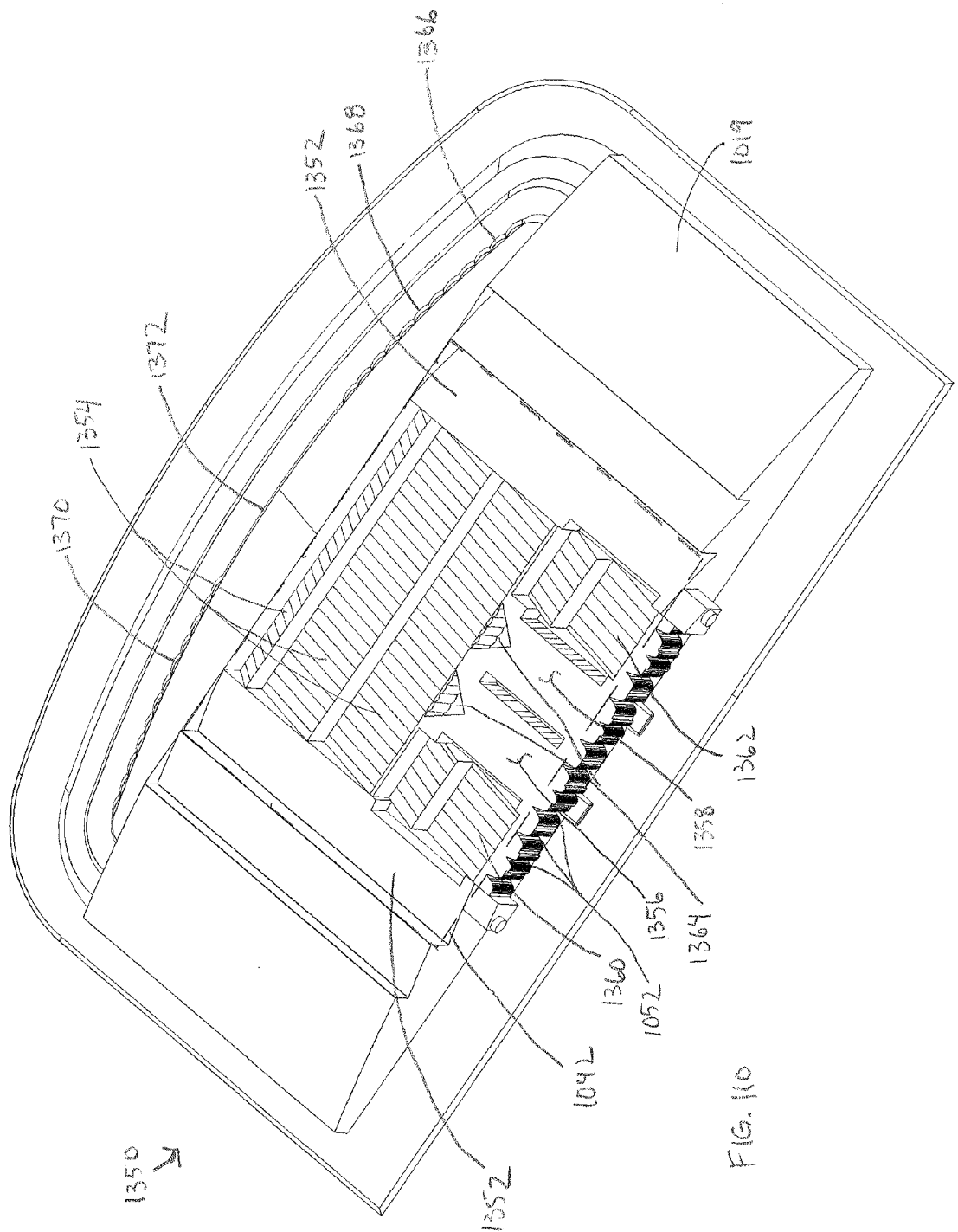
FIG. 110 is a top isometric view of a further embodiment of a waveguide body that may be used in the embodiment of FIG. 81.
Figure 111:
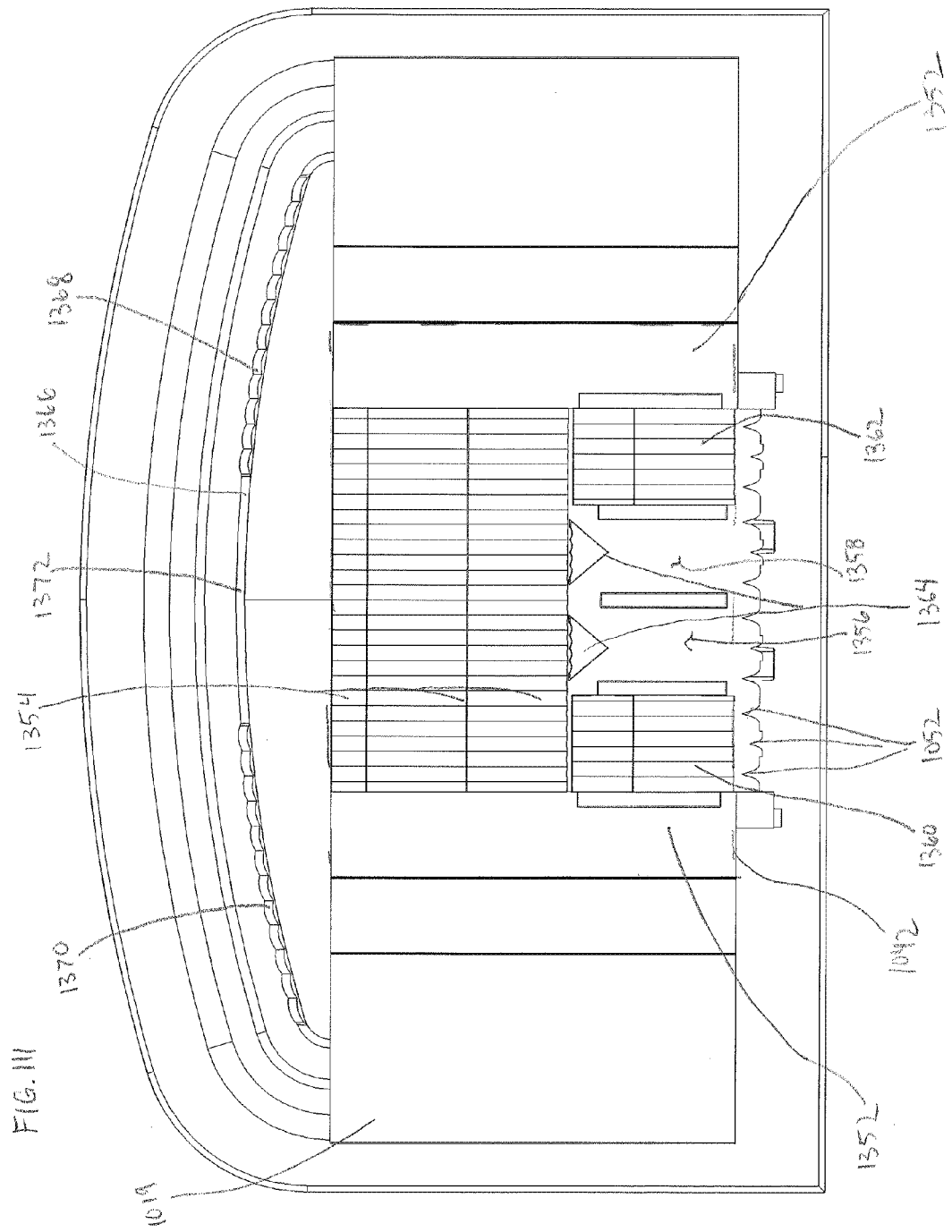
FIG. 111 is a plan view of the waveguide body of FIG. 111.

Referring to FIGS. 110 and 111, a further embodiment of a waveguide body 1350 is identical to the waveguide body 980a shown in FIG. 91 with the exceptions noted as follows. The central section 1042 is disposed between wedge-shaped members 1352 of the side sections of the outboard portion 1019. Similar to the waveguide body 980a, the central section 1042 includes three-wedge shaped members 1354 that extend between the wedge-shaped members 1352. The central section 1042 further includes first and second light mixing channels 1356, 1358 disposed between first and second light extraction volumes 1360, 1362 adjacent the coupling cavities 1052. The light mixing channels 1356, 1358 and the light extraction volumes 1360, 1362 are similar to such features described in reference to FIGS. 104-107. Two light redirection cavities 1364 are formed between the light mixing channels 1356, 1358 and the adjacent wedge-shaped member 1354. Each light redirection cavity 1364 has an equilateral triangular shape that extends into the central section 1042. The three wedge-shaped members 1354 extending across the central section 1042 include scallops to promote the scattering and mixing of light. A tapered surface 1366 of the outboard portion of the waveguide body 1350 includes first and second scalloped portions 1368, 1370 separated by a smooth portion 1372.

Referring next to FIGS. 90A and 90B, the plurality of light coupling cavities or features 1028 includes cavities 1028a-1028m that extend into the waveguide body 980 from an end surface thereof. LED elements (see FIG. 82) are disposed in a stacked configuration within each of the plurality of light coupling cavities 1028 as described in greater detail below. The coupling cavities 742 of the waveguide body 680 have the same shapes and sizes of the coupling cavities 1028 of waveguide bodies 980, 980a, and hence, the following description applies to all three waveguides 680, 980, 980a.

The plurality of light coupling cavities 1028 includes three groups 1060a-1060d, each of which includes three light coupling cavities of substantially the same shape. However, two of the coupling cavities of each group are larger than a remaining coupling cavity of the group and the remaining coupling cavity is disposed between the two larger coupling cavities. For example, group 1060a includes two larger coupling cavities 1028a, 1028c and a remaining coupling cavity 1028b. Similarly, group 1060b includes two larger coupling cavities 1028d, 1028f and a remaining coupling cavity 1028e, group 1060c includes two larger coupling cavities 1028g, 1028i and a remaining coupling cavity 1028h, and group 1060d includes two larger coupling cavities 1028j, 1028m and a remaining coupling cavity 1028k. Preferably, all of the light coupling cavities 1028a-1028m have the same shape, although other shapes may be used to effectuate a desired illumination pattern.

Each light coupling cavity 1028 includes two coupling surfaces 1062-1, 1062-2 that are mirror images of one another on either side of an axis 1064 of symmetry. The coupling surfaces 1062-1, 1062-2 of each larger coupling cavity are recessed slightly relative to the coupling surfaces 1062-1, 1062-2 of the adjacent remaining smaller coupling cavity. For example, the coupling surfaces 1062g-1, 1062g-2 of the larger coupling cavity 1028g are recessed slightly relative to the coupling surfaces 1062h-1, 1062h-2 of the adjacent remaining coupling cavity 1028h. The coupling surfaces 1062-1, 1062-2 are shaped to direct light emitted from LEDs 990 substantially in defined paths in the waveguide. The coupling surfaces 1062-1, 1062-2 may be smooth, textured, curved, or otherwise shaped to affect light mixing and/or redirection. Each or some of the curved portions 1062-1, 1062-2 may have a piecewise linear shape. In an embodiment illustrated in FIG. 90B, the angles for segments of the curved portions 1062-1, 1062-2 of the waveguide body 980 having a piecewise linear shape are provided in Table 1. The coupling cavities of the waveguide bodies 680, 980, 980a, 983, 983a, and 983b shown in FIGS. 71, 90, 91, 102, 103, and 104, respectively, have the same shape as described above, although the sizes of the coupling cavities may vary.

Figure 71:
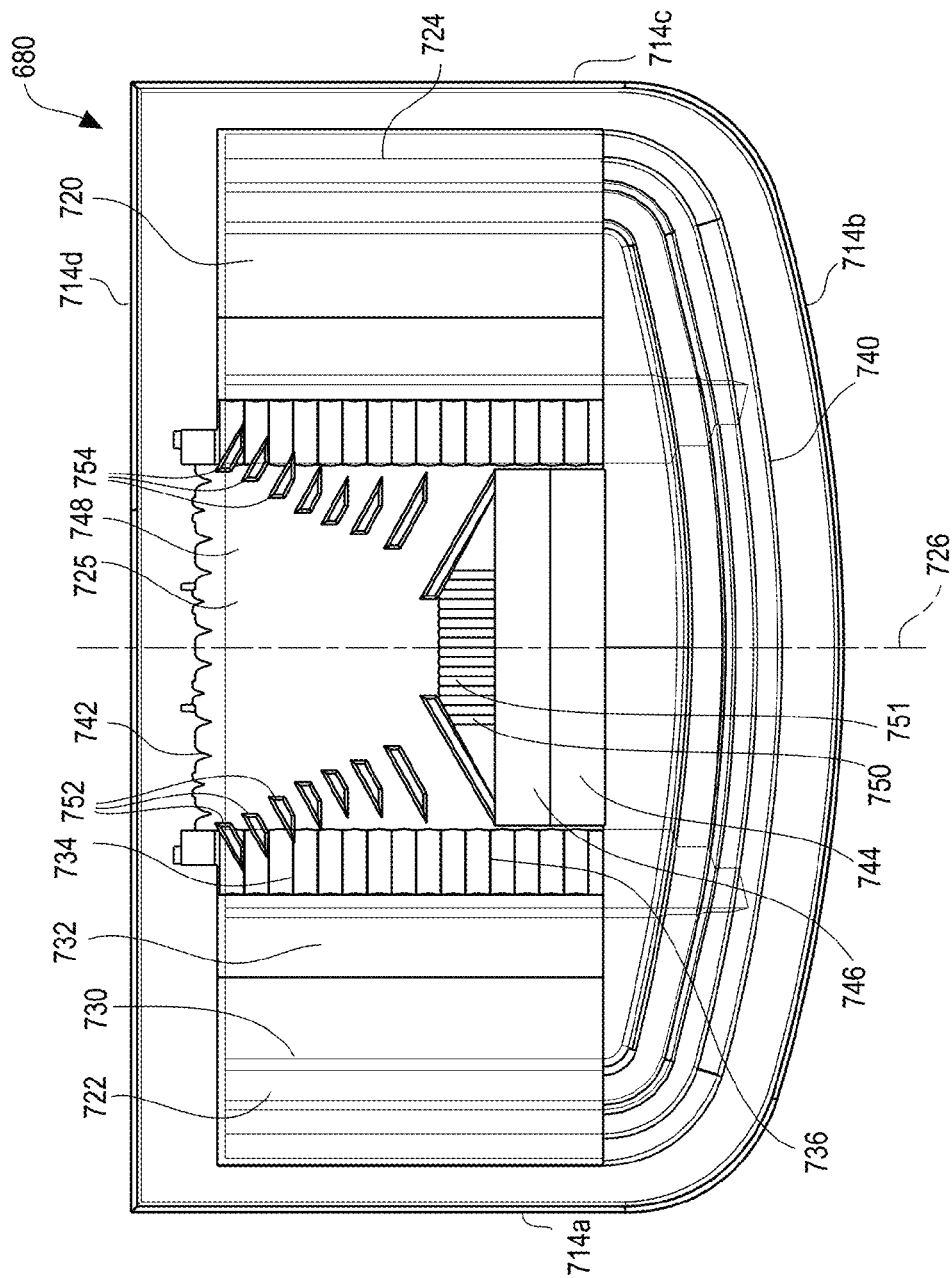
Figure 72:
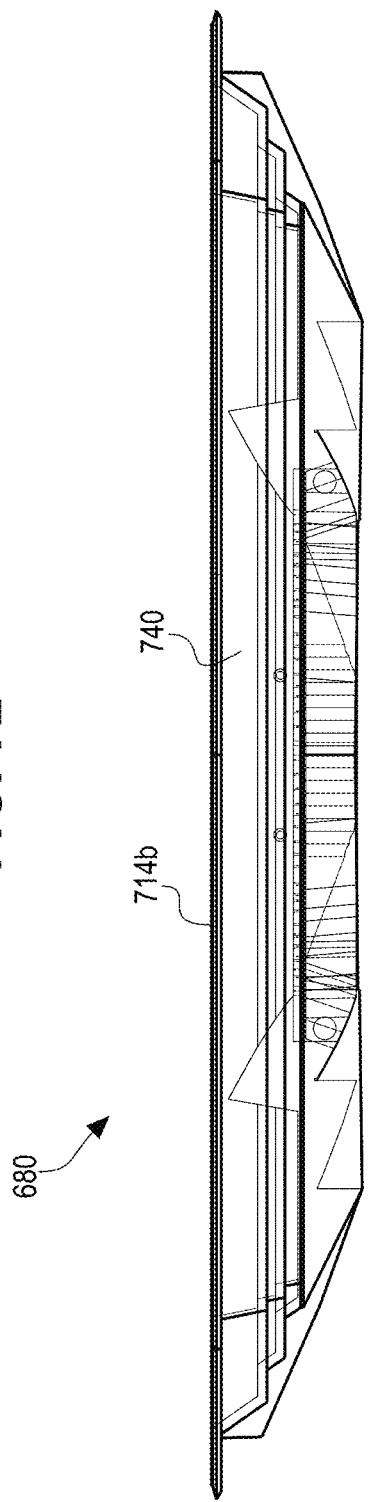
Figure 73:
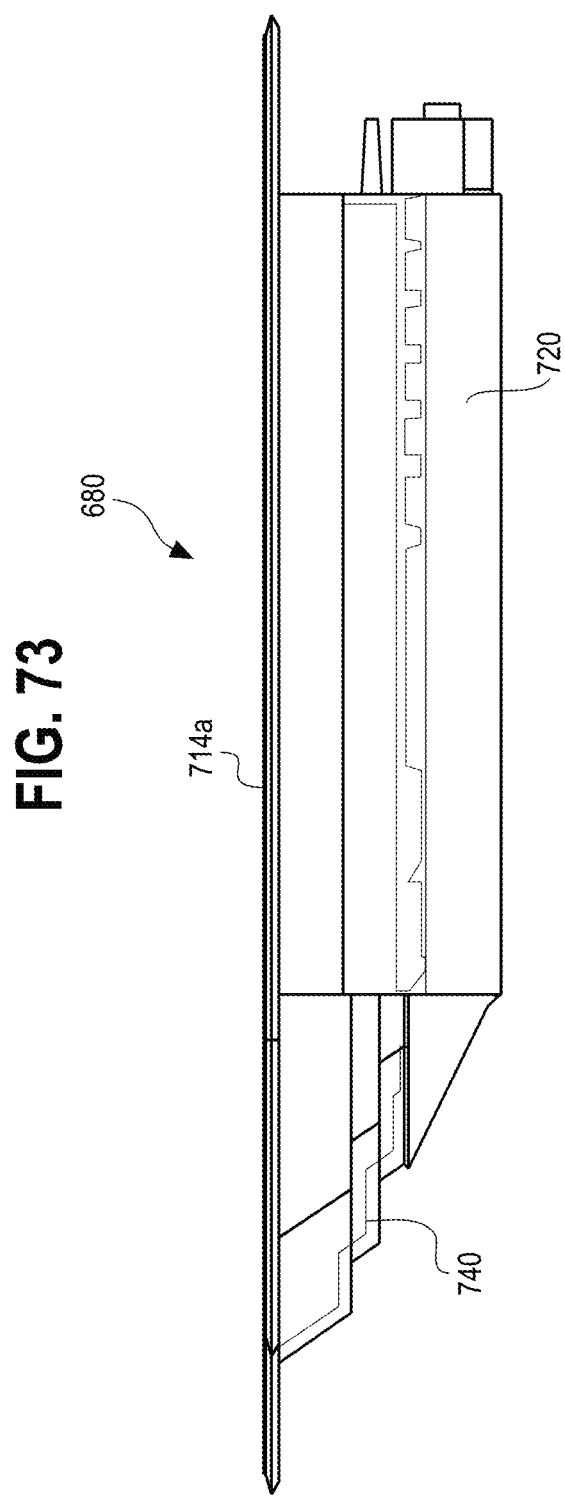
Figure 74:
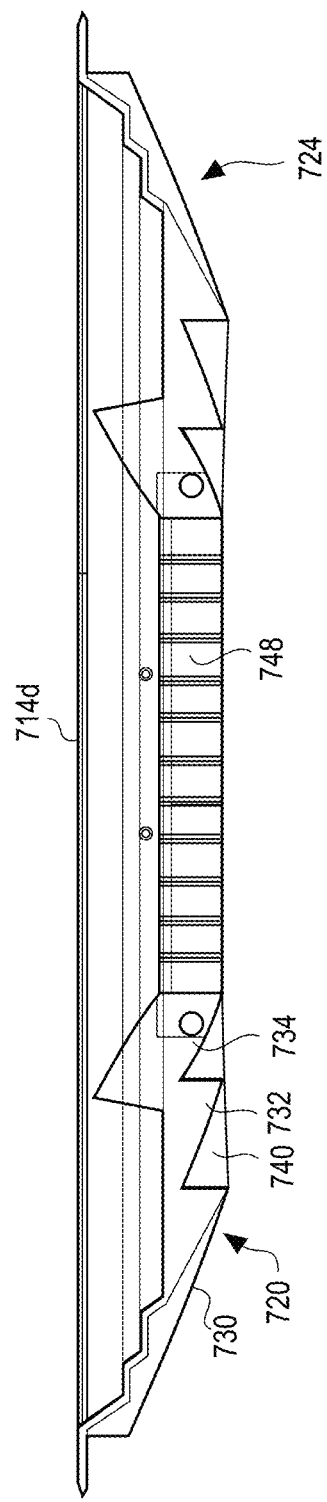

Similar to the waveguide bodies 680, 980, 980a of FIGS. 71, 90, and 91, the waveguide bodies 983, 983a, and 983b of FIGS. 96-99 include a bottom surface 1064 and an outboard portion 1066 of a top surface 1068 are common to each waveguide. The bottom surface 1064 illustrated in FIG. 96 is tray-shaped, and includes planar side surfaces 1070a-1070d disposed about an inner planar surface 1072. An outer planar surface 1074 extends outwardly from and transverse to the side surfaces 1070a-1070d. An inner recessed section 1076 includes two ridge-shaped light extraction members 1078 spaced apart from one another and extending parallel to side surfaces 1070a, 1070c. A rib 1080 protrudes from the inner recessed section 1076 along a center line 1082 of the waveguide body 983.

Figure 100:
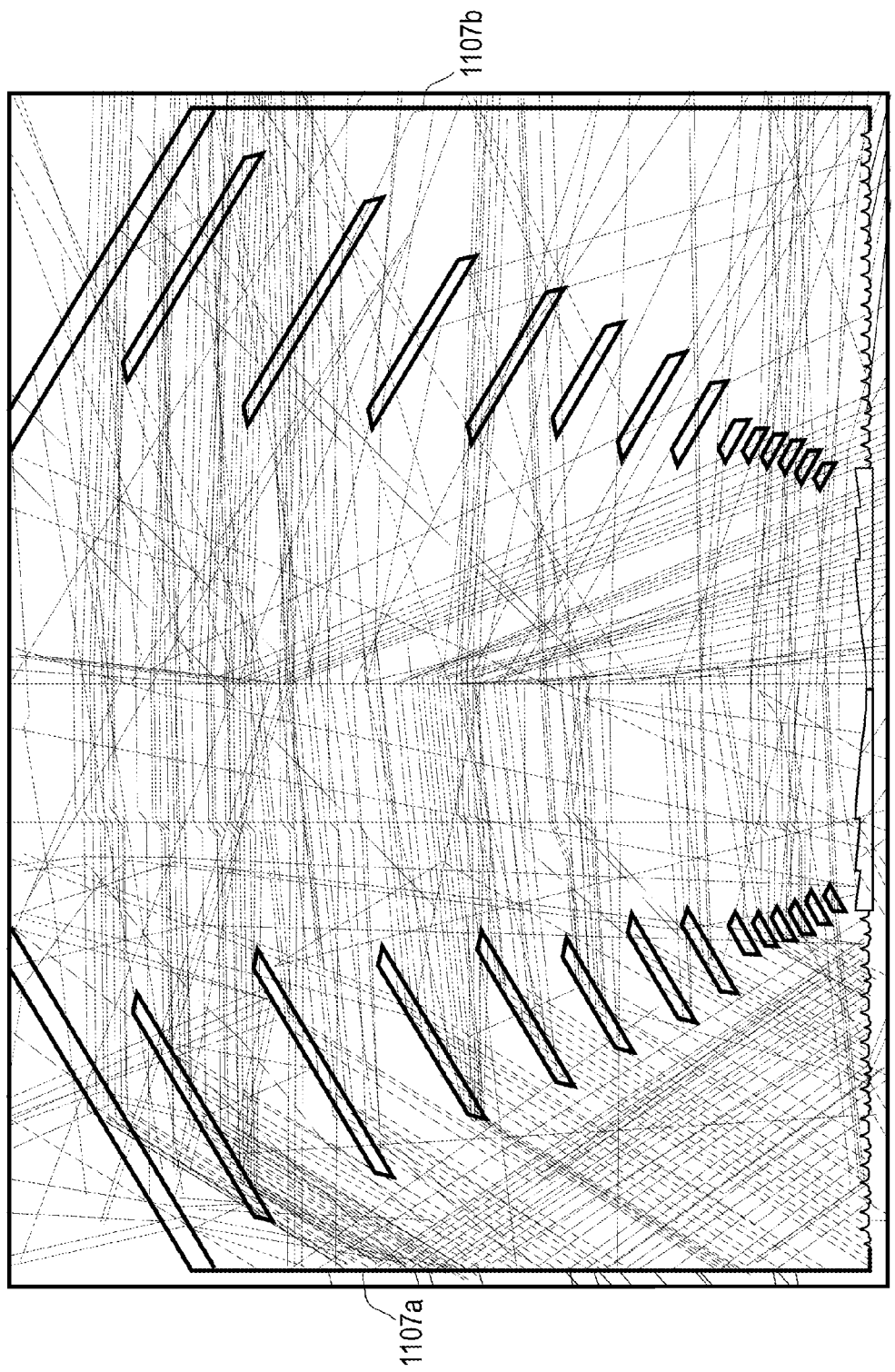
FIG. 100 is a ray trace diagram of a waveguide body having a side wall feature common to the waveguide bodies of FIGS. 97-99.

Referring to FIG. 97, the outboard portion 1066 of the upper surface 1068 includes first and second opposed side surfaces 1084, 1086 along sides 1070a, 1070c, respectively. First and second side walls 1088a, 1088b extend along a portion of the first and second side surfaces 1084, 1086, respectively. Each side wall 1088 includes a planar surface 1090a, 1090b formed by the respective side surfaces 1084, 1086 and a respective inner side surface 1092a, 1092b. The outboard portion 1066 further includes an end portion 1096 having a wedge-shaped light extraction member 1098 and a transition surface 1100. A coupling portion 1102 along the side 1070d includes a planar surface 1104 extending between two pluralities of coupling cavities or features 1106a, 1106b that receive the light developed by the LED elements. The coupling cavities 1106a, 1106b are disposed adjacent to respective side walls 1088a, 1088b such that light incident on the side wall is totally internally reflected within the waveguide bode 983, 983a, 983b. FIG. 100 illustrates the total internal reflection of light on the side wall 1088 along a side 1107a while light escapes from a side 1107b opposite the side 1107a having no side wall feature. During use, first and second groups of light rays are reflected off of respective side walls 1088a, 1088b and extracted through the respective members 1078a, 1078b of the bottom surface 1064 toward the center line 1082 such that the first and second groups of light rays cross one another at the center line 1082. Use of total internal reflection along the sides of the waveguide bodies 983, 983a, 983b allows for a reduction in size of the waveguide body along the x-direction. Additionally, four protrusions 1108a-1108d extend outwardly from the coupling portion 1102 of the waveguide body 983 along the side 1070d. Two corners 1109a, 1109b of the waveguide bodies 983, 983a, 983b may have a rounded shape as shown in FIG. 95. In any embodiment, any sharp corner may be filleted and have a radius of curvature of less than 0.33 mm. Further, as seen in the present embodiment, the linear extent of at least one extraction feature extends the entire length or width of the waveguide, and the linear extent of at least one redirection feature is smaller than the linear extent of the extraction feature.

A central section 1110 is disposed between the side walls 1088a, 1088b and extends between a coupling portion 1102 and the end portion 1096 of the outboard portion 1066. The central section 1110 includes two side sections 1112a, 1112b that are preferably mirror images of one another and are symmetric about the center line 1082, and hence, only the side section will be described in detail. The side section 1112a includes a first plurality of wedge-shaped light extraction members 1114 and a transition area 1116 extending between the side wall 1088a and a planar rectangular portion 1118. In the illustrated embodiment, the plurality 1114 includes four wedge-shaped members and the transition area 1116 has a scalloped surface. End surfaces of the plurality of wedge-shaped light extraction members 1114 are spaced apart from the planar portion 1118 to define a gap 1120 therebetween. A plurality of light redirection cavities 1122 extending into the planar portion 1118 is disposed at an angle relative to a lateral extent of the adjacent coupling portion 1102. The angle may range between about 5 degrees and about 85 degrees, preferably between about 15 degrees and about 45 degrees, and most preferably between about 25 degrees and about 35 degrees. Side surfaces of each cavity 1122 define a prismatic shape and taper together toward the bottom surface 1064 of the waveguide body 983. A second plurality of light extraction wedge-shaped members 1124 and a transition area 1126 are disposed between the planar portion 1118 and the center line 1082, and extend between the coupling portion 1102 and the transition surface 1100 of the end portion 1096. Additionally, the coupling cavities 1106a, 1106b have the same shape relative to the coupling cavities 742, 1028 described above, but differ in size. Referring to FIG. 97A, angles for segments of the curved portions of the coupling cavities 1106a, 1106b having a piecewise linear shape are provided in Table 2.

Sample dimensions for the waveguide body 983 are provided in Table 2 below in reference to FIGS. 97A, 97B, and 97C. Dimensions are provided in mm unless otherwise specified. Each cavity 1036, 1038 may have a length ranging from about 0.1 mm to about 50 mm, preferably from about 1 mm to about 35 mm, and a width ranging from about 0.1 mm to about 10 mm, preferably from about 0.1 mm to about 5 mm.

TABLE 2

Figure 97B:
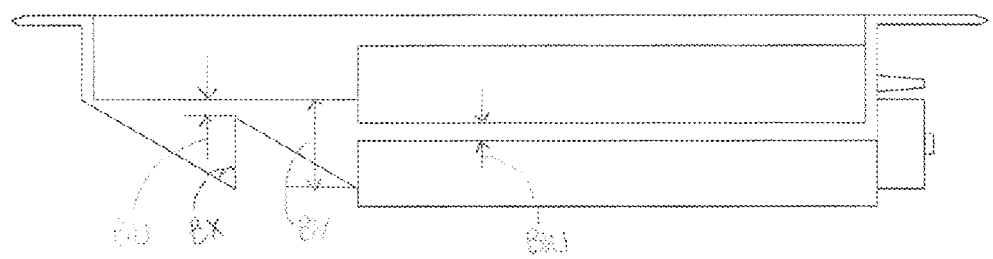
FIGS. 97B and 97C are sectional elevational views taken generally along the lines 97B-97B and lines 97C-97C, respectively, of FIG. 97A.
Figure 97C:
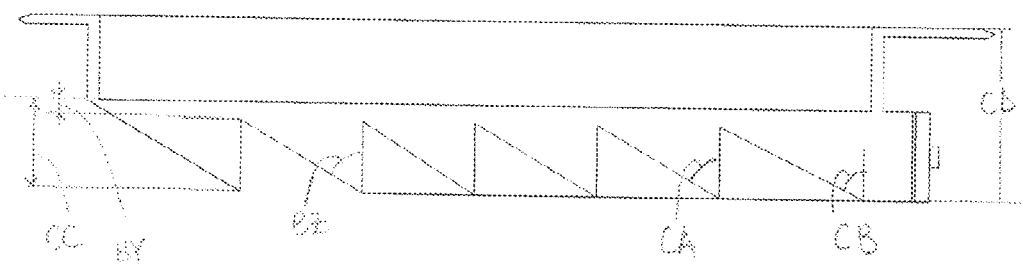

| Waveguide body 983 | |
|---|---|
| FIG. 97A | |
| BB | 421.78 |
| BC | 363 |
| BD | 134.77 |
| BE | 165.07 |
| BF | 16.0 degrees |
| BG | 18.5 degrees |
| BH | 22.0 degrees |
| BJ | 27.5 degrees |
| BK | 34.5 degrees |
| BM | 44.0 degrees |
| BN | 54.0 degrees |
| BP | 65.0 degrees |
| BQ | 75.0 degrees |
| BR | 83.0 degrees |
| BS | 89.0 degrees |
| BT | 93.0 degrees |
| FIG. 97B | |
| BU | 3 |
| BV | 15 |
| BW | 3.02 |
| BX | 60 degrees |
| FIG. 97C | |
| BY | 3 |
| BZ | 60 degrees |
| CA | 55 degrees |
| CB | 55 degrees |
| CC | 15 |
| CD | 29.1 |

The waveguide body 983a of FIG. 98 includes a central section 1128 similar to the central section of the waveguide body of FIG. 12 except for the following differences. The first plurality of wedge-shaped light extraction members 1114 includes three wedge-shaped members and the transition area 1116 is smooth. Further, the plurality of light redirection cavities 122 includes a different number, sizes, and shapes thereof.

As with the previous embodiments, the central section 1130 of the waveguide body 983b of FIG. 99 includes two side sections 1132a, 1132b that are preferably mirror images of one another. Each side section 1132 includes first and second pluralities of wedge-shaped members 1134, 1136 that are disposed transverse to one another. Two wedge-shaped light extraction members of the first plurality 1134 and a transition surface 1138 extend between the side wall 1088a and the second plurality of wedge-shaped members 1136. Two wedge-shaped light redirection members of the second plurality 1136 and a transition surface 1140 are disposed between the first plurality 1134 and the center line 1082. The second plurality 1136 and transition surface 1140 extend between the coupling portion 1102 and the transition surface 1100 of the end portion 1096. A first plurality of light redirection cavities 1142 is disposed at an angle relative to a lateral extent of the coupling portion 1102 and is aligned across the first and second pluralities of wedge-shaped members 1134, 1136. A second plurality of light redirection cavities 1144 extends from the coupling portion 1102 into the transition surface 1138 of the first plurality of wedge-shaped members 1134. Each cavity 1144 has an equilateral triangular shape and is disposed such that a side surface 1146 is parallel to the side 1070d and a point 1148 opposite the side surface 1146 is disposed between the coupling cavities 1106a and the side surface 1146. The cavities 1144 redirect light laterally within the waveguide 983b toward two outer corners 1149a, 1149b opposite the coupling cavities 1106a, 1106b.

In some embodiments, the waveguide body includes a plurality of redirection features and a plurality of extraction features, wherein the redirection features are relatively smaller than the extraction features. In other embodiments, at least one redirection feature has a linear extent in a first direction and at least one extraction feature has a linear extent in a second direction different from the first direction. In further embodiments, the linear extent of at least one extraction feature extends the entire length or width of the waveguide, and the linear extent of the at least one redirection feature is smaller than the linear extent of the extraction feature. In still further embodiments, extraction features are disposed on a bottom surface of the waveguide and redirection features extend into an upper surface of the waveguide opposite the bottom surface. In other embodiments, the redirection features are disposed at an angle relative to a lateral extent of a plurality of coupling cavities and the extraction features are disposed perpendicular and/or parallel to the lateral extent of the plurality of coupling cavities. Still further, the waveguide dimensions are exemplary only, it being understood that one or more dimensions could be varied. For example, the dimensions can all be scaled together or separately to arrive at a larger or smaller waveguide body, if desired.

While a uniform distribution of light may be desired in certain embodiments, other distributions of light may be contemplated and obtained using different arrays of extraction features.

Other embodiments of the disclosure including all of the possible different and various combinations of the individual features of each of the foregoing embodiments and examples are specifically included herein. Any one of the light redirection features could be used in an embodiment, possibly in combination with any one of the light extraction features of any embodiment. Similarly, any one of the light extraction features could be used in an embodiment, possibly in combination with any one of the light redirection features of any embodiment. Thus, for example, a luminaire incorporating a waveguide of one of the disclosed shapes may include extraction features of the same or a different shape, and the extraction features may be symmetric or asymmetric, the luminaire may have combinations of features from each of the disclosed embodiments, etc. without departing from the scope of the invention.

Figure 112:
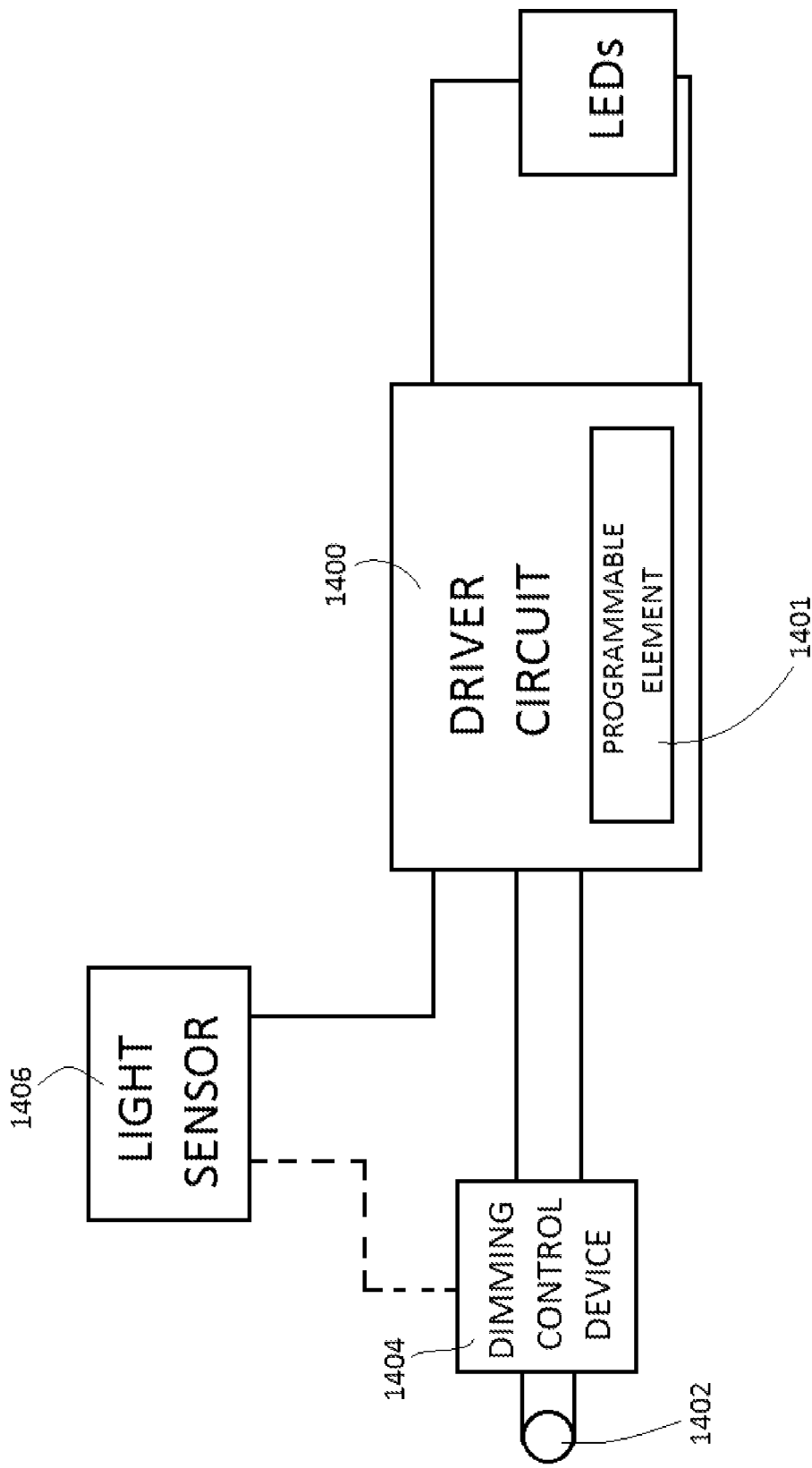
FIG. 112 is a schematic diagram of driver circuitry used with an embodiment of the luminaire.

Referring next to FIG. 112, the driver circuit 1400 may be adjustable either during assembly of the luminaire 10 or thereafter to limit/adjust electrical operating parameter(s) thereof, as necessary or desirable. For example, a programmable element 1401 of the driver circuit 1400 may be programmed before or during assembly of the luminaire 10 or thereafter to determine the operational power output of the driver circuit 1400 to one or more LED strings. A different adjustment methodology/apparatus may be used to modify the operation of the luminaire 10, as desired.

Still further, an adjustable dimming control device 1404 may be provided inside the housing 12 and outside the reflective enclosure member 682, 982, 1182 that houses the circuit board 1405. The adjustable control device 1404 may be interconnected with a NEMA ambient light sensor 1406 and/or dimming leads of the driver circuit 1400 and may control the driver circuit 1400. The adjustable dimming control device 1404 may include a resistive network and a wiper that is movable to various points in the resistive network. An installer may operate (i.e., turn) an adjustment knob 1402 or another adjustment apparatus of the control device 1404 operatively connected to the wiper to a position that causes the resistive network to develop a signal that commands the output brightness of the luminaire to be limited to no more than a particular level or magnitude, even if the sensor 1406 is commanding a luminaire brightness greater than the limited level or magnitude.

If necessary or desirable, the volume of the reflective enclosure member 682, 982, 1182 may be increased or decreased to properly accommodate the driver circuit 1400 and to permit the driver circuit 1400 to operate with adequate cooling. The details of the parts forming the reflective enclosure member 682, 982, 1182 may be varied as desired to minimize material while providing adequate strength.

Further, any of the embodiments disclosed herein may include a power circuit having a buck regulator, a boost regulator, a buck-boost regulator, a SEPIC power supply, or the like, and may comprise a driver circuit as disclosed in U.S. patent application Ser. No. 14/291,829, filed May 30, 2014, entitled "High Efficiency Driver Circuit with Fast Response" by Hu et al. or U.S. patent application Ser. No. 14/292,001, filed May 30, 2014, entitled "SEPIC Driver Circuit with Low Input Current Ripple" by Hu et al. incorporated by reference herein. The circuit may further be used with light control circuitry that controls color temperature of any of the embodiments disclosed herein in accordance with user input such as disclosed in U.S. patent application Ser. No. 14/292,286, filed May 30, 2014, entitled "Lighting Fixture Providing Variable CCT" by Pope et al. incorporated by reference herein.

Any of the embodiments disclosed herein may include one or more communication components forming a part of the light control circuitry, such as an RF antenna that senses RF energy. The communication components may be included, for example, to allow the luminaire to communicate with other luminaires and/or with an external wireless controller, such as disclosed in U.S. patent application Ser. No. 13/782,040, filed Mar. 1, 2013, entitled "Lighting Fixture for Distributed Control" or U.S. provisional application No. 61/932,058, filed Jan. 27, 2014, entitled "Enhanced Network Lighting" both owned by the assignee of the present application and the disclosures of which are incorporated by reference herein. More generally, the control circuitry includes at least one of a network component, an RF component, a control component, and a sensor. The sensor, such as a knob-shaped sensor, may provide an indication of ambient lighting levels thereto and/or occupancy within the room or illuminated area. Such sensor may be integrated into the light control circuitry.

INDUSTRIAL APPLICABILITY

When one uses a relatively small light source which emits into a broad (e.g., Lambertian) angular distribution (common for LED-based light sources), the conservation of etendue, as generally understood in the art, requires an optical system having a large emission area to achieve an asymmetric angular light distribution. In the case of parabolic reflectors, a large optic is thus generally required to achieve high levels of collimation. In order to achieve a large emission area in a more compact design, the prior art has relied on the use of Fresnel lenses, which utilize refractive optical surfaces to direct and collimate the light. Fresnel lenses, however, are generally planar in nature, and are therefore not well suited to re-directing high-angle light emitted by the source, leading to a loss in optical efficiency. In contrast, in the present invention, light is coupled into the optic, where primarily TIR is used for re-direction and light distribution. This coupling allows the full range of angular emission from the source, including high-angle light, to be re-directed, resulting in higher optical efficiency in a more compact form factor.

While specific coupling features and extraction feature parameters including shapes, sizes, locations, orientations relative to a light source, materials, etc. are disclosed as embodiments herein, the present invention is not limited to the disclosed embodiments, inasmuch as various combinations and all permutations of such parameters are also specifically contemplated herein. Any of the features such as various shaped coupling cavities, LED elements, redirection features, extraction features, etc. described and/or claimed in U.S. patent application Ser. No. 13/842,521, U.S. patent application Ser. No. 13/839,949, U.S. patent application Ser. No. 13/841,074, filed Mar. 15, 2013, entitled "Optical Waveguide Body" U.S. patent application Ser. No. 13/840,563, U.S. patent application Ser. No. 14/101,086, filed Dec. 9, 2013, entitled "Optical Waveguides and Luminaires Incorporating Same", U.S. patent application Ser. No. 14/101,132, filed Dec. 9, 2013, entitled "Waveguide Bodies Including Redirection Features and Methods of Producing Same," U.S. patent application Ser. No. 14/101,147, filed Dec. 9, 2013, entitled "Luminaire Using Waveguide Bodies and Optical Elements" U.S. patent application Ser. No. 14/101,129, filed Dec. 9, 2013, entitled "Simplified Low Profile Module with Light Guide for Pendant, Surface Mount, Wall Mount and Stand Alone Luminaires", and U.S. patent application Ser. No. 14/101,051, filed Dec. 9, 2013, entitled "Optical Waveguide and Lamp Including Same", International Application No. PCT/US14/13931, filed Jan. 30, 2014, entitled "Optical Waveguides and Luminaires Incorporating Same", and International Application No. PCT/US14/030017, filed Mar. 15, 2014, entitled "Optical Waveguide Body" incorporated by reference herein and owned by the assignee of the present application may be used in a luminaire, either alone or in combination with one or more additional elements, or in varying combination(s) to obtain light mixing and/or a desired light output distribution. Thus, for example, any of the luminaires disclosed herein disclosed herein may include one or more waveguide bodies including coupling features, one or more light redirection features, one or more extraction features or optics, and/or particular waveguide body shapes and/or configurations as disclosed in such applications, as necessary or desirable. Other waveguide body form factors and luminaires incorporating such waveguide bodies are also contemplated.

At least some of the luminaires disclosed herein are particularly adapted for use in installations, such as outdoor products (e.g., streetlights, high-bay lights, canopy lights) preferably requiring a total luminaire output of at least about 2,000 lumens or greater, and, in some embodiments, a total luminaire output of up to about 10,000 lumens, and, in other embodiments, a total lumen output from about 10,000 lumens to about 23,000 lumens. Further, the luminaires disclosed herein preferably develop a color temperature of between about 2500 degrees Kelvin and about 6200 degrees Kelvin, and more preferably between about 3000 degrees Kelvin and about 6000 degrees Kelvin, and, in some embodiments, between about 3,500 degrees Kelvin and about 4,500 degrees Kelvin. Also, at least some of the luminaires disclosed herein preferably exhibit an efficacy of at least about 90 lumens per watt, and more preferably at least about 100 lumens per watt, and more preferably, about 110 lumens per watt. Further, at least some of the waveguide bodies used in the luminaires disclosed herein preferably exhibit an overall efficiency (i.e., light extracted out of the waveguide body divided by light injected into the waveguide body) of at least about 90 percent. A color rendition index (CRI) of at least about 80 is preferably attained by at least some of the luminaires disclosed herein, with a CRI of at least about 85 being more preferable. The luminaires disclosed herein produce a scotopic to photopic (S/P) ratio of at least 1.4, preferably at least 2.0. Any desired form factor and particular output light distribution, including up and down light distributions or up only or down only distributions, etc. may be achieved.

Embodiments disclosed herein are capable of complying with improved operational standards as compared to the prior art as follows:

| | State of the art standards | Improved standards achievable by present embodiments |
|---|---|---|
| Input coupling efficiency (coupling + waveguide body) | 90% | About 95% plus improvements through color mixing, source mixing, and control within the waveguide body |
| Output efficiency (extraction) | 90% | About 95%: improved through extraction efficiency plus controlled distribution of light from the waveguide body |
| Total system | ~80% | About 90%: great control, many choices of output distribution |

In certain embodiments, the waveguide bodies used in the luminaires disclosed herein may generally taper from a central portion to an outside edge thereof so that substantially all light is extracted during a single pass of each light ray from the LED element(s) to the outer edge of the waveguide body. This extraction strategy maximizes the incidence of light rays impinging on an outer side of each extraction feature and being reflected out a surface (or surfaces) of the waveguide body in a controlled manner, as opposed to striking other surfaces at an angle greater than the critical angle and escaping as uncontrolled light. The outer sides of the extraction features are accurately formed so that control is maintained over the direction of extracted light, thereby allowing a high degree of collimation. Still further, the waveguide body is very low profile, leaving more room for heat exchanger structures, driver components, and the like in the luminaire. Also, glare is reduced as compared with other lamps using LED light sources because light is directed outwardly in the waveguide body while being extracted from the waveguide body by the extraction features such that the resulting emitted light is substantially mixed and substantially uniformly distributed throughout the beam angle. The result is a light distribution that is pleasing and particularly useful for general illumination and other purposes using a light source, such as one or more LED element(s).

In some embodiments, one may wish to control the light rays such that at least some of the rays are collimated, but in the same or other embodiments, one may also wish to control other or all of the light rays to increase the angular dispersion thereof so that such light is not collimated. In some embodiments, one might wish to collimate to narrow ranges, while in other cases, one might wish to undertake the opposite. Any of these conditions may be satisfied by the luminaires utilizing waveguide bodies disclosed herein through appropriate modification thereof.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar references in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Numerous modifications to the present disclosure will be apparent to those skilled in the art in view of the foregoing description. Preferred embodiments of this disclosure are described herein, including the best mode known to the inventors for carrying out the disclosure. It should be understood that the illustrated embodiments are exemplary only, and should not be taken as limiting the scope of the disclosure.

We claim:

1. An optical waveguide body comprising orthogonal x- and y-dimensions, comprising:
   at least one coupling feature for directing light into the waveguide body and the at least one coupling feature extending into the waveguide body from an end surface;
   at least one light redirection feature extending in the x- and y-dimensions for redirecting light within the waveguide body;
   at least one first light extraction feature extending in the x-dimension for extracting light out of the waveguide body;
   at least one second light extraction feature extending in the y-dimension for extracting light out of the waveguide body; and
   at least one light extraction rib extending in the y-dimension and disposed within a first side of the waveguide body transverse to the end surface;
   wherein the at least one first light extraction feature, the at least one second light extraction feature, and the at least one light redirection feature are disposed within a second side of the waveguide body transverse to the end surface;
   wherein the at least one first light extraction feature and the at least one second light extraction feature comprise first and second sloped surfaces, respectively, and the first and second sloped surfaces face different directions.

2. The optical waveguide of claim 1, wherein the at least one light redirection feature comprises at least two light redirection features that are mirror images of one another with a gap therebetween.

3. The optical waveguide of claim 2, wherein the at least one light redirection feature comprises at least two sets of light redirection features that are mirror images of one another with a gap therebetween.

4. The optical waveguide body of claim 1, wherein the at least one first light extraction feature comprises at least one further light extracting feature disposed between the at least one coupling feature and the at least one first light extraction feature.

5. The optical waveguide body of claim 4, wherein the at least one further light extraction feature comprises a TIR surface for reflecting light in the optical waveguide.

6. The optical waveguide body of claim 1, wherein the at least one first light extraction feature comprises at least two spaced further light extracting features disposed between the at least one coupling feature and the at least one first light extraction feature.

7. The optical waveguide of claim 6, wherein each of the at least two spaced further light extraction features comprises a pair of light extraction surfaces.

8. The optical waveguide of claim 7, wherein each pair of light extraction surfaces comprises light scattering features.

9. The optical waveguide of claim 8, wherein each pair of light extraction surfaces is bounded by two side surfaces that comprises light scattering features.

10. The optical waveguide body of claim 6, wherein a channel is defined between TIR surfaces of the at least two spaced further light extraction features and wherein the TIR surfaces reflect light along the channel toward the at least one light redirection feature.

11. The optical waveguide body of claim 10, wherein each TIR surface comprises light scattering features.

12. The optical waveguide body of claim 6, further comprising a TIR feature disposed between the at least two spaced further light extraction features wherein the TIR feature comprises opposed first and second TIR surfaces and wherein a first channel is defined between the first TIR surface and a third TIR surface of one of the further light extraction features and a second channel is defined between the second TIR surface and a fourth TIR surface of another of the further light extraction features.

13. The optical waveguide body of claim 12, wherein the first and second channels are adapted to direct light in the waveguide toward the at least one light redirection feature.

14. The optical waveguide body of claim 13, wherein the at least one light redirection feature comprises first and second sets of light redirection features aligned with the first and second channels, respectively.

15. The optical waveguide body of claim 1, further comprising at least one third light extraction feature extending in the x- and y-dimensions for extracting light out of the waveguide.

16. The optical waveguide body of claim 15, wherein the at least one third light extraction feature comprises light scattering features.

17. The optical waveguide body of claim 1, wherein the at least one light redirecting feature is disposed between the at least one coupling feature and the at least one first light extraction feature.

18. The optical waveguide of claim 1, wherein the at least one light redirecting feature comprises first and second sets of light redirecting features wherein all but at least one of the light redirection features of the first set are spaced from all but at least one of the light redirecting features of the second set.

19. The optical waveguide of claim 18, wherein the light redirecting features of the first and second sets are spaced from one another along the y-dimension and comprise inner edges that are offset with respect to one another along the x-dimension.

20. The optical waveguide of claim 19, wherein the inner edge of each light redirection feature of the first set is aligned with the inner edge of an associated light redirection feature of the second set along the y-dimension and wherein a spacing between inner edges of associated light redirection features of the first and second sets decrease with distance from the at least one coupling feature along the y-dimension.

21. The optical waveguide of claim 18, wherein the at least one of the light redirection features of the first set is contiguous with the at least one of the light redirection features of the second set to define at least one combined light redirection feature.

22. The optical waveguide of claim 21, wherein each light redirection feature is elongate in the x- and y-dimensions.

23. The optical waveguide of claim 22, wherein the at least one combined light redirection feature comprises a chevron shape.

24. The optical waveguide of claim 23, wherein the at least one combined light redirection feature comprises a light extraction surface.

25. The optical waveguide of claim 24, wherein the light extraction surface comprises light scattering features.

26. The optical waveguide of claim 1, wherein the at least one light redirection feature comprises a cavity.

27. The optical waveguide body of claim 1, wherein the at least one light extraction feature comprises a tapered surface.

28. The optical waveguide of claim 1, wherein the at least one light redirection feature is disposed on a first face, and further comprising at least one light extraction rib on a second face opposite the first face.

29. The optical waveguide of claim 28, wherein the at least one rib comprises light scattering features.

30. A luminaire comprising the optical waveguide body of claim 1.

31. The luminaire of claim 30, further comprising:
a housing adapted for outdoor use;
a driver circuit disposed in the housing;
at least one of a control device and an element associated with the driver circuit adapted to control an illumination output of the luminaire.

32. The luminaire of claim 31, wherein the control device comprises a dimming control device adapted to controllably limit a brightness of the luminaire.

33. The luminaire of claim 32 wherein the control device comprises a programmable element adapted to limit power developed by the driver circuit.

34. A luminaire, comprising:
an optical waveguide body comprising orthogonal x- and y-dimensions, a housing for outdoor use, and a control device comprising a programmable element adapted to limit power developed by a driver circuit wherein the optical waveguide body, the control device, and the driver circuit are disposed within the housing, the optical waveguide body comprising:
at least one coupling feature for directing light into the waveguide body and the at least one coupling feature extending into the waveguide body from an end surface;
at least one light redirection feature extending in the x- and y-dimensions for redirecting light within the waveguide body;
at least one first light extraction feature extending in the x-dimension for extracting light out of the waveguide body;
at least one second light extraction feature extending in the y-dimension for extracting light out of the waveguide body; and
at least one light extraction rib extending in the y-dimension and disposed within a first side of the waveguide body transverse to the end surface;
wherein the at least one first light extraction feature, the at least one second light extraction feature, and the at least one light redirection feature are disposed within a second side of the waveguide body transverse to the end surface.

* * * * *